US005557515A

United States Patent [19]

Abbruzzese et al.

[11] Patent Number: 5,557,515

[45] **Date of Patent: * Sep. 17, 1996**

[54] COMPUTERIZED SYSTEM AND METHOD FOR WORK MANAGEMENT

[75] Inventors: Pamela Abbruzzese, Newington, Conn.; Paul Bailey, Butler, Pa.; Denise L. Fritz, West Simsbury; John Lawler, Columbia, both of Conn.; Rick Manning, Palmer, Mass.; Russ Pollnow, Manchester, Conn.; Anthony Retartha, Burlington, Conn.; Mary J. Round, South Windsor, Conn.; Marc Schardt, Bolton, Conn.; Barbara Synodinos, Pawcatuck, Conn.; Robert Tanner, Plainville, Conn.

[73] Assignee: Hartford Fire Insurance Company, Inc., Hartford, Conn.

[ * ] Notice: The portion of the term of this patent subsequent to Jan. 26, 2010, has been disclaimed.

[21] Appl. No.: 407,499

[22] Filed: Mar. 17, 1995

Related U.S. Application Data

[63] Continuation of Ser. No. 791,411, Nov. 15, 1991, abandoned, which is a continuation-in-part of Ser. No. 392,842, Aug. 11, 1989, Pat. No. 5,182,705.

[51] Int. Cl.[6] .................... G06F 17/60

[52] U.S. Cl. .................... 364/401 R; 364/419.1; 395/145

[58] Field of Search .................... 364/401, 419.1, 364/402; 395/600, 650, 145, 146, 147, 148, 149

[56] References Cited

U.S. PATENT DOCUMENTS

| | | | |
|---|---|---|---|
| 4,503,499 | 3/1985 | Mason et al. | 395/650 |
| 4,831,526 | 5/1989 | Luchs et al. | 364/401 |
| 4,918,588 | 4/1990 | Barrett et al. | 395/600 |
| 5,155,850 | 10/1992 | Janis et al. | 395/600 |
| 5,161,214 | 11/1992 | Addink et al. | 395/145 |
| 5,168,444 | 12/1992 | Cukor et al. | 364/406 |
| 5,181,162 | 1/1993 | Smith et al. | 364/419 |
| 5,182,705 | 1/1993 | Barr et al. | 364/401 |
| 5,191,525 | 3/1993 | LeBrun et al. | 364/419.1 |

*Primary Examiner*—Robert A. Weinhardt
*Attorney, Agent, or Firm*—Plevy & Associates

[57] ABSTRACT

A computerized system and method for managing work in process is provided. Case specific information, including information from an initial transaction is electronically entered into a database and automatically linked with a work source index which includes basic client information. Input information residing in externally generated documents is scanned into the system as images for subsequent display or conversion to textual data. As work is performed on the case, the system tracks its progress and provides a variety of support functions. An electronic activity log function maintains a record of key activities involved in the processing of work items.

27 Claims, 46 Drawing Sheets

DIARY

*TITLE BLOCK

IDENTIFIES A SERIES OF RELATED PROCESSING WITH A TITLE COMMENT

BLOCK

IDENTIFIES A SECTION OR A SIMPLE CONDITION (IF WITH NO ELSE)

SELECTION BLOCK

A CASE CONSTRUCT
(i.e. ONLY ONE OF THE OPTIONS IS PERFORMED)

REPETITION

UNTIL SOME CRITERIA IS MET

*FIG. 7*

COMPUTERIZED SYSTEM AND METHOD FOR WORK MANAGEMENT

This is a continuation of application Ser. No. 07/791,411, filed on Nov. 15, 1991, entitled Computerized System and Method for Work Management, now abandoned, which is a continuation-in-part of application Ser. No. 392,842, filed Aug. 11, 1989, now U.S. Pat. No. 5,182,705.

A. FIELD OF THE INVENTION

This invention relates to computer systems and methods, and more particularly to such systems and methods for work management and the like.

B. BACKGROUND OF THE INVENTION

The processing and tracking of work in process in most environments is virtually non-existent or intensely manual. By way of example, the processing and tracking of damage loss claims has been a time-consuming, mostly manual process requiring multitudes of paper records. As such, claim processing and tracking is expensive, complex and relatively unreliable in maintaining the collected information.

In a typical prior art claim processing system, a claims office receives an initial notice of a loss from an insured, a claimant, a customer or an agent. The loss notification is received by mail, telephone, or in-person. By way of example, when a notice of loss is received by mail in the claims office, it is sorted into the appropriate line of insurance business (e.g. workers' compensation, automobile, property/liability, fidelity/surety etc.) (See FIG. 1). Loss Notices are then delivered to one or more assistant managers and/or unit supervisors who review the notices and determine which claim "handler" actually will work on the claim(s). The supervisor also determines a diary date which is recorded on the original file to check on the status of the claim and the assigned handler's progress. The supervisor then sends a copy of the notice to that handler and calculates and notes the specific reserves to be set aside for the claim.

The original notice is given to a clerk for manual issuance of a claim number from a Register Book and for input into FOCS. (FOCS is a computer based claim recording system which relies on a mainframe computer located at a remote location to record the notice of loss. The FOCS system is used to record only actual claims and to issue certain payments. No claim adjustment support is provided to assist a claim handler in the progress of a claim to conclusion. The purpose of FOCS is essentially to assist in the maintenance of corporate financial records.) After the notice of loss information has been input into FOCS, a file is prepared and filed.

On a daily basis, clerks search all "open" files for claims with a diary date matching the day's date (See FIG. 2). All applicable files are removed and given to the appropriate claim handler or supervisor. After the necessary action is taken the files are refiled and any new diary dates noted.

When a claimant or insured calls to check on the status of a claim the handler, supervisor or clerk must again retrieve the file from wherever it is filed (See FIG. 3). The file is reviewed as necessary and then left for a clerk for refiling. At any time while the file is not properly filed, no correspondence received or other document can be placed in the file without undertaking a search for the file.

During the time the claim is "open", key events must be recorded in an Activity Log to provide an audit trail. (The Activity Log is one or more preprinted sheets of paper which are affixed to the inside of the claim file.) As these key activities occur, the claim handler is obligated to record them in the Activity Log. If the file is not located immediately, it becomes likely that the key event(s) will be recorded inaccurately or not at all.

When work on the claim has been completed, the handler requests that the file be closed. (See FIG. 4). A closure statement is input into the FOCS system to update the corporate record and the file is stamped closed and filed in a "closed" file bank. After a specific retention period all files are put in dead storage and then eventually destroyed.

As can be clearly seen, the prior art claim processing system, like most work processing systems, requires that the file be available for virtually every activity. Thus, when files are not found in their normal location, problems arise. Still further, recording of specific key events in the Activity Log and the maintenance of diary dates depends on human diligence. As such, many things which should be done or recorded never get completed in a timely manner, if at all.

C. OBJECTS OF THE INVENTION

Accordingly it is an object of the present invention to provide a system and method for alleviating the foregoing problems and improving upon the prior systems and methods.

It is another object of the present invention to reduce the time to respond to telephone inquiries about work in process.

It is a further object to automatically and securely maintain a record of the activities of all staff members in work processing.

It is yet another object to minimize the time to prepare and complete forms, letters, reports and checks in processing work.

It is a still further object to reduce or eliminate paper in the maintenance of records in processing work.

It is yet a further object to capture all physical documentation for the processing of work as electronic images which can be readily stored and retrieved.

It is another object to electronically associate substantiating documentation with all payment transactions undertaken through a computerized work management system.

It is yet another object to automatically track the time spent in particular matters which are undertaken through a computerized work management system.

It is a still further object to integrate the use of electronic imaging, voice processing and text data manipulation in a computerized work management system.

It is yet a further objective to enable multiple staff members to concurrently access image and text information in the processing of work in a computerized work management system.

D. SUMMARY OF THE INVENTION

In accordance with the present invention, there is provided a system and method for substantially automating work management. To illustrate the capabilities of this system and method, reference is made mainly to the processing of insurance claims. This reference should not be construed as a limitation on the application of this System to other work environments.

Throughout this specification, reference will be made primarily to two embodiments of the present invention ("first embodiment" and "second embodiment"). The first embodiment is a work management system which generally relies on manual input of documentary information and requires ready access to actual physical documentation. The second embodiment virtually eliminates the need for access to physical documentation by providing the capability to store and retrieve electronic images of documents. Where no distinction is made between embodiments the description should be construed to be applicable to all.

In the insurance claim adjustment environment, the present invention provides claim office supervisors and other staff members with the ability to maintain an accurate record of all activities undertaken in the processing of a claim and the further ability to quickly and easily access the complete claim file.

In accordance with a first embodiment of the present invention the processing of a claim begins with the receipt of a notice of loss ("Loss Notice") from an insured, a claimant, a customer or an agent. These Loss Notices are received by mail, telephone, in person or electronically. The information from these notices is keyed into a local computer where a separate electronic file or record is created for each "loss event and stored in a Loss Event database table."

In accordance with a second preferred embodiment of the present invention, work processing begins with the manual sorting of received mail. The sorted mail is first loosely indexed and then scanned into a local computer via a digital scanner. (The scanned documents are stored as electronic "images" which can be retrieved at will). The scanned mail is then electronically "routed" to office personnel identified by electronic addresses, or to one or more electronic queues. The various queues are reviewed by appropriate staff members who further electronically route the images to another staff member or, in rare cases, delete the image(s).

The actual processing of a claim begins with the receipt a notice of loss usually on a standardized form. In one preferred version of the second embodiment, after a standardized notice is scanned, it is sent to an Optical Character Recognition Device ("OCR") which reads the information in pre-defined zones on the form and places it in the appropriate fields in a Loss Claim database table.

In accordance with the present system and method, an operator accesses the local computer through a terminal, where he requests (usually through a displayed menu) a series of input screens called the Loss Processing Transaction ("LPTX"). These screens, which comprise the LPTX, each have a number of empty input fields preceded by descriptive prompts. In the first embodiment, the Loss Notice is manually input, through the LPTX screens, from the documentation or telephone call. In the second embodiment, if the Loss Notice cannot be processed by the OCR, the information is manually input into the Main CPU, in accordance with the descriptive prompt from the Loss Notice image which is displayed simultaneously with the various LPTX input screens.

A separate series of LPTX screens is typically available for each line of insurance business (e.g. workmen's compensation, automobile, property/liability, fidelity/surety, etc.). Thus, the particular LPTX screens which are displayed to the input operator are formatted according to the particular line of business which is the subject of the claim.

The LPTX is designed to capture information relevant to claim recording and to the loss adjustment process. All data relating to a claim which is collected, is stored in one or more locally supported database adapted to interface with a remotely located host computer ("Host") and its databases. The Host computer preferably maintains policy and other information, used in the loss adjustment process, that is also employed in the regular activities of the company.

If, for example, the claim is related to an automobile loss, a variety of relevant information is input from the Loss Notice and other sources (e.g. the insured's policy, police reports, interviews, etc.), including: information about the insured, information about the insured's policy, information regarding special procedures to be undertaken in the processing of the claim, a description of the accident, a description of any physical or property damage, information regarding any injured party, information about witnesses and/or passengers and any other relevant comments. All this information need not be immediately input into the claim file created with the LPTX. It may be added subsequently as more details are uncovered during the investigation of the loss.

Prior to inputting the Loss Notice information, the insured's policy information is verified by extracting such information from the local computer's databases or by interfacing with the Host and its databases, depending on where the policy information resides. This information "pre-fills" certain fields in the LPTX thereby further minimizing operator input.

In accordance with the first embodiment, once the information requested in the LPTX is input, and stored in a local database, the transaction is typically either "routed" by the input operator to a supervisor to access and review the file or directly "assigned" to a particular claim handler. When a claim is routed to a supervisor or assigned to a claim handler, a message is generated to the person's "mailbox" (discussed in detail below) briefly summarizing the claim transaction. If a claim is routed to a supervisor, he reviews the claim, then electronically assigns it to a particular staff member and sets aside reserves (based on his experience and calculations) to cover the expected cost of the claim. When the claim is assigned to a claim handler, an automatic numbering facility assigns the next available, appropriate number(s), from a numbering registry, to the claim(s). This facility eliminates the extra, manual step of ascertaining the next unused number(s) and recording it on the claim file and elsewhere.

When a claim is assigned, at least one due date ("diary" date) is typically set for the claim handler and/or the supervisor. The diary dates set for the handler are normally done automatically. In different versions of the present invention, diary dates for the supervisor can be set manually or automatically to encourage the supervisor to review the progress of the claim. Automatic dates are calculated and set by the System based on the type of claim and the handler's experience. Manual dates can be set to override or augment the automatic dates set by the system. Dates also may be set in the "Diary" by the claim handler or any other staff member with appropriate authority.

In the first embodiment, an electronic Activity Log is automatically created at the time of the first activity in the processing of the claim through the System. In the second embodiment, the Activity Log is automatically created when the new claim file is established along with a first entry defining the date the Loss Notice (image) was received into the system, when the image was attached for review and when the image was processed and by whom.

An Activity Log is essentially an overview of key activities associated with the loss adjustment process (e.g. payments, interviews, correspondence, images (in the second embodiment) etc.). Comments are electronically entered into the log to document these activities through normal keyboard entry or automatically generated when a specific system activity is undertaken. The date and the operator's initials are automatically entered into the Activity Log with the entry. Entries into the log are readily accessible for review by an operator and are displayed in reverse chronological order so that the most recent entries appear first.

In the second embodiment of the present invention, images and voice can be "linked" with individual Activity Log entries. The entries may include comments describing the image or voice message, but comments are not required. The linking of images to Activity Log entries provides the user with the ability to access pertinent documents from the Activity Log where they are identified and would logically be located.

Whenever certain functions within the system are accessed, and activities undertaken therefrom (e.g. Text processing or Payments), entries are automatically made to the Activity Log for that claim. The entries summarize the activity without conscious effort by the operator. Each entry consists of the date, the operator, the activity and the specifics associated with that activity (e.g. check issued for $500.00 to John Doe, etc.). In the second embodiment, for example, when a payment transaction is completed, the specifics of the payment are automatically written to the Activity Log and the associated substantiating documentation (images) is linked to the comment. The extra steps which would be required to locate the log, recall the specifics of the activity, and make a manual entry are eliminated. A handler's memory is not involved at all and the Activity Log will thus be accurate and up-to-date. Still further, the log serves as an audit trail because the Activity Log entries, once made, are secure and cannot be changed.

Individual claim files may be accessed directly by selecting a particular Diary entry. When the claim is accessed from the Diary in this manner, the Activity Log associated with the particular claim is displayed. This permits the handler or supervisor to find out the most recent activity undertaken or to see particular instructions which should be followed. If a Diary entry is not accessed or reset to another date, it will "rollover" to the succeeding day until it is accessed and rediaried. This prevents dates from being missed due to an unexpected absence or illness. If a Diary date rolls over too many times an "alert" message is generated to the handler's supervisor. The number of allowed "rollovers" is defined by a "Staff Table" through which specific parameters for staff member System usage are established.

The Diary also acts as a work load monitoring tool because the number of claims which should be "diaried" for any given day is limited. For example, if a supervisor/manager attempts to set a Diary date on a claim for a particular handler when the Diary listing for that handler already has the maximum number of claims to be reviewed for that day (as defined in the Staff Table for that handler), a message is displayed to the supervisor. (Despite the message, the supervisor can still assign the Diary date, if he desires). In this way, work can be more efficiently distributed throughout an office or a more realistic workload established for a particular handler.

Text processing is also preferably included within the system. This provides automatic/semi-automatic generation of forms and letters tailored to the particular office and the particular claim. In practice, the Text processing function is selected and a form or letter then chosen. Most of the preprepared forms and letters have blank fields embedded in them to make them specific to the appropriate claim. The System automatically attempts to fill in these blank fields from information previously entered and stored in the claim database. This saves time because the operator does not need to locate the basic claim information in a paper file or key it in. If all the necessary information to complete the document is not available from the claim file, the operator is prompted to provide it manually. When all the required fields in the document have been filled, the document's text data is sent to a printer. The documents are precoded to apprise the System and an output operator (an individual in charge of the printing of forms, letter and/or checks) of the proper paper on which the correspondence is to be printed and the number of copies to be generated. An Activity Log comment is also automatically generated to document the activity.

It is preferred that a Payment function be included in the System. There are typically four types of payments which can be made: (1) closing payments; (2) repetitive payments; (3) partial payments; and (4) reopen/close payments. Checks may be issued for any of the four types of payments upon selection by the claim handler. Many of the fields on the various payment screens are prefilled from information previously entered into the claim file (database). If insufficient information is available in the claim file to print a check, the operator is prompted to manually input the missing information in the appropriate fields.

If the requested amount of a check exceeds the specific monetary authority of the person authorizing the request, as defined in that user's corresponding Staff Table, the check request is automatically routed to a supervisor for approval. (In the second embodiment, any substantiating documentation (images) is also routed for review). Thus, all checks which are finally printed have been duly authorized.

There are two ways checks can be automatically issued. With the first method the check request is sent from the local computer to the Host computer where it is processed. The Host assigns a check number and sends a check printing command to a check printing queue for printing on a check printer located in the local office. With this method the local system is only involved in the front end of the transaction. The rest of the check transaction is handled by the Host computer. When the check transaction is completed, the check number is sent to the local system where it is recorded in the electronic claim file.

With the second method the check request is processed by the local computer which debits the local office's account in real time. (With the first method the corporate account is debited off-hours after all checks have been issued for a given day). The assignment of check numbers occurs locally and the check printing command is issued by the local computer. The Host is typically apprised of the check transactions via batch uploading from the local computer at various intervals.

As indicated above, all payments generate an entry to the Activity Log including: amount, requester, nature of benefit, payee name and check number (and in the second embodiment, substantiating documentation). This happens automatically without any effort on the part of an operator.

In one preferred embodiment of the present invention, an interactive Help system is available. The Help system is generally invoked from any screen, during any operation of the system, throughout the processing of a claim. It is activated by actuating one or more "function" keys at a terminal (i.e. separate keys which do not normally generate alphanumeric characters on the display screen). The Help function initially displays transaction and/or field specific codes which are used for filling in data fields within the various screens. Actuating still other function keys provides an explanation as to how to select and move between modules and operations within the system and accomplish various transactions or activities. The Help function is used to assist an operator in the proper input of information and the manipulation of screens and functions.

An "Info Search" feature, in a preferred embodiment of the invention, permits any operator to check on the status of a claim based on only minimal information, such as: the insured's last name, the claimant's last name, the insured's policy number or the claim number. (When a claim file is created this "minimal information" is automatically entered as a record into database tables for this purpose.) This feature is particularly valuable when an insured or a claimant telephones to check on the status of a claim. With the Info Search function, it is not necessary to physically retrieve a paper file which may or may not be complete. Rather, the operator who receives the telephone call simply accesses the Info Search function and inputs the appropriate name (full name, partial name or phonetic equivalent) and/or claim number to locate the electronic Info Search record containing the "minimal information." If the caller needs more detailed information, the complete claim file may be accessed, including its up-to-date Activity Log and, in the second embodiment, all images (documents) associated with the claim. From this an operator can quickly and easily provide the caller with a complete status report. Correspondingly, with a minimum of effort, the Activity Log may be updated to include any information imparted during the telephone call.

In the second embodiment of the present invention the Info Search function also serves as an image routing facility. It can be used to associate or "tag" images with particular claim files (images are "tagged" to individual claim files for evaluation purposes before they are permanently "linked" to the claim) or to route images to particular Mailboxes.

Directory Tables, which are included in a preferred embodiment of the present invention, function, in part, as an online telephone/address book. Any name, telephone number, address and tax code may be keyboard entered and stored in the Directory Tables. These entries are then accessible by name and can include attorneys, claimants, doctors, state agencies, etc. The Directory Tables are not claim specific and are shared by the entire office. These tables are also integrated with other System functions (e.g. Text Processing, Payments, LPTX, etc.) to prefill information into their respective data fields, as necessary.

The Staff Tables, mentioned previously, provide an online record for each member of the office staff. Each record includes the current title, diary limit, authority level and supervisor of the staff member as well as the maximum case load of that member. (In the second embodiment, the record also includes the member's telephone extension number, fax number and "Queue Access Authorities.") The Staff Tables are integrated with virtually every other System function. The information contained in the various Staff Table records is used to verify and prefill various data fields in other System functions. The authority level, diary limit and caseload limits (also queue access authorities in the second embodiment) of each staff member are set by supervisors with appropriate authority and entered into the Staff Tables. These records can be modified, deleted or added as necessary.

Statistics regarding claim assignments are stored and monitored to determine individual and office-wide performance through a caseload monitoring function. This function allows a supervisor to assess the general nature of an individual's work load and to examine a staff member's progress on groups of claims. This feature assists the supervisors in assigning claims to particular handlers and making more efficient use of the staff.

A windowing function also is provided in a preferred embodiment of the present invention. The windowing function permits an operator to work on more than one claim by opening a "window" into other claim files while others are being processed. (The operator can only enter data into one claim file at a time, but can switch back and forth between the various files.) This feature also allows the operator to access a second function, such as the Activity Log (while remaining within the same claim), and enter new information while in the middle of performing some other task (e.g. reviewing a diary). This feature may be used to access information from the Host computer without foregoing operations undertaken using the local computer. This is particularly useful when investigating the details of a policy where policy information is stored on the Host. In the second embodiment of the present invention the windowing feature permits the display of one or more images while other system screens are also displayed. This is an important feature in eliminating paper from an office.

Just as claims can be assigned to a particular handler, they can be reassigned as well. In a preferred embodiment of the present invention, the system is capable of reassigning one or all of an individual's claims to one or more handlers or supervisors. This is helpful, for example, when a handler or supervisor is ill for an extended period of time or leaves the office permanently. The reassignment is done electronically so that the reassigned claims are passed to the new handler intact. The notice of reassignment is sent to the new handler's or supervisor's Mailbox.

As indicated above, when a claim is routed electronically from one person to another, a summary of the claim, in message form, is sent to a person's Mailbox. The Mailbox, of the present invention, is analogous to an electronic in and out box. When a supervisor assigns or reassigns a claim to a handler a message appears on the handler's Mailbox screen indicating that he has an assignment. Assignments are viewed through the handler's Assignment Mailbox, but the complete file (including images in the second embodiment) may be accessed to determine the actual steps to be taken.

The Mailbox screen also indicates to a supervisor whether any alerts have been generated (e.g. authority level exceeded for check issuance, etc.). This enables a supervisor to pinpoint certain office problems automatically.

A number of print queue managers are also provided to allow an output operator to monitor the flow of reports, forms, letters and checks (and images in the second embodiment) to be printed. This is helpful when a number of lengthy or specialized print jobs have created a backlog at the time that a top priority print job is sent to the printer. The print queue managers enable an output operator to shift the print jobs in the print queue to accommodate those with higher priority. The print queue managers also display any special printing information, such as number of copies, type of paper, etc.

A specialized feature, which is part of a preferred embodiment of the present invention is referred to generally as "Local Data." The Local Data feature includes a screen or set of screens which have been generically formatted to accommodate database fields of numeric, date and alphanumeric data. (A set of these screens is available for input and display for each claim). The particular display configuration of the screen or screens is selectable by the individual claims office. The purpose of the Local Data feature is to permit each claims office to design its own display screens to accommodate specialized information which the office desires to maintain. This information primarily is of the type needed to complete specific state agency filing requirements, but it may be used simply for statistical purposes or customer needs. The data input through the customized screens created with the Local Data function is intended to be kept locally in the claims office and not communicated to the Host.

The Local Data function provides each office with the same number of generic numeric, date and alphanumeric fields (each of which is also of a predetermined length) to arrange into customized screens. Once these fields have been arranged into a particular display format for use in a local office, they can only be modified by an operator with the proper level of authority. Any number of these fields can be employed and there is no requirement that all/any of them be used. Since the fields are generic, they can be used in any format to store any information desired by the local claims office as long as the information conforms to the field designations. The Local Data function is integrated with Text processing such that customized forms and letter can be generated which rely on the information input through a Local Data screen or field. Since the information input through Local Data is maintained on a local database it is also available for extraction through an Ad Hoc Reporting function.

In a preferred embodiment of the present invention an Ad Hoc Reporting function is provided. This function relies on a standard database query to extract information from any System database. The Reporting function may be employed to extract any combination of data required and to output the data in a user designed format. For example, this function can be used to determine all office payments for any given time period.

In the second embodiment of the present invention a number of additional features facilitate the use of electronic images instead of paper. Several image queues are provided which permit review of a plurality of images to determine routing and/or action to be undertaken. For example, there is a Medical Payments Queue for reviewing and processing medical bills as well a number of mail queues for reviewing loosely sorted mail which has been received. Mailboxes also act as queues for lining up mail or other work. In accordance with this embodiment of the present invention, images may be associated with the work which has been routed to a mailbox or other queue.

The ability to "mark-up" an image with free-form input is also provided in the second embodiment. An electronic tablet and stylus are preferably used to input hand markings onto an image. If the user desires, the "marked-up" image can be saved and associated with any claim being processed through the System. However, the original image always remains in the System unchanged.

The second embodiment can also directly and automatically send and receive faxes through a "Fax Gateway." Faxes, composed in Text processing and/or images which have been scanned into the system, can be sent out as faxes through the Fax Gateway. The number to which the fax is to be sent is either pulled from the Directory Tables or manually input. In either case, the sending of a fax automatically generates a comment to the Activity Log of the particular claim with which it is associated. Faxes which are received via the Fax Gateway are saved as images and immediately sent to a predetermined mail queue for review. A received fax is not reduced to hard copy unless manually requested at a later time.

Documents, which are generated through the system to request information from third parties, are preferably set up with alphanumeric identifiers in predetermined locations on the documents. These documents, when returned with the requested information, are scanned into the system and routed to the OCR where the identifiers are read. This permits automatic classification and/or identification of the received information allowing it to be routed to a specific electronic address without going through a mail queue.

The second embodiment is also designed to process voice communications. All telephone communication whether outgoing or incoming can be recorded and linked with particular claim records. (This feature may be omitted from the System to minimize data storage requirements). Outgoing calls, like faxes, automatically generate a comment to the Activity Log associated with the claim being processed. Incoming calls may be recorded or, through a Voice Front-End Processor ("VFEP"), can give the caller claim information residing on the system, in voice form, without human intervention.

A Central Library is also preferably provided with the second embodiment. The Central Library functions as a repository for commonly referenced information such as policy forms, endorsements, large account instructions ("LACONS") and general letters in image form. This information would have existed in a variety of locations, in paper form, in prior art offices.

The main purpose of the Central Library is to provide reference materials which can be attached to the Activity Log to provide documentation to substantiate work processing decisions. This makes the record supporting a claim superior to all prior such records since everything can now be found quickly and easily in one place. The library is also updatable to allow for the inclusion of newly revised policies and the like.

A Document Manager function, which can be used to manipulate images, is preferably provided in the second embodiment. This function permits a user to split a document into multiple documents, insert a document into another document, rearrange a document, delete an "in-process" document and copy a document.

As can be clearly seen, the present invention yields substantial improvements over prior systems. Other features and advantages of the invention are set forth in the following description and drawings.

E. DESCRIPTION OF THE DRAWINGS

In the drawings:

FIG. 7 is an explanatory diagram depicting the construction of an Action Diagram;

F. GENERAL DESCRIPTION

Figure 1:
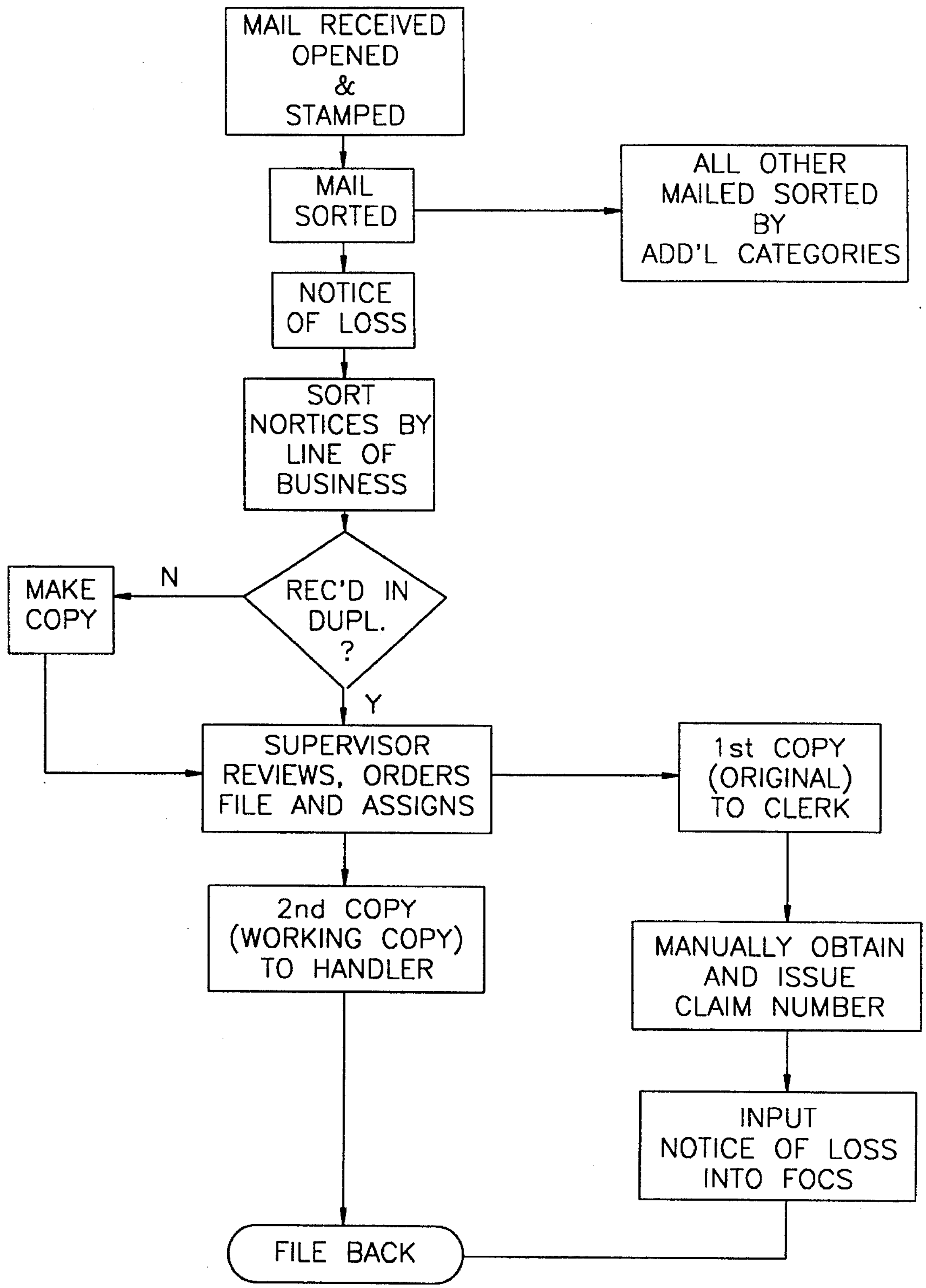
FIG. 1 is a flow chart depicting the manual steps undertaken when a notice of loss is received in a prior art claims office.
Figure 2:
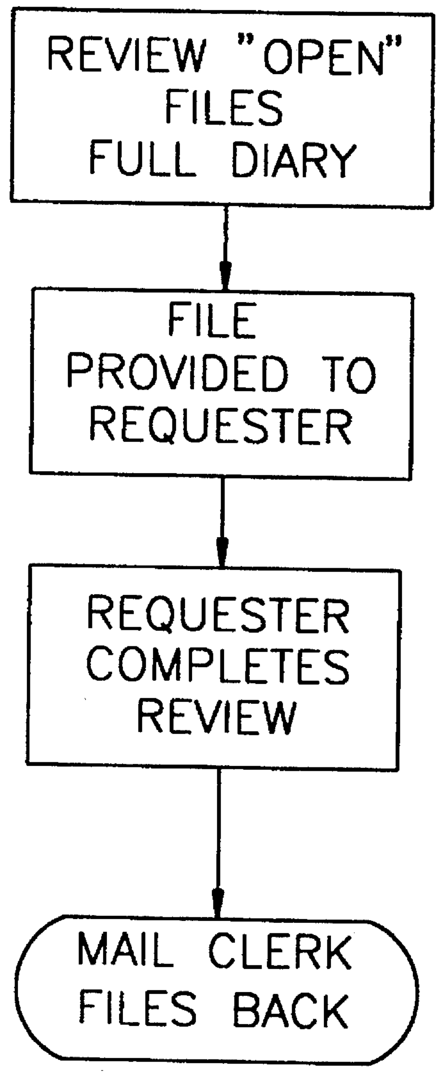
FIG. 2 is a flow chart depicting the manual steps associated with the use of claim diary in a prior art claims office.
Figure 3:
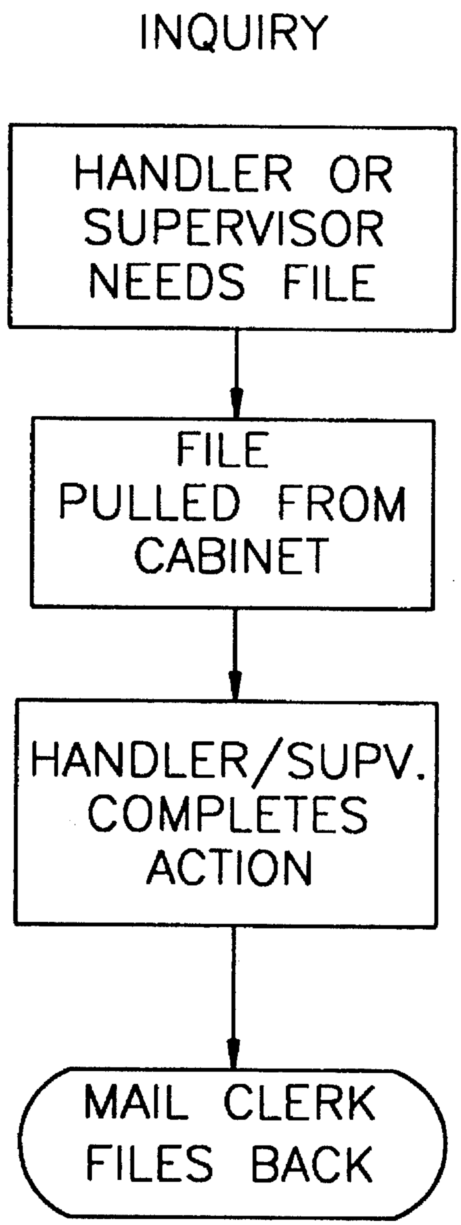
FIG. 3 is a flow chart depicting the manual steps associated with the receipt of a claim status inquiry in a prior art claims office.
Figure 4:
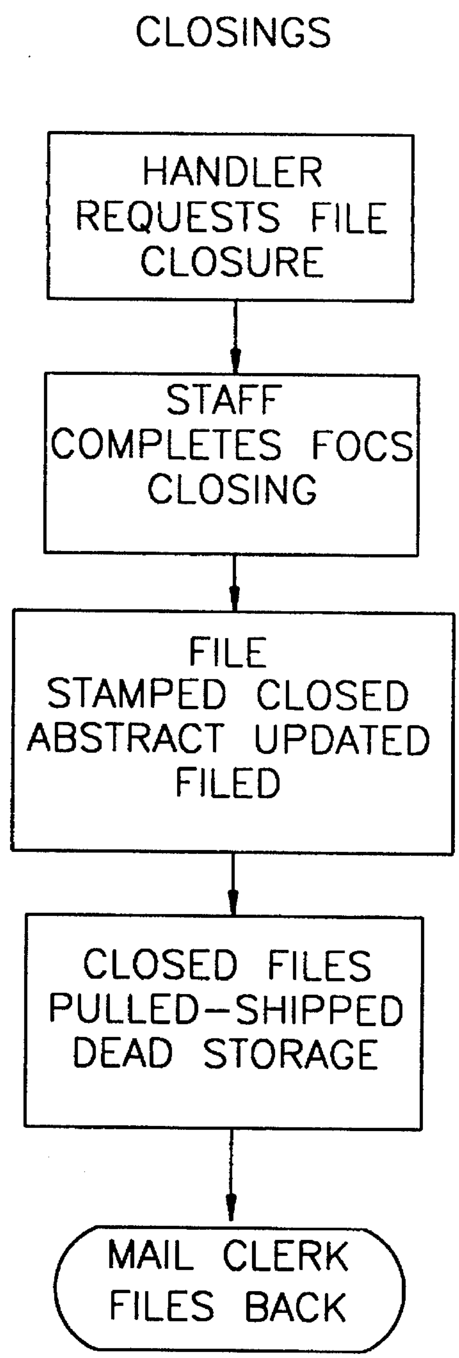
FIG. 4 is a flow chart depicting the manual steps associated with the "closing" of a claim file in a prior art claims office.
Figure 5:
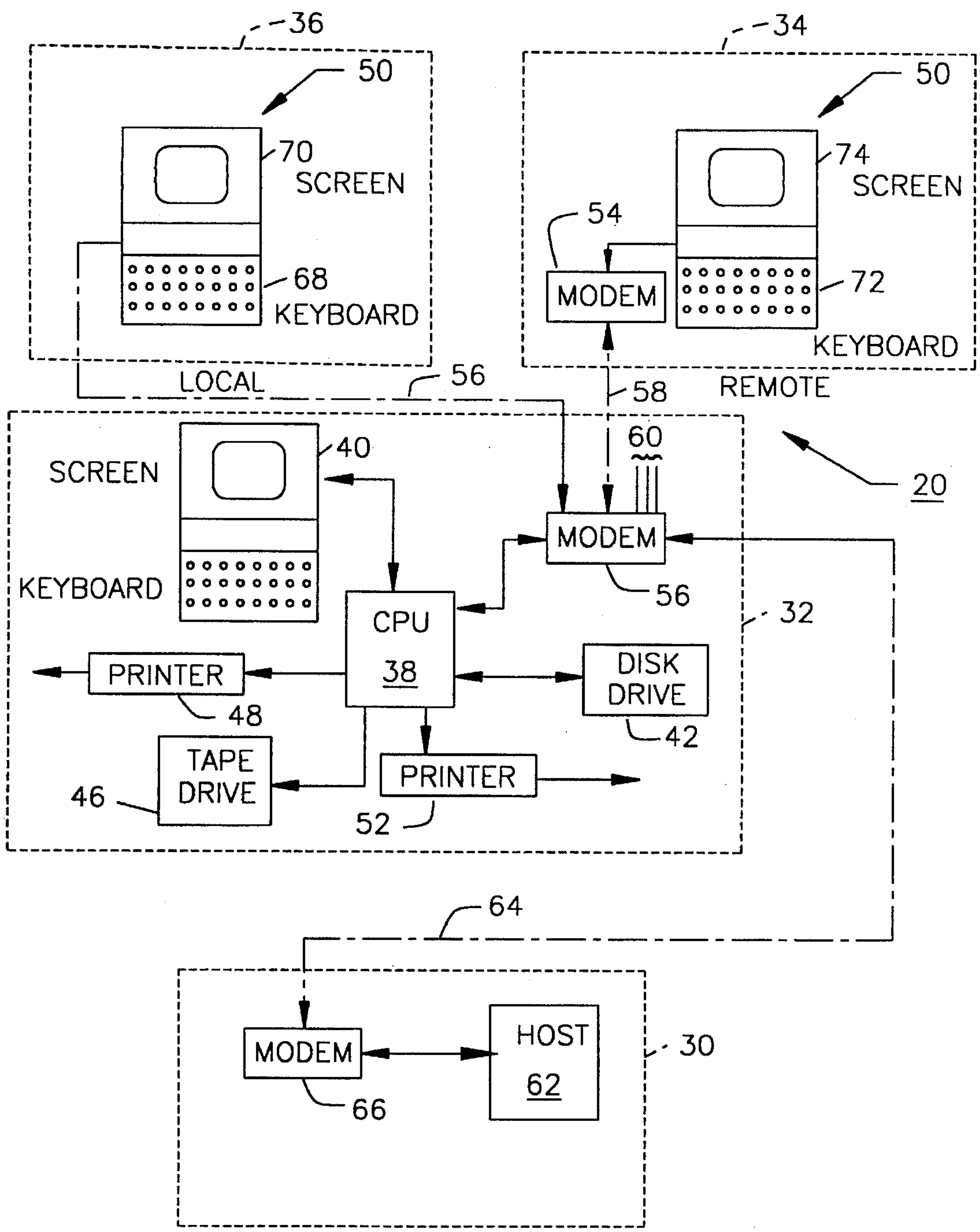
FIG. 5 is a schematic diagram of a work management system constructed in accordance with a first preferred embodiment of the present invention.

FIG. 5 illustrates schematically a first preferred embodiment of a portion 20 of the system of the invention. The system portion 20 includes local data processing equipment at a first station 32, Host data processing equipment at a second station 30 and two separate sets of display input/output equipment at two other stations 34 and 36. (Although only two display input/output stations 34 and 36 are shown in FIG. 5, it should be understood that it is preferred to use more stations than two.)

In the first preferred embodiment of the invention the Host data processing station 30 is located at a remote location. The local data processing station 32, output printing equipment 48 and 52 , and the display input/output equipment 50 are all located in the claims office. (Some display input/output equipment 50 may be located at remote stations 34. Communication between the local data processing station 32 and this remote display input/output equipment 50 occurs via the modem 60.)

The data processing equipment located at the claims office includes a computer CPU 38. The computer is preferably a moderately high-speed, high-capacity computer such as a Wang VS, however, the computer can be any general purpose digital computer having sufficient speed and capacity for processing data in the system.

Also located at the claims office is a plurality of input/output devices 50, each comprising a keyboard and a display screen which are used for programming purposes as well as data input and review. The output printing equipment 48 is used to print out checks, forms, reports and various types of correspondence.

A modem 60 is used for sending and receiving data over telephone lines 64 to a modem 66 provided at the Host computer 62.

When a Loss Notice is received in a claims office, an operator inputs the information received in that notice through the keyboard 68. The information is then transmitted over intraoffice lines 56 to the local computer 38 which stores the information on a disk at a disk drive 42. Information regarding the claims file which is created is routed through the intraoffice lines 56 to the electronic "Mailbox" of a supervisor for review.

Typically, the supervisor reviews the newly created file on his display screen 70 and through his keyboard 68 assigns a claim handler to it and sets aside reserves. The supervisor then routes the claim (in the form of a claim summary message) to the designated handler's Mailbox through the intraoffice lines 56.

As the claim handler processes the claim he normally accesses various functions in the system including the Diary, the Activity Log, the Payment transaction, etc. Each function is accessed through a keyboard 68 and consists of one or more preformatted input screens which are displayed on a display screen 70. The functions are preprogrammed and run on the local computer 38. The information input in response to prompts in the functions' preformatted screens is stored in the local computer 38.

When a form, letter or check needs to be prepared, the appropriate function is accessed through a keyboard 68, the preformatted screens associated with the function are displayed on a display screen 70 and any necessary information input through a keyboard. The output to be printed is routed through intraoffice lines 56 to a local printer 48 or 52 where it goes into a print queue. (Print queue managers are available to control the printing priority). Upon exiting the print queue, the output is printed by the local printer 48 or 52, reviewed and sent out.

As mentioned above, the Host computer 62 interfaces with the local computer 38. In practice, the Host computer 62 communicates with the local computer 78 through its modem 66, the phone lines 64 and the local modem 60. In response to a request from the Host computer 62, the local computer 38 copies certain information stored in the local database and uploads it to the Host computer 62 and vice versa. This information then resides in both the Host computer 62 and the local computer 38. It is not removed from the local computer's storage facility 42 or 46.

Figure 6:
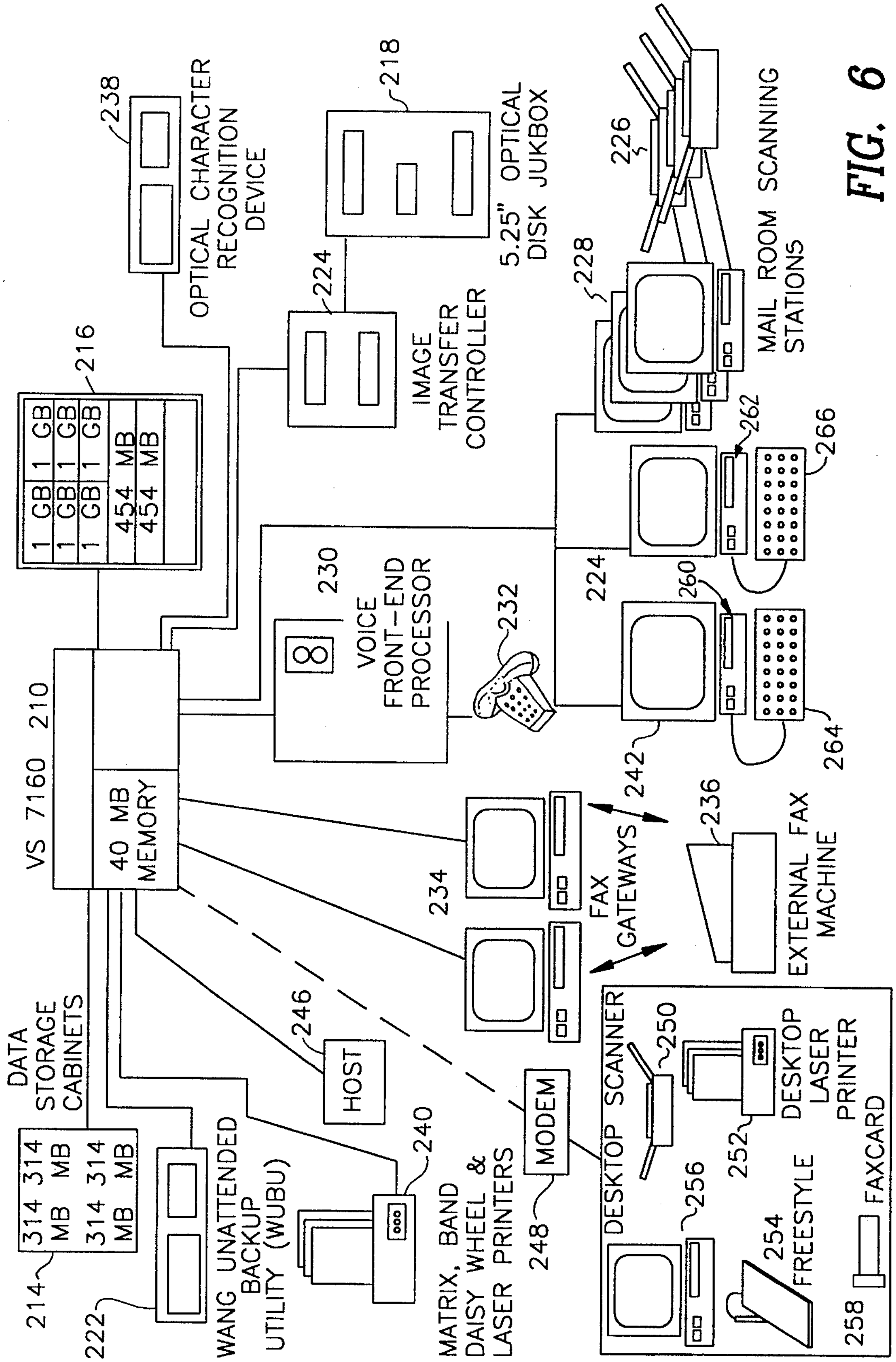
FIG. 6 is a schematic diagram of a work management system constructed in accordance with the second embodiment of the present invention.

FIG. 6 is a schematic illustration of a second preferred embodiment of the hardware of the present invention. A minicomputer (CPU) 210, such as a Wang VS 7160 with about 40 megabytes ("MB") of random access memory ("RAM") is the primary processing unit ("Main CPU") of the System. Associated with the Main CPU 210 are a plurality of storage devices 214, 216 and 218 for reading and writing data and for maintaining and providing access to the databases and other software which comprise additional portions of the present invention.

An automated backup system 222 is used to support the backup operations required by the enormous capacity magnetic drives which are preferably used for daily activities. The hardware of the backup system preferably employs industry standard 8 mm cartridge tape. This tape can hold approximately 2.3 gigabytes ("GB") of information. The software is called Wang Unattended Backup Utility ("WUBU").

The backup procedure is preferably done daily and weekly during off-peak hours in response to pre-selected time triggers. The daily backup procedure copies anything changed in any database table during the previous 24 hour period as well as any new images scanned into the System. The weekly backup preferably copies all the database tables and all images residing on magnetic disks.

An image transfer controller 224 controls the physical storage and retrieval of images from an optical disk storage device 218. It manages the traffic of the flow of image data from optical disks to the Main CPU 210. The optical disk storage device 218 is preferably an optical disk jukebox. The jukebox typically has two or more drives for reading the optical disks and storage racks for storing a plurality of disks. When information is requested from a disk the location of the disk is determined. If the disk is located in one of the two drives it is simply read. However, if the disk resides in the storage racks, drive must be cleared by removing one disk and replacing it with the appropriate disk from the storage racks. This procedure is done automatically, but results in a dramatic increase in response time.

One or more digital scanners 226 are employed with the second embodiment of the present invention. The scanners 226 are image capture devices which, by way of example, could be Wang SC300 or SC4000 scanners. Each scanner 226 is linked to a personal computer 228 ("PC") which not only controls the physical scanner functions, but also the transfer of compressed images to magnetic or optical disk. The PC 228, which includes a storage and retrieval device as well as a display device, is also used to screen images (via the display device) after they have been scanned to insure their good quality. The software which operates through the PC to control the scanner(s) is Wang WIIS Emulation Work Station software. The software recognizes and controls the operation of the scanner, the compression of the image and the transfer of the image to the Main CPU 210.

A Voice Front-End Processor 230 ("VFEP") is also linked to the Main CPU 210. The VFEP 230 is a voice and telephone control processor that provides an interface between a telephone system 232 and the Main CPU 210. It is preferably used in conjunction with software by Wang called Speech and Telephony Environment for Programmers ("STEP") which integrates voice and telephone functions with user applications and voice mail which is itself integrated into the System. STEP has routines which act as an interface between the VFEP 230 and the Main CPU 210. For example, when an outgoing telephone call is made through the System, the Main CPU 210 issues a command to initiate the call, the STEP software then passes that command to the VFEP 230 and the call is made. Thus, STEP acts as the interpreter between the Main CPU 210 and the VFEP 230. The VFEP 230 can support a plurality of telephone lines and is used for recording statements taken over the phone, supporting automated telephone inquiries and handling internal/external voice mail.

A Fax Gateway 234 is provided to permit the sending and receiving of faxes through the system. The Fax Gateway provides a connection between CPU applications and external facsimile machines 236. Faxes are received as images and can be routed to any electronic address like any other image, text data, checks, etc.

If an incoming fax is a System generated or other preset form, the image can be routed to an Optical Character Recognition Device 238 ("OCR"). The OCR 238 converts images to ASCII data based on its recognition of multiple text fonts. The OCR 238 can read information from any image in the system which is in a preset form, not just faxes.

The Main CPU 210 is also connected to one or more printer devices 240 which are capable of printing out reproductions of the electronic images.

A plurality of workstations 242 and 244, functioning as smart terminals, are linked with the Main CPU 210. The workstations 242 and 244 are Personal Computers ("PC's") preferably with 16 or 19 inch high resolution monitors (monitors of this type provide enhanced viewing of images). These workstations 242 and 244 are the primary means of text input into the system and image review. Each workstations 242 or 244 preferably includes a large capacity hard drive 260 or 262, a keyboard 264 or 266 and a free-form input device 268 or 270 (e.g. a mouse or a tablet and stylus). Each workstation 242 or 244 is associated with one or more electronic addresses to which work can be routed. Each also forms the basis for operator interaction with the system.

A Host computer 246 also communicates with the Main CPU 210. It functions in the same way as described with respect to the first embodiment.

Outside claim representatives are able to communicate with the Main CPU 210 via modem 248. This facilitates the sending and receiving of faxes or other electronic communication. Typically, each outside claim rep has a remote smart terminal system which includes a scanner 250, a printer 252, special free-form annotation software 254, a fax card 258 and a terminal 256 with disk storage and retrieval capability and a free-form input device 272.

Other valuable features of the invention will be discussed in the more detailed description which follows.

G. DETAILED DESCRIPTION

As indicated in the previous section, reference is made to the processing of insurance claims to illustrate the features and capabilities of the system and method of the present invention. It should be understood that this is a description of only a few preferred embodiments and other embodiments may be accordingly prepared by one of skill in the art.

Similarly, the present description makes reference primarily to preferred work flows through the System of the present invention. However, an almost infinite number of work flows is possible based on the System's ability to move between virtually any of its functions upon manually input directions.

1. System Security

In order to prevent the theft of data, the unauthorized issuance of checks, system vandalism, etc., a security system is provided to limit access to the system of the present invention. Preferably, an off-the-shelf security system called MENUTECH® is integrated into the "front end" of the System. MENUTEC® controls Log On procedures via User IDs. It is also able to control user access to the System functions via further integration.

Each employee in an office is assigned to a particular security level based on his responsibilities. The security level is used to limit the system functions and transactions which can be accessed or performed by the employee. This is done by comparing the user's security level with the level of the function being called.

Initially, each employee is given a User ID (usually his initials) and a password which limit his system access to his assigned security level. When an employee wishes to use the system, he must first Log On using his User ID. If the User ID is entered correctly, the system validates it and then displays a password screen. The operator inputs his password through this screen and the system passes the password to MENUTECH® which verifies it through an encrypted security file. If the password is validated, a Main Menu screen for the operator's appropriate security level is displayed. If an incorrect password or User ID is entered, a message appears and the operator is prompted to reenter the incorrect term. Generally, after three unsuccessful attempts, an error message is displayed and the operator is locked out of the system. (An alert is also simultaneously generated to a supervisor.) If the password entered has expired (most passwords remain active for 30 days) a Password Expiration screen (not shown) is displayed. This screen permits an operator to select a new password and then access the system. It is not necessary to wait until a password expires. Rather, passwords can be changed at any time through a Password Change screen (not shown).

2. System Driver

The System Driver is a program module that manages and controls every System session. It does this by controlling the timing and execution of all system functions. The System Driver is based on a model transaction which is the blueprint for every online transaction.

Figure 8A:
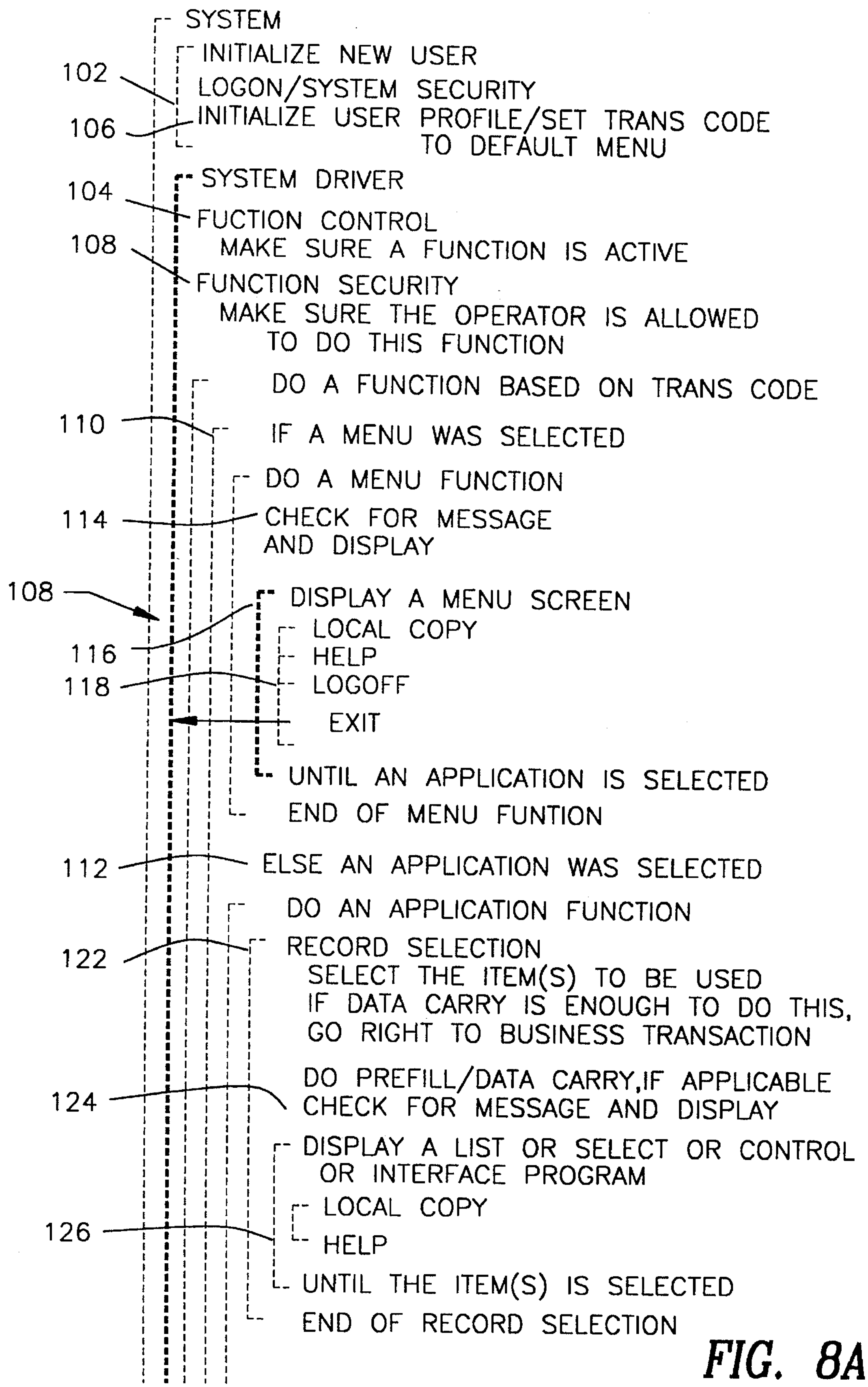
FIG. 8 is an Action Diagram illustrating the computer program and operative steps of the System Controller.
Figure 8B:
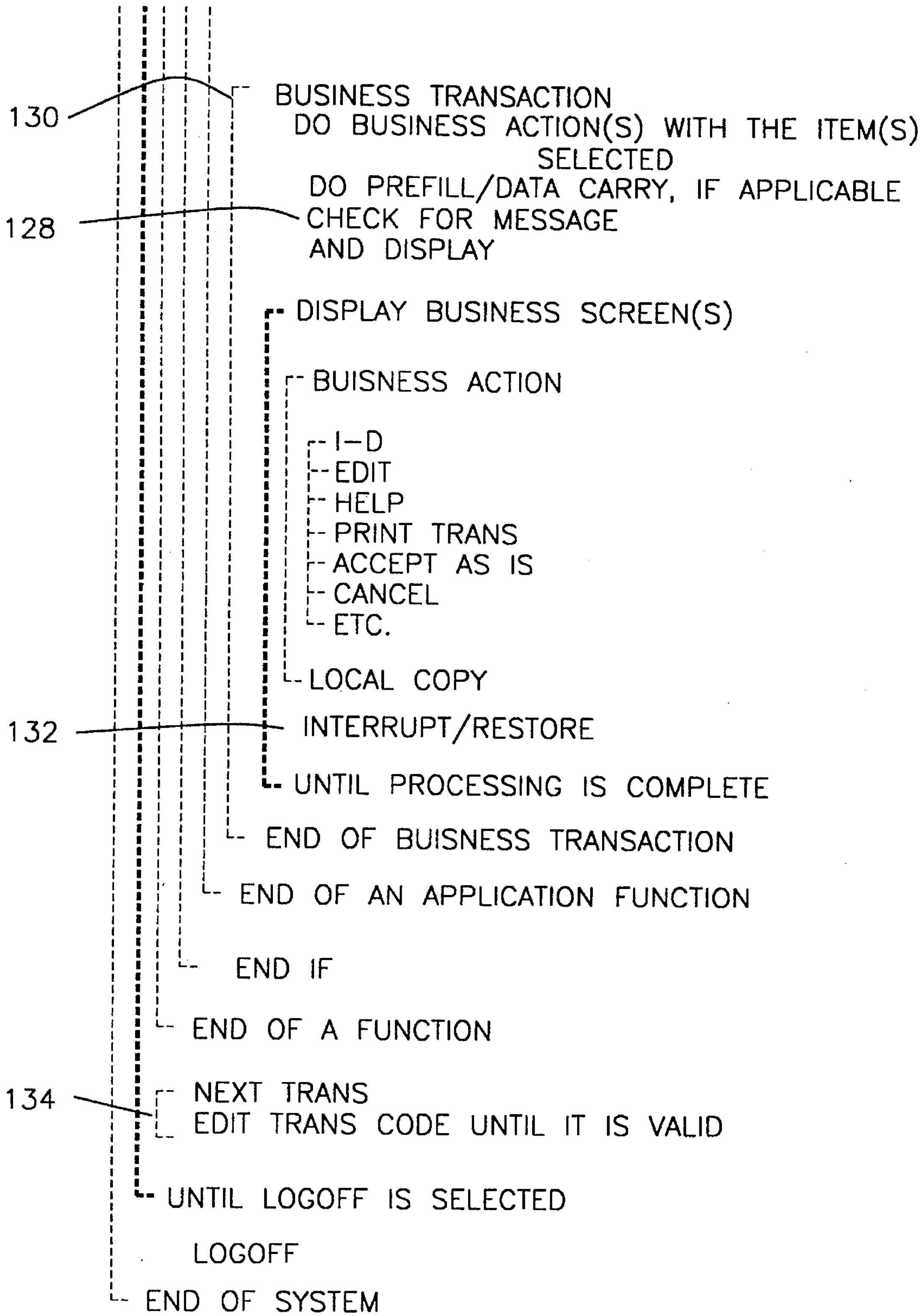
Figure 9A:
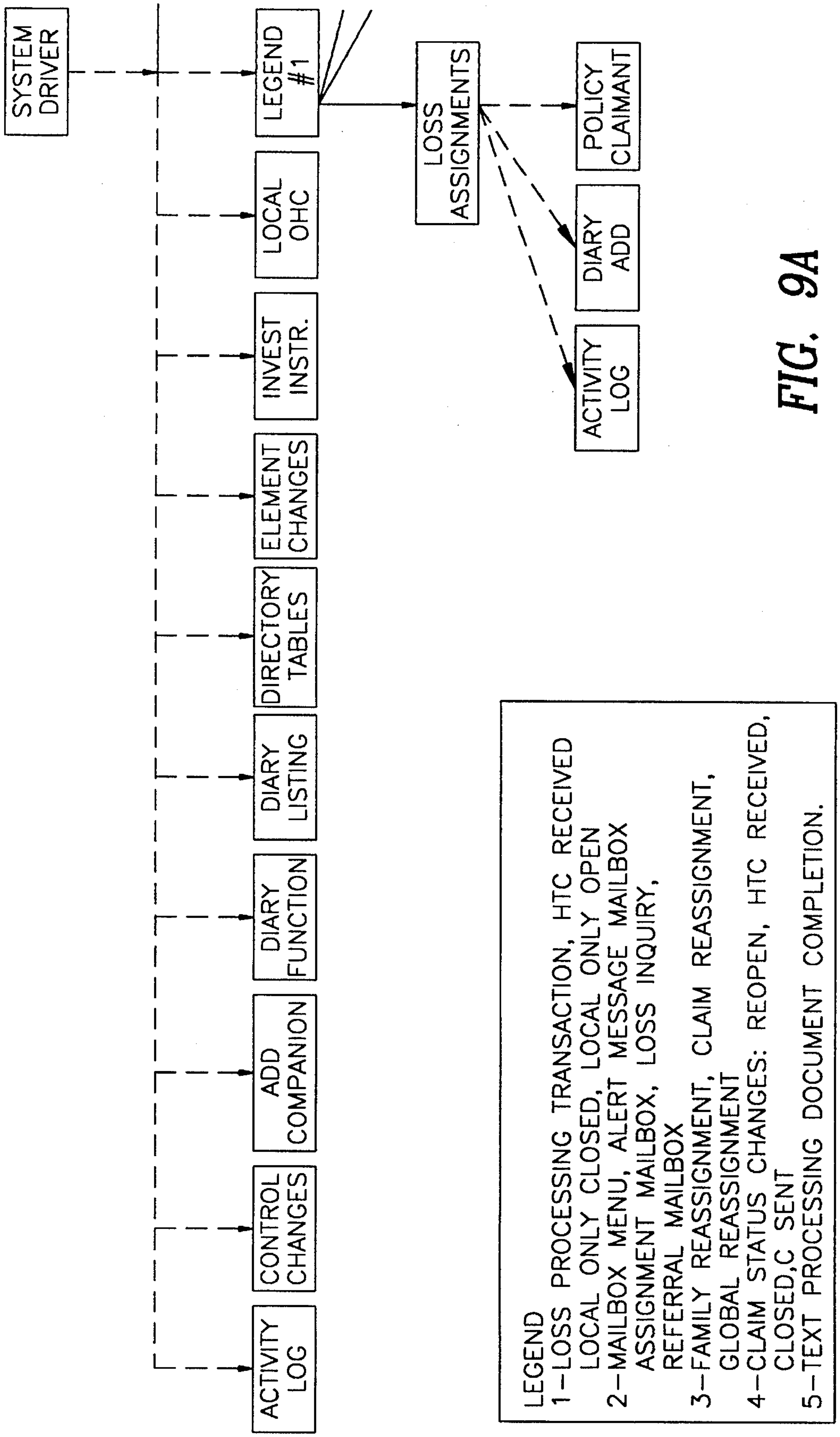
FIG. 9 is a block diagram depicting the interrelationship of the System functions of the first embodiment of the present invention.
Figure 9B:
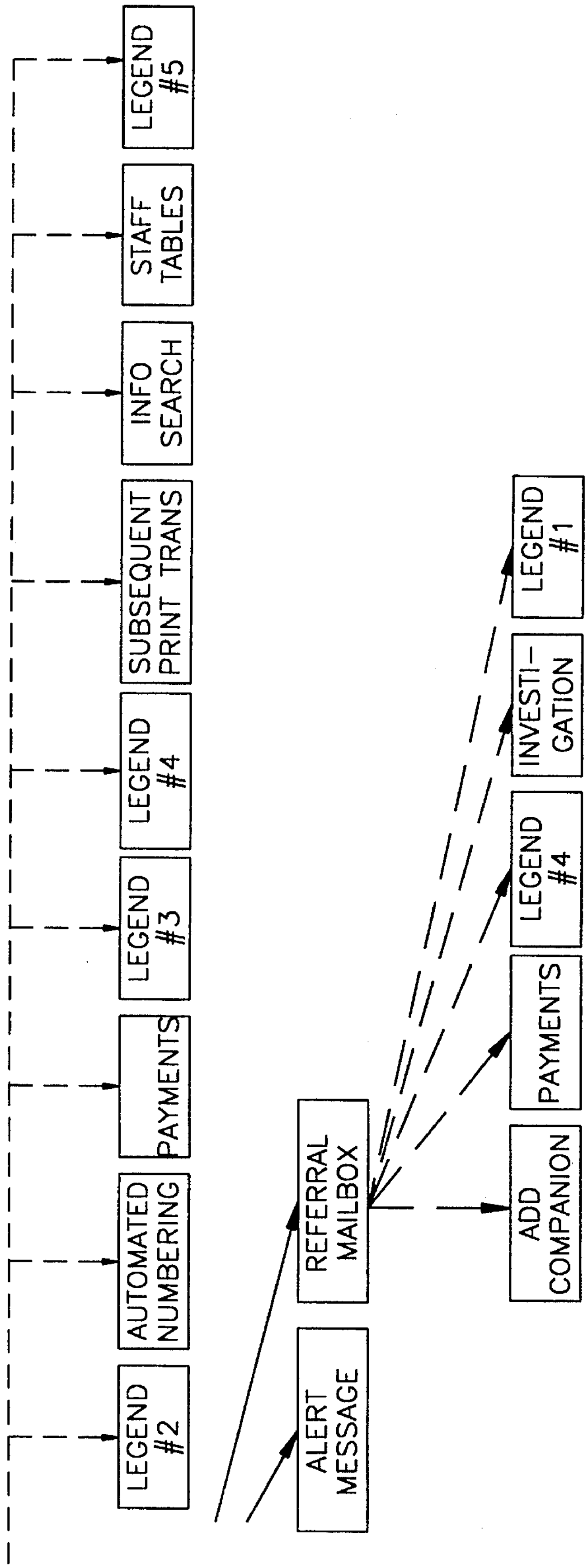

FIG. 8 is an Action Diagram of an overview of a successful System session. (As shown in FIG. 7, an Action Diagram is analogous to a sideways flow chart. The nested brackets depict various functional steps occurring under the umbrella of other functional steps. Double lines indicate a loop, while single lines with multiple bracket ends indicate a choice of functions. Wording between two pairs of asterisks is merely explanatory in nature.) As indicated at 102, entry into the system must be achieved prior to the takeover of all operations by the System Driver 100. After the System Driver has assumed control it first verifies that the requested transaction is available for use within the System 104 (primary and default menus are not subject to this verification since, if the system is available these menus must be available as well. The code to invoke the Default Primary Menu is given automatically after successful logon and just prior to takeover by the System Driver 100). Once the System Driver 100 verifies the availability of the requested function it must insure that the operator has the proper authority to invoke the requested function 108. This is done by comparing the function's required authority level with the System Security (Menutech) authority level. If the operator has the appropriate authority, the function is "run."

Two types of functions may be invoked, either a menu function 110 or an application function 112. If a menu function is selected, the System Driver 100 first checks for messages (i.e. System error messages or new entries to the Assignment or Referral Mailboxes) and then displays the appropriate message 114. Next, the selected menu is displayed 116. A number of options are available from within a menu including: Help, Local Copy, Logoff and a variety of application functions 118. Help and Local Copy do not cause any change in the System location, Logoff 120 exits the System entirely, while the selection of an application returns the System Driver to the Function Control position 104.

If an application function is initially selected 112 the record(s) to be acted upon must be selected 122. This involves either the entry of a new claim number or the selection of "Data Carry" when leaving a previous function. (The selection of Data Carry carries the same claim record(s) and all its information to the next function.) If Data Carry is not used, the System Driver first checks for any messages and displays appropriate screen indicators 124. It then provides a screen or screens which permit the selection of a claim number 126.

Once a claim number has been chosen the System Driver again checks for messages 128 before undertaking any business transaction 130. (A business transaction is the part of a function which changes or creates a specific record or set of records.) Any business transaction can be interrupted 132 to "window" to another function of a different type. The original transaction is restored 132 when the operator windows back out of the other function.

Just prior to completing the business transaction the operator can place a four letter code in a 'Next Trans' field to specify the next function to be undertaken 134. When the business transaction is then ended, the function is exited and the System Controller returns to the Function Control position 104 to evaluate the next requested function. (The following is a partial list of available functions: Loss Processing Transaction, Activity Log, Diary, Directory Tables, Info Search, Payments, Reassignments, Secondary Menu and Text Processing. All the available functions are shown in block form in FIG. 8).

3. The First Embodiment a. Menu Screens

The menu screens serve as a table of contents enabling an operator to select a desired system function or transaction. Following a successful logon, the System displays a Default Primary Menu tailored to the operator's specific needs and security level. (See, e.g., Tables I and II, for screens designed for a claim handler and a supervisor). The appropriate Primary Menu screen for a particular operator is determined by a Default Menu Number which is entered in the operator's Staff Table.

A Secondary Menu, shown in Table III is also available. This Secondary Menu displays less frequently used functions and transactions. Using the Primary Menu or the Secondary Menu, an operator can access virtually any available system function.

System functions are accessed from the Primary or Secondary Menus by actuating the "PF" or "Function" key corresponding to the desired function (e.g. a PF1 or F1 key is pressed to access the Claim Status Change function from the Secondary Menu, the PF5 or F5 key is pressed from a Main Menu to access the Directory Tables function, etc.).

TABLE I

| CLAIM HANDLER MENU | |
|---|---|
| Press a PFKey below or RETURN to do Next Trans: ___ | |
| 1) Activity Log | 9) LP Element Change |
| 2) Claim Status Changes | 10) Mailbox Menu |
| 3) Diary Function | 11) Nature of Payments |
| 4) Diary Listing | 12) Payments |
| 5) Directory Tables | 13) TEXT forms Selection/Completion |
| 6) Info Search | 14) Wang OFFICE |
| 7) LPT Inquiry | 15) CAS Secondary Menu |
| 8) LP Control Change | |
| 32) Logoff | |

b. The Loss Processing Transaction

The processing of a claim begins upon receipt of a notice of loss. These "Loss Notices" are received from agents, insureds, customers or claimants, either through the mail, in person, electronically or over the telephone.

In a typical claims office, a person called a Claim Assistant is primarily responsible for the input of Loss Notices into the System. The Loss Notice information is input through a Loss Processing Transaction ("LPTX") function which may be

TABLE II

| SUPERVISOR MENU | |
|---|---|
| Press a PFKey below or RETURN to do Next Trans: ___ | |
| 1) Activity Log | 10) Mailbox Menu |
| 2) Claim Status Changes | 11) Nature of Payments |
| 3) Diary Function | 12) Payments |
| 4) Diary Listing | 13) Reassignments |
| 5) Directory Tables | 14) Wang OFFICE |
| 6) Info Search | 15) CAS Secondary Menu |
| 7) Investigative Instructions | |
| 8) LP Control Change | |
| 9) LP Element Change | |
| 32) Logoff | |

accessed from a Primary Menu (see, e.g., Tables I and II) or by placing the four letter code 'LPTX' in the 'Next Trans' field of any transaction.

The first screen displayed when the LPTX function is accessed is shown in Table IV. This is the Loss Processing Transaction Interface screen. This screen is used to input skeletal policy information which, in turn, is used to extract policy information from a Policy File which may reside in one of the Host Computer's databases or in a local database. (Even if some of the policy information is maintained in one of the Host's databases, most claim's offices have a Policy Index Table which

TABLE III

| CAS SECONDARY MENU | |
|---|---|
| Press a PFKey below or RETURN to do Next Trans: ___ | |
| 1) Claim Status Changes | 12) Payment Corrections |
| 2) Diary Function | 13) Reassignments |
| 3) Diary Listing | 14) Staff Table |
| 4) HTC Sent | 15) Subsequent Print Trans |
| 5) Investigate Instrs. | 17) Text Forms Selection/Completion |
| 6) Local OHC | 18) TEXT Print Queue |
| 7) Loss Processing Trans | 19) Word Processing |
| 8) LP Control Change | 21) 3270 Emulation |
| 9) LP Element Change | 22) DPSA Security Functions |
| 10) LPT Inquiry | 23) Forms Maintenance |
| 11) LPT Subsequentys | 24) Text Processing |
| 16) Return to Previous Menu | |
| 32) Logoff | |

tracks the name, address, policy number, etc. of its large accounts. This Policy Index is available for display through the System to assist in the proper extraction of policy information.) The main element required to extract policy information from the Policy File or Policy Index Table is the policy number. If no policy record is found in a Policy File or Policy Index Table, an explanatory error message is displayed and the information must be input manually. (Even if no policy number is found, the loss report must still be maintained. Therefore, a "non-claim" "record report" is maintained on the system.) When information is successfully extracted from the Policy File or Policy Index Table, the initial input fields (i.e. the Interface Screen fields) are protected to preserve the credibility of the extracted data.

Upon completion of the LPTX Interface screen, the 'Enter' key is pressed and a series of loss screens particular to a single "line of business" are displayed. The loss screens are formatted according to a policy symbol (indicating the type of policy) and the line of business specified on the Interface screen. These screens contain policy/insured and loss/claim description data. The number of screens and their sequence is relative to the number of claims arising from the loss occurrence and the manner in which the loss was reported.

The initial screens accessed contain fields for inputting required information that applies to the entire loss occurrence. Reporting screens are used to record information which is specific to an individual claim arising out of the loss occurrence. Screens are also available for entering Witness, Contact/Comment information and Special Procedures, if applicable. Where the Loss Notice is received electronically from agents, insureds, customers or a central reporting center, the information is in a form which is used to prefill fields in the LPTX. The electronically reported information must be reviewed for accuracy but this type of reporting substantially reduces input time.

The following is a list of screens specific to the automobile line of insurance business (which will be used as an example for purposes of this description) in their logical order of appearance (screens marked with asterisks will potentially become new claims):

Policy Information Screen (required)

Special Procedures (optional unless extracted from Policy Index Table)

Description of Accident (required)

*Claimant Screen (required)

*Physical Damage screen (required for certain types of policies—identified by claim symbol)

*Property Damage screen (required for certain types of policies)

*Injured Party Information screen (required for certain types of policies)

Witness/Passengers screen (optional)

Contact/Comment screen (optional).

TABLE IV

| | |
|---|---|
| LOSS PROCESSING TRANSACTION LPTX | |
| POLICY NUMBER: ___ ___ ___ LARS IND: SERV EXPEDTR CODE: | |
| AGENT CODE: ___ | |
| LOSS DATE: ___ | |
| REPT DATE: ___ | |
| INDICATE LINE OF BUSINESS: ___ | 1 AUTOMOBILE |
| | 2 PROPERTY/LIABILITY |
| | 3 WORKERS'COMPENSATION |
| | 4 FIDELITY/SURETY |
| TELEPHONE FIRST REPORT: * | LOCAL PREFILL: X |
| ENTER) POLICY INFO 6) POLICY INDEX 18) HELP 23) LC 32) CANCEL | |

Table V shows an Auto Policy Information Screen. Much of the information necessary to complete the input called for by this screen is prefilled or input through the LPT Interface screen and the information extracted from the Policy File (e.g. Policy Status, Policy Number, Agt Code, Loss Date, Insured Name and Address, etc.) Any additional information that is needed to complete this screen is input manually through the keyboard.

The Special Procedures screen, shown in Table VI, is accessed from the Policy Information screen and is used to note any special handling procedures, specific to the policy involved,

TABLE V

| POLICY INFORMATION |
|---|
| POL NUM: ___ ___ ___ |
| AGT CODE: ______ AGCY NAME: SALESMAN CODE: |
| INSURED: ______________________ P/C: __ TITLE: |
| STREET: ______________________ |
| CITY: ________ ST: ____ ZIP: ____ |
| BUS PH: ________ RES PH: ______ TIN: |
| POL EFF: ______ POL EXP: ______ LOSS DATE: ______ REPT DATE: |
| FORMS/ENDT: |
| SPECIFY FORMS/ENDT AFF COV: |
| EXCESS IND: CERT NUM: LARS IND: LARS LOC CODE: |
| SERV EXPEDITER CODE: |
| ENTER) VEH-DRIVER 3) SPECIAL PROCEDURES 18) HELP |
| 27) ERASE LPT 1) CLAIM SET-UP 19) SELF REFER |
| 23) LC 30) LOCAL DATA |

that are required in the processing of the claim. Multiple screens are available for input and information can be added, modified or deleted as needed. If special procedures are enumerated in the Policy Index Table this screen will be prefilled.

The Vehicle-Driver Coverage Information screen, shown in Table VII, is used to enter information pertaining to the insured driver's coverage limits as well as vehicle information such as the make and model of the car. Any information which is prefilled to this screen can be modified. This screen is

TABLE VI

| SPECIAL PROCEDURES | |
|---|---|
| PERRY, FREDERICK | 02 PH 123123 |
| ______ | |
| ______ | |
| ______ | |
| ______ | |
| ______ | |
| ______ | |
| ENTER) ADD 4) PREVIOUS PAGE 18) HELP | |
| 23) LC 16) RETURN 3) NEXT PAGE | |

generally accessed after information has been entered to the Policy Information screen. It may, however, be accessed from a number of screens within the LPTX.

The Description of Accident screen, shown in Table IX, is used to enter information that applies to all claims in the Loss Processing Transaction. The information includes the accident description, location of accident, impact area, time of loss etc. This screen is generally accessed following input of the Vehicle-Driver Coverage Information screen, it also may be accessed from a number of screens within the LPTX.

TABLE VII

| VEHICLE - DRIVER COVERAGE INFORMATION | | | | |
|---|---|---|---|---|
| CUSTOMER TESTER | | 02 PH 123123 | | |
| VEH NUM: | YR: | MAKE: | | MODEL: |
| VIN: | | PLATE: | | ST: |
| COV/DED | BI: | PD: | MED PAY: | NON COLL: |

TABLE VII-continued

| VEHICLE - DRIVER COVERAGE INFORMATION | | | | |
|---|---|---|---|---|
| COLL: | UM: | | | NO FAULT: |
| T/L: | RR: | | | FULL GLASS: |
| | LIAB DED AMT: | | | DED COV: |
| SPECIFY IF OTHER COV/LIMITS: | | | | |
| MI: LOSS PAYEE: | | | | |
| SPECIFY IF OTHER INSUR ON VEHICLE: | | | | |
| ENTER 'X' IF DRIVER SAME AS INSD: | | | | |
| DRIVER: | | | | TITLE: |
| STREET: | | | | |
| CITY: | ST: | ZIP: | | PHONE: |
| LIC NUM: | ST: | | | |
| AGE: | DOB: | SEX: | MS: | REL TO INSD: |
| ENTER) DESC OF ACC 19) SELF REFER 18) HELP 16) RETURN | | | | |

The Witness Information Screen (not shown) is accessed from the Description of Accident screen and is used to input basic witness information when necessary (e.g. name, address, telephone number, etc.). If information about more than one witness needs to be recorded, a Witness List screen (not shown) is available. This screen permits the viewing, addition, modification or deletion of witness information.

A Comments/Contact Information screen (not shown) can be accessed from the Description of Accident screen and from other screens within the LPTX to enter any relevant comments about the claim. This screen can also be used, for example, to indicate who should be contacted for further information if the insured is unavailable.

A Responsible Party screen (not shown) may be accessed from the Description of Accident screen to enter any relevant information indicating responsibility for the loss. When all available information is entered through this screen, pressing 'Enter' automatically returns the Description of Accident screen to the display.

A Claimant Information screen, shown in Table IX, is used to add claimant information (e.g. name, address, telephone number etc.) to the system. The information requested in the Claimant Information screen must be input before a claim can be added for that claimant. Once this information is input, multiple claims can be added for the same claimant as necessary.

TABLE VIII

| DESCRIPTION OF ACCIDENT | | | | LPTX |
|---|---|---|---|---|
| CUSTOMER TEST | | | 02 PH 123123 | |
| DESCRIBE ACCIDENT: | | | | |
| LOC OF ACCIDENT: | | | | |
| CITY: | | ST: | ZIP: | |
| ENTER "X" IF SUBROGATION POSSIBILITIES: | | | | |
| INVEST AUTHORITY: | | | | |
| VIOLATIONS/CITATIONS: | | VIOLATION CODE: | | |
| REPT TO: | REPT TO: | | | |
| COVERAGE REQ: RSK ALRT: QUESTNBLE COV IND: SVRTY IND: | | | | |
| 6) ADD CLMT | 14) WITNESS | 19) SELF REFER | 18) HELP | 16) RETURN |
| 15) COMMENTS-CONTACT | | 28) RESP PARTY | 23) LC | 27) ERASE LPT |

TABLE IX

| CLAIMANT INFORMATION | | | |
|---|---|---|---|
| CUSTOMER TEST | | 02 PH 123123 | |
| CLAIMANT - ENTER X IF SAME AS INSURED: | | | |
| | | | (IF NOT ENTER DATA BELOW) |
| NAME: | | P/C: | TITLE: |
| STREET: | | | |
| CITY: | ST: | | ZIP: |

TABLE IX-continued

| CLAIMANT INFORMATION | | | |
|---|---|---|---|
| BUS PH: | | RES PH: | |
| AGE: | SEX: | | MS: NUM DEP: |
| OCC CODE: | STATUS: | INCOME RANGE: TIN: | |
| 11) PHYS DAMAGE | 13) INJURY | 18) HELP | 16) RETURN |
| 12) PROP DAMAGE | 30) LOCAL DATA | | 23) LC |

The Auto-Physical Damage Information screen, shown in Table X, is used, when necessary, to enter information pertaining to any damage to an insured vehicle. The operator is also prompted to enter a variety of additional information including: incurred loss information, the estimated incurred allocated expense, a repair estimate, etc.

TABLE X

| PHYSICAL DAMAGE INFORMATION | | | |
|---|---|---|---|
| CUSTOMER TEST | | | 02 PH 123123 |
| OWNER NAME: CUSTOMER TEST | | | |
| DESCRIBE DAMAGE TO INSD VEH: | | | |
| USED W/PERM? (Y/N): | PURPOSE OF USE: | | |
| REPAIR EST: | ENTER "X" IF SALVAGE POSSIBILITIES: | | |
| WHERE/WHEN VEH CAN BE SEEN: | | | |
| ATTY (N/R): NAME: | | | |
| CLM DESC CODE: | CLM DESC: | | |
| LOSS TYPE: CLM SYM: | COV ID: | TOTAL LOSS IND: | |
| EST INC LOSS: | EST INC ALLOC EXP: | VERIFIER: | |
| PTA: JIA: | CLAIMS MADE DATE: | | |
| 1) CLAIM SET-UP | 13) INJURY | 18) HELP | |
| 6) ADD CLMT | 31) STAT CODING | 23) LC | |
| 16) RETURN | 11) PHYS DAMAGE | 30) LOCAL DATA | |

The Auto Third Party Property Damage screen, shown in Table XI, is used to enter information relating to any property damaged in the accident. A description of the property, the damage, as well as the estimated incurred loss and other additional information is entered through this screen.

An Injured Party screen is provided to enter information about any party injured in the accident (i.e., description of the injury, disability dates, claim descriptions, etc.). This screen is shown in Table XII.

TABLE XI

| AUTO THIRD PARTY PROPERTY DAMAGE | | | |
|---|---|---|---|
| CUSOTMER TEST | | | 02 PH 123123 |
| OWNER: CUSTOMER TEST | | | |
| PROPERTY DAMAGE | | | |
| DESC OF PROP: | | | |
| DESC OF DAMAGE: | | | |
| REPAIR EST: | ENTER "X" IF SALVAGE POSSIBILITIES: | | |
| WHERE DAMAGE CAN BE SEEN: | | | |
| ATTY (N/R): | NAME: | | |
| IF DRIVER OTHER THAN OWNER - DRIVER NAME: | | | |
| OTHER PROP INSD BY: | | | |
| ENTER "X" IF DED AMT APPLIES: | | | |
| CLM DESC CODE: | CLM DESC: | | |
| LOSS TYPE: | CLM SYM: | COV ID: | TOTAL LOSS IND: |

TABLE XI-continued

AUTO THIRD PARTY PROPERTY DAMAGE

| | | | |
|---|---|---|---|
| EST INC LOSS: | | EST INC ALLOC EXP: | VERIFIER: |
| PTA: | JIA: | | CLAIMS MADE DATE: |
| 1) CLAIM SET-UP | 18) HELP | 30) LOCAL DATA | 16) RETURN |
| 6) ADD CLMT | 13) INJURY | 31) STAT CODING | 23) LC |

A Service Provider screen, (not shown) which may be accessed from the Injured Party Information screen is used to record the names and addresses of the individual(s) or institute(s) that provides medical services to the claimant.

A Claim Set-Up screen, shown in Table XIII, is the final screen of the LPTX. Each claim (at least one for each of the asterisked screens on the earlier list) is displayed in summary form, showing the loss type, the claim symbol (an internal processing code), the claimant's name as well as the estimated incurred loss. If more claims are involved than space permits, additional screens will be generated for those remaining.

Routing the incomplete claim is accomplished by pressing a function key and appropriately completing the Route/Process screen shown in Table XIV. (This procedure is discussed in more detail below).

Routing the incomplete LPTX generates a message to the receiving staff member's mailbox to let him know that he should review the incomplete "claim." He, in turn, can then route the unfinished LPTX to any other staff member. There is no limit to the number of times this routing can occur.

Editing of the unfinished LPT can be done by actuating certain function keys corresponding to the small "secondary " menu on the bottom of the Claim Set-Up screen. By using the function keys all of the LPTX screens can be redisplayed (except the Interface screen). When a screen is redisplayed it can be edited in accordance with regular System editing procedures.

TABLE XII

INJURED PARTY INFORMATION

| | | | | |
|---|---|---|---|---|
| CUSTOMER TEST | | | | 02 PH |
| 123123 | | | | |
| NAME: CUSTOMER TEST | | | | |
| DESC OF INJURY: | | | | |
| TYPE INJURY CODE: | DIS BEG DATE: | | DIS END DATE: | |
| ENTER "X" IF DED AMT APPLIES: | | | SEAT BELT USE: | |
| ATTY (N/R): | NAME: | | | |
| CLM DESC CODE: | DLM DESC: | | | |
| LOSS TYPE: | CLM SYM: | COV ID: | | COLL SOURCE IND: |
| EST INC LOSS: | EST INC ALLOC EXP: | | | VERIFIER: |
| PTA: JIA: | | | | CLAIMS MADE DATE: |
| 1) CLAIM SET-UP | 12) PROP DAMAGE | 23) LC | | 18) HELP |
| 11) PHYS DAMAGE | 31) STAT CODING | 22) SERVICE PROVIDER | | |
| 6) ADD CLMT | 16) RETURN | 13) INJURY | | 30) LOCAL DATA |
| PACKAGE: DUPLICATE PAYMERNT PROBLEM | | | | |

From the Claim Set up screen, the LPTX can be completed, routed to another staff member for additional input or review, or edited further. In order to complete the LPTX all required fields must be validly filled. If all the required fields are not properly filled, the operator is prompted to correct and/or input the appropriate information. If the operator is unable to complete the required field(s) the LPTX will not be completed and the claim number(s) will not be assigned. In such situations, however, pre-determined dummy codes are used to maintain the notice of loss. Alternatively, if other staff members may be able to provide the necessary information, the incomplete "claim " may be routed to them.

When the Claim Set-Up screen is completed, pressing the appropriate function key activates an Automated Claim Numbering facility. This facility automatically assigns a number, from a pre-determined range, to each claim or record report of the LPTX (record reports are given numbers from a separate range apart from the range of claim numbers.). These numbers are the primary method of accessing individual claims for processing and review.

TABLE XIII

CLAIM SET-UP SCREEN

| | | |
|---|---|---|
| SMITH, JOHN | | 02 PH 123123 |
| | TELEPHONE FIRST REPORT: | |

TABLE XIII-continued

CLAIM SET-UP SCREEN

| LOSS TYPE | CLM SYM | CLMT NAME | EST INC LOSS |
|---|---|---|---|
| CR | AF | CLAIMANT #1 | 300 |
| CR | AP | CLAIMANT #2 | 450 |
| CP | AC | CUSTOMER TEST | 150 |

| | | | |
|---|---|---|---|
| 1) ROUTE-PROCESS | | 10) POLICY INFO | |
| 2) SELECT KEY CLM | 6) ADD CLAIM | 19) SELF REFER | 18) HELP |
| | 7) DESC OF ACC | 25) MODIFY LOSS | 23) LC |
| 17) MORE FUNCTIONS | 9) MODIFY CLMT | 29) VEH-DRIVER | 27) ERASE LPT |

c. Routing and Assigning Claims

Typically, when all the information available from the Loss Notice has been input through the Loss Processing Transaction, the as yet incomplete LPTX is routed to a supervisor for review and assignment. This routing is done through the Route/Process screen, shown in Table XIV. When the initials of a staff member are placed in the "Route To:" field and 'Enter' is pressed, the unfinished LPTX is routed to the indicated individual.

TABLE XIV

| | | | | |
|---|---|---|---|---|
| | ROUTE-PROCESS SCREEN | | LPTX | |
| INSURED, INC. | | | | 02 WEC 123123 |
| | ROUTE TO: ___ | ASSIGN TO: ___ | SUPERVISOR: ___ | |
| | KEY OFFICE CODE: ___ | | | |
| | PT: ___ | NEXT TRANS: ___ | DATA CARRY: ___ | |
| ENTER) ROUTE | 2) PROCESS | 18) HELP | 23) LC | 16) RETURN |

When the LPTX is routed to a staff member he receives a message in his electronic "Mailbox". The message comprises a very brief summary of certain information already input into the LPTX and indicates who routed the LPTX and the reason for the routing. This is called a "referral " when it is routed for review by a supervisor. When the staff member next works on the System, he will be prompted that he has a message waiting (See FIG. 8 steps 114, 124 and 128).

When a supervisor retrieves an unfinished LPTX from the database which has been routed to him for review, he typically fills in certain information in the various LPTX screens including the estimated incurred loss, the estimated incurred allocated expense, special procedures, etc. The supervisor's input generally completes the LPTX. Upon this completion, the supervisor electronically assigns the claim to a particular handler for processing by using a Route/Process screen (see Table XIV). When the LPTX is complete (complete, meaning all initial information available has been input) and the supervisor assigns the claim, a sequential claim number (or record report number) is automatically generated and assigned by the system to every claim resulting from the loss. (A supervisor in the claims office specifies various ranges of claim numbers to be used by the system through a Number Assignment Transaction screen (not shown)). A claim that has not yet been assigned and given a claim number (or record report number) is considered to be "in-process." When the claim has been assigned and has been given a claim number (or record report number) it is considered to be "processed."

d. Modifying or Augmenting the Loss Processing Transaction Information

Once an LPTX has been completed it cannot be altered by merely returning to the original LPTX. Thus, to add a companion claim arising out of a previously entered loss a separate function called the Add Companion Claim transaction is provided. All information previously input through the LPTX (e.g. description of the accident, etc.) may be viewed in the Add Companion Claim transaction. The Add Companion Claim Select screen, shown in Table XV, is used to select the claim to which the subsequent companion claim(s) will be added. This screen may be accessed via a Main Menu or by entering 'CCLM' in any 'Next Trans' field.

TABLE XV

| | | |
|---|---|---|
| CCLM | | |
| ADD COMPANION CLAIM TRANSACTION | | |
| | ENTER CLAIM NUMBER: | |
| ENTER) CLAIM LIST | 18) HELP | 32) CANCEL |

The Claimant Information screen, the Physical Damage Information screen, the Injured Party Information screen, the Service Provider screen and the Claim Set-Up screen are all available in the Add Companion Claim transaction for the companion claim, just as they were for the original LPTX.

A set of LP-Element Change screens are used to add, modify or delete information previously input via the LPTX. An LP-Element Changes screen (not shown) is accessed via a Main Menu selection or by entering 'ECHG' in any 'Next Trans' field. Each LP-Element Change transaction is comprised of prefilled screens containing essentially the same fields as the corresponding original LPTX screens. Changes are made on a per-screen basis. In other words, information entered via an LPT is redisplayed screen-by-screen for correction of any item on that screen. (See, e.g. Table XVI.)

There are two ways to change element information previously input via the LPTX.

1. Overlay

The cursor is moved to the desired field location on the display and the original information in that field is typed over. This continues through each succeeding field requiring modification. If the modified information has fewer characters than before, any extra characters may be deleted by erasing to the end of the field.

2. Deletions

This method is used to remove all the information in a field. The cursor is placed in the first character space of the field and the "Erase Key " is pressed. This deletes all the information in the field.

TABLE XVI

| CLAIMANT INFORMATION | | | |
|---|---|---|---|
| BUMSTEAD, DAGWOOD | | | 02 PH 000999 |
| CLAIMANT - ENTER X IF SAME AS INSURED: | | (IF NOT ENTER DATA BELOW) | |
| NAME: | | P/C: | TITLE: |
| STREET: | | | |
| CITY: | ST: | ZIP: | |
| BUS PH: | | RES. PH: | |
| AGE: | SEX: | MS: | NUM DEP: |
| OCC CODE: | STATUS: | INCOME RANGE: | TIN: |
| 11) PHYS DAMAGE | 13) INJURY | 18) HELP | 16) RETURN |
| 12) PROP DAMAGE | 30) LOCAL DATA | 23) LC | |

"Control Changes " are changes to any of the following: a claim number, a claimant name, or a policy number. These are essentially fundamental changes which impact the accessibility of the entire loss transaction.

An LP-Control Changes Menu is used to designate the desired control change and claim number (See Table XVII). First, the entire claim number is entered. Then, the appropriate function key is selected for the Control Change function desired.

TABLE XVII

| LP - CONTROL CHANGES MENU | | |
|---|---|---|
| CLAIM NUMBER: ___ ___ ___ | | |
| 1) CLAIM NUMBER/RECORD REPORT CHANGE | | |
| 2) POLICY NUMBER CHANGE | | |
| 3) DELETE LINKAGE | | |
| 4) CHANGE LINKAGE | | |
| 5) CLAIMANT NAME CHANGE | | |
| 18) HELP | 23) LC | 32) CANCEL |

By way of example, an LP-Control Changes Claim Number screen is shown in Table XVIII. This screen is displayed following the selection of the Claim Number/Record Report Change function on the LP-Control Changes Menu screen. The majority of the information on LP-Control Changes Claim Number screen is prefilled with the existing control information. However, a field is provided for entry of a new claim number. When the new claim number is entered, this transaction is processed and a comment providing both the old and new claim number is automatically generated to the Activity Log (discussed in detail below).

TABLE XVIII

| LP - CONTROL CHANGES | | | |
|---|---|---|---|
| CLAIM NUMBER | | | |
| INSURED: JOHNSON, RICHARD | | P/C: P | TITLE: MR |
| CLAIMANT: JONES, PETER | | P/C: P | TITLE: MR |
| POLICY NUMBER: 02PH 120000 | | | |
| CLAIM NUMBER: 023 AP 00103 | | | |
| NEW CLAIM NUMBER: ________ | | | |
| LOCAL ONLY UPDATE: __ | PT: __ | PTA: __ | NEXT TRANS: __ |

TABLE XVIII-continued

| LP - CONTROL CHANGES | | | | |
|---|---|---|---|---|
| | | | | DATA CARRY: ___ |
| ENTER) CHANGE CLAIM | 23) LC | 18) HELP | 32) CANCEL | |

e. Review of Claim Files

An LPTX Inquiry function is used to view claims after they have been processed (through the LPTX). The LPTX Inquiry transaction, available for viewing purposes only, consists of a series of screens which are essentially the filled screens of the current LPTX.

To review any claim using the LPTX Inquiry function the claim number must be entered through an LPTX Loss Inquiry screen shown in Table XIX. The LPTX Loss Inquiry screen is accessed via the Main Menu or by inputting 'LPTI' in the 'Next Trans' field of any transaction.

TABLE XIX

| LOSS INQUIRY | |
|---|---|
| CLAIM NUMBER: 023 AC 13131 | |
| ENTER) VIEW INFORMATION | 16) RETURN |

A Loss Assignment/Inquiry—Claim Summary screen, shown in Table XX, is displayed in response to the entry of the claim number in the LPTX Loss Inquiry screen. This screen lists all claims associated with the claim number entered (i.e. the claim requested and all companion claims). Positioning the cursor next to the desired claim and pressing 'Enter' displays a filled Claim Information screen. From the Claim Information screen it is then possible to review filled screens from the current LPTX.

TABLE XX

| AUTO LOSS ASSIGNMENT/INQUIRY SUMMARY SCREEN | | | |
|---|---|---|---|
| INSURED: | DARBY ENTERPRISES | | |
| | 300 COMPOSER AVENUE | | BUS PH: |
| | WEST HARTFORD CT 06102 | | RES PH: |
| POL NUM: 37 DP 100111 | AGENCY: | | |
| CLM DESC: | | | WITNESS: N |
| LOSS DATE: 08/01/88 | TIME OF LOSS: 06 | | PREPORTED DATE: |
| TELEPHONE FIRST REPORT: | | | |
| CLAIM NUMBER | CLAIMANT | EST INC LOSS | HAND/SUPV |
| 023 AC 13131 | DARBY ENTERPRISES | 2,000 | RRD/CGM |
| | 300 COMPOSER AVENUE | | |
| | WEST HARTFORD CT 06102 | | BUS PH: |
| | | | RES PH: |
| 023 AN 13132 | JOHN DALEO | | BUS PH: |
| | 258 CONCORD DR. | | RES PH: |
| | POTTSTOWN, PA 19464 | | |
| ENTER) SLDT CLAIM | 7) SLCT CLAIMANT | 12) ADD DIARY ENTRY | |
| 16) RETURN | 4) PREV CLAIM | 10) POLICY INFO | |
| 14) ACTIVITY | 17) NT | 5) NEXT CLAIM | |
| 11) DESC OF ACC | 29) VEH-DRIVER | 23) LC | |

f. Transfer of Claims Between Claims Offices

Claims initially received, set-up, and numbered in one office may need to be transferred to another office to Handle to Conclusion (HTC) due to a change in the claimant's or insured's address (or other change in location). To do this, the originating office completes an HTC Sent transaction, through the System, and electronically transfers the claim file to the new claims office.

The HTC Received Transaction screens are almost identical to the LPTX screens and follow the same screen flows and completion procedures. The difference between the HTC Received screens and the LPTX screens is the addition of a claim number field, a sending office field and the removal of the claim symbol field as a separate field. For example, for the automobile line of business LPTX, the additional fields appears on the Physical Damage Information screen, the Auto Third Party Property Damage screen and the Injured Party Information screen.

When the HTC Received transaction is accessed, an Interface screen returns which is identical to the LPTX Interface screen and follows the same completion procedures and subsequent screen flows. Shown below in Table XXI, is an example of one of the HTC Received screens with the addition of the claim number field and the sending office field (marked with asterisks).

A "Service Item " is a request by one claims office to another claims office for a partial investigation of a claim that is being handled by the first claim office. Such requests can include obtaining a police report, a signed statement, etc. A Service Item request may be mailed or electronically transferred to a receiving office. If the request is mailed it must be manually input into the System via a Service Item transaction. If the request is transferred electronically, the Service Item

TABLE XXI

| PHICIAL DAMAGE INFORMATION | | | |
|---|---|---|---|
| BURMINGHAM, TED | | | 12 MKZ 030889 |
| OWNER NAME: BURMINGHAM, TED | | | |
| NUMBER: * | | | OFFICE: * |
| DESCRIBE DAMAGE TO INSD VEH: | | | |
| USED W/PERM? (Y/N): | | PURPOSE OF USE: | |
| REPAIR EST: | ENTER "X" IF SALVAGE POSSIBILITIES: | | |
| WHERE/WHEN VEH CAN BE SEEN: | | | |
| ATTY (N/R): | NAME: | | |
| CLM DESC CODE: | CLM DESC: | | |
| LOSS TYPE: | COV ID: | TOTAL LOSS IND: | |
| EST INC LOSS: | EST INC ALLOC ESP: | | VERIFIER: |
| CLAIMS MADE DATE: | | | |
| 1) CLAIM SET-UP | 11) PHYS DAMAGE | 18) HELP | 16) RETURN |
| 6) ADD CLMT | 13) INJURY | 23) LC | 30) LOCAL DATA |

transaction screens prefill. In such cases, when the Service Item request is received it goes to a predesignated supervisor's Mailbox for review and assignment. The Service Item transaction screens (not shown) are similar to the LPTX screens and follow the same screen flows and completion procedures. The difference between the Service Item screens and the LPTX screens is that not as much information is required for processing a Service Item and the Service Item screens contain fields for recording Requesting Office information (e.g. name, code, etc).

g. Staff Tables

The Staff Tables maintains information relevant to the claim office personnel. This information includes authority level, case load maximum, job title, etc. for each staff member. supervisors determine the proper reserve authority level, payment authority level, diary limit, case load amount, etc. for each staff member. Only claim office personnel having the proper authority are able to view, update, and or delete information on the Staff Tables.

When the Staff Tables are accessed, the operator can: view a particular staff member's table; add staff members to the staff directory; search for a particular staff member; or modify information on the Staff Table. The ability to perform any or all of these functions is entirely dependent on the operator's Staff Table authority. To view all the members of the staff a Staff Directory screen (shown in Table XXII) is available. This directory will display on multiple screens, if necessary, depending on the number of staff members.

When a new staff member needs to be added to the Staff Tables a screen entitled Valid JDC-AMC Combinations, shown in Table XXIII, is typically accessed first. This screen is a prefilled table of job descriptions applicable to a claim office. By positioning the cursor on the appropriate job description and pressing 'Enter' the selected job description pre-fills into an Add Staff Member screen. This Add Staff Member screen is used to input the various authority levels, system IDs and other information regarding the new staff member. (See Table XXIV).

In order to view, modify or delete a particular staff member's table, the cursor is placed next to the name of that

TABLE XXIII

STAFF DIRECTORY

| LAST NAME | FIRST NAME | INITIALS | JDC |
|---|---|---|---|
| ANDERSON | SUSAN | SAA | GA |
| ANDREWS | ANNE | AOA | ASR |
| ASHTON | PAULA | PXA | SA |
| BALD | LISA | LLS | ICR |
| BARNES | DWAYNE | DJB | SA |
| BARR | DAVID | DKB | OCR |
| BARR | ROBIN | RSB | CA |
| BARR 2ND | ROBIN | RB1 | OCR |
| BEARSE | ELIZABETH | EJB | OSU |
| BECKER-JONES | PAM | PBJ | OCR |
| BECKLES-MITCHELL | BRENDA | BAM | IND |
| BELISLE | JOANNE | JAB | CP |
| BELL | ANNE | ALB | CA |
| BENSON | RON | RAB | 999 |

| | | | | |
|---|---|---|---|---|
| ENTER) INQUIRE | 6) ADD | 9) MODIFY | 16) RETURN | 8) DELETE |
| 5) NEXT/LAST | 7) FIND | 18) HELP | 23) LC | |

staff member and 'Enter' is pressed. Alternatively, a Find Staff Member screen (not shown) is available for directly accessing a particular staff member's screen. All that is necessary is to input that individual's initials or last name.

When a supervisor wishes to check on authority levels and/or other parameters for a staff member, a Staff Member Inquiry screen can be accessed to view the current settings. This screen is shown in Table XXV.

Additional screens are available within the Staff Tables to modify staff member information and to delete staff members from the file.

The Staff Tables are an extremely important piece of the System. The Staff Tables are integrated with virtually every other function in the system. For instance, before an operator can even access System functions, the User ID which has been input is compared to the staff initials specified in the Staff Tables. If no match is found, the operator will not be able to access any System functions. Once the operator has successfully logged on, the System Driver must look to the Staff Tables to display the proper Primary Default menu which is indicated in the Default Menu Number field of the user's Staff Table record. Still further, the Staff Tables are referenced to properly route alert messages, to limit function access, to limit payment and reserve activities, to prefill operator information for Activity Log entries and to specify when diary and authority level alert messages will automatically be generated. In each of these cases, the Staff Tables are referenced to insure the proper operation of other System functions which are user specific.

TABLE XXIII

VALID JDC - AMC COMBINATIONS

| JOB DESCRIPTION CODE | ADJUSTMENT METHOD CODE | JOB DESCRIPTION |
|---|---|---|
| GA | 1 | GENERAL ADJUSTER |
| HSR | 1 | HEALTH SERVICES REP |
| OCR | 1 | OUTSIDE CLAIM REP |
| OCS | 1 | OUTSIDE CLAIM SPECIALIST |
| OSR | 1 | OUTSIDE SENIOR CLAIM DEP |
| RCR | 1 | RESIDENT CLAIM REP |
| CP | 2 | CLAIM PROCESSOR |
| ICR | 3 | INSIDE CLAIM REP |
| ICS | 3 | INSIDE CLAIM SPECIALIST |
| ISR | 3 | INSIDE SENIOR CLAIM REP |
| TCR | 3 | TELEPHONE CLAIM REP |
| CA | 4 | CLAIM ASSISTANT |
| OSU | 4 | OFFICE SERVICES UNIT |
| SA | 4 | SYSTEM ADMINISTRATOR |
| 6) ADD STAFF MEMBER | 18) HELP | 23) LC |
| 5) NEXT/LAST | | 32) CANCEL |

TABLE XXIV

ADD STAFF MEMBER

| | | | |
|---|---|---|---|
| STAFF TABLE FOR: | | | |
| LAST NAME: | | | |
| FIRST NAME: | | | |
| LOGON ID: | | | |
| JOB TITLE: | | | |
| UNIT: | | UNIT NUMBER: | |
| AMC: | | DEFAULT MENU NUMBER: | |
| JOB DESCRIPTION CODE: | | STATE LICENSE NUMBER: | |
| SUPERVISOR: | | ALERT MSG REC: | |
| PAYMENT AUTHORITY: | | TRANS REVIEW: | |
| RESERVE AUTHORITY: | | | |
| OUT OF OFFICE: | TO | ABSENCE TYPE: | (S-T-V) |
| CASELOAD/NEW ASSIGNMENTS: | | CASELOAD OUTSTANDING: | |
| DIARY LIMIT PER DAY: | | | |
| GENERATE SUPV DIARY - COMPENSATION: | | "ALL OTHERS": | |
| DIARY ROLLOVER LIMIT - DAILY: | | PER CLAIM: | |
| STAFF TABLE AUTHORITY: (A-B-C-D-E) | | TERMINATION/TRANSFER DATE: | |
| OTHER TABLE AUTHORITY: (Y-N) | | PRIMARY OFFICE CODE: | |
| AUTHORIZER: UPDATER: | | NEXT TRANS: | |
| ENTER) ADD 13) VALID ADMINISTRATIVE UNITS | | 23) LC | |
| 32) CANCEL 18) HELP | | | |

TABLE XXV

| STAFF MEMBER INQUIRY | | | |
|---|---|---|---|
| STAFF TABLE FOR: | AOA | | |
| LAST NAME: | ANDREWS | | |
| FIRST NAME: | ANNE | | |
| LOGON ID: | AA 6646 C | | |
| JOB TITLE: | SYSTEM ADMINISTRATOR | | |
| UNIT: | AU/CHU | UNIT NUMBER: | 03 |
| AMC: | 8 | DEFAULT MENU NUMBER: | 01 |
| JOB DESCRIPTION CODE: | ASR | STATE LICENSE NUMBER: | |
| SUPERVISOR: | JFM | ALERT MSG REC: | EWW |
| PAYMENT AUTHORITY: | | TRANS REVIEW: | N (Y/S/N) |
| RESERVE AUTHORITY: | | | |
| OUT OF OFFICE: | TO | ABSENCE TYPE: | (S-T-V) |
| CASELOAD/NEW ASSIGNMENTS: | | CASELOAD OUTSTANDING: | |
| DIARY LIMIT PER DAY: | | | |
| GENERATE SUPV DIARY - | COMPENSATION: | "ALL OTHERS": | |
| DIARY ROLLOVER LIMIT - | DAILY: PER CLAIM: | | |
| STAFF TABLE AUTHORITY: | A (A-B-C-D-E) | TERMINATION/TRANSFER DATE: | |
| OTHER TABLE AUTHORITY: | Y (Y-N) | PRIMARY OFFICE CODE: | 515 |
| AUTHORIZER: | RAB UPDATER: DML | NEXT TRANS: | |
| ENTER) NT | 18) HELP | 16) RETURN | 23) LC |

Another available function, which is a derivative of the Staff Tables, is the Caseload Monitoring function. This function can produce a series of reports which permit supervisors and other claim office managers to monitor the case loads of individual staff members, claim units and the office as a whole. This series of reports can include information such as monthly claim openings and closings, the number of claims handled by line of business, and total caseload counts. The Caseload Monitoring function can also provide a Current Claim Distribution report. This report, which can be done by an individual staff member, claim unit or the entire office, shows the number of claims of a specific monetary range which are being handled. This is an important management tool since higher valued claims generally require substantially more time and effort to complete.

h. Directory Tables

The Directory Tables are used to store and display names, addresses and other pertinent information about currently used services and individuals. These include attorneys, doctors/hospitals, investigating authorities, etc. Each listing in the Directory Tables is automatically assigned a unique directory code upon initial input. (The code includes a category designation so that, for example, a list of defense attorneys can be readily displayed.) The Directory Tables then interact with various other functions including the LPTX, Payment and Text Processing functions to pre-fill the name and/or address information when a directory code is input into one or more fields on these screens.

When the Directory Tables are accessed, the first screen which is displayed is the Directory Tables List screen, shown in Table XXVI. This screen is a listing of entries in the Directory Tables. (The Directory Tables List screen will automatically display the appropriate category of entries for filling in certain empty text fields during Text Processing. In such cases placing the cursor on the correct listing and actuating the correct function key will fill in the blank field.) In order to access all the information associated with the entry, the cursor can be placed next to the entry and 'Enter' pressed. A Directory Table Display screen, shown in Table XXVII, then appears displaying the information applicable to the particular entry. Alternatively, a Directory Tables Inquiry screen, shown in Table XXVIII, can be used to search for the particular entry.

TABLE XXVI

DIRECTORY TABLES LIST SCREEN

| CODE | NAME | P/C | TITLE |
|---|---|---|---|
| A 00001 | LASSERMAN, TAMMY E. | P | MS. |
| A 00002 | D'ANGELO & D'ANGELO, LAW OFFICES OF | P | |
| A 00003 | KARSH, DIANNE | P | MS. |
| A 00004 | STEVENSON, JACOBS & ROSE PC | C | |
| A 00005 | JOHNSON, DAVID LEE | P | MR. |
| A 00006 | JOHNSON, DAVID LEE | P | MR. |
| A 00008 | GILLEY, HINKEL & BROWNE, ATTYS AT LAW, PC | C | |
| A 00008 | JAMESON, HENRY | P | MR. |
| A 00009 | FOY, MICHAEL | P | |
| A 00010 | LINCOLN, WASHINGTON, ROOSEVELT & KENNEDY, PC | C | |
| A 00013 | ROGERS & ROGERS PC | C | |
| A 00015 | HURLEY, MARY | P | MS. |
| A 00016 | WALBACK AND WALBACK PC | C | |

| | | | | |
|---|---|---|---|---|
| ENTER) DISPLAY | 4) PREV/FIRST | 6) ADD | 8) DELETE | 16) RETURN |
| | 5) NEXT/LAST | 7) FIND | 9) MODIFY | 17) NT |

TABLE XXVI-continued

| DIRECTORY TABLES LIST SCREEN | |
|---|---|
| 23) LC | 18) HELP |

To add an entry to the Directory Tables, a Directory Tables Add screen, shown in Table XXIX, is available. When the input fields have been filled and the 'Enter' key is pressed, the new entry becomes part of the Directory Tables List.

TABLE XXVII

| DIRECTORY TABLES DISPLAY SCREEN | | |
|---|---|---|
| CODE: | A 00036 | P/C: C |
| NAME: | PEARSON, BAUK & WEINSTEIN | |
| TITLE: | ATTY | |
| STREET: | 1000 FARMINGTON AVENUE | |
| (OPTIONAL): | | |
| CITY: | HARTFORD | |
| STATE: | CT | |
| ZIP CODE: | 06115 | |
| TELEPHONE: | (203) 548-0011 | |
| TIN: | | |
| TR CODE: | | |
| | NEXT TRANS: | |
| 16) RETURN | 17) NT 18) HELP | 23) LC |

Additional screens (not shown) are also provided to delete and modify individual entries. The screen structure and format is very similar to that used for the Staff Tables.

i. Info Search

The Info Search facility provides the ability to search for information resident on the local data base (on-line) as well as data that has been purged to an off-line database. Info Search will access both "in-process " and "processed " claims.

The Info Search facility screen, shown in Table XXX is accessed via a Main Menu selection or by entering 'SRCH' in the 'Next Trans' field of any transaction. The Info Search facility performs searches by using any of the following criteria: (1) claim number; (2) claimant name; (3) insured name; or (4) policy number. If exact spellings of names are not known, phonetic translation, a technique that puts a similar sounding or spelled name/text to a numeric equivalent or phonetic key, is used by the System to assist in the location of the records. If the entire name is not known, the System will also search on a partial name. To further restrict the search and limit the number of records returned, additional information about the claim(s) can be input through the Info Search Facility screen (such as loss date, insured address, claimant address, etc.)

TABLE XXVIII

| DIRECTORY TABLES INQUIRY SCREEN | | |
|---|---|---|
| | SEARCH ON | |
| CODE: | | |
| NAME: | | |
| ENTER) LIST | 18) HELP | 32) CANCEL |

TABLE XXIX

| DIRECTORY TABLES ADD SCREEN | |
|---|---|
| CODE: | |
| NAME: | P/C: |
| TITLE: | |
| STREET: | |
| (OPTIONAL): | |
| CITY: | |
| STATE | |
| ZIP CODE: | |
| TELEPHONE: | |
| TIN: | |
| TR CODE: | |
| NEXT TRANS: | |
| ENTER) ADD 18) HELP 23) LC 32) CANCEL 3) ACCEPT DUPLICATE | |

A Select Applicable Insured Information screen (not shown) is displayed when the insured name is searched through the Info Search Facility screen and multiple records are found. Similar screens are available when claimant information is used as the search basis.

Once the desired claim is found, the operator may acquire further detailed information by accessing the Activity Log or the LPT Inquiry function from the Claim Information screen or by pressing a 'Next Trans/Data Carry' function key and placing the appropriate code in the 'Next Trans' field to access any other function. If the desired information is located "off-line," it can still be accessed through the System without any manipulation which is apparent to the user. The off-line information is displayed in the same manner through separate Off-Line Claim Information screens (not shown) which access a plurality of files containing skeleton information (an index) relating to the off-line files.

TABLE XXX

| INFO SEARCH FACILITY | | |
|---|---|---|
| INSURED: | | |
| CLAIMANT: | | |
| CLM NUMBER: | POL NUMBER: | |
| IF KNOWN, ENTER THE FOLLOWING INFORMATION: | | |
| LOST DATE: | SEEK TERM: | THRU |
| INSURED ADDRESS: | ST: | ZIP: |
| CLAIMANT ADDRESS: ST: | ZIP: | |
| ENTER "X" IF OFFLINE SEARCH: | | |
| ENTER) SEARCH 10) NAME EXACT MATCH 18) HELP 23) LC 16) RETURN | | |

j. Activity Log

The Activity Log is a record of the key activities involved in the processing and adjustment of a claim. The Activity Log is created in one of two ways. A claim handler, supervisor or other staff member can create an Activity Log by inputting a claim number through the Activity Log Select screen shown in Table XXXI (This screen is also used to access an existing Activity Log). Alternatively, the System will create an Activity Log automatically, if one does not already exist, when an operator moves directly to the Activity Log function for a specific claim. If another System transaction generates a comment to the Activity Log and the Log does not already exist, it will likewise be automatically created.

TABLE XXXI

| ACTIVITY LOG SELECT |
|---|
| CLAIM NUMBER : |
| ENTER) ACTIVITY LOG 18) HELP 16) RETURN 23) LOCAL COPY |

An Activity Log Comments screen, shown in Table XXXII, is pre-filled and displays all comments presently in the Activity Log. There is no limit to the number of Comments screens in an Activity Log. The screens within the Activity Log are displayed in reverse chronological order allowing the operator to view the most recent entries to the Log first.

TABLE XXXII

| ACTIVITY LOG COMMENTS | | |
|---|---|---|
| CLM NUM: 023 C 00002 | CLMT: BAILEY, BILL | |
| INSD: STRADLIN, IZZY | | LOSS DATE: 03/03/89 |
| CLM DSC: | EST INC LOSS: 250 | |
| HAND: LLB | SUPV: RJM | INITIAL RESERVE: 250 |
| 03/03/89 JACKET INDEX NON SCAN - DLSA: | | |
| 03/03/89 JACKET INDEX NON SCAN - DLSC: | | |
| 6) ADD COM 10) INDEX 14) POL LIMITS | 17) NT 16) RETURN | |
| 7) SELECT | 12) DIARY FUNCTN | 15) DIARY LIST |
| 18) HELP | 23) LC | 19) PAYMENT COM |

The Activity Log Add screen shown in Table XXXIII is used to add a comment to an Activity Log. Any time an entry is made to the Activity Log, the claim number, insured name, claimant name, loss date, claim description and estimated incurred loss fields are pre-filled. All these fields are protected and cannot be modified by the operator. When a comment is automatically generated to the Activity Log, these fields are likewise prefilled and protected. In fact, every field in the Activity Log is protected once an entry has been made. This provides an audit trail for any necessary claim review.

An Activity Log Index screen, shown in Table XXXIV, is provided to show the general status of a claim and serves as an index to multiple claims of a particular loss occurrence. The Activity Log Index screen, which is prefilled, can be used to select the desired claim by positioning the cursor next to the claim number and pressing the appropriate function key.

TABLE XXXIII

| ACTIVITY LOG ADD | |
|---|---|
| CLM NUM: 023 C 00002 | POL NUM: 00 GRN 010101 |
| INSD: STRADLIN, IZZY | |
| CLMT: BAILEY, BILL | LOSS DATE: 03/03/89 |
| CLM DSC: | |
| 03/07/89 | |
| LAE ________________________ | |
| ________________________ | |
| ________________________ | |
| ________________________ | |
| ________________________ | |
| ________________________ | |
| ________________________ | |
| ________________________ | |
| ________________________ | |
| ________________________ | |
| ________________ | |
| 6) ADD COMMENT 18) HELP | 23) LC 32) CANCEL |

Within the Activity Log function, a Modify screen (not shown) is available to modify or input the Destroy Date, the Coverage Requested Date, the Coverage Received Date and the Comment field of the Activity Log Index. This information may appear pre-filled if these dates or comments were previously entered or generated. If the fields are pre-filled, they can be modified by overlaying the information. If there are no prefilled dates or comments, the correct date or comment can simply be added in the blank field.

TABLE XXXIV

| ACTIVITY LOG INDEX | | | |
|---|---|---|---|
| INSURED: STRADLIN, IZZY | | | |
| POL NUM: 00 GNR 010101 | | LOSS DATE: 03/03/89 | DESTROY DATE: |
| COV REQ: | | | COV. REC: |
| OCC RESERVE: 250 | | POLICY STATUS: | LAPSE STATUS: |
| COMMENTS: | | | |
| CLAIM NUMBER | CLAIMANT | EST INC LOSS | STATUS |
| 023 C 00002 | BAILEY, BILL | 250 | 0 |

TABLE XXXIV-continued

| ACTIVITY LOG INDEX | | |
|---|---|---|
| ENTER) ACTIVITY LOG | 9) ADD/MODIFY | 18) HELP |
| 16) RETURN | 14) POL LIMITS | 23) LC |

An Activity Log Payment Comments screen (not shown) is available for viewing. This screen is pre-filled and displays all payment comments which have been automatically generated to the Activity Log. This provides a quick, efficient way to evaluate a claim's payment record.

k. Claim Reassignment

There are three types of reassignment transactions: claim; family; and global. A Claim Reassignment transaction is available through a Claim Reassignment screen (not shown) to reassign a single new claim to a different claim handler and/or supervisor. A Family Reassignment transaction is available through a Family Reassignment screen (not shown) which is used to reassign a family of claims to a new/different claim handler and/or supervisor. Lastly, a Global Reassignment transaction is available to reassign all open claims from one claim handler and/or supervisor to another claim handler and/or supervisor. The latter is accomplished through a Global Reassignment screen (not shown). This transaction requires a high security level and can only be undertaken by certain staff members.

1. Claim Status changes

A Claim Status Change function is used when one of the following activities is required on a claim file: (1) close a claim when no closing check is being issued at the time of the closing; (2) reopen a closed claim that is to remain open; or (3) change the reserves on an open claim.

A Claim Status Change Menu, shown in Table XXXV, lists each of the Claim Status Change transactions available for selection. A Claim Status Changes Claims Select screen (not shown) is used to enter the claim number for which a change is required. This screen is displayed after selection of any type of Claim Status Change through the Claim Status Change menu screen.

Either a Claim Status Change-Close Transaction or a Final/Close Payment transaction is required to close a claim. If a Final/Closed Payment check is issued, the Closing Payment transaction will close the file. If the claim is being closed

TABLE XXXV

| CLAIM STATUS CHANGES |
|---|
| PRESS A PF KEY BELOW OR RETURN TO DO NEXT TRANS: |
| 1) CLAIM STATUS CHANGE - CLOSE |
| 2) CLAIM STATUS CHANGE - REOPEN |
| 3) CLAIM STATUS CHANGE - RESERVE |
| 16) RETURN TO PREVIOUS MENU |
| 32) LOGOFF |

without a payment, the Claim Status Change-Close transaction must be used to close the claim. A Claim Status Change-Close screen, shown in Table XXXVI, is automatically accessed from the Claim Select screen after the selection of "Claim Status Change-Close " in the Claim Status Changes Secondary Menu.

There are two types of claim reopenings. They are: (1) reopen/close to issue a payment and to close the claim again in one transaction using a Payment Reopen/Close transaction; and (2) a reopen that is to leave the claim open using a Claim Status Change-Reopen transaction. A regular payment transaction is used

TABLE XXXVI

| CLAIM STATUS CHANGES - CLOSE | | | | |
|---|---|---|---|---|
| CLAIM NUMBER: 023 L 00003 | | | POLICY NUMBER: 02 SCC777777 | |
| INSURED: THE DUPONT CORPORATION | | | | |
| CLAIMANT: JERKINS, HARRY | | | CLAIMANT STATUS: | |
| LOSS PAID: 0.00 | | | ALLOCATED EXPENSE PAID: 0.00 | |
| SUBROGATION EXPENSE: 0.00 | | | SALVAGE EXPENSE: | |
| REFUND EXPENSE: | | | | |
| CLAIM ACTION CODE: 0 | | | SUIT RESULT CODE: | |
| COLLATERAL SOURCE/TOTAL LOSS IND: | | | | |
| DISABILITY BEGINNING DATE: | | | DISABILITY ENDING DATE: | |
| LOCAL ONLY: | | DESTROY DATE: | | |
| PTA: | | NEXT TRANS: | DATA CARRY: | |
| 2) PROCESS | 18) HELP | 23) LC | 30) LD | 32) CANCEL |

to reopen and close a claim if an additional payment is made and the claim does not need to remain open.

A Claim Status Changes-Reopen transaction is required to reopen a claim which will remain open. The loss type will remain the same as it is when the claim was closed. A Claim Status Change-Reopen screen, shown in Table XXXVIII, is used to perform this transaction. If the closed claim is not found using the On-Line Info Search Facility, the Off-Line Info Search Facility is used which searches the Off-Line Index tables.

A Claim Status Changes-Reserve Change transaction is required to change the estimated incurred loss and/or estimated

TABLE XXXVII

| | | | |
|---|---|---|---|
| CLAIM STATUS CHANGES - REOPEN | | | |
| CLAIM NUMBER: 023 L 00003 | | POLICY NUMBER: 02 SCC 777777 | |
| INSURED: THE DUPONT CORPORATION | | | |
| CLAIMANT: JERKINS, HARRY | | | |
| | EST INC | PAID | |
| LOSS: | 0 | .00 | |
| ALLOCATED EXPENSE: | 0 | 0.00 | |
| LOSS VERIFIER: | 0 | | |
| DISABILITY BEGINNING DATE: | | DISABILITY ENDING DATE: | |
| LOCAL ONLY: | ASSIGN TO: | SUPERVISOR: | |
| PTA: | NEXT TRANS: | DATA CARRY: | |
| 2) PROCESS | 18) HELP | 23) LC | 30) HOLD | 32) CANCEL |

incurred allocated expense on open claims (The estimated incurred allocated expense is the amount of money that is expected to be spent by claims office for investigation of a claim). When a Reserve Change is processed, a comment is automatically generated to the Activity Log. A Claim Status Changes-Reserve Change screen, shown in Table XXXIX below, is used to complete this transaction. The claim number, policy number, insured and claimant name fields will pre-fill with the previously entered information. The Initial Reserve field will pre-fill with the original reserve which was entered in the LPTX and the Estimated Incurred and Paid fields will prefill with the most current totals.

TABLE XXXVIII

| | | | |
|---|---|---|---|
| RESERVE CHANGE | | | |
| CLAIM NUMBER: 023 L 00003 | | POLICY NUMBER: 02 SCC777777 | |
| INSURED: THE DUPONT CORPORATION | | | |
| CLAIMANT: JERKINS, HARRY | | | |
| INITIAL RESERVE: 1,200 | | | |
| | EST INC | PAID | |
| LOSS: | 0 | .00 | |
| ALLOCATED EXPENSE: | 0 | .00 | |
| LOSS VERIFIER: | 0 | | |
| LOCAL ONLY: | ASSIGN TO: | SUPERVISOR: CGM | |
| PTA: | NEXT TRANS: | DATA CARRY: | |
| 2) PROCESS | 18) HELP | 23) LC | 30) HOLD | 32) CANCEL |

m. Text Processing

The Text Processing function provides the ability to perform various types of text processing without leaving the system. Text Processing can generate preformatted documents and pre-fill blank fields in the documents' bodies by extracting information input through other System functions. Upon operator request, all applicable information, previously input into the System via other transactions (e.g. LPTX) is pre-filled into the requested document. In the event that all the information necessary for form completion cannot be extracted from the system, the Text Processing function prompts the operator to manually input the additional information.

A core group of generic forms are preformatted for use in any claims office. However, each claims office can customize its own forms. This customization requires the creation of a form in "Word Processing " (A Word Processing function is provided with Wang® brand equipment, however, this function is available with virtually every other available system. The Word Processing function is generally accessed through a "Wang® Office " menu selection.) After the form is created it is brought within the Text Processing function where it is coded with merge codes so that all blank fields will prefill with specific claim information from the appropriate database tables. Thus, a local claims office is not constrained by a limited selection of preformatted forms.

A Document Claim Selection screen (not shown) is used to select the claim(s) for which documents are needed. A Document Claim Request screen, (not shown) is used to select the particular claim for which correspondence is desired. A Document Request screen, shown in Table XXXIX, displays a list of preformatted documents applicable to the selected claim. From this screen an operator may select the specific form(s) to be printed. Only those documents appropriate for the type of claim which has been input are listed. If multiple claims are selected for correspondence generation, form lists are displayed one at a time for each claim.

TABLE XXXIX

| DOCUMENT REQUEST SCREEN | | | |
|---|---|---|---|
| CLAIM NUMBER: 023 AC 00001 | | LOSS DATE | 04/19/89 |
| INSURED: SMITH, JOHN | | | |
| CLAIMANT: SMITH, JOHN | | | |
| (X OR V) | DOCUMENT NAME | | HANDLING INSTR |
| * | CP-16 CLAIM RECOVERY ESTIMATE* | | |
| * | ACKNOWLEDGE AND REQUEST FOR INFO* | | |
| * | FILE TRANSFER* | | |
| * | ACKNOWLEDGE OF CLM -NO INFO ML-10* | | |
| * | ASR ASSIGNMENT SHEET INSD AUDTX* | | |
| * | ADR-ML 11* | | |
| * | APP BENEFITS AUTO/PROP LC-5069-1 * | | |
| * | ACKNOWLEDGEMENT LETTER TO AGENT WTCHR* | | |
| * | ASR ASSMT SHT INSD NON-AUDA - DLSA* | | |
| * | ATTORNEY ACKNOWLEDGEMENT* | | |
| * | ASR ASMT SHT-CLMT - AUDA LC 5344* | | |
| * | CLAIM FOR DAMAGES LC-2474* | | |
| * | ASR ASMT SHT-INSD - AUDA LC 5344* | | |
| * | CLAIM FOR DAMAGES PROPERTY LC4556* | | |
| ENTER) SELECT | 4) PREV SCREEN | | 16) RETURN |
| | 5) NEXT SCREEN | | 18) HELP |

Text Processing pulls applicable information from within the system and pre-fills as many fields requiring completion as possible. If all the required fields are completed and if a particular designation is made ( i.e. placing an 'X' in the 'X OR V' field), the system automatically sends the document to the appropriate print queue. If the system is unable to pre-fill all of the fields, the requester is prompted to input the necessary information via a Directory Completion screen (if the information is contained in the Directory Tables) or with a Document Completion screen (if the information is not contained anywhere in the System).

The Directory Completion Screen, shown in Table XL, is associated with the Directory Tables. It lists the appropriate type of Directory entries (e.g. all Doctors, or all investigators, etc.) for the particular empty field. If a designation is made (i.e. placing a 'V' in the 'X OR V' field) the System will display the Document Completion screen (even if the document is 100% completed) so that the requester may view, modify and/or complete the document prior to sending it to the print queue. The Document Completion screen is unique for each specific document. Any blank fields displayed on the Document Completion screen are those which the System was unable to complete with the available System information. Fields which are necessary in order to generate the document, are highlighted and underlined. A document cannot be sent to the print queue if a required field is blank. Ultimately, if a required field cannot be filled, the document request must be cancelled.

Some forms are generated automatically without any operator intervention. This may occur, for example, when an LPTX is processed, or when certain LPTX screens are completed. In these situations a form may be generated to provide system or legal backup for the Loss Notice. If the System reaches an automatic form generation point, and the necessary information to send the form to the Text Processing Print queue is unavailable, the System will prompt for the information.

As indicated previously, the System is also integrated with a Word Processing function which supports the preparation of free-form documents. This permits an operator to type and/or revise any letter or form that is needed.

TABLE XL

| DIRECTORY TABLE | |
|---|---|
| POSITION CURSOR AND PRESS ENTER FOR DESIRED SELECTION: | |
| - | EASTON, ELIZABETH |
| - | MIDDLESEX MEMORIAL HOSPITAL |
| - | HARTFORD HOSPITAL |
| - | PATTERSON, IRVING |
| - | IRVINGTON, JAMES |
| - | DAVIDS, JOHN |
| - | BROWN, ALFRED |
| - | BANKS, SUSAN |
| - | BRIGHAMS, SAMUEL |
| - | JACKSON, CARMEN |
| - | PALMER, DOROTHY |
| - | ST. FRANCIS HOSPITAL |
| - | RIVERVIEW HOSPITAL |
| - | SMITH, FRANKLIN |
| ENTER) SELECT RECORD 16) RETURN 5) NEXT/LAST 18) HELP | |

n. Print Queues

There are two main output facilities available through the system. They are the LOHC (Local Output Hold Control) facility and the Text Processing Print Queue. (Local Copy is available to print out single screen transactions or to print out one screen of a multi-screen transaction. Local Copy is sent to the designated printer (without LOHC intervention)).

As indicated above, the Text Processing function provides the means for the selection and completion of the majority of the claim office forms and letters. All documents are complete coming off the printer. Some documents are ready for mailing immediately after printing. However, multipart forms need to be torn apart and distributed. Depending upon office structure, an output operator generally pulls all Text processing output and mails or completes the "processing " of the output.

Depending on the form, a document request is also sent to a mail print queue or a file print queue or both. After documents are sent to one or both of these print queues, the request for document printout is initiated, as described above, via the print queue facility. A Document Summary Mail Print Queue screen, shown in Table XLI, provides an overview of the documents to be printed and mailed. Documents are listed by group (paper type) with the number of documents requested and any special handling instructions. A Document Summary File Print Queue screen (not shown) is also provided to give an overview of the documents to be printed and filed. Again, documents are listed by group and number of documents requested along with any special handling instructions.

TABLE XLI

DOCUMENT SUMMARY MAIL PRINT QUEUE

| | GROUP | NAME | TOTAL DOCUMENTS | HANDLING INSTRUCTIONS |
|---|---|---|---|---|
| __ | BLKSTK | BLANK STOCK (SHEET FEED) | 4 | |
| __ | BLKSTK | BLANK STOCK (SHEET FEED) | 2 | A |
| __ | BLKSTK | BLANK STOCK (SHEET FEED) | 2 | R |
| __ | LTRHED | LETTERHEAD | 2 | |
| __ | LTRHED | LETTERHEAD | 6 | A |
| __ | LTRHED | LETTERHEAD | 6 | R |

| | | | |
|---|---|---|---|
| 1) PRINTED DOCUMENTS | 6) FILE QUEUE | 16) RETURN | 8) DELETE |
| | 17) DETAIL QUEUE | 15) PRINT | 18) HELP |

A number of Detail Queue screens (not shown) reformat the summary information of the Document Summary Mail and File Print Queues into detailed columns that list:

1) claim number;

2) document name;

3) group;

4) request date; and

5) User ID.

For example, the Detail Queue by Claim Family screen shown in Table XLII, displays all requested documents for the applicable claim family. The documents displayed are listed in claim number order.

TABLE XLII

DETAIL QUEUE BY CLAIM FAMILY

| | CLM NUMBER | DOCUMENT | GROUP | REQ DATE | UID |
|---|---|---|---|---|---|
| __ | 033 00110 | MEDICAL REQUEST TO DOCTOR | LTRHED | 07/08/87 | RAB |
| __ | 033 00110 | MEDICAL REQUEST TO DOCTOR | LTRHED | 07/08/87 | RAB |
| __ | 033 00112 | REQUEST FOR POLICE REPORT | LTRHED | 07/08/87 | RAB |
| __ | 033 00112 | DEDUCTIBLE RECEIVED LTR PRATE | LTRHED | 07/08/87 | MGR |
| __ | 033 00112 | DEDUCTIBLE RECEIVED LTR PRATE | LTRHED | 07/08/87 | MGR |

| | | | |
|---|---|---|---|
| 8) DELETE | 10) DATE REQ SORT | 15) PRINT | |
| 16) RETURN | 9) REQ SORT | 11) GROUP SORT | 18) HELP |

The Local Output Hold Control facility (LOHC) is an electronic storage facility designed to hold information which is waiting to be printed as a result of a transaction input to the local database. There are a number of types of output printed from LOHC including Print Transactions, Transaction Logging and a variety of System reports. The Print Transaction, when requested, generates a hard copy of selected processed (completed), multi-screen system transaction screens. This may be used, for instance, when a claim is to be transferred to another office for completion or partial investigation. Transaction Logging captures and sends every screen of most CAS transactions to LOHC to print into hard copy in the event of system failure. If a daily System backup is run, the Transaction Logging data is deleted. A number of System and database reports are also printed which flow through the LOHC. Such reports include processing error reports, reassignment reports, overnight System reports, etc.

All the reports reflect a system generated creation date. The creation date is the date the report originally entered the print queue (loaded in LOHC) o For On-Line reports, this is the date the information to produce the report was input. For Off-Line reports, this is the date following overnight processing.

All reports are stored in the LOHC facility until they are printed. Once loaded to LOHC, they have a predetermined retention period. After the retention period, an automatic purge occurs and reports that have been sent but not printed will no longer be available.

A Status Option Menu (not shown) is used to select reports to be displayed. The reports are then displayed in accordance with the specific field requested (such as date, form number, group or report number). One or more fields can be entered in the Status Option Menu (e.g. entering a date and form number will display the status of all reports created on the specified date for printing on the specified paper, entering no date will default to all reports queued for that user). A Default Status screen, shown in Table XLIII, displays all reports in ascending order by group and secondarily, in descending order by date within the group. An operator can delete or print all sent or unsent pages of a report by positioning the cursor on the left side of the desired report and pressing the appropriate function key. In addition, an operator can change the printer destination, the number of copies or select specific pages to be printed by using the Print With Options menu shown in Table XLIV.

TABLE XLIII

LOCAL OUTPUT HOLD - DEFAULT - SYS ADMIN

| GROUP | REPORT | (REPORT) | CREATED | FORM | TOTAL PAGES | PAGES SENT | PTR |
|---|---|---|---|---|---|---|---|
| HOSTHCPY | HHC LPT AUTO | (HCLPAUTO) | 06/29/89 | 000 | 0003 | 0000 | C |
| HOSTHCPY | HHC LPT AUTO | (HCLPAUTO) | 07/01/89 | 000 | 0002 | 0000 | C |
| HOSTHCPY | HHC LPT AUTO | (HCLPAUTO) | 07/02/89 | 000 | 0003 | 0000 | C |
| HOSTHCPY | HHC LPT AUTO | (HCLPAUTO) | 07/05/89 | 000 | 0002 | 0000 | C |
| HOSTHCPY | HHC LPT AUTO | (HCLPAUTO) | 07/06/89 | 000 | 0008 | 0000 | C |
| HOSTHCPY | HHC LPT AUTO | (HCLPAUTO) | 07/07/89 | 000 | 0002 | 0000 | C |
| HOSTHCPY | HHC LPTX WC | (HCLPWORK) | 07/02/89 | 000 | 0009 | 0000 | C |
| HOSTHCPY | HHC LPTX WC | (HCLPWORK) | 07/06/89 | 000 | 0008 | 0000 | C |
| HOSTHCPY | HHC LPTX WC | (HCLPWORK) | 07/07/89 | 000 | 0000 | 0000 | C |
| HOSTHCPY | HHC PAYMENTS | (HCPA) | 07/02/89 | 000 | 0004 | 0000 | C |
| HOSTHCPY | HHC PAYMENTS | (HCPA) | 07//7/89 | 000 | 0004 | 0000 | C |
| LOHC | SCTY BY RPT | (LOHCRPT) | 07/01/89 | 000 | 0002 | 0000 | C |
| LOHC | SCTY BY USER | (LOHCUID) | 07/01/89 | 000 | 0003 | 0000 | C |
| PRTTRANS | PTRS LPT AUT | (PTLPAUTO) | 06/29/89 | 000 | 0004 | 0000 | C |
| PRTTRANS | PTRS LPT AUT | (PTLPAUTO) | 07/02/89 | 000 | 0002 | 0000 | C |
| 5) NEXT | 6) REQUEUE | 13) PRINT ALL | 7) P-OPTIONS | | 14) PRINT UNSENT | | |
| | 16) PREVIOUS | 8) DELETE | 15) PRINT SENT | | 32) TOP MENU | | |

TABLE XLIV

| LOCAL OUTPUT HOLD CONTROL | | | | | | | |
|---|---|---|---|---|---|---|---|
| | | PRINT WITH OPTIONS MENU | | | | | |
| GROUP | REPORT | (REPORT) | CREATED | FORM | PAGES | SENT | PTR |
| TRXLOG | TRANS LOG PAYMENTS | TLPA | 07/09/87 | 000 | 0002 | 0000 | C |

NEW PRINTER: ___
OF COPIES: ____
PRINT PAGE RANGE FROM ____ TO ____

| | | | |
|---|---|---|---|
| 13) PRINT ALL<br>14) PRINT UNSENT | 15) PRINT SENT | 16) PREVMENU | 32) TOP MENU |

o. Payments

Payments are one end result of the processing of claims. The entire investigation (adjustment) process and the corresponding documentation is all to determine what, if any, payment is owed to a claimant. Payments can be repetitive (the same payment for a predetermined period of time), multiple and varying, or single sum. Each payment is treated slightly differently by the system and processing varies depending on a claim's status (i.e. open or closed) at the time of the payment.

A different work flow occurs depending on the handler's selection of the type of payment transaction (i.e. close, partial, reopen/close) and the method of issue (i.e. machine, manual, repetitive). To choose a claim upon which a payment is to be made, a Claim List screen, shown in Table XLV, is provided. This screen displays the claim family and is prefilled, listing the main claim number, followed by any companion claim numbers. Alternatively, a claim upon which payment is to be made, can be chosen through the Select Claim screen shown in Table XLVI.

Once the claim is chosen, a Payment Control screen, shown in Table XLVII is accessed. This screen is used to advise the system of the type of payment, the method of issue, the check amount, the nature of the payment, the payee and the person to whom the check should be mailed. Additional information including the claim number and the authorizer's initial are prefilled from previously entered data. If the payment is to receive special handling (e.g. attachment required, return to requestor, etc.), it may be indicated on the Payment Control screen.

Manual and Machine Issue Payment screens are provided which are nearly identical. However, the Machine Issue screen does not include the policy number, check number and check digit fields

TABLE XLV

| PAYMENT LIST CLAIM SCREEN | | | | | |
|---|---|---|---|---|---|
| PLEASE SELECT FROM THE LIST OF CLAIMS: | | | | | |
| | KEY OFFICE CODE | | CLAIM SYMBOL | NUMBER | WIP INDICATOR |
| __ | 023 | K | AL | 00046 | |
| __ | 023 | __ | AC | 00047 | |
| __ | 023 | __ | AP | 00048 | |
| __ | 023 | __ | AP | 00049 | |
| __ | ____ | __ | __ | _____ | |
| __ | ____ | __ | __ | _____ | |
| __ | ____ | __ | __ | _____ | |

| | | | |
|---|---|---|---|
| ENTER) SELECT CLM | 4) PREV/FIRST<br>5) NEXT/LAST | 18) HELP<br>23) LC | 16) RETURN |

found on the Manual Issue screen. The Payment-Machine Issue screen is shown in Table XVIII.

The Close-Reopen/Close Payment Transaction is used to record and/or issue a final check on a claim or to reopen a closed claim, issue a check and close the claim again. The Close Payment Transaction screen from which this transaction is undertaken, is shown in Table XLIX.

Frequently, partial payments are made on claims. These partial payments are used to compensate a claimant for only a verified portion of a claim. The Partial Payment Transaction

TABLE XLVI

| PAYMENT SELECT CLAIM SCREEN | | |
|---|---|---|
| ENTER CLAIM NUMBER ___ _ ___ | | |
| ENTER) SELECT CLM | 16) HELP | 16) RETURN |

screen (shown in Table L) is provided to record and/or issue partial payments on open claims. In this screen, the claim number is prefilled.

When 'Repetitive' is selected in the 'Method of Issue' field of the Payment Control screen, the Payment-Machine Issue screen displays for completion. This is because all repetitive payments are machine issued. The Repetitive Payment Transaction screen is normally accessed following the completion of the Machine Issue and Partial Payment screens.

A Repetitive Payment Schedule Information screen is used to advise the system of the number of repetitive payments, frequency

TABLE XLVII

| PAYMENT CONTROL SCREEN | | | | | |
|---|---|---|---|---|---|
| CLM NUM: 027 K AP 00002 | | | AI: FRD | | |
| TYPE OF PAYMENT: | CLOSE: | PARTIAL: | REOPEN/CLOSE: | | |
| METHOD OF ISSUE: | MACHINE: | MANUAL: | REPETITIVE: | | |
| CHECK AMT: | | NATURE OF PAY: | | | |
| PAYEE SAME AS: | INSD: CLMT: | INSD/LOSS PAYEE: | DIR: | OTHER: | |
| MAIL TO: | PAYEE: | AGENT: | | | |
| IF OTHER ENTER: | NAME: | | | | |
| | STREET: | | | | |
| | CITY: | | ST: | ZIP: | |
| | HNDL ID: | | LOCAL ONLY: | | |
| ENTER) UPDATE | 18) HELP | 23) LC | 32) CANCEL | | |

of issuance (i.e. weekly, bi-weekly or monthly) and the date the payments will begin. The claim number, authorizer's initials, check amount and nature of payment will be prefilled on this screen, which is shown in Table LI.

A Repetitive Payment Schedule screen (not shown), which normally follows the Repetitive Payment Schedule Information screen, is prefilled when it displays. This screen lists the payments by their respective date of issue (automatically calculated from the information input through the Repetitive Payment Schedule Information screen) along with the nature of the payment. This schedule is reviewed by the operator to confirm

TABLE XLVIII

| PAYMENT - MANUAL ISSUE | | | | | |
|---|---|---|---|---|---|
| | | | | | AI:FRD |
| CLM NUM: | 027 AP 00002 | POL NUM: | 02 MVP 110355 | LOSS DATE: | 06/13/88 |
| INSD NAME: | BROWN, JANE | | | | |
| CLMT NAME: | GOVERNALI JOSEPH | | | CLMT STATUS: | |
| CHECK NUM: | 0000000000 ID: | IN LIEU CHK NUM: | 00000 | | |
| PAYEE NAME: | GOVERNALI, JOSEPH | | | | |
| STREET: | 16 CENTRAL AVENUE | | | | |
| CITY: | SYRACUSE | ST: NY | ZIP 13221 | | |
| NATURE OF PAY: | SETTLEMENT ON PROPERTY DAMAGE | | | ISSUE DATE: | 07/18/89 |
| CHECK AMOUNT: | 527.55 | TR CODE: | | PAYEE TIN: | |

TABLE XLVIII-continued

| PAYMENT - MANUAL ISSUE | | | |
|---|---|---|---|
| NB: AMT: | | | |
| NB: AMT: | | | |
| NB: AMT: | | | |
| NB: AMT: | | | |
| ENTER) UPDATE | 18) HELP<br>32) CANCEL | 30) LOCAL DATA | 16) RETURN<br>23) LC |

that prefilled information is correct. If the schedule needs to be revised, screens for adding, deleting or modifying the repetitive payment schedule are available.

A Payment-Route/Process screen is typically the final screen in a Payment Transaction. This screen is shown below in Table LII. The Payment-Route/Process screen is used to "process" the Payment Transaction or to route the unprocessed payment transaction to another staff member (e.g. a supervisor) for review. When a payment transaction is "processed," the System communicates with the HOST and provides the HOST with certain information. The HOST verifies the appropriate information, generates a print file which is sent back to the System and advises the System to accept the transaction and to proceed with the necessary steps to print the check. If a claim handler's authority is exceeded by the amount of the payment, it is necessary for a supervisor to review the payment transaction before it is processed. Thus, the routing of the unprocessed payment transaction to a supervisor insures that the necessary authority will be secured prior to the printing of the check. If a handler attempts to process a check for more than his authorized amount, an alert message is generated and the transaction is automatically routed to a supervisor. (The handler's authorization amount is obtained by interaction with the Staff Tables.)

TABLE XLIX

| CLOSE PAYMENT TRANSACTION | | |
|---|---|---|
| CLM NUM: 027 AP 00002 | | DESTROY DATE: |
| | DIS REG DATE: | |
| | DIS IND DATE: | |
| | CLM ACTION CODE: | |
| | SUIT RESULT CODE: | |
| | COLL SOURCE/TOTAL LOSS IND: | |
| | LOSS PAID: | __ 0.00 |
| | ALLOC EXP PAID: | __ 0.00 |
| | SUBRO EXP PAID: | __ 0.00 |
| | SALVAGE EXP PAID: | __ 0.00 |
| | REFUND EXP. PAID: | __ 0.00 |
| ENTER) UPDATE<br>32) CANCEL | 18) HELP<br>23) LC | 16) RETURN<br>30) LOCAL DATA |

TABLE L

| PARTIAL PAYMENT TRANSACTION | | |
|---|---|---|
| CLM NUM: 027 K AP 00002 | | |
| DIS BEG DATE: | | |
| DIS IND DATE: | | |
| CLM ACTION CODE: | | |
| SUIT RESULT CODE: | | |
| COLL SOURCE/TOTAL LOSS IND: | | |
| ENTER) UPDATE<br>32) CANCEL | 18) HELP<br>23) LC | 16) RETURN<br>30) LOCAL DATA |

p. Windowing

Incorporated into the present system is the capability to simultaneously access more than one function or screen on a single terminal. This capability is called windowing. (In a preferred embodiment of the present invention this function is provided as a Wang® utility, but it is available through many other vendors.)

Once an operator is logged on to the system, he can "window" to another screen on the same terminal. This is accomplished by pressing a combination of two keys at the same time. The combination of the 'Shift' key and the 'Next' key moves the operator between the various windows.

TABLE LI

| REPETITIVE PAYMENT SCHEDULE INFORMATION | | |
|---|---|---|
| CLM NUM: 027 C 40987 | | AI: FRD |
| CLM AMT: 200.00 | | |
| NAT. OF PAYM: TEMPORARY COMPENSATION________ | | |
| NUMBER OF PAYMENTS: 00 | M = MONTHLY | |
| FREQUENCY OF PAYMENTS: | B = BI-MONTHLY | |
| REPETITIVE PAYM START DATE: | M = MONTHLY | |

TABLE LI-continued

| REPETITIVE PAYMENT SCHEDULE INFORMATION |
| --- |
| ENTER) GEN REP PAYM SCHED 18) HELP 16) RETURN 23) LC 32) CANCEL |

The System treats each window as a separate terminal. As such, it is necessary to log on and log off every window in order to access and depart from the system. This function permits an operator to perform multiple transactions at the same time including: viewing the Directory Tables while inputting Text fields; answering a telephone inquiry while inputting Loss Notices; and interfacing with the Host while performing any other function.

TABLE LII

| PAYMENT - ROUTE/PROCESS |
| --- |
| CLM NUM: 027 AP 00002 |
| ROUTE TO INITIALS: |
| PT: |
| PTA: |
| NEXTTRANS: DO: |
| ENTER) ROUTE 2) PROCESS 3) CONTROL SCREEN |
| 18) HELP 16) RETURN 23) LC |

q. Mailboxes

Mailboxes are the equivalent of a "message waiting" function. "Alert" messages, Loss Processing Referrals, Payment Referrals and Investigative Instructions are examples of information which will form a queue in a user's Mailbox.

A Mailbox Menu screen, shown in Table LIII, provides the user with an indication of the types of messages waiting for him, if any (e.g. assignments, referrals or alerts). From this same menu he can access the various messages and display summary listings of assigned claims etc.

TABLE LIII

MAILBOX MENU

| | MESSAGES WAITING |
| --- | --- |
| 1) Assignment Mailbox | X |
| 2) Referral Mailbox | X |
| 3) Alert Message Mailbox | X |
| 4) Wang Office | |
| 16) Return | |
| -OR- | |
| Supply a new Trans Code and press ENTER: ____ | |

The selection of the Assignment Mailbox accesses an Assignment Mailbox screen which shows claims that have been assigned to a claim handler. This screen, shown in Table LIV, displays assignments, in summary form, in chronological order. Each assignment can be reviewed by the claim handler by positioning the cursor next to the assignment entry and pressing 'Enter'. When an assignment has been reviewed a 'Y' appears in a 'Reviewed' field which indicates that item can be deleted automatically at the end of the day by the system.

TABLE LIV

| ASSIGNMENT MAILBOX for ABC | | | | | | | |
|---|---|---|---|---|---|---|---|
| TYPE | INSURED NAME | | | | | | ASSIGNED BY |
| REVIEWED | DATE | TIME | CLAIM | NUMBER | | CLAIMANT NAME | |
| LPTX | CRANE CONSTRUCTION CO. | | | | | | FMD |
| N | 12/09/87 | 11:06:05.36 | 023 | C | 00139 | BILL SMITH | |
| LPTX | FRANK BROWN | | | | | | RTS |
| Y | 12/14/87 | 08:57:48.61 | 023 | AC | 00193 | JIM JONES | |

POSITION CURSOR IN FRONT OF ITEM TO BE REVIEWED AND PRESS ENTER
4) PREV/FIRST 8) DELETE 17) NT
5) NEXT/LAST 11) CHANGE INITIALS 23) LC 16) RETURN

A Referral Mailbox screen, shown in Table LV, contains: payment referrals and LPTX referrals (new LPTXs, HTC Received, Add Companion and Local Only). These transactions appear in the above order and with each set of items corresponding to a particular transaction sorted in chronological order. As with assignments, each referral can be selectively reviewed. After review, the item entry will be deleted unless the operator chooses to maintain the entry for additional review. Deletion can be accomplished by selecting the appropriate function key.

TABLE LV

| REFERRAL MAILBOX FOR ALB | | | | | | |
|---|---|---|---|---|---|---|
| TYPE/ | INSURED NAME DATE | TIME | CLAIM | NUMBER | CLAIMANT NAME | ROUTED BY |
| REVIEWED | BUFFALO OIL COMPANY, INC. | | | | | PMA |
| I INST | 12/10/87 | 07:42:57.16 | 023 | C 00053 | CHARLIE BROWN | |
| | BRINKMAN CHEVROLET INC. | | | | | LRS |
| I INST | 12/10/87 | 07:53:25.57 | 023 | C 00054 | JOHN BLOCK | |
| N | BUFFALO OIL COMPANY INC. | | | | | TPC |
| I INST | 12/11/87 | 15:33:41.59 | 023 | C 00055 | | |
| N | | | | | | |

POSITION CURSOR IN FRONT OF ITEM TO BE REVIEWED AND PRESS ENTER
4) PREV/FIRST 9) SELECT TYPE 17) NT
5) NEXT/LAST 11) CHANGE INITIALS 18) HELP
8) DELETE 23) LC 16) RETURN

An Alert Message Mailbox screen, shown in Table LVI, may also be accessed from the Mailbox Menu screen. This Mailbox is only available to staff members who are in a supervisory position and provides access to alerts which have been generated including: LPTX Referral/Assignment Delay, Authority Level Exceeded and Diary and Staff Table Alert Messages.

TABLE LVI

ALERT MESSAGE MAILBOC
FOR RDC

PRESS THE APPROPRIATE PF KEY AS LISTED BELOW

| | MESSAGES WAITING |
|---|---|
| 1) LPT REFERRAL/ASSIGNMENT DELAY | X |
| 2) AUTHORITY LEVEL EXCEEDED | X |
| 3) DIARY | X |
| 4) CASE LOAD | X |
| 5) STAFF TABLE | |
| 6) INCOMPLETE FORMS | |
| 7) CHANGE INITIALS TO TFC | |
| 16) RETURN | |

-OR-
SUPPLY A NEW TRANS CODE AND PRESS ENTER:

TABLE LVI-continued

ALERT MESSAGE MAILBOC
FOR RDC

NEXT TRANS: ____

A provision also exists within the Mailbox function to send intraoffice electronic mail (primarily administrative memos and the like). This function is preferably accessed through the "Wang® Office" automation program which is available when Wang® brand computers and peripherals are used throughout a claims office. This function is not, however, limited to Wang® brand equipment. One of skill in the art would be able to provide such a feature using any comparable hardware.

r. The Diary Function

The ability to "diary" a claim which requires subsequent activity is an integral facet of the loss adjustment process. The Diary is a personal diary, determined by the operator's User ID. It has the capability to record a specified date for action on a claim, to display that claim at the appropriate time and to "rediary" as needed. When an LPTX is processed, the System automatically sets the diary date for the supervisor according to Staff Table parameters. This date is predetermined based on the type of claim and the experience level of the handler but can be overridden if necessary.

The Diary, is formatted by staff member, for each day of the year on which a claim has been placed on the diary. A Diary Listing screen, shown in Table LVII, displays all claims diaried for a specified day. The date displayed defaults to the current date, but future diary dates can also be accessed.

The diary history, displayed on a Diary History screen (not shown) lists all dates set by a supervisor for a particular claim (past, present and future). The diary history is primarily used as a quality control review by management.

A Diary Function screen, shown in Table LVIII, permits: diary creation; deletion; rediary; alternate diary; and access to a diary history. The Diary Function screen can be used to display all dates diaried for a particular claim in chronological order. A record is maintained for any claim for which at least one diary date existed.

Diary dates may be set by any staff member for a particular claim. However, only the initial supervisor diary dates are set automatically. For instance, a claim handler may wish to set personal diary dates to remind him to do certain things. In such cases, it is usually helpful to provide comments with the diary date. Comments are entered through the Activity Log function and are accessible when a diary date is displayed.

Diary alert messages, mentioned above, are returned to the operator's screen as well as being routed to a supervisor's message queue (mailbox). Such alerts are generated when the maximum number of diary entries allowed for an individual on a per day basis (set through the Staff Tables) has been exceeded, when a handler allows his diary to "roll over" more than a set number of days (diary dates automatically "roll over" to the next day when they are not accessed or acted upon by the handler), when an attempt is made to diary a day that has been identified as a vacation or non-working day (set through the Staff Tables), or when an attempt is made to Diary a date that is more than six months in the future.

TABLE LVII

| DIARY LISTED | | | | | |
|---|---|---|---|---|---|
| DATE: 03/20/89 STAFF: LAE COUNT: 1 | | | | | |
| INSURED NAME | | CLAIM NUMBER | | | BY |
| | CLAIMANT NAME | | LOSS DATE | REASON | |
| FILE | | 023 | AC 0001 | | LAE |
| | SMITH, JOHNB | | 02/02/89 | FILE | |
| SUPPLY A TRANS CODE AND PRESS RETURN | | | | | |
| NEXT TRANS: DATA CARRY: | | | | | |

TABLE LVIII

| DIARY FUNCTION | | | | |
|---|---|---|---|---|
| CLAIM NUMBER: 023 C 00002 | | | | |
| INSURED NAME: STRADLIN, IZZY | | | | |
| CLAIMANT NAME: BAILEY, BILL | | | | |
| LOSS DATE: 03/03/89 | | HAND.: RDC SUPV.: ALB | | |
| DIARY | REASON REQUEST | JOB | | |
| DATE BY | FOR | FILE | DESCRIPTION | |
| 03/15/89 LAE | FILE | OUTSIDE CLAIM REP | | |
| 05/02/89 RJM | ACTL | INSIDE CLAIM REP | | |
| 4) PREV/FIRST | 6) ADD | 8) DELETE | 14) ACTIVITY LOG | 17) NT |
| 16) RETURN | 5) NEXT/LAST | 7) SELECT | 15)DIARY LISTING | 18) HELP |
| 23) LC | 11) HISTORY | 22) FAMILY REDIARY | | |
| ENTER TO CONFIRM OR PF1 TO RE-SELECT. 20020 | | | | |

s. Ad Hoc Reporting

The Ad Hoc Reporting function is a standard software database query. It is used to extract any local database information which is desired. As with most software database queries the output from the extraction can be arranged in any manner.

A number of preformatted reports or queries are available to any office. These preferably include: Duplicate Payment Reports, Claim Handler Outstanding Claim Reports and Activity Log Disaster Recovery reports. An example of a custom local claims office report is a Weekly Claim Input Summary. This report totals the number of claims input for a given week. It can be done office wide and/or by line of business. Essentially, the Ad Hoc Reporting function can extract and format any system database information into a report.

t. Local Data

The Local Data function provides an individual claim office with the ability to define and record local specific data through generic definitions maintained by the system. It permits a local claims office to name the input elements (prompts) as they wish them to appear on a screen and to capture these elements at logical points within the System workflow.

A Local Data Label Maintenance screen (not shown) is provided which functions as a menu to permit an operator (usually a supervisor with a very high security level) to choose specific input fields (i.e. policy, claimant, claim or payment information) to establish. By way of example, a Local Claim Information Labels screen is shown in Table LIX. This screen permits the operator to choose screen labels for preformatted generic input fields. The preformatted generic input fields include a number of 10 byte numeric fields, 2 byte character fields, 30 byte character fields and 6 byte date fields.

TABLE LIX

| LOCAL CLAIM INFORMATION SCREEN LABELS | | | |
|---|---|---|---|
| N1: TT EST INC LOSS | (NUMBER 10) | | |
| N2: TT PAID | (NUMBER 10) | C11: MISC (1 THRU 6) PAID | (CHAR 30) |
| N3: TP EST INC LOSS | (NUMBER 10) | C12: CLMT'S ATTY EST INC | (CHAR 30) |
| N4: TP PAID | (NUMBER 10) | C13: CLMT'S ATTY PAID | (CHAR 30) |
| N5: MEDICAL PD | (NUMBER 10) | C14: RECOVERY AMOUNT | (CHAR 30) |
| N6: HOSPITAL PAID | (NUMBER 10) | | |
| C1: | (CHAR 2) | D1: DATE CLMT 1ST CONTAC | (DATE) |
| C2: | (CHAR 2) | D2: DATE 1ST COMP PAYMENT | (DATE) |
| C3: | (CHAR 2) | D3: DATE COMP STOP/SUSP | (DATE) |
| C4: | (CHAR 2) | D4: | (DATE) |
| C5: | (CHAR 2) | D5: | (DATE) |
| C6: | (CHAR 2) | D6: | (DATE) |
| C8: DRUGS PAID | (CHAR 30) | | |
| C9: MED TRANS. PAID | (CHAR 30) | (LABEL PREFIX = LL3) | |
| 10: MEDICAL EST INC | (CHAR 30) | (DATE PREFIX = LLC) | |
| | 9) MODIFY | 16) RETURN | |

Once the desired number of generic input fields have been given specific labels (not all the generic fields have to be used) they are arranged into an input format on a Local Claim Information screen such as that shown in Table LX.

TABLE LX

| LOCAL CLAIM INFORMATION | | | |
|---|---|---|---|
| INSD: WARNER LANDSCAPING | | POL NO: 02 WB 125487 | |
| CLMT: GROAN, JIM | | CLAIM NUMBER: C 0000 | |
| TT EST INC LOSS | 5,000 | | |
| TT EST INC LOSS | 0 | | |
| MEDICAL (PHYS FEE) PD | 0 | | |
| DRUGS PAID | ______ | | |
| MED TRANSPORTN PAID | ______ | | |
| MEDICAL EST INC LOSS | 3500 | | |
| MISC (1 THRU 6) PAID | ______ | | |
| CLMT'S ATTY EST INC | ______ | | |
| CLMT'S ATTY PAID | ______ | | |
| RECOVERY AMOUNT | ______ | | |
| DATE CLMT 1ST CONTACT | 03/09/89 | DATE 1ST COMP PAYMENT | ______ |
| DATE COMP STOP/SUSP | ______ | | |
| ENTER) MODIFY 8) DELETE 23) LC 16) RETURN | | | |

Information input through the Local Information screen(s) is maintained on local databases only. It is not communicated to the Host. The purpose of this function is to capture data necessary to comply with local filing requirements and other specific local needs. Other dedicated functions, enumerated above, are designed to capture information transferred to and used by the Host.

4. The Second Embodiment

The second embodiment of the present invention, discussed below, is described, by way of example, in terms of an insurance claims processing office.

Unless otherwise specified, it is to be assumed that functions and features discussed with respect to the first embodiment are carried out in a similar manner with respect to the second embodiment.

Figure 10:
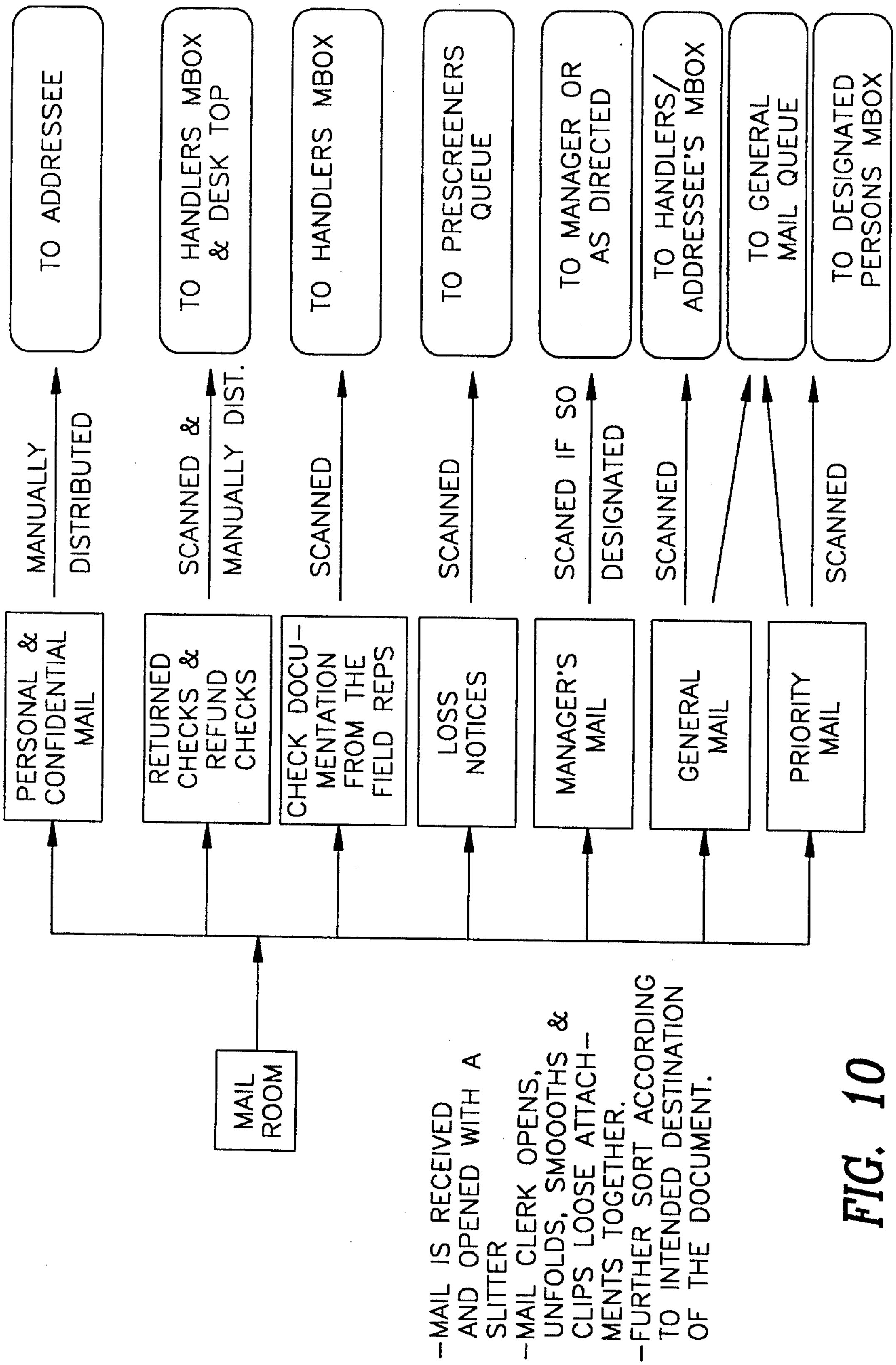
FIG. 10 is a block diagram depicting the flow of mail into an office employing the second embodiment of the present invention.

In any claims office, the processing of work begins with the receipt of mail as shown in FIG. 10. That mail is typically opened and sorted by mail clerks into a plurality of categories. In a typical work flow associated with use of the present invention, the mail is sorted into the following categories:

Personal and Confidential;

Returned Checks and Refund Checks;

Documentation from Claim Representatives;

Manager Mail;

Loss Notices;

General Mail; and

Priority Mail.

In accordance-with the second embodiment of the present invention, all mail relevant to the processing of claims is electronically scanned into the System to form images which are electronically stored and retrieved.

Personal and Confidential mail consists of mail that is addressed to specific individuals in the office bearing no indication of official business. It is simply hand delivered to the addressee. If any of this mail is found to have a relationship to a claim, it is scanned into the System at a later time.

Returned Checks and Refund Checks constitute the vast majority of all checks which are received by a claims office. Returned Checks are those checks which were sent out as payments but have been sent back for any number of reasons. Refund Checks are refunds from overpayments. They are both scanned into the System as images and the Refund Checks are hand delivered to designated staff members.

Documentation from Claim Representatives is the paperwork generated by a Outside Claim Representative when he investigates a claim in the field. All such documentation is scanned into the System.

Manager Mail consists of advertisements, educational materials and other mail which is office related. This mail is hand delivered to a manager and then scanned into the System later if so designated.

Loss Notices are, as described previously, first notification that a loss has occurred. While some of these notices are free-form, many are on standard forms. All Loss Notices are scanned into the System.

General Mail is the category which has the highest volume. It encompasses all claim correspondence (except Loss Notices) and "Returned Text" documents. (Returned Text documents are correspondence which has been produced by the System (with identifying codes in selected locations on the produced documents) which is sent out from the office and then returned to the office with the requested material and/or information.) All General Mail is scanned into the System.

The last category is Priority Mail. This is a mail which has been identified as being particularly important. It can, in the present example, include lawsuits, hearing notices and arbitration correspondence. All priority mail is also scanned into the System.

a. Scanning

Referring initially to FIG. 6, mail or other documents which are to be scanned into the System are placed one at a time or fed in stacks through a scanner 226 such as a Wang® SC4000 scanner. The scanner is directly linked to a PC 228 which, in turn, is linked to the System's Main CPU 210 (preferably a Wang® 7160 VS or the like). The PC 228 controls the scanner's basic operation via Wang® WIIS Emulation Workstation software. (The software is integrated into the system by a WIIS Application Program Interface ("API") and cooperates with all System functions.) Two scanning "functions" are available for controlling the flow of images into the System, Scan ("SCAN") and Mail Scan ("MSCN"). Each accomplishes the same end result but accomplishes that result with a slightly different work flow.

1. The Mail Scan Function ("MSCN")

Mail Scan is the preferred function for scanning documents into the System on a regular basis. MSCN can be accessed by hitting a 'PF' key (function key) while the Main Menu is displayed (an example of a Main Menu for a Claim Handler is shown in Table LXI) or entering 'MSCN' in a 'Next Trans' field.

The MSCN function, the input screen of which is shown in Table LXII, initially requires the input, by the operator (scanner/mail clerk) of a "Mail Qualifier." The Mail Qualifier is a code, preferably comprised of two to four positions, which can be used to identify the type of mail, the line of business and/or the designated recipient of the image(s). It is a first level of indexing the images in the System.

Figure 11:
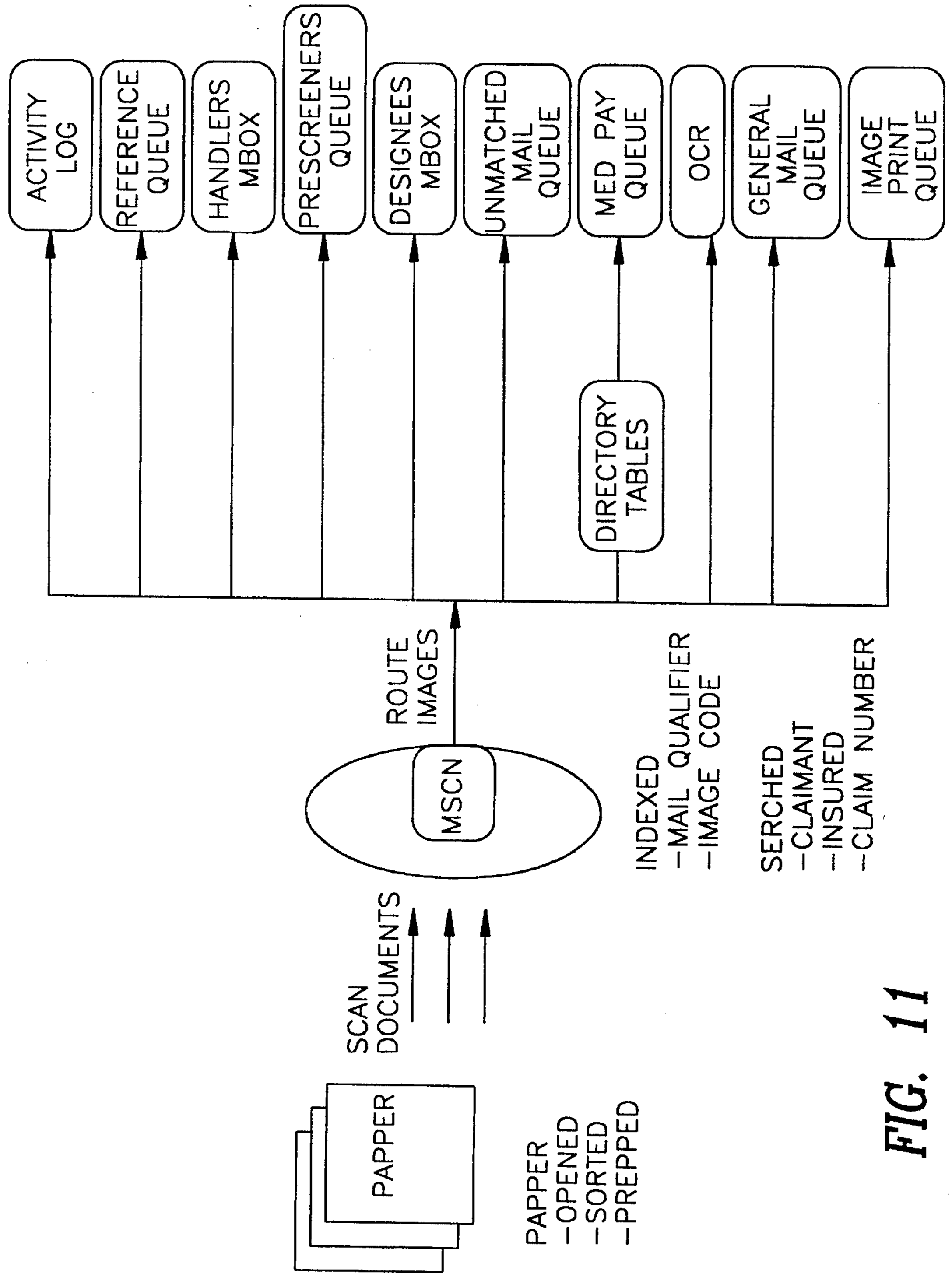
FIG. 11 is a block diagram depicting the flow of mail through the MSCN function in accordance with the second embodiment of the present invention.

Based on the Mail Qualifier information, the System automatically determines the routing destination of the image(s). As shown in FIG. 11, potential destinations for routed images include: a particular staff member's Mailbox (a pre-designated electronic address); a Medical Payments Queue; a General Mail Queue; a Central Library; an Unmatched Mail Queue; an Image Print Queue; a Prescreener's Queue; a Reference Queue; the Activity Log; or an Optical Character Recognition Device ("OCR").

Loss Notices, by way of example, are identified by an 'LN' code in the first two positions of the Mail Qualifier input. The

TABLE LXI

```
WORKSTATION 132 - USER BJS - Barbara J. Synodinos
10:13:45 am        Friday        September 20, 1991
******************************************************************************************
****          1         2         3         4         5         6         7         8 ****
**** 1234567890123456789012345678901234567890123456789012345678901234567890123456789 0 ****
******************************************************************************************
*  *                                                                                  *  *
* 1*                        CAS IMAGING KWI09 - SYTEM TEST                            * 1*
* 2*                             Claim Handler Menu                                   * 2*
* 3*                                                                                  * 3*
* 4*             Press a PFKey below or RETURN to do Next Trans: ****                 * 4*
* 5*                                                                                  * 5*
* 6*    1) Activity Log                                                               * 6*
* 7*    2) Claim Status Changes                                                       * 7*
* 8*    3) Diary Function                           19) Image List                    * 8*
* 9*    4) Diary Listing                            20) Mail Scan                     * 9*
*10*    5) Directory Tables                                                           *10*
* 1*    6) Info Search                                                                * 1*
* 2*    7) LPT Inquiry                                                                * 2*
```

TABLE LXI-continued

```
* 3*    8) LP Control Change                                                 * 3*
* 4*    9) LP Element Change                                                 * 4*
* 5*   10) Mailbox Menu                       26) Unmatched Mail             * 5*
* 6*   11) Nature of Payments                                                * 6*
* 7*   12) Payments                                                          * 7*
* 8*   13) TEXT Forms Selection/Completion                                   * 8*
* 9*   14) Wang OFFICE                        30) Incoming Phone Call        * 9*
*20*   15) CASIT Secondary Menu                                              *20*
* 1*                                                                         * 1*
* 2*                                          32) Logoff                     * 2*
* 3*                                                                         * 3*
* 4*                                                                         * 4*
*  *                                                                         *  *
***************************************************************************************
****          1         2         3         4         5         6         7         8 ****
**** 12345678901234567890123456789012345678901234567890123456789012345678901234567890 ****
***************************************************************************************
```

third position of the Qualifier is for the line of business the Loss Notice deals with (e.g. A=Auto, C=Workman's Compensation, F=Fidelity/Surety, G=General Liability and P=Property). The fourth and final position, may be optionally used to identify a particular staff member who will handle the claim (For example, if Ann Carbonell handles all claims with insured

TABLE LXII

```
WORKSTATION 132 - USER BJS - Barbara J. Synodinos
10:29:46 am      Friday      September 20, 1991
***************************************************************************************
****          1         2         3         4         5         6         7         8 ****
**** 12345678901234567890123456789012345678901234567890123456789012345678901234567890 ****
***************************************************************************************
*  *                                                                         *  *
* 1*                  MAIL ROOM SCANNING FACILITY                            * 1*
* 2*                                                                         * 2*
* 3*     Mail Qualifier: ** * *  Image Code: 0000          Queue Priority: * * 3*
* 4*                                                                         * 4*
* 5*     Claiment:    *****************************      OCR Start Page: 001 * 5*
* 6*                                                                         * 6*
* 7*     Clm Number: *** ** 00000     Policy Number:  ** *** ******          * 7*
* 8*                                                                         * 8*
* 9*     Enter "X" If Offline Search: *                                      * 9*
*10*                                                                         *10*
* 1*     Insured:     **************************************************     * 1*
* 2*                                                                         * 2*
* 3*     IF KNOWN, PLEASE ENTER THE FOLLOWING INFORMATION:                   * 3*
* 4*                                                                         * 4*
* 5*          Loss Date:  ********  Seek Term:  ********  Thru  ********     * 5*
* 6*                                                                         * 6*
* 7*     Insured Address:  St: **     Zip:  *****                            * 7*
* 8*     Claiment Address: St: **     Zip:  *****                            * 8*
* 9*                                                                         * 9*
*20*  Enter) Search          10) Exact Match                      16) Return *20*
* 1*     2) RT Types         11) Rte To Hdlr      15) Image Type  17) NT     * 1*
* 2*     3) PM Types         12) Rte To Other     23) LC          18) Help   * 2*
* 3*     9) Med Pay Q        13) Rte To Queue     28) PIF                    * 3*
* 4*                                                                         * 4*
*  *                                                                         *  *
***************************************************************************************
****          1         2         3         4         5         6         7         8 ****
**** 12345678901234567890123456789012345678901234567890123456789012345678901234567890 ****
***************************************************************************************
```

names in the A–L range, a 'C' could be placed in the fourth position of the Qualifier).

All Loss Notices are routed to the Prescreener's Queue (discussed below) regardless of the identification of an ultimate claim handler. This is because Loss Notice information must be manually input from the image or, if read by the OCR, reviewed for accuracy. Once in the Prescreener's Queue two slightly different work flow are preferable. (These are discussed below).

Some types of mail to be scanned into the system require the input of an Image Code in addition to the Mail Qualifier (e.g. General Mail, Priority Mail, and Claim Representative Documentation). If an operator inputs a Mail Qualifier corresponding to one of these types of mail, and tries to scan in a document, the system will automatically display an Image Types Table screen (shown in Table LXIII, below) to allow the operator to make a selection. Alternatively, the operator can input an Image Code directly into this field on the MSCN screen or can manually move to the Image Type Table screen and make a selection. The selection of the Image Code can affect the routing destination of the image.

In order to further index the image, the MSCN function is designed with Info Search functionality to allow a mail clerk to search for a claim number, insured, etc. from the piece of mail (except Loss Notices). Inputting at least a portion of a claim number or other piece of information into one of the MSCN screen input fields and pressing 'Enter' causes the System to perform a search for that information and return any matching records. If the proper claim is found, the mail clerk can route the image, after it's scanned in, directly to a claim handler rather than to the General Mail Queue.

Figure 12A:
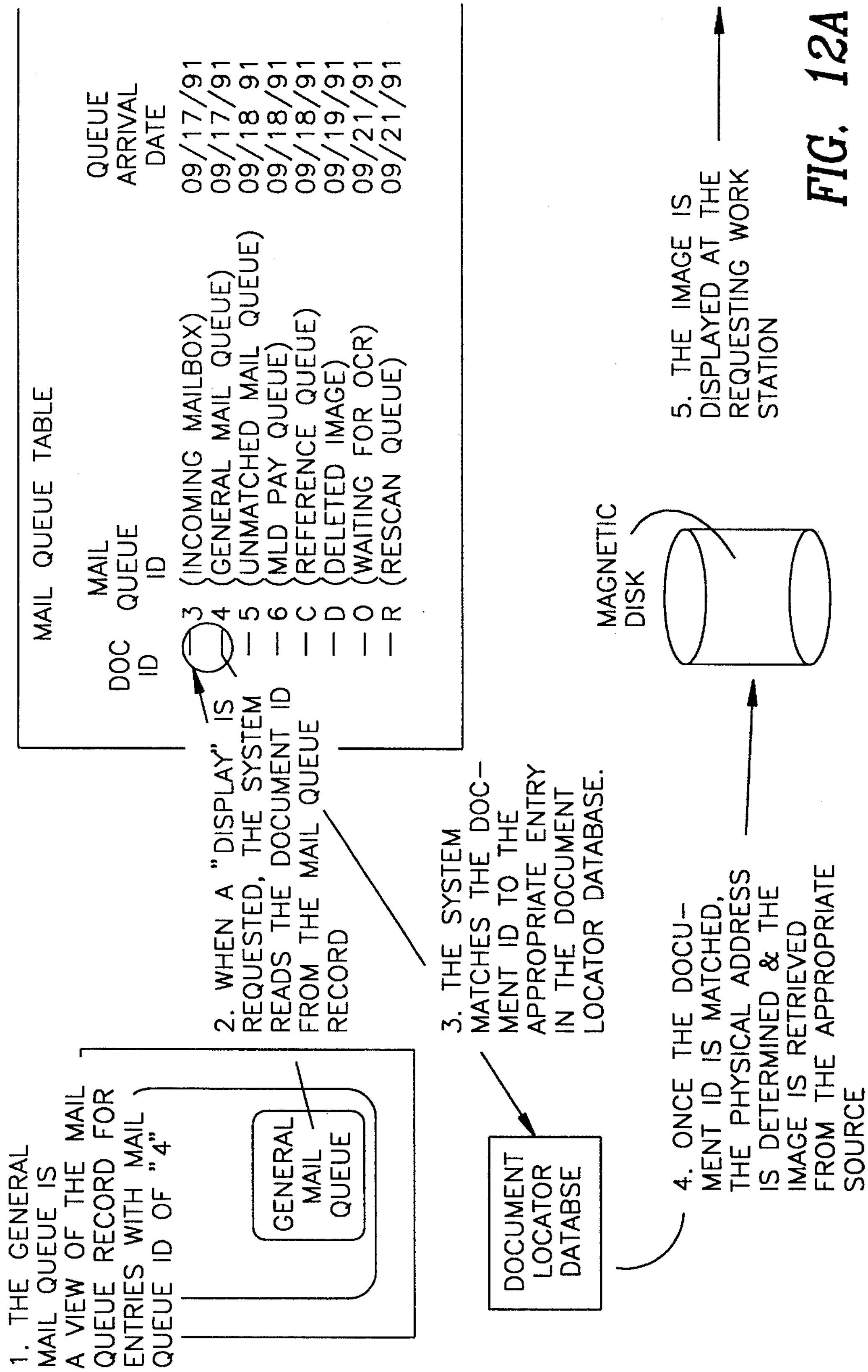
FIG. 12 is a block diagram depicting the physical display of an image from a mail queue in accordance with the second embodiment of the present invention.
Figure 12B:
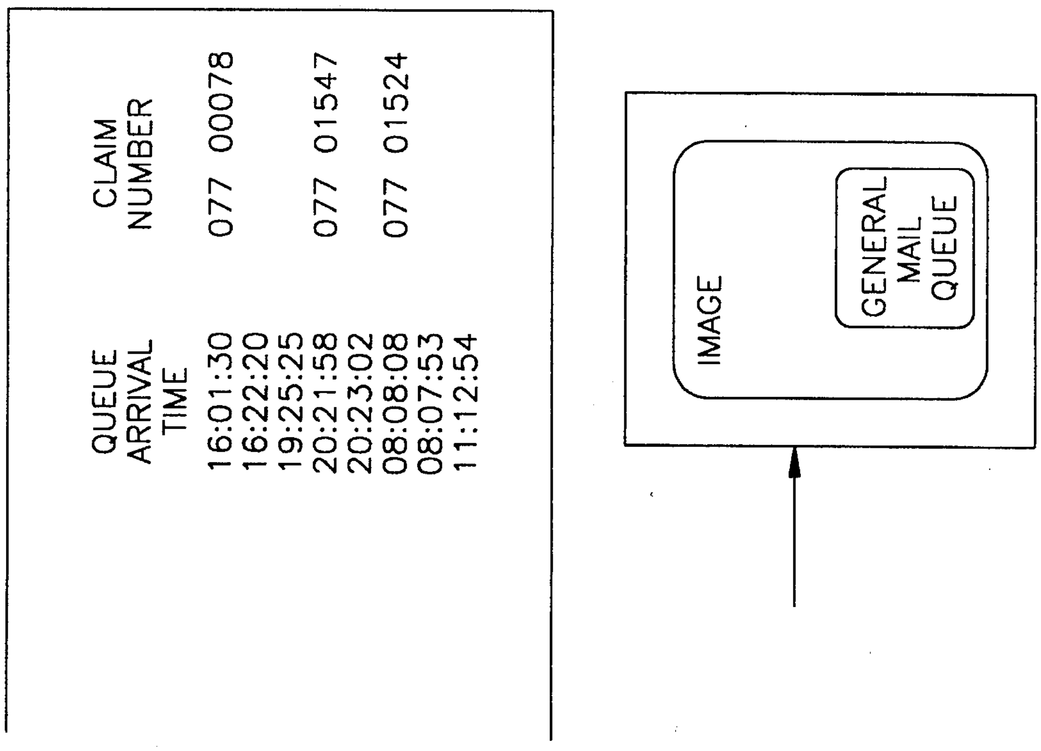

The Mail Queue Table is a database table which tracks and identifies each image which has been scanned into the system. As shown in FIG. 12, the Mail Queue Table also contains a link to a Document Locator Database which identifies the specific storage location of the actual image on the disk. Thus, when an operator accesses for example, the General Mail Queue, the System searches the Mail Queue Table for all records with a Mail Queue Table ID which corresponds to the ID by which the General Mail Queue is identified. Then all records with that ID are displayed

TABLE LXIII

```
WORKSTATION 11 - USER BJS - Barbara J. Synodinos
10:21:31 am     Wednesday     October 16, 1991
*************************************************************************************
****      1         2         3         4         5         6         7         8 ****
**** 1234567890123456789012345678901234567890123456789012345678901234567890123456789 0 ****
*************************************************************************************
*  *                                                                            *  *
* 1*                                                                            * 1*
* 2*                              IMAGE TYPES                                   * 2*
* 3*                                                       Key Claim            * 3*
* 4*          Image Code          Image Type               Image                * 4*
              __________          __________               _____
* 5*                                                                            * 5*
* 6*       *     0028       AFFI VHCL THEFT                                     * 6*
* 7*       *     0139       AGENCY STAT RPT                                     * 7*
* 8*       *     0080       ASR ASSIGNMENT                                      * 8*
* 9*       *     0176       ATTORNEY LTR                                        * 9*
*10*       *     0163       BILL(MEDICAL)                                       *10*
* 1*       *     0122       CARRIER LETTER                                      * 1*
* 2*       *     0159       COVERAGE MEMO              X                        * 2*
* 3*       *     0149       COVERAGE REQUES            X                        * 3*
* 4*       *     0086       COVERAGE VERIFY            X                        * 4*
* 5*       *     0165       DIAGRAM                    X                        * 5*
* 6*       *     0063       EST/RCPT/INVOIC                                     * 6*
* 7*       *     0144       GENERAL EST                                         * 7*
* 8*       *     0145       HO CORRESPONDEN            X                        * 8*
* 9*       *     0128       LITIGATION MAIL            X                        * 9*
*20*       *     0020       MEDICAL RECORDS                                     *20*
* 1*                                                                            * 1*
     _________________________________________________________________________
* 2*  Enter) Select Image Type                       7) Query     16) Return    * 2*
* 3*                           5) Next / Last                                   * 3*
* 4*                                                                            * 4*
*  *                                                                            *  *
*************************************************************************************
****      1         2         3         4         5         6         7         8 ****
**** 1234567890123456789012345678901234567890123456789012345678901234567890123456789 0 ****
*************************************************************************************
```

Procedurally, the mail clerk inputs the Mail Qualifier and, if necessary, the Image Type, through the keyboard in the Mail Qualifier and/or Image Type input field, and then positions the Loss Notice or other document on the scanner 226. Hitting 'Enter' or selecting a function key to route the image sends a signal which activates to the scanner 226. After scanning, the image is displayed on the display device of the PC 228 for quality review. At that point, the image is resident in the PC's virtual memory and is displayed via Wang® WIIS software which is stored on the PC's storage device. If the image is of acceptable quality, the image is "closed" and routed to the appropriate queue. When the image is closed, a Mail Queue Table (explained below) is updated (via a Mail Queue ID code) to reflect the queue to which the image has been routed.

When the image is routed to the General Mail or other queue from the MSCN function, the actual electronic data which comprises the image is stored on a magnetic disk. What actually goes to the queue is information describing characteristics of the image. These characteristics are pulled from a Mail Queue Table which maintains information with respect to all "in-process" images.

thereby providing the operator with a displayed listing of all "in-process" documents (images) which have been routed to that queue. It should be understood, however, that regardless of the particular queue to which an image is routed, and regardless of the number of times an image is routed, the physical storage location of the image does not change.

Once a particular image is selected for viewing from the queue, the Main CPU follows the path from the Mail Queue Table record to the Document Locator Database record to the storage location of the electronic data which comprises the image. The image is retrieved, sent to the operator's workstation and displayed via Wang® WIIS software.

2. SCAN

Figure 13:
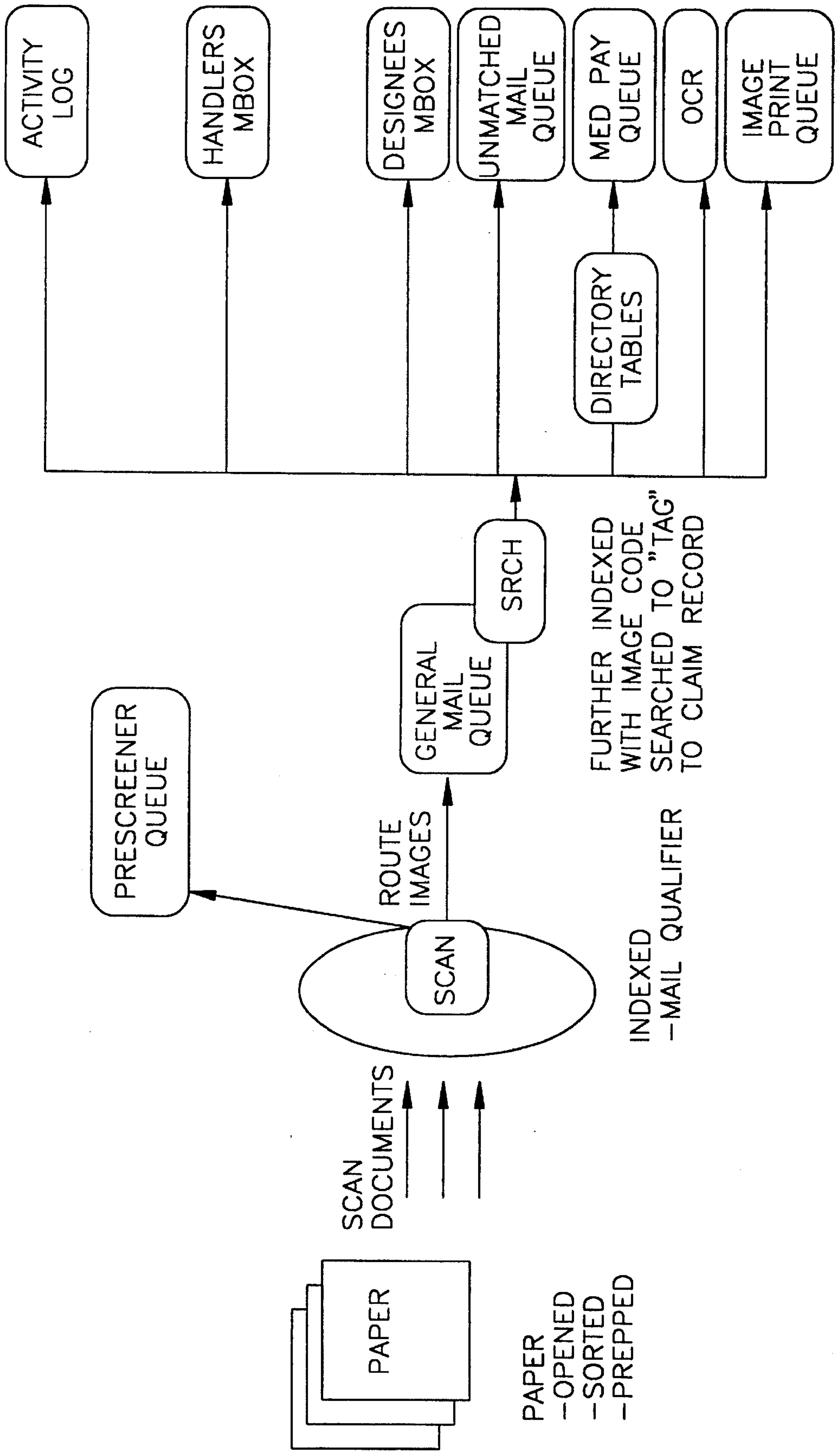
FIG. 13 is a block diagram depicting the flow of mail through the SCAN function in accordance with the second embodiment of the present invention.

The SCAN function (the main input screen of which is shown in Table LXIV) is provided as an alternative scanning approach to MSCN. (The SCAN function can be turned on or off, as needed). SCAN differs from the MSCN function in one significant way. As shown in FIG. 13, when any document (except Loss Notices and Returned Text) is scanned into the system, it goes directly to the General Mail Queue. The only pre-indexing of the documents is the input of the Mail Qualifier. This functionality permits the rapid scanning of documents into the System without the more comprehensive indexing/decision making required by MSCN. The physical scanning process and the routing of images is otherwise essentially the same as MSCN.

other queues, the General Mail Queue provides a list of all documents which have been routed to its address. The list is comprised of basic information which has been input by the operator (mail clerk) through the SCAN or MSCN screens as well as certain other information previously extracted from the System and stored in the Mail Queue Table.

TABLE LXIV

```
WORKSTATION 132 - USER BJS - Barbara J. Synodinos
10:10:23 am      Friday         September 20, 1991
*********************************************************************************************
****           1          2          3          4          5          6          7          8 ****
**** 12345678901234567890123456789012345678901234567890123456789012345678901234567890 ****
*********************************************************************************************
*  *                                                                                  *  *
* 1*                                                                                  * 1*
* 2*                                                                                  * 2*
* 3*                              SCAN MENU                                           * 3*
* 4*                                                                                  * 4*
* 5*                                                                                  * 5*
* 6*                   Type in the Mail Qualifier:  ** * *                            * 6*
* 7*                                                                                  * 7*
* 8*                                                                                  * 8*
* 9*                                                                                  * 9*
*10*             Mail Types:                        Lines of Buisness:                *10*
* 1*                                                                                  * 1*
* 2*           LN  - Loss Notice                      A - Auto                        *(2*
* 3*           PM  - Priority Mail                    C - Worker's Comp               * 3*
* 4*           GM  - General Mail                     P - Property                    * 4*
* 5*           RT  - Returned Text                    F - Fidelity                    * 5*
* 6*           HT  - Handle to Conclusion             G - General Liability           * 6*
* 7*                                                                                  * 7*
* 8*                                                                                  * 8*
* 9*                                                                                  * 9*
*20*                                                                                  *20*
* 1*                                                                                  * 1*
* 2*   Enter) Scan     2) RT Types                               16) Return           * 2*
* 3*                   3) PM Types                               17) NT               * 3*
* 4*                                                                                  * 4*
*  *                                                                                  *  *
*********************************************************************************************
****           1          2          3          4          5          6          7          8 ****
**** 12345678901234567890123456789012345678901234567890123456789012345678901234567890 ****
*********************************************************************************************
```

b. General Mail Queue

Figure 14:
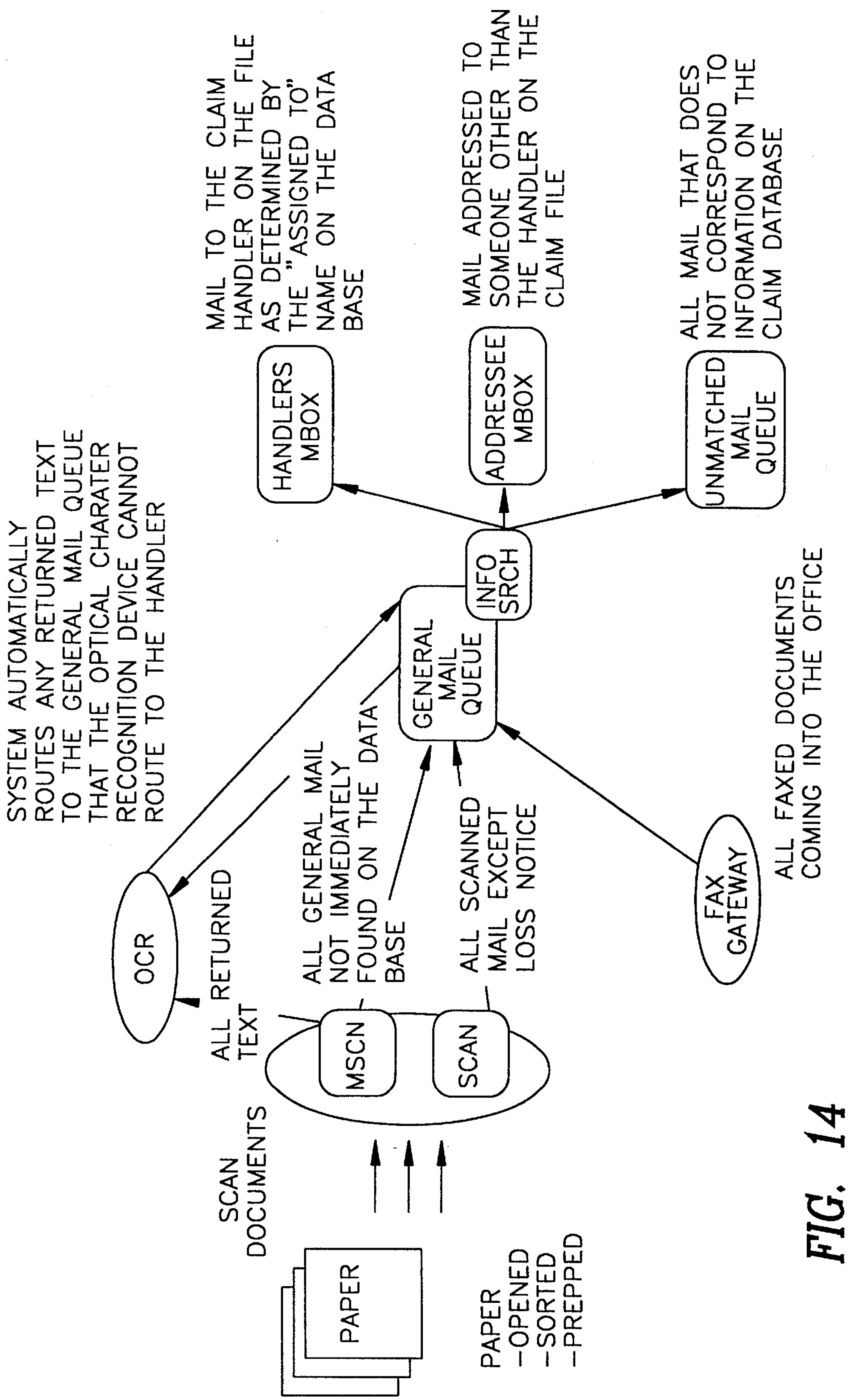
FIG. 14 is a block diagram depicting the flow of mail through the General Mail Queue in accordance with the second embodiment of the present invention.

Referring to FIG. 14, the General Mail Queue is the destination of all documents scanned into the System through the SCAN function except Loss Notices and Returned Text. Mail scanned into the System through the MSCN function which cannot be matched with a claim on the System database also goes to the General Mail Queue. All incoming faxes and Returned Text documents which were found unreadable by the OCR go to the General Mail Queue as well.

The purpose of the General Mail Queue is to provide a staff members with an opportunity to match the image with work already in process, i.e. a claim or claims. As with all An operator or operators (clerks), accesses the General Mail Queue through the Main Menu screen or by inputting 'GMAL' in the 'Next Trans' field on any screen. Table LXV shows the information displayed to a clerk via the General Mail Queue List screen. The operator simply selects the desired document on the list by moving the cursor and then hitting 'Enter'. This retrieves the associated image from the magnetic disk. The image information is sent from the disk to the operator's address and then bit-mapped onto the display device of the operator's workstation via Wang® WIIS Emulation Workstation software.

TABLE LXV

```
WORKSTATION 196 - USER BJS - Barbara J. Synodinos
11:44:08 am        Tuesday         September 17, 1991
**************************************************************************************************
****        1         2         3         4         5         6         7         8 ****
**** 12345678901234567890123456789012345678901234567890123456789012345678901234567890 ****
**************************************************************************************************
*  *                                                                                  *  *
* 1*                                                                                  * 1*
* 2*                         GENERAL MAIL QUEUE LIST SCREEN                           * 2*
* 3*                                                                                  * 3*
* 4*                  Priority     Number                                             * 4*
* 5*       Mail        Mail        of         Arrival       Arrival       Router      * 5*
* 6*       Type        Type        Pages      Date          Time          Initials    * 6*
* 7*    *  RT                      001        07/18/91      08:39:14.85   GRH         * 7*
* 8*    *  RT                      001        07/18/91      08:42:20.27   GRH         * 8*
* 9*    *  GM                      001        09/17/91      11:43:57.96   BJS         * 9*
*10*                                                                                  *10*
* 1*                                                                                  * 1*
* 2*                                                                                  * 2*
* 3*                                                                                  * 3*
* 4*                                                                                  * 4*
* 5*                                                                                  * 5*
* 6*                                                                                  * 6*
* 7*                                                                                  * 7*
* 8*                                                                                  * 8*
* 9*                                                                                  * 9*
*20*                                                                                  *20*
* 1*  Enter) Display Image And Info Search                            16) Return      * 1*
* 2*     1) Display Image                                             17) NT          * 2*
* 3*                                            7) Query              23) LC          * 3*
* 4*                                                                                  * 4*
*  *                                                                                  *  *
**************************************************************************************************
****        1         2         3         4         5         6         7         8 ****
**** 12345678901234567890123456789012345678901234567890123456789012345678901234567890 ****
**************************************************************************************************
```

The clerk reviews the image/document, extracting any additional information to assist in associating the image with one or more claims. (If the SCAN function was used to input the mail, the General Mail Queue will most likely have a significantly greater number of documents needing a supplementary "first cut" routing designation). When an image is selected, the System automatically displays the image and accesses the Info Search function. This function is called the General Mail Routing Facility when it is accessed from the General Mail Queue. (The General Mail Routing Facility input screen is shown below in Table LXV). This allows the user to conduct an immediate search to locate the handler or other staff member associated with the selected image(s). The user can input all, or a portion of, one or more of the following to locate the appropriate claim and staff member: claimant name; claim number; policy number; insured name; loss date; insured state and/or zip code; and claimant state and/or zip code.

If the search yields enough information to associate the image with a particular claim, and the image is routed via the 'Route to Handler' function key, the identifying image information automatically goes to the appropriate handler. This is because the System reads the handler's identity from the corresponding Loss-Claim record and automatically sends the Mail Queue Table record information to that handler's mailbox. A successful routing of the image deletes the listing of the image from the General Mail Queue. There is no change in the physical storage location of the image.

TABLE LXVI

```
WORKSTATION 196 - USER BJS - Barbara J. Synodinos
11:46:51 am      Tuesday      September 17, 1991
*****************************************************************************************
****          1         2         3         4         5         6         7         8 ****
**** 12345678901234567890123456789012345678901234567890123456789012345678901234567890 ****
*****************************************************************************************
*  *                                                                                 *  *
* 1*                        GENERAL MAIL ROUTING FACILITY                            * 1*
* 2*                                                                                 * 2*
* 3*    Mail Qualifier: GM    Image Code: 1234 DUP LOSS NOTICE       Queue Priority: * 3*
* 4*                                                                                 * 4*
* 5*    Claiment:       ******************************          OCR Start Page: 001  * 5*
* 6*                                                                                 * 6*
* 7*    Clm Number:     *** ** 00000       Policy Number:   ** *** ******            * 7*
* 8*                                                                                 * 8*
* 9*    Enter "X" If Offline Search: *                                               * 9*
*10*                                                                                 *10*
* 1*    Insured:        **************************************************           * 1*
* 2*                                                                                 * 2*
* 3*    If Known, Enter The Following Information:                                   * 3*
* 4*                                                                                 * 4*
* 5*            Loss Date:   ********             Seek Term: ******** Thru ********  * 5*
* 6*                                                                                 * 6*
* 7*    Insured  Address: St: **     Zip:   *****                                    * 7*
* 8*    Claiment Address: St: **     Zip:   *****                                    * 8*
* 9*                                                                                 * 9*
*20*   Enter) Search    10) Exact Match    14) Unmatched     23) LC           16) Return *20*
* 1*   1) Refresh       11) Rte To Hdlr    15) Image Type    26) Print Image  17) NT     * 1*
* 2*   2) Chng Types    12) Rte To Other   19) Split Doc     27) Fax Image    18) Help   * 2*
* 3*   9) Med Pay Q     13) Rte To Queue   22) Rescan Image                   28) PIF    * 3*
* 4*                                                                                 * 4*
*  *                                                                                 *  *
*****************************************************************************************
****          1         2         3         4         5         6         7         8 ****
**** 12345678901234567890123456789012345678901234567890123456789012345678901234567890 ****
*****************************************************************************************
```

If, after conducting a search, the operator can find no matching claim, the image is routed to an Unmatched Mail Queue for a further, more in-depth review at a later time. Similarly, if the image accessed from the General Mail Queue is unreadable it is routed to a Rescan Queue, via a function key, to allow the scanner operator to review the problem. When the item has been rescanned it automatically returns to the General Mail Queue with a new time/date.

c. Optical Character Recognition

As noted previously, an Optical Character Recognition device ("OCR") 238 is associated with the second preferred embodiment of the present invention. Before the OCR can be used to automatically "read" typed information from an image and place it into pre-defined fields in a database, a number of templates must be prepared. The templates tell the OCR where to look for the information to be read from the image. Preferably, these templates are pre-prepared and identified through one or more input screens (not shown).

OCR templates or forms reside in a database table called "FRMBAS." This database was created and is maintained through WANG's WIIS OCR Forms Database Utility ("FDBUTIL"). Each form within the FRMBAS database table describes or defines a single page of an image document. A form may contain up to 64 zones. Each zone defines a specific rectangular area on the image document to be processed by OCR. A zone is defined by specifying the X and Y coordinates of the upper left corner of the area, the height and width of the boxed area and the type of data (e.g. Text, WP, etc.) contained in the area. The Form Editor (a subfunction of the Forms Database Utility) provides a graphical interface to determine the X/Y coordinates, height and width of the zones.

The OCR application consists of a program that runs in the background and periodically (preferably every two minutes) reads an OCR Queue Table in the System database to look for items to be submitted to the WANG® OCR Server Task. The program submits a job to the Server Task via a series of calls to the WANG® OCR APIs (Application Program Interfaces). Upon completion of the job, a user specified program is automatically submitted by the Server Task. This program retrieves the data recognized by the server via a series of calls to the WANG® OCR APIs, formats the data and updates the appropriate database tables.

Figure 15:
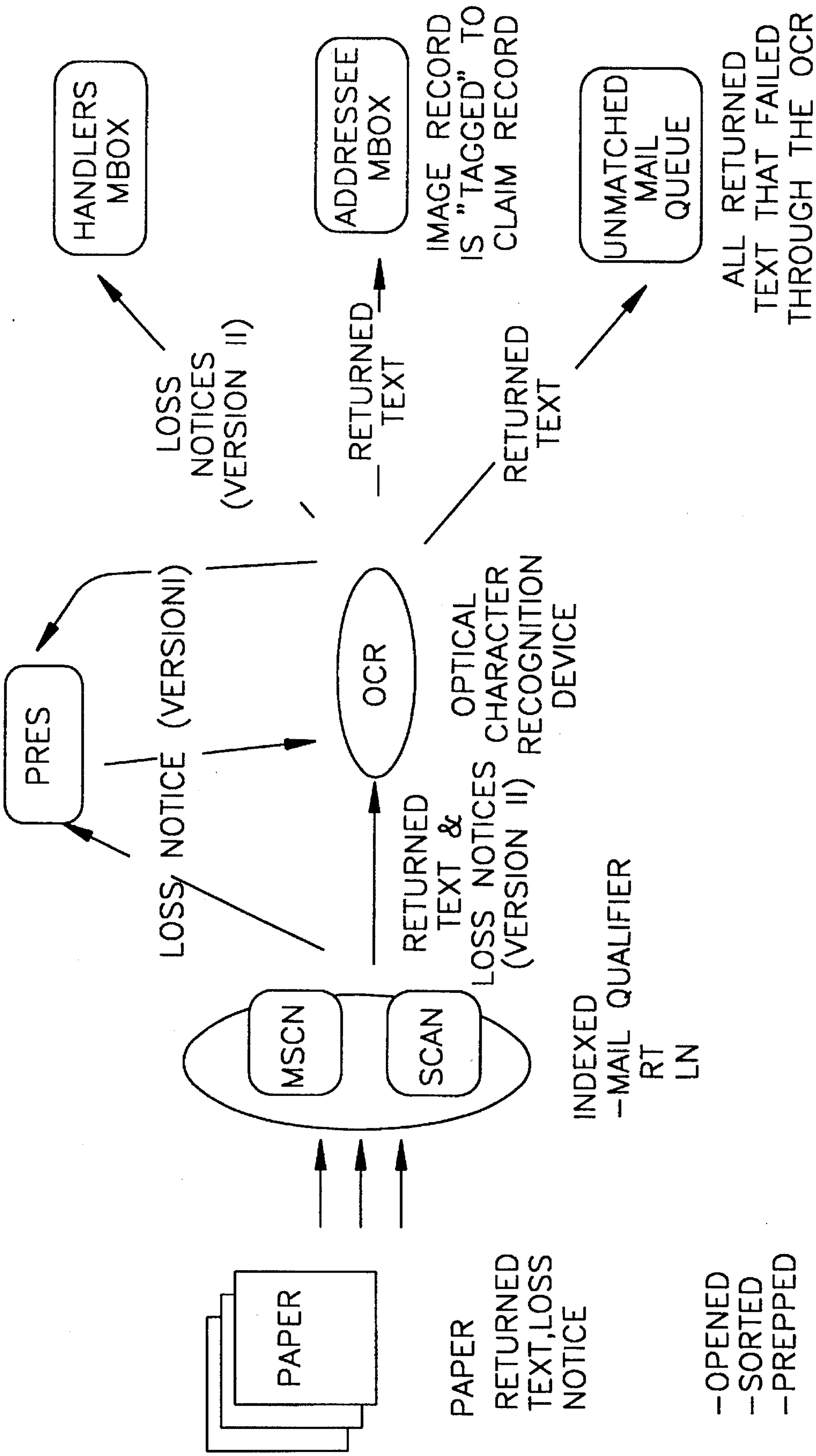
FIG. 15 is a block diagram depicting the flow of mail through the OCR in accordance with the second embodiment of the present invention.

Referring to FIG. 15, the OCR is generally used in conjunction with Returned Text and Loss Notices since these documents usually contain typewritten information on standardized forms. As noted previously, Returned Text is mail which was originally sent out from the office, usually a request for information, which is then sent back to the office. The mail which is sent out has identifying codes (such as claim number, image type, etc.) placed at predetermined locations on the document(s). When the document(s) are received back in the office they are scanned in (along with all enclosures) and electronically sent to the OCR 238 based on the input of the appropriate Mail Qualifier ('RT' in this case) and the identification of an OCR template through the SCAN or MSCN input screen.

In a first System flow, Loss Notices which can be read by the OCR travel first through the Prescreener's Queue (discussed below). An appropriate template identification field is provided on a Prescreener's Queue modify screen to input any variance in form set-up. Then, the image is electronically routed to the OCR 38. (In a second system flow, Loss Notices are directed to the OCR directly from the MSCN function and then to the Prescreener's Queue).

The OCR 238 converts the image data within the template zones to text. It does this by first finding two reference zones located on opposite corners of the image to be read. This allows the OCR to set a "skew" position to properly orient the image for reading. (If the OCR fail to read the appropriate information from the two zones it automatically routes the document to the General Mail Queue) The OCR then reads each zone identified by the template and automatically inputs the recognized text data into one or more pre-selected fields in the appropriate database table(s). Based on the sufficiency of the information read in by the OCR 238, the image is either routed directly to a designee's Incoming Mailbox (discussed below), the Prescreener's Queue (if it is a Loss Notice) or to the General Mail Queue (if the OCR cannot read the image).

While reference has been made to Returned Text and Loss Notice documents for OCR conversion to text, clearly any type of mail or document can be adapted for OCR reading if it is a standardized form, regularly returned or regularly received in the office. Particularly adaptable to this are medical bills from common providers and those bills processed by third party clearing houses.

d. Loss Notice Processing Flows

Figure 16:
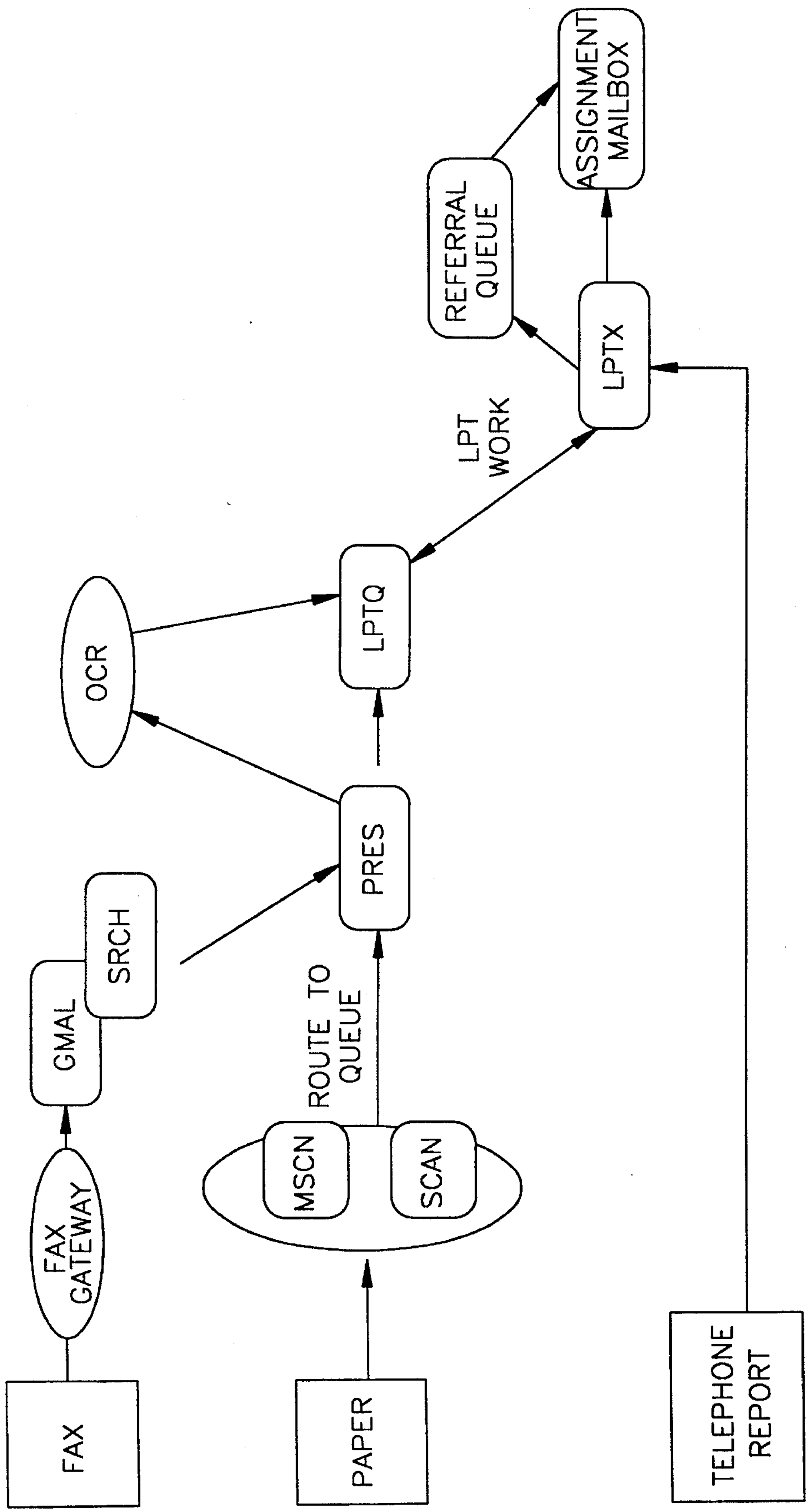
FIG. 16 is a block diagram depicting a first flow of Loss Notices through the System in accordance with the second embodiment of the present invention.
Figure 17:
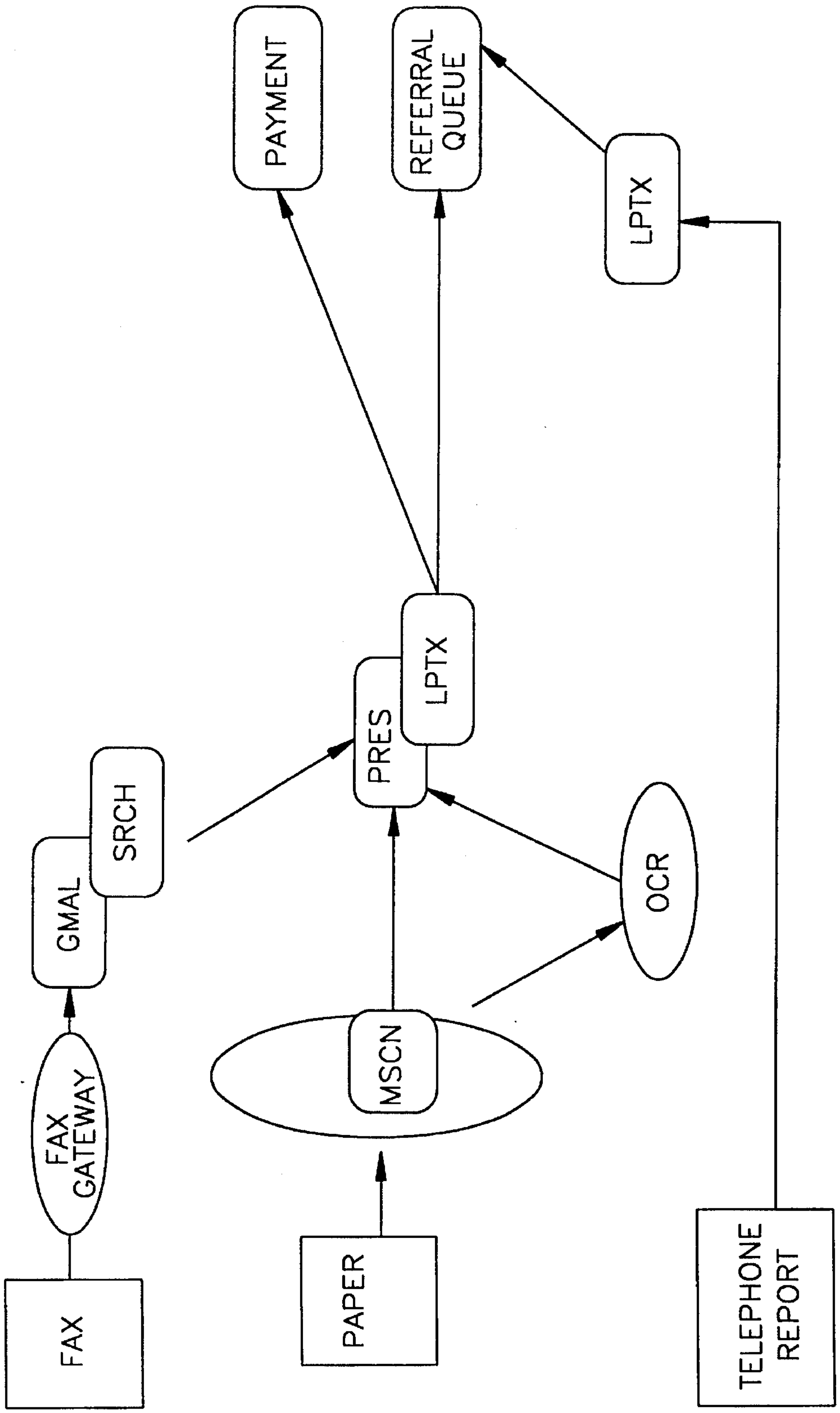
FIG. 17 is a block diagram depicting a second flow of Loss Notices through the System in accordance with the second embodiment of the present invention.

As shown in FIGS. 16 and 17, in accordance with the second embodiment of the present invention, Loss Notices are typically received in the office in three different ways: (1) by fax; (2) on paper; and (3) by telephone. The initial input of Loss Notices received by telephone is essentially the same as that with respect to the first embodiment. However, fax and paper Loss Notices are handled very differently.

Loss Notices received by fax come in through a Fax Gateway and are converted to images. The fax then automatically goes to the General Mail Queue with a Mail Qualifier of 'FX'. When the General Mail is reviewed through the General Mail Queue, the faxed Loss Notice is given a new Mail Qualifier of 'LN' and routed to the Prescreener's Queue.

Loss Notices received on paper are scanned into the System via the SCAN or MSCN procedure. Each is given an 'LN' Mail Qualifier and routed to the Prescreener's Queue.

1. Loss Notice Flow - Version I

The purpose of the Prescreener's Queue in one version of the Loss Notice flow is generally to permit someone in authority to review the Loss Notice information and determine the appropriate routing.

When the Prescreener's Queue (shown below in Table LXVII) is accessed, the most common path taken by the operator ("prescreener") is to invoke 'Display and Modify' by hitting 'Enter'. This displays the image associated with the queue entry and allows the operator to modify the Mail Qualifier, the Loss Notice Path Indicator, the Loss Notice Edition the routing destination and the Input Priority through a Modify Mail/Loss Type screen ("Modification screen") (See Table LXVIII, below).

The primary "modification" which is done through the Modification screen is the input of a Loss Notice Path Indicator. This indicator is preferably a two letter code identifying either the type of loss or the class of staff member to perform input of the LPT information. However, the identification of a type of loss also serves to identify the class of staff member to perform the input since the System associates each type of loss with a particular route and also determines which input screens are displayed in the LPTX flow.

The Loss Notice Edition can be input by an operator before routing the Loss Notice to the OCR. This code tells the OCR which template should be used to properly read the information from the Loss Notice. (This is explained further below).

The 'Route to' field on the Modification screen permits the prescreener to specify a particular staff member to input the

TABLE LXVII

WORKSTATION 11 - USER BJS - Barbara J. Synodinos
11:45:47 am Wednesday October 16, 1991

```
****************************************************************************************
****          1         2         3         4         5         6         7         8 ****
**** 1234567890123456789012345678901234567890123456789012345678901234567890123456789 0 ****
****************************************************************************************
*  *                                                                               *  *
* 1*                                                                               * 1*
* 2*                          PRESCREENER'S QUEUE                                  * 2*
* 3*                                                                               * 3*
* 4*                   Number     Loss                      Queue       Queue      * 4*
* 5*      Mail           of       Notice OCR    Scanner     Arrival     Arrival    * 5*
* 6*      Qualifier     Pages     Edition Ind   Inits       Date        Time       * 6*
* 7*                                                                               * 7*
* 8*  *   LN A          001                     RMP         10/01/91    09:21:29.07 * 8*
* 9*  *   LN A          001                     RMP         10/01/91    11:33:54.57 * 9*
*10*  *   LN A          001                     RMP         10/03/91    10:57:03.37 *10*
* 1*  *   LN C E        001                     LAE         10/10/91    17:49:37.86 * 1*
* 2*  *   LN P          001                     LAE         10/10/91    17:53:43.54 * 2*
```

TABLE LXVII-continued

```
* 3*  *   LN P         001                     LAE   10/10/91   17:54:01.18    * 3*
* 4*  *   LN P         001                     LAE   10/11/91   13:50:58.75    * 4*
* 5*  *   LN A E       001                     LAE   10/15/91   12:21:02.15    * 5*
* 6*  *   LN A         001                     BJS   10/16/91   10:43:42.24    * 6*
* 7*  *   LN A         002                     BJS   10/16/91   11:43:07.99    * 7*
* 8*  *   LN A         001                     BJS   10/16/91   11:45:11.04    * 8*
* 9*                                                                           * 9*
*20*  Enter) Display and Modify  4) Prev / First  19) Doc Mgr     16) Return    *20*
* 1*  1) Display Image                            22) Rescan Image 17) NT       * 1*
* 2*  2) Scan Return to Work     7) Query         23) Local Copy  24) Print Image * 2*
* 3*                                                                           * 3*
* 4*  24 in list.                                               Z0437          * 4*
*  *                                                                           *  *
*************************************************************************************
****          1         2         3         4         5         6         7         8 ****
**** 1234567890123456789012345678901234567890123456789012345678901234567890123456789 0 ****
*************************************************************************************
```

Loss Notice. This is generally done where more than one person is responsible for the input of the type of Loss Notice input into the Loss Notice Path Indicator field.

A series of additional input screens are accessible from the Prescreener's Queue. These screens permit the prescreener to When the prescreener is satisfied with the ultimate designation of the person for input of the Loss Notice information, the Loss Notice is generally routed out of the Prescreener's Queue to a Loss Processing Transaction Queue ("LPTQ" or "LPT Queue") (See Table LXIX, below).

TABLE LXVIII

```
WORKSTATION 11 - USER BJS - Barbara J. Synodinos
11:54:42 am    Wednesday    October 16, 1991
*************************************************************************************
****          1         2         3         4         5         6         7         8 ****
**** 1234567890123456789012345678901234567890123456789012345678901234567890123456789 0 ****
*************************************************************************************
*  *                                                                           *  *
* 1*                                                                           * 1*
* 2*               PRESCREENER'S MODIFY MAIL/LOSS TYPE                         * 2*
* 3*                                                                           * 3*
* 4*                          Loss                                             * 4*
* 5*                          Notice      Loss                                 * 5*
* 6*            Mail          Path        Notice      Route     Input          * 6*
* 7*            Qualifier     Ind         Edition     To        Priority       * 7*
* 8*                                                                           * 8*
* 9*            LN A *        CR          *****       ***       *              * 9*
*10*                                                                           *10*
* 1*                                                                           * 1*
* 2*            Mail To Office:   *******************                          * 2*
* 3*                                                                           * 3*
* 4*                                                                           * 4*
* 5*  Comments:                                                                * 5*
* 6*  ******************************************************************************  * 6*
* 7*                                                                           * 7*
* 8*                                                                           * 8*
* 9*                                                                           * 9*
*20*  Enter) Modify Loss Notice                                                *20*
* 1*  1) Display Image      6) Dupl Loss Notice   22) Rescan Image  16) Return * 1*
* 2*  2) Select Edition     19) Doc Mgr           23) Local Copy    27) Fax Image * 2*
* 3*                                                                           * 3*
* 4*                                                                           * 4*
*  *                                                                           *  *
*************************************************************************************
****          1         2         3         4         5         6         7         8 ****
**** 1234567890123456789012345678901234567890123456789012345678901234567890123456789 0 ****
*************************************************************************************
```

retrieve Loss Notice images from their stored location, display Loss Notice images, print the images, divide images into multiple documents, combine images with other documents and modify or delete any textual information which was previously input (either manually or by the OCR).

The LPT Queue is the "holding bin" for Loss Notices which will be input using the LPTX function.

The LPTQ is rarely accessed, except to locate a particular Loss Notice which may be in-process or to modify the workload of one or more LPT inputters. Rather, the LPT inputter accesses the LPTX function and selects an 'LPT Work' function key. This automatically selects the next Loss Notice appropriate to the LPT inputter from the LPTQ. The Loss Notice is displayed in image form on the LPT inputter's display screen in one window, and the LPTX input screens are simultaneously displayed in another window. Since the inputter's workstation preferably includes a 19 inch display monitor, the entire image can be seen without obstruction from the LPTX input screens.

When the LPT inputter has completed his input of the Loss Notice, he either routes the image to an assigned claim handler's Assignment Mailbox or, if the Loss Notice lacks sufficient information or has no indication of a handler to whom it should be assigned, the image is routed to a supervisor's Referral Mailbox for evaluation.

the Mail Qualifier on the MSCN input screen to specify the alpha range within which the insured name falls.

From MSCN, the scanned-in image is routed to the OCR, if appropriate, or directly to the Prescreener's Queue. Based on this new OCR flow, the Prescreener's Queue no longer includes the Loss Notice Edition input field and the OCR Indicator input field. (See Table LXX, below). Similarly, the Prescreener's Modify Mail/Loss Type screen ("Modification screen") also omits these two fields. (See Table LXXI, below).

In this version of the Loss Notice Flow, the Prescreener's Queue displays only those Loss Notices which are designated for input by the staff member accessing the queue. For

TABLE LXIX

WORKSTATION 196 - USER BJS - Barbara J. Synodinos
11:24:13 am Tuesday September 17, 1991

** 1 2 3 4 5 6 7 8 **
** 12345678901234567890123456789012345678901234567890123456789012345678901234567890 **

LPT QUEUE

| | | Mail Qualifier | Loss Notice Path | Number of Pages | LPT Recipient Initials | Queue Arrival Date | Queue Arrival Time | Input Priority | Pre-Screener Initials | |
|---|---|---|---|---|---|---|---|---|---|---|
| * 9* | * | LN C Z | MF | 001 | PXA | 08/27/91 | 15:26:36.80 | X | PXA | * 9* |
| * 1* | * | LN C H | CR | 001 | PXA | 08/07/91 | 09:16:21.30 | | GRH | * 1* |
| * 3* | * | LN C H | CR | 001 | GRH | 08/07/91 | 09:24:39.84 | | GRH | * 3* |
| * 5* | * | LN C H | CR | 001 | GRH | 08/07/91 | 09:25:46.90 | | GRH | * 5* |
| * 7* | * | LN C Z | CP | 001 | DLF | 05/08/91 | 10:49:13.44 | | JWS | * 7* |
| * 9* | * | LN C | CP | 001 | MJR | 05/15/91 | 15:31:01.46 | | PXA | * 9* |

1) Display Image 7) Query 9) Modify 16) Return
5) Next / Last 17) NT

** 1 2 3 4 5 6 7 8 **
** 12345678901234567890123456789012345678901234567890123456789012345678901234567890 **

2. Loss Notice Flow - Version II

In a second version of the Loss Notice Flow (See FIG. 17) the office's approach to LPT input is redefined and reflected in an altered System flow. In this second version, all LPT input is divided along alphabetical lines by insured name (which is input during the MSCN process). For example, for insureds with last names beginning with letters A–M, staff member Ann Carbonell may be responsible for LPT input, while for insureds with last names beginning with letters N–Z, staff member Ivy Latimer may be responsible. This "alpha split" is implemented by using the fourth position of example, Ann Carbonell would see only those Loss Notices with insured names in the A-M range when she displayed the Prescreener's Queue.

The normal flow out of the Prescreener's Queue in Version II is through the Modification screen immediately to the LPTX input screens. The LPT Queue has been eliminated from this flow. This is because the prescreeners, in this flow, either handle the claim themselves by paying them off through the Payment function (primarily simple claims with single payments) or "refer" them to

TABLE LXX

```
WORKSTATION 82 - USER BJS - Barbara J. Synodinos
10:17:56 am       Monday        October 21, 1991
*****************************************************************************************
****        1         2         3         4         5         6         7         8 ****
**** 12345678901234567890123456789012345678901234567890123456789012345678901234567890 ****
*****************************************************************************************
*  *                                                                               *  *
* 1*                                                                               * 1*
* 2*                           PRESCREENER'S QUEUE                                 * 2*
* 3*                                                                               * 3*
* 4*                  Number                                  Queue     Queue      * 4*
* 5*     Mail           of                         Scanner    Arrival   Arrival    * 5*
* 6*     Qualifier    Pages   Insured Name         Inits      Date      Time       * 6*
* 7*                                                                               * 7*
* 8*  *  LN C A        001    CARBONELL            LAE        09/17/91  11:46:11.06 * 8*
* 9*                                                                               * 9*
*10*                                                                               *10*
* 1*                                                                               * 1*
* 2*                                                                               * 2*
* 3*                                                                               * 3*
* 4*                                                                               * 4*
* 5*                                                                               * 5*
* 6*                                                                               * 6*
* 7*                                                                               * 7*
* 8*                                                                               * 8*
* 9*                                                                               * 9*
*20*  Enter) Display and Modify                    19) Doc Mgr      16) Return     *20*
* 1*  1) Display Image                             22) Rescan Image 17) NT         * 1*
* 2*  2) Change Initials                           23) Local Copy   24) Print Image * 2*
* 3*                                                                               * 3*
* 4*                                                                               * 4*
*  *                                                                               *  *
*****************************************************************************************
****        1         2         3         4         5         6         7         8 ****
**** 12345678901234567890123456789012345678901234567890123456789012345678901234567890 ****
*****************************************************************************************
```

a handler with appropriate authority, based on alpha split and monetary value. When a claim is referred to a handler in this manner, it goes into that handler's Referral Mailbox. Since a supervisor is no longer "assigning" claims to handlers, the Assignment Mailbox may be eliminated.

TABLE LXXI

```
WORKSTATION 82 - USER BJS - Barbara J. Synodinos
10:18:35 am   Monday   October 21, 1991
******************************************************************************************
****         1          2          3          4          5          6          7          8 ****
**** 1234567890123456789012345678901234567890123456789012345678901234567890123456789 0 ****
******************************************************************************************
*  *                                                                                   *  *
* 1*                                                                                   * 1*
* 2*                         PRESCREENER'S MODIFY MAIL/LOSS TYPE                       * 2*
* 3*                                                                                   * 3*
* 4*                                Loss                                               * 4*
* 5*                                Notice                                             * 5*
* 6*                 Mail           Path                                               * 6*
* 7*                 Qualifier      Ind                                                * 7*
* 8*                                                                                   * 8*
* 9*                 LN C A         CR                                                 * 9*
*10*                                                                                   *10*
* 1*                                                                                   * 1*
* 2*                 Mail To Office:     ********************                          * 2*
* 3*                                                                                   * 3*
* 4*                                                                                   * 4*
* 5* Comments:                                                                         * 5*
* 6* ***************************************************************************       * 6*
* 7*                                                                                   * 7*
* 8*                                                                                   * 8*
* 9*                                                                                   * 9*
*20*                                                                                   *20*
* 1* Enter) Modify Loss Notice                                                         * 1*
* 2* 1) Display Image          6) Dupl Loss Notice   22) Rescan Image   16) Return     * 2*
* 3* 2) Modify Only            19) Doc Mgr           23) Local Copy     27) Fax Image  * 3*
* 4*                                                                                   * 4*
*  *                                                                                   *  *
** ***************************************************************************************
****         1          2          3          4          5          6          7          8 ****
**** 1234567890123456789012345678901234567890123456789012345678901234567890123456789 0 ****
******************************************************************************************
```

e. Medical Bill Processing through the Medical Payments Queue

Figure 18:
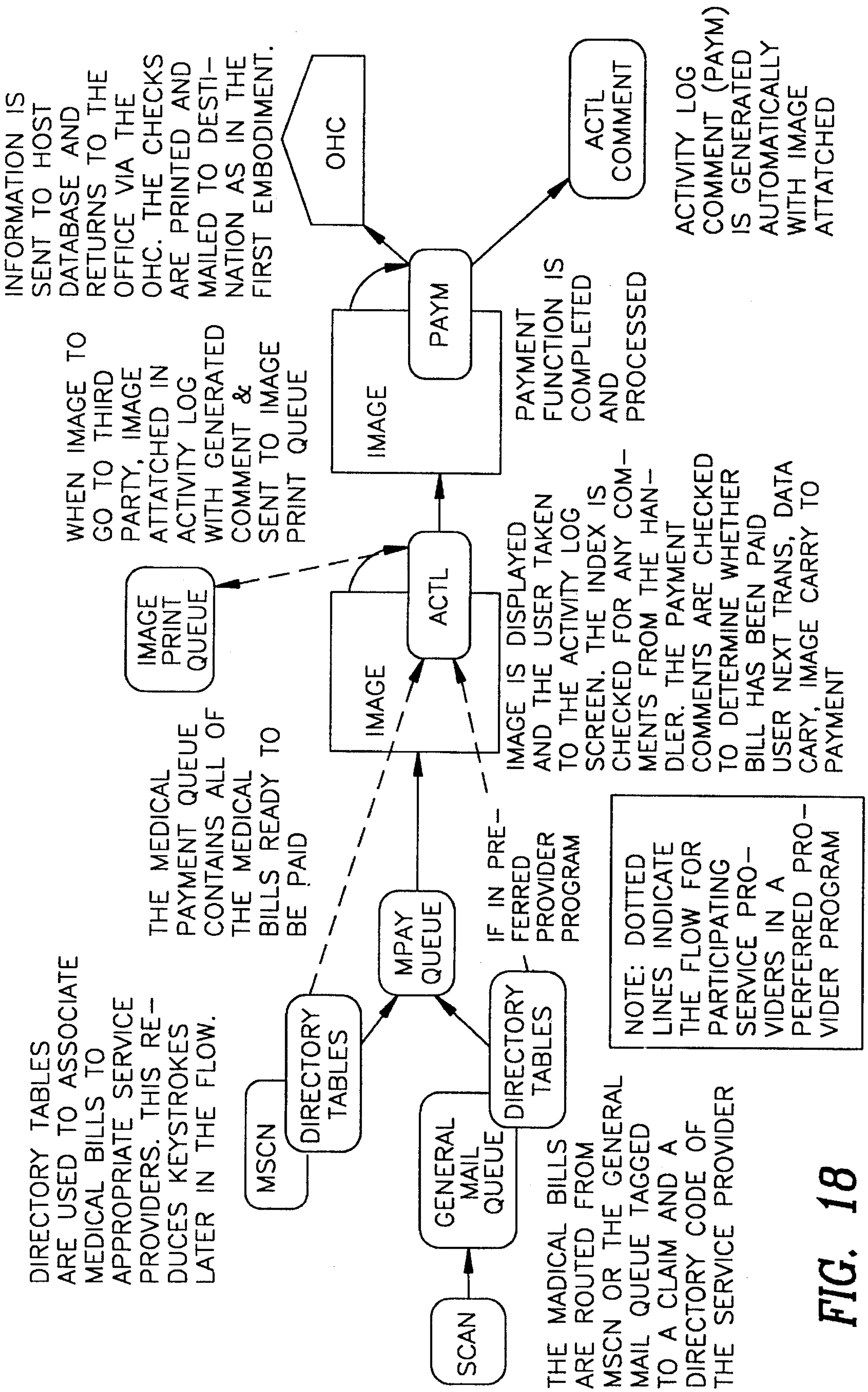
FIG. 18 is a block diagram depicting the flow of medical bills through the System in accordance with the second embodiment of the present invention.

Referring to FIG. 18, when medical bills are received in the office, they are processed with the incoming General Mail and scanned into the System via the SCAN or MSCN functions. If the claim number is not apparent from the bill, a search is done to provide the claim number. As with other General Mail, medical bills are given an Image Code which determines their routing. In one version of the second embodiment, only certain medical bills get routed to the Medical Payments Queue ("Med Pay Queue") for processing. The rest of the bills go to handlers for processing in the normal course. In another version of the second embodiment all medical bills get routed to the Med Pay Queue.

In the first version, the type of claim, as determined by the claim number (which identifies the line of insurance business), coupled with the Image Code, functions as the criteria for routing the medical bill image to the Med Pay Queue. When the criteria are met, the system will return error messages for any efforts to route the image to a destination other than the Med Pay Queue.

When the operator routes the image to the Med Pay Queue (by hitting a function key), the system will automatically bring up the Directory Table List for Doctors and Hospitals (See Table LXXII, below). The appropriate provider is selected and a Vendor Indicator Field associated with the selected record is examined. If the field has a mark (a 'V') in it (i.e. the provider participates in a discount program which is administered by an outside vendor) the image (of the bill) is "linked" to the Activity Log generating a comment such as, "Bill (Medical) sent to vendor (0006) Sep. 03, 1991," and sent to an Image Print Queue for If the field is empty, or has some indicator other than 'V', the System will route the image to the Med Pay Queue for processing.

TABLE LXXII

```
WORKSTATION 132 - USER BJS - Barbara J. Synodinos
10:51:07 am   Friday   September 20, 1991
**************************************************************************************************
****          1         2         3         4         5         6         7         8 ****
**** 12345678901234567890123456789012345678901234567890123456789012345678901234567890 ****
**************************************************************************************************
*  *                                                                                  *  *
*  1*                                                                                 * 1 *
*  2*                           DIRECTORY TABLE                                       * 2 *
*  3*                                                                                 * 3 *
*  4*                                                                                 * 4 *
*  5*    Position cursor and press enter for desired selection:                       * 5 *
*  6*                                                                                 * 6 *
*  7*          *  ADKINS M. D., JOHN C                                                * 7 *
*  8*          *  ASSOCIATES IN NEUROLOGY OF PITTSBURGH                               * 8 *
*  9*          *  ALLEGHENY ANESTHESIOLOGY ASSOC                                      * 9 *
* 10*          *  ALLEGHENY GENERAL HOSP. EMERGENCY ASSOC.                            *10 *
*  1*          *  ALLEGHENY NEUROLOGICAL ASSOCIATES                                   * 1 *
*  2*          *  ALLEGHENY NEUROSURGICAL ASSOCIATES                                  * 2 *
*  3*          *  ALLEGHENY SURGICAL ASSOCIATES                                       * 3 *
*  4*          *  ALLEGHENY VALLEY HOSPITAL                                           * 4 *
*  5*          *  ALIQUIPPA HOSPITAL                                                  * 5 *
*  6*          *  ARMSTRONG COUNTY MEMORIAL HOSPITAL                                  * 6 *
*  7*          *  BALTIC M. D., CHARLES                                               * 7 *
*  8*          *  BEAVER ORTHOPAEDIC ASSOCIATION                                      * 8 *
*  9*          *  BEAVER X - RAY ASSOCIATES                                           * 9 *
* 20*          *  BLOUGH M. D., LELAND S.                                             *20 *
*  1*          *  BRADDOCK GENERAL HOSPITAL                                           * 1 *
*  2*  Enter) Select Record                          7) Find             16) Return   * 2 *
*  3*    1) Display Details       5) Next / Last                                      * 3 *
*  4*                                                                                 * 4 *
*  *                                                                                  *  *
** ************************************************************************************************
****          1         2         3         4         5         6         7         8 ****
**** 12345678901234567890123456789012345678901234567890123456789012345678901234567890 ****
**************************************************************************************************
```

Once the Med Pay Queue is displayed (See Table LXXIII), the operator selects the entry (image bill) to be processed and presses 'Enter.' This retrieves the image from the magnetic disk and displays it. When a particular function key is depressed ('PF16'), the Activity Log is brought up in a data window while the image is simultaneously displayed in an image window. While the Activity Log is displayed the clerk checks to make sure the bill is not a duplicate, whether the bill is associated ("tagged") with the appropriate claim, whether the claim is open or closed and whether the bill is appropriate for the injury stated in the claim. This process can be made easier by invoking a function key ('PF19') which will bring up all payment comments in the Activity Log for the particular claim.

If the image is tagged to the wrong claim, the clerk can go into an Image List (discussed below), and using the Info Search function, re-route the image. If a duplicate bill is found, the duplicate image, may be deleted using a Document Manager function available through an Image List application (discussed below). If the clerk has questions about the bill, he "links" the image to the Activity Log (i.e. permanently associates the image with an Activity Log entry) by hitting a function key and routes it to the responsible claim handler for further action.

If the bill is appropriate for payment, the clerk selects a Link With Comments' function by invoking a function key. This writes a standardized entry to the Activity Log (e.g. "Bill (Medical) received Sep. 10, 1991" - See Table LXXIV, below), links the image with the Activity Log entry and displays an input screen for the input of additional comments such as the name of the

TABLE LXXIII

WORKSTATION 109 - USER BJS - Barbara J. Synodinos
10:06:30 am Monday October 21, 1991

| | | | | | | |
|---|---|---|---|---|---|---|
| ****************************************************************************************** | | | | | | |
| **** | 1 2 | 3 4 | 5 6 | 7 | 8 **** | |
| **** | 12345678901234567890123456789012345678901234567890123456789012345678901234567890 **** | | | | | |
| ****************************************************************************************** | | | | | | |
| * * | | | | | | * * |
| * 1* | | MED PAY QUEUE | | | | * 1 * |
| * 2* | | | Q | Q | | * 2 * |
| * 3* | Image Type | Claimant Name | Arrival | Arrival | Off | * 3 * |
| * 4* | #pg Claim Number | Insured Name | Date | Time | Ind | * 4 * |
| * 5* | | | | | | * 5 * |
| * 6* | * BILL(MEDICAL) | PAMELA, ABBRUZZESE | 09/11/91 | 08:19:24.72 | | * 6 * |
| * 7* | 001 007 C 00013 | ABBRUZZESE, PAMELA | | | | * 7 * |
| * 8* | | | | | | * 8 * |
| * 9* | * BILL(MEDICAL) | PAMELA, ABBRUZZESE | 09/11/91 | 11:58:14.07 | | * 9 * |
| * 10* | 001 007 C 00013 | ABBRUZZESE, PAMELA | | | | *10 * |
| * 1* | | | | | | * 1 * |
| * 2* | * BILL(MEDICAL) | PAMELA, ABBRUZZESE | 09/12/91 | 11:33:35.08 | | * 2 * |
| * 3* | 001 007 C 00013 | ABBRUZZESE, PAMELA | | | | * 3 * |
| * 4* | | | | | | * 4 * |
| * 5* | * BILL(MEDICAL) | PAMELA, ABBRUZZESE | 09/13/91 | 11:59:18.70 | | * 5 * |
| * 6* | 001 007 C 00013 | ABBRUZZESE, PAMELA | | | | * 6 * |
| * 7* | | | | | | * 7 * |
| * 8* | * BILL(MEDICAL) | PAMELA, ABBRUZZESE | 09/16/91 | 11:14:35.85 | | * 8 * |
| * 9* | 001 007 C 00013 | ABBRUZZESE, PAMELA | | | | * 9 * |
| * 20* | | | | | | *20 * |
| * 1* | | | | | | * 1 * |
| * 2* | Enter) Display Image/Actl/info | | 7) Query | 16) Return | | * 2 * |
| * 3* | | 5) Next / Last | 22) Rescan Image | 17) NT | | * 3 * |
| * 4* | | | | | | * 4 * |
| * * | | | | | | * * |
| ** ****************************************************************************************** | | | | | | |
| **** | 1 2 | 3 4 | 5 6 | 7 | 8 **** | |
| **** | 12345678901234567890123456789012345678901234567890123456789012345678901234567890 **** | | | | | |
| ****************************************************************************************** | | | | | | |

doctor or hospital and date of the service. As soon as the image is linked, the entry in the Med Pay Queue for that image is removed.

From the Activity Log, the operator preferably moves to a Payment Control screen by invoking 'NT' ('Next Trans') via a function key and by designating 'Data Carry' and 'Image Carry' (which carries the image and the claim information forward to the next function). The Payment Control screen furnishes access to functionality similar to that associated with this feature in the first embodiment. However, in this embodiment the ability to attach substantiating documentation (images) to the pay transaction entry in the Activity Log is also provided.

Finally, the clerk processing bills through the Med Pay Queue can, if necessary, send an illegible image back to a Rescan Queue for rescanning or can search on a number of fields (e.g. claim number, insured name, queue arrival date/time, claimant name, image type, etc.) to find out additional information to assist in the processing of the bill.

f. Reference Queue/Central Library

In accordance with the second embodiment of the present invention, a Central Library function is provided to give staff members access to a variety of reference documents, online. The reference documents are maintained as images and are indexed to permit easy retrieval and display.

Figure 19:
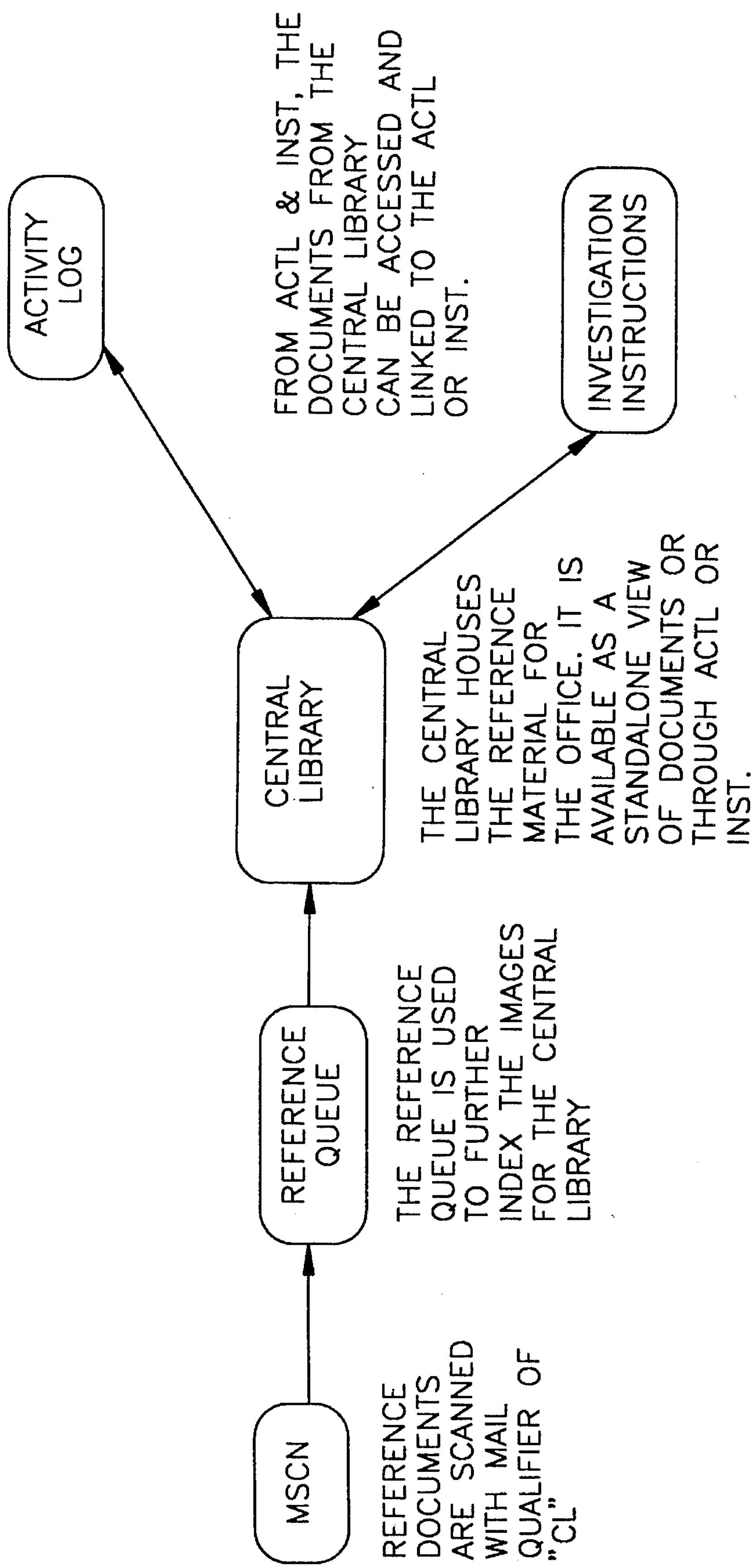
FIG. 19 is a block diagram depicting the flow of reference documents through the System in accordance with the second embodiment of the present invention.

Referring to FIG. 19, documents are associated with the Central Library via a Reference Queue. When documents which are to be used for reference are received in the office or designated for inclusion in the Central Library, they are scanned into the system via the MSCN function with a mail qualifier of 'CL'. This input designates the Reference Queue as the image's destination when the 'Route to Queue' function key ('PF13') is invoked from

TABLE LXXIV

```
WORKSTATION 109 - USER BJS - Barbara J. Synodinos
10:06:45 am   Monday   October 21, 1991
*****************************************************************************************
****          1          2          3          4          5          6          7          8 ****
**** 12345678901234567890123456789012345678901234567890123456789012345678901234567890 ****
*****************************************************************************************
*   *                                                                               *   *
*  1*                          ACTIVITY LOG COMMENTS                                * 1 *
*  2* Clm Num: 007   C  00013   Clmt: WHITCHURCH, JANE ANN                          * 2 *
*  3*    Insd: VLIES, SUSAN                               Loss Date: 04/30/91       * 3 *
*  4* Clm Dec:                                      Est Inc Loss:          0        * 4 *
*  5* Hand: PXA    Supv: LAE    LPT Input Date: 04/03/91    Initial Reserve:   200  * 5 *
*  6*                                                                               * 6 *
*  7* * 10/03/91   CH23 - PAYMENT FOR $450.00, AI-PXA, NB-05 FOR AMOUNT $450.00, TO * 7 *
*  8*    RMP  1    PAYEE NAME ALIQUIPPA HOSPITAL FOR TTD MM-DD-90 TO MM-DD-90,      * 8 *
*  9*              MAIL TO: PAYEE.                                                  * 9 *
* 10* * 10/03/91   BILL(MEDICAL)  RECEIVED 10/03/91 DIRECTORY CODE 00010            *10 *
*  1*    RMP  1                                                                     * 1 *
*  2*                                                                               * 2 *
*  3* * 10/01/91   FAX INITIATED OF TYPE(S) BILL(MEDICAL)                           * 3 *
*  4*    RMP                                                                        * 4 *
*  5*                                                                               * 5 *
*  6* * 10/01/91   CH21 - PAYMENT FOR $4,700.00, AI-PXA, NB-05 FOR AMOUNT $4,700.00, * 6 *
*  7*    RMP  2    TO PAYEE NAME JOHN C ADKINS M. D. FOR TTD MM-DD-90 TO            * 7 *
*  8*              MM-DD-90, MAIL TO: PAYEE.                                        * 8 *
*  9*                                                                               * 9 *
* 20* 1) Refresh        5) Next / Last    10) Index        14) Pol Limits    16) Return      *20 *
*  1* 2) Link With Com  6) Add Comment    11) Autodial     15) Diary List    17) NT  23) LC  * 1 *
*  2* 3) Link WO Com    7) Select         12) Diary Func   22) Logical Scan  24) CLIB        * 2 *
*  3*                   9) MORE FUNC      13) Image List   28) Family Link   29) Link Exist  * 3 *
*  4*                                                                               * 4 *
*   *                                                                               *   *
** **************************************************************************************
****          1          2          3          4          5          6          7          8 ****
**** 12345678901234567890123456789012345678901234567890123456789012345678901234567890 ****
*****************************************************************************************
```

the MSCN screen.

The Reference Queue is accessed by a "librarian" or other operator who reviews the images by selecting a displayed entry (as with all other System queues). The librarian determines the appropriateness of the image for residence in the Central Library and then, if it is to be kept, indexes it by selecting an existing reference category or by creating a new one. This indexing is done through an Option Menu accessible via a function key ('PF11') from the Reference Queue List screen (not shown). The Reference Queue Option Menu (not shown) and the various input screens associated therewith permit the operator to create new categories, link the new image to the Central Library in a selected category, list all images currently in the Central Library or insert the image into a previously stored document.

Once an image is permanently associated with the Central Library, it can be accessed as necessary (See, for example, Table LXXIV) and, if desired, copied for linking with Activity Log entries or Investigative Instructions (See Table LXXVI).

g. Incoming Mailbox, Assignment Mailbox, Referral Mailbox

All mailboxes are essentially queues for a given staff member. Each mailbox is associated with a particular electronic address to which images and other "work" can be routed. The Assignment Mailbox and the Referral Mailbox are changed from the first embodiment only to the extent that they can accommodate and provide access to images.

Figure 20:
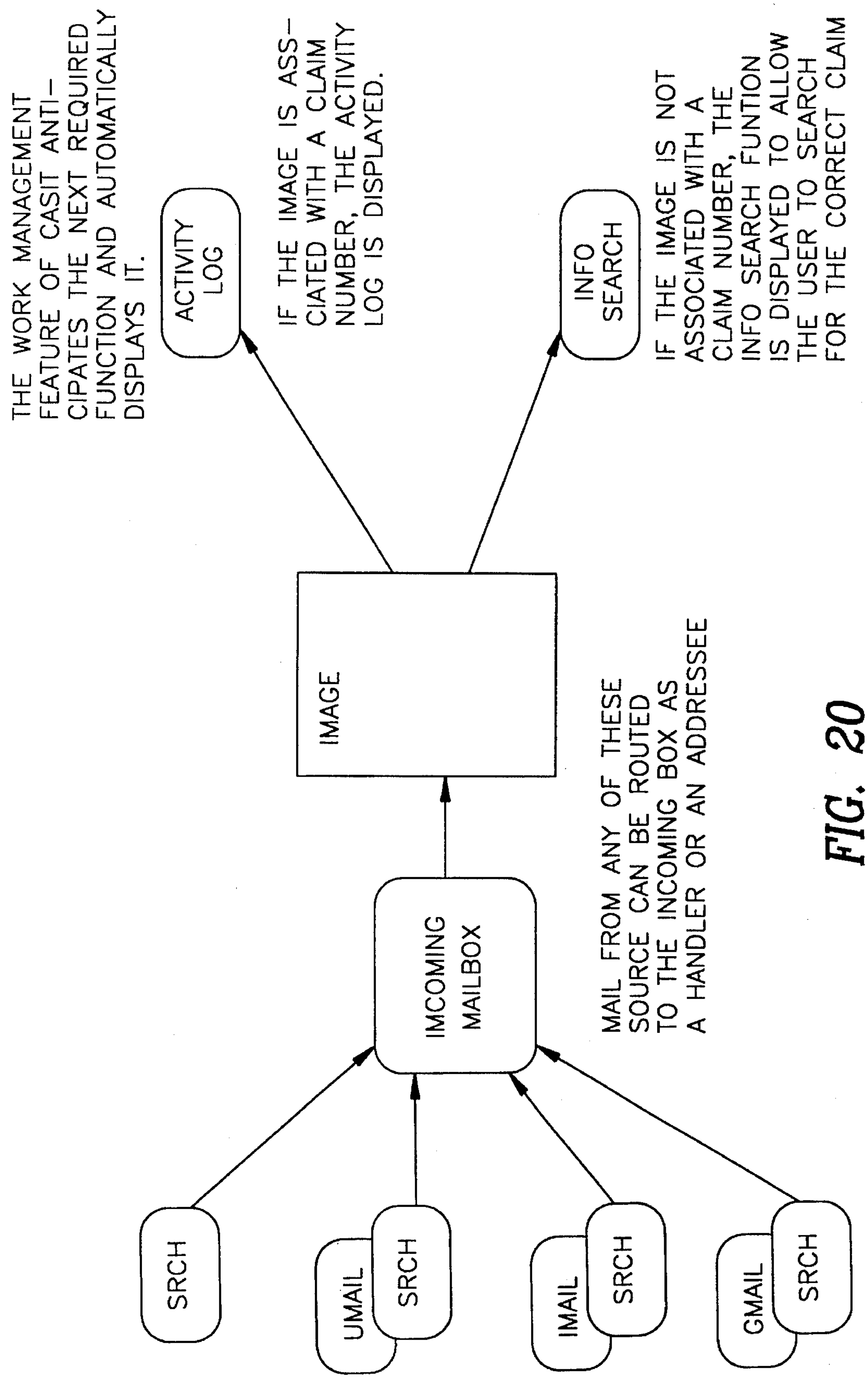
FIG. 20 is a block diagram depicting the flow of mail to an Incoming Mailbox in accordance with the second embodiment of the present invention.

Referring to FIG. 20, the Incoming Mailbox is an addition associated with the second embodiment. It constitutes the main electronic "in-box" for the system. This Mailbox acts as an access queue to: new mail items (images) scanned into the System and routed to a staff member using MSCN; and items routed from

TABLE LXXV

```
WORKSTATION 196 - USER BJS - Barbara J. Synodinos
11:57:28 am   Tuesday   September 17, 1991
*****************************************************************************************
****         1         2         3         4         5         6         7         8 ****
**** 1234567890123456789012345678901234567890123456789012345678901234567890123456789 0 ****
*****************************************************************************************
*  *                                                                              *  *
*  1*                                                                             * 1 *
*  2*                         CENTRAL LIBRARY                                     * 2 *
*  3*                       DOCUMENT DISPLAY LIST                                 * 3 *
*  4*                                                                             * 4 *
*  5*                       COMPUTER COVERAGES                                    * 5 *
*  6*                                                                             * 6 *
*  7*    TITLE                               FORM #      EDITION DATE       Pgs   * 7 *
*  8*                                                                             * 8 *
*  9* * COMM IM COMPUTER BREAKDOWN DED MS 03 01       04/89              001   * 9 *
* 10* * COMM IM COMPUTER EQUIP SCHEDUL   MS 19 09       04/89              001   *10 *
*  1* * COMPUTER EQUIP COVERAGE FORM     MS 00 25       04/89              008   * 1 *
*  2*                                                                             * 2 *
*  3*                                                                             * 3 *
*  4*                                                                             * 4 *
*  5*                                                                             * 5 *
*  6*                                                                             * 6 *
*  7*                                                                             * 7 *
*  8*                                                                             * 8 *
*  9*                                                                             * 9 *
* 20*                                                                             *20 *
*  1* Enter) Disp/Link                      7) Find            16) Return        * 1 *
*  2* 1) Display Image                      10) Link Image 26) Print  27) Fax Image  * 2 *
*  3*                                                                             * 3 *
*  4*                                                                             * 4 *
*  *                                                                              *  *
*****************************************************************************************
****         1         2         3         4         5         6         7         8 ****
**** 1234567890123456789012345678901234567890123456789012345678901234567890123456789 0 ****
*****************************************************************************************
```

one staff member to another using Info Search out of an Image List, the General Mail Queue or an Unmatched Mail Queue.

A Mailbox Menu screen, shown in Table LXXVII below, indicates the presence of "messages" in each Mailbox. Hitting the appropriate function key the accesses the Incoming Mailbox

TABLE LXXVI

```
WORKSTATION 196 - USER BJS - Barbara J. Synodinos
11:57:37 am      Tuesday        September 17, 1991
*****************************************************************************************
****         1         2         3         4         5         6         7         8 ****
**** 1234567890123456789012345678901234567890123456789012345678901234567890123456789 0 ****
*****************************************************************************************
*  *                                                                              *  *
* 1*                                                                              * 1*
* 2*                          CENTRAL LIBRARY                                     * 2*
* 3*                            LINK IMAGE                                        * 3*
* 4*                                                                              * 4*
* 5*                                                                              * 5*
* 6*                        COMPUTER COVERAGES                                    * 6*
* 7*                                                                              * 7*
* 8*       TITLE                                                                  * 8*
* 9*                   COMM IM COMPUTER BREAKDOWN DED                             * 9*
*10*                                                                              *10*
* 1*       FORM #                                                                 * 1*
* 2*                   MS 03 01                                                   * 2*
* 3*                                                                              * 3*
* 4*       EDITION DATE                                                           * 4*
* 5*                   04/89                                                      * 5*
* 6*                                                                              * 6*
* 7*                   Total Pages in Image:   001                                * 7*
```

TABLE LXXVI-continued

```
* 8*                                                                      * 8*
* 9*          Pages to Include:  From 000  to 000                         * 9*
*20*          Pages to Include:  From 000  to 000                         *20*
* 1*          Pages to Include:  From 000  to 000                         * 1*
* 2*  Enter) Link                                    26) Print Image      * 2*
* 3*      1) Display Image                           32) Cancel Link      * 3*
* 4*                                                                      * 4*
*  *                                                                      *  *
**********************************************************************************************
****         1         2         3         4         5         6         7         8 ****
**** 12345678901234567890123456789012345678901234567890123456789012345678901234567890 ****
**********************************************************************************************
```

(shown in Table LXXVIII, below), retrieves summary information from the Mail Queue Table and displays it in tabular form. The Incoming Mailbox displays the type of image, its page length, the mail type, the claim number, the insured's name, the claimant's name, the next diary date, any priority indication, any off-line indication and the date and time the image was scanned into the System. The entries are sorted by Mail Qualifier (Priority Mail ('PM') then General Mail ('GM') then Returned Text ('RT')) and Mail Priority Status (indicated by inputting an 'X' in a queue priority field when the image is scanned in through the MSCN facility or through the General Mail Queue when the image is routed).

Selecting one of the entries in the Incoming Mailbox and pressing 'Enter,' displays the image(s) associated with that entry. Thereafter, when the operator exits from the image conjunction with a specific, new, Activity Log entry. If an Incoming Mailbox entry is not associated with a particular claim, selecting that entry will automatically bring up the Info Search function to allow the user to attempt to match the image with a claim.

After an image has been linked to a claim, re-routed or deleted, the associated Incoming Mailbox entry will no longer be displayed.

From the Incoming Mailbox an operator can gain access to another's Incoming Mailbox by using a 'Change Initials' function key. In this way anyone can view another staff member's Incoming Mailbox and perform activities on the entries enumerated thereon.

TABLE LXXVII

```
WORKSTATION 109 - USER BJS - Barbara J. Synodinos
 8:41:21 am        Monday          October 21, 1991
**********************************************************************************************
****         1         2         3         4         5         6         7         8 ****
**** 12345678901234567890123456789012345678901234567890123456789012345678901234567890 ****
**********************************************************************************************
*  *                                                                      *  *
* 1*                        MAILBOX MENU                                  * 1*
* 2*                                                                      * 2*
* 3*                                                                      * 3*
* 4*                                              Messages                * 4*
* 5*                                              Waiting                 * 5*
* 6*                   1) Assignment Mailbox         X                    * 6*
* 7*                   2) Referral Mailbox           X                    * 7*
* 8*                   3) Alert Message Mailbox                           * 8*
* 9*                   4) Incoming Mailbox           X                    * 9*
*10*                                                                      *10*
* 1*                                                                      * 1*
* 2*                  16) Return                                          * 2*
* 3*                                                                      * 3*
* 4*                              - OR -                                  * 4*
* 5*                                                                      * 5*
* 6*            Supply a new trans code and press ENTER:  ****            * 6*
* 7*                                                                      * 7*
* 8*                                                                      * 8*
* 9*                                                                      * 9*
*20*                                                                      *20*
* 1*                                                                      * 1*
* 2*                                                                      * 2*
* 3*                                                                      * 3*
* 4*                                                                      * 4*
*  *                                                                      *  *
**********************************************************************************************
****         1         2         3         4         5         6         7         8 ****
**** 12345678901234567890123456789012345678901234567890123456789012345678901234567890 ****
**********************************************************************************************
```

display, the Activity Log of the associated claim is automatically brought up. This allows the handler to automatically link the image permanently to the claim record in If any permanent activity is performed within another person's Mailbox, the System automatically assigns the initials of the person performing the task to the activity. As with other queues, any Incoming Mailbox is accessible to multiple users at one time, however, particular images can only be viewed by one

TABLE LXXVIII

```
WORKSTATION 132 - USER BJS - Barbara J. Synodinos
11:08:54 am     Friday     September 20, 1991
**********************************************************************************
****        1         2         3         4         5         6         7         8 ****
**** 12345678901234567890123456789012345678901234567890123456789012345678901234567890 ****
**********************************************************************************
*  *                                                                            *  *
* 1*                                                                            * 1*
* 2*                          INCOMING MAILBOX                                  * 2*
* 3*                              For BJS                                       * 3*
* 4*                                                                            * 4*
* 5*   Image Type/      Mail  Claim Number    Priority  Next      Off  Datestamp   * 5*
* 6*   Number Pages     Type  Clmt/Insd       Ind       Diary Dt  Ind  Timestamp   * 6*
* 7*                                                                            * 7*
* 8* * DIAGRAM          PM    007 AC 00085              08/29/91       09/20/91    * 8*
* 9*     001                  SYNODINOS4, BJS                          10:53:09.93 * 9*
*10*                          SYNODINOS4, BJS                                      *10*
* 1* * ATTORNEY LTR     GM    007 C 00081               08/29/91       09/20/91    * 1*
* 2*     001                  SYNODINOS1, JO                           10:35:54.24 * 2*
* 3*                          SYNODINOS1, BARBARA                                  * 3*
* 4*                                                                            * 4*
* 5*                                                                            * 5*
* 6*                                                                            * 6*
* 7*                                                                            * 7*
* 8*                                                                            * 8*
* 9*                                                                            * 9*
*20*                                                                            *20*
* 1* Enter) Display Image/Actl/Info Srch    7) Query                16) Return  * 1*
* 2*    1) Display Image                   11) Change Initials      17) NT      * 2*
* 3*                                       22) Rescan Image         23) LC      * 3*
* 4*                                                                            * 4*
*  *                                                                            *  *
**********************************************************************************
****        1         2         3         4         5         6         7         8 ****
**** 12345678901234567890123456789012345678901234567890123456789012345678901234567890 ****
**********************************************************************************
```

person at a time.

The Incoming Mailbox further includes a query capability allowing searches on a number of criteria. This permits an operator to locate a specific document in the Mailbox without having to scroll through every entry.

Illegible images can also be sent to the Rescan Queue from the Incoming Mailbox for rescanning.

h. Image List

The Image List (shown in Table LXXIX, below) is a central listing of every image/document associated with a claim or family of claims, sorted primarily by claim number and secondarily by queue arrival date and time. It can be accessed by typing 'IMGL' in any 'Next Trans' field or by selecting a designated function key from the Activity Log or other function. Instead of a claim file with a plurality of paper documents, the Image List provides a list of all the electronic image documents which would otherwise make up the paper claim file.

As soon as an image is associated with a particular claim or claim family, it appears on an Image List corresponding to that claim or claim family. Thus, even if the image has only been routed to a handler's Incoming Mailbox, it will also appear on the Image List. However, until the image is permanently linked with a claim, an 'I' for "in-process," is displayed next to the image.

The Image List provides a user with access to any image/document associated with claim or claim family. It also may provide the following information: the document's status (i.e. in-process, linked or set for deletion); the image type (as defined by any previously input image code); the number of pages of the document (The words "image" and "document," as used in

TABLE LXXIX

```
WORKSTATION 132 - USER BJS - Barbara J. Synodinos
11:18:54 am        Friday        September 20, 1991
**************************************************************************************
****          1         2         3         4         5         6         7         8 ****
**** 12345678901234567890123456789012345678901234567890123456789012345678901234567890 ****
**************************************************************************************
*  *                                                                              *  *
* 1*                              IMAGE LIST                                      * 1*
* 2*                                                                              * 2*
* 3*                                                                              * 3*
* 4*    Img                     No   Link      Claim                        Link  * 4*
* 5*    Stat  Image Type        Pgs  Date      Number       Description      By   * 5*
* 6*                                                                              * 6*
* 7*   *      DIAGRAM           1  09/20/91  007 AC 00085  AUTO ACCTD. SCNENE  BJS * 7*
* 8*   *      DIAGRAM           1  08/21/91  007 AC 00085  POSITION OF CARS    BJS * 8*
* 9*   *  I   DIAGRAM           4            007 AC 00085                         * 9*
*10*   *      LOSS NOTICE       3  08/12/91  007 AC 00085                      BJS *10*
* 1*                                                                              * 1*
* 2*                                                                              * 2*
* 3*                                                                              * 3*
* 4*                                                                              * 4*
* 5*                                                                              * 5*
* 6*                                                                              * 6*
* 7*                                                                              * 7*
* 8*                                                                              * 8*
* 9*                                                                              * 9*
*20*  2) Link w/ Comments       7) Query          19) Document Mgr    16) Return  *20*
* 1*  3) Link w/o Comments      9) Modify         26) Print Image     17) NT      * 1*
* 2*                           10) Info Search    27) Fax             23) LC      * 2*
* 3*                           18) Logical Scan   28) Link to Family              * 3*
* 4*                                                                              * 4*
*  *                                                                              *  *
**************************************************************************************
****          1         2         3         4         5         6         7         8 ****
**** 12345678901234567890123456789012345678901234567890123456789012345678901234567890 ****
**************************************************************************************
```

this section, have slightly different meanings. An "image" is a single page, reproduced in electronic form. A document is one or more images which are treated as a single entity. Thus, a single page which has been scanned into the system is both an image and a document.); the date (if any) the document was linked to the claim (this date can be used in an Activity Log Query to access the Activity Log Comment made when the image was linked); the claim number with which the document has been associated; a description of the document (taken from the first 20 characters of an Activity Log entry to which the image is linked); and the person (if any) who linked the image with the claim.

Figure 21:
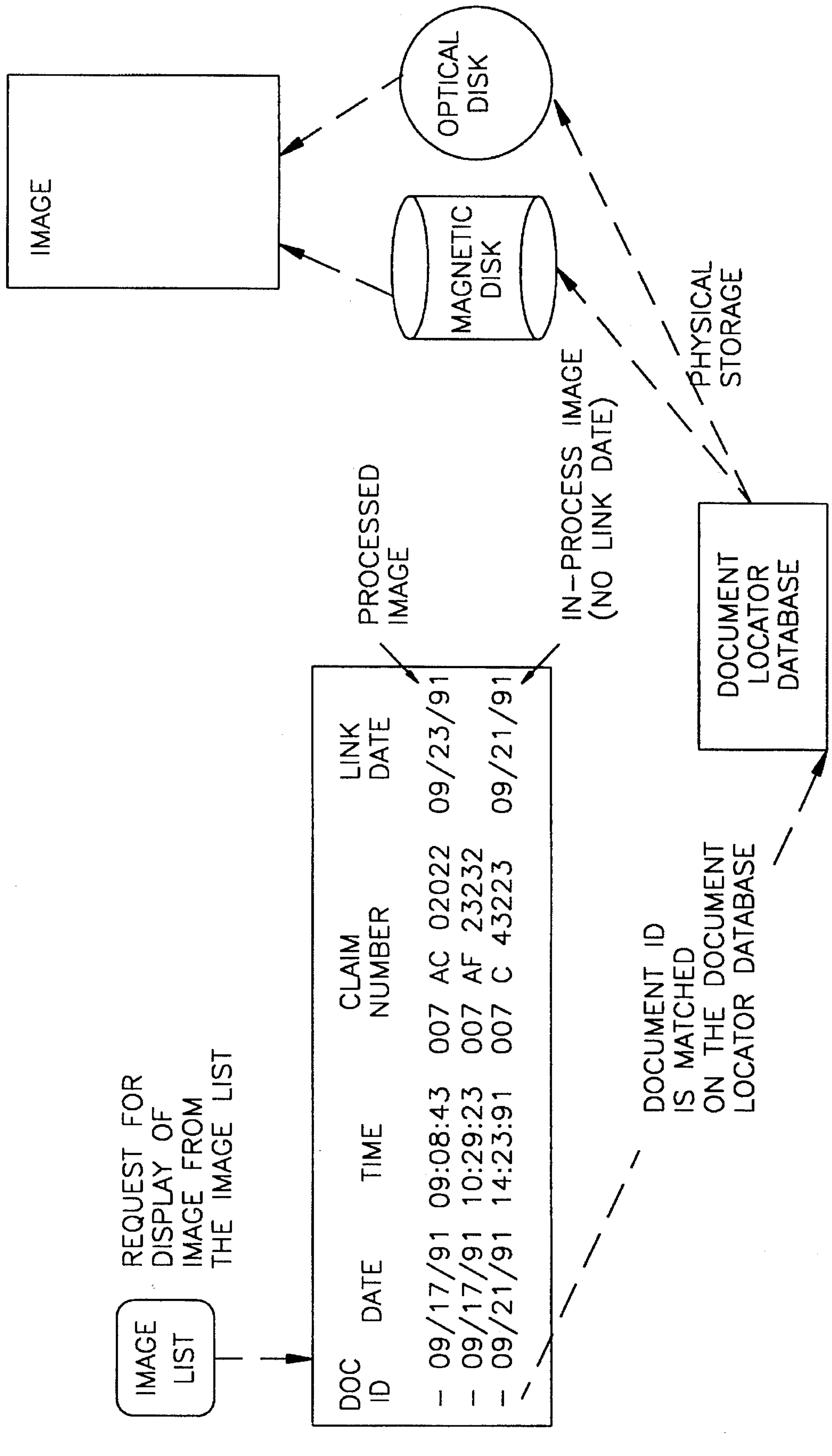
FIG. 21 is a block diagram depicting the physical display an image from the Image List in accordance with the second embodiment of the present invention.

From the Image List it is possible to view each document (See FIG. 21). This can be done one at a time, by selecting individual documents and pressing 'Enter' or by placing an 'X' next to a plurality of images and pressing 'Enter'. When multiple documents are selected, they will display sequentially.

When a document is selected for display from the Image List, a number of activities go on "behind the scenes" to physically retrieve and display the document. A Claim Image Table is accessed and the record associated with the Image List entry is examined to determine the document ID. The Claim Image Table is a database table that includes a record for every image/document associated (tagged or linked) with a claim. Each record has much of the same information as a record in the Mail Queue Table, but is not limited to in-process images/documents as is the Mail Queue Table. The Image List display is a view of the Claim Image Table, encompassing all images/documents associated with a particular claim or claim family.

As with the Mail Queue Table operation discussed previously, the Document ID from the selected Claim Image Table record is matched with the Document ID in the Document Locator Database. The Document Locator Database record associated with the Document ID identifies the physical storage location (on magnetic or optical disk) of the selected image.

From the Image List, in-process images/documents can be linked to the Activity Log, with or without additional comments, by selecting an appropriate function key. Additional operations available from the Image List include: query on key office code, claim number, link date or image type; modification of image type or document start page; routing a document to another staff member's Incoming Mailbox or to another queue; manipulation of documents through the Document Manager function; printing of documents; faxing of documents and linking of documents to some or all of the claims in a family.

i. Activity Log

The Activity Log application attendant to the second embodiment of the present invention is functionally enhanced over that of the first embodiment. The primary enhancement is the ability to link images/documents with particular Activity Log entries. These linked images can then be viewed at any time in conjunction with the Activity Log entry, or alone, via the Image List.

When an image is linked to the Activity Log, a comment describing that image is automatically generated. (See the Activity Log Comments screen in Table LXXX, below). This comment is based on the indexing that has been undertaken with respect to the image (e.g. Mail Qualifier, Image Code, Reference Category, etc.), the date and the person linking the image. Additionally, manual comments may be provided to explain the image or the decision being made based on the image. This is accomplished by choosing a 'Link With Comments' function key. Invoking this key displays an input screen called the Activity Log Add screen (see Table LXXXI, below) which permits the input of an unlimited number of lines of text. The automatically generated comment appears on the first line of the comment input field.

Choosing a 'Link Without Comments' function key simply links the image to the Activity Log with the automatically generated comment. No additional text can be added.

Figure 22:
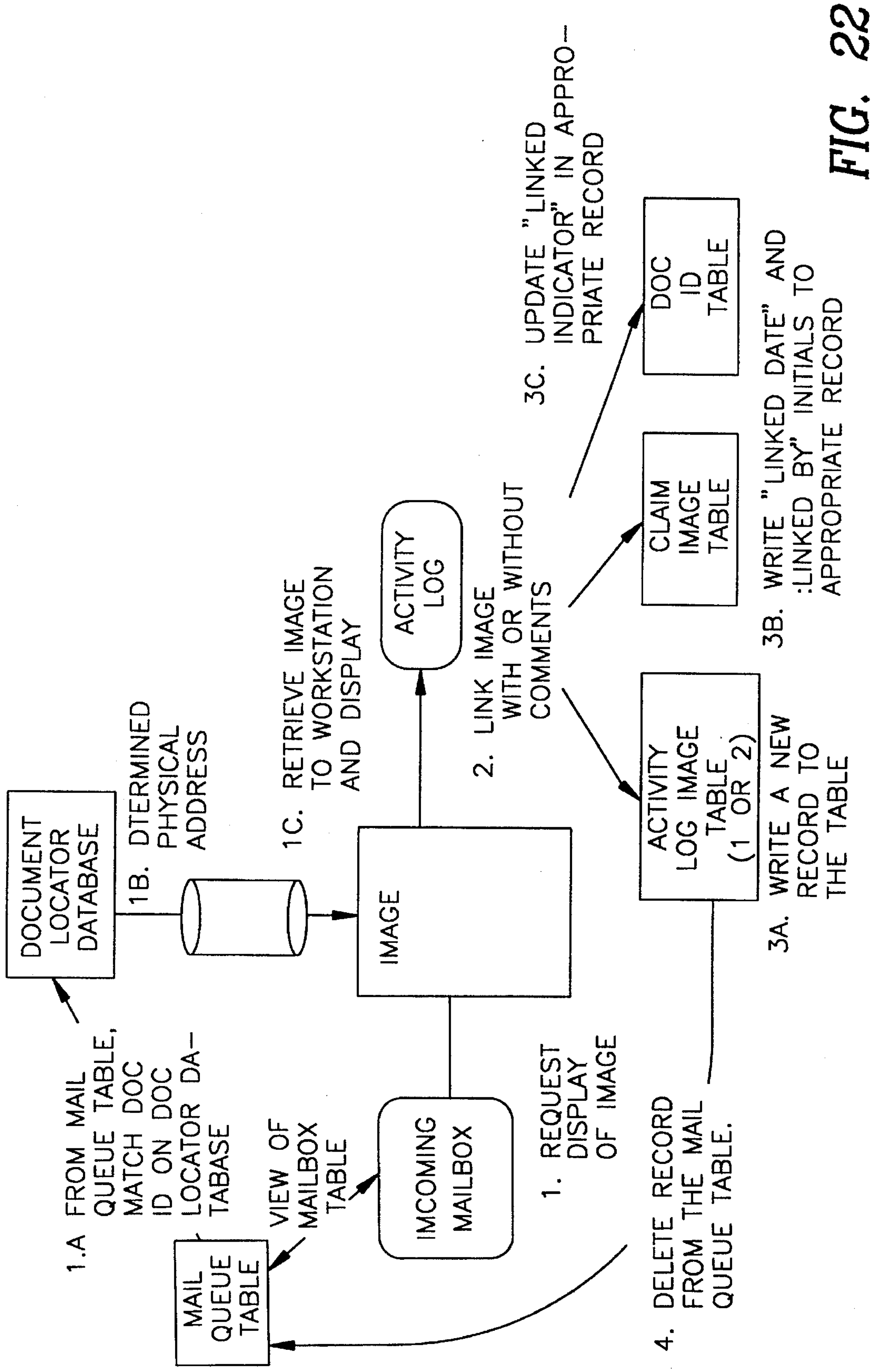
FIG. 22 is a block diagram depicting the linking of a document to the Activity Log in accordance with the second embodiment of the present invention.

The physical process of linking an image to the Activity Log is shown in FIG. 22. Assuming the invocation of a 'Display Image/Actl/Info Srch' function key from an Incoming Mailbox, the image is first retrieved and displayed. Selecting a function key while the image is displayed will simultaneously display the Activity Log Comments screen. When this screen is displayed, invoking a 'Link With Com' or 'Link WO Comm' function key actually links the image/document by: writing a new record to the Activity Log Image Table; writing the linked date and linked by initials to the image's record in the Claim Image Table; and updating the linked indicator in the Document ID Table. When this occurs the image/document's corresponding record is deleted from the Mail Queue Table.

TABLE LXXX

```
WORKSTATION 132 - USER BJS - Barbara J. Synodinos
11:11:39 am       Friday       September 20, 1991
************************************************************************************
****          1         2         3         4         5         6         7         8 ****
**** 12345678901234567890123456789012345678901234567890123456789012345678901234567890 ****
************************************************************************************
*  *                                                                             *  *
* 1*                          ACTIVITY LOG COMMEMTS                              * 1*
* 2* Clm Num: 007  C 00081          Clmt: SYNODINOS1, JO                         * 2*
* 3*    Insd: SYNODINOS1, BARBARA                           Loss Date: 08/01/91  * 3*
* 4* Clm Dec: BROKEN FOOT                               Est Inc Loss:    10,000  * 4*
* 5* Hand: BJS  Supv: MJR    LPT Input Date: 08/12/91   Initial Reserve: 10,000  * 5*
* 6*                                                                             * 6*
* 7*    09/20/91  DIAGRAM            RECEIVED PIF (CR) 09/20/91                  * 7*
* 8*    BJS    1                                                                 * 8*
* 9*                                                                             * 9*
*10*    09/20/91  BILL(MEDICAL)      MED BILL SENT TO VENDOR (00002) 09/20/91    *10*
* 1*    BJS    1                                                                 * 1*
* 2*                                                                             * 2*
* 3*    09/20/91  BILL(MEDICAL)      MED BILL SENT TO VENDOR (00002) 09/20/91    * 3*
* 4*    BJS    1                                                                 * 4*
* 5*                                                                             * 5*
* 6* *  09/04/91  CH22 - PAYMENT FOR $1.00, AI-PXA, NB-06 FOR AMOUNT $1.00, TO   * 6*
* 7*    PXA    2  PAYEE NAME A. BAUMHAMMERS D. D. S. FOR MEDICAL 08 01 91, MAIL  * 7*
* 8*              TO: PAYEE.                                                     * 8*
* 9*                                                                             * 9*
*20* 1) Refresh       5) Next / Last   10) Index        14) Pol Limits    16) Return       *20*
* 1* 2) Link With Com 6) Add Comment   11) Atdl / Call  15) Diary List    17) NT 23) LC    * 1*
* 2* 3) Link WO Comm  7) Select        12) Diary Func   22) Logical Scan  24) CLIB         * 2*
* 3*                  9) MORE FUNC     13) Image List   28) Family Link   29) Link Exist   * 3*
* 4*                                                                             * 4*
*  *                                                                             *  *
************************************************************************************
****          1         2         3         4         5         6         7         8 ****
**** 12345678901234567890123456789012345678901234567890123456789012345678901234567890 ****
************************************************************************************
```

An additional feature of the Activity Log application in the second embodiment of the present invention is the ability to perform queries to limit the display of Activity Log entries.

TABLE LXXXI

```
WORKSTATION 131 - USER BJS - Barbara J. Synodinos
 3:19:31 am   Friday   September 20, 1991
*****************************************************************************************
****           1          2          3          4          5          6          7          8 ****
**** 1234567890123456789012345678901234567890123456789012345678901234567890123456789 0 ****
*****************************************************************************************
*   *                                                                          *   *
*  1*                              ACTIVITY LOG ADD                            * 1 *
*  2*  Clm Num:  007   MD 00063              Pol Num: 40 SMP 287262            * 2 *
*  3*      Insd: CARBONELL, ANN                                                * 3 *
*  4*      Clmt: BROOKMAN, ADAM                    Loss Date: 01/01/91         * 4 *
*  5*  Clm Dec:  SEVERELY BROKEN NOSE                   Est Inc Loss: 100,000  * 5 *
*  6*     *                                                                    * 6 *
*  7*   09/20/91   ATTORNEY LETTER   RECEIVED 09/19/91                         * 7 *
*  8*     BJS      *************************************************************  * 8 *
*  9*              *************************************************************  * 9 *
* 10*              *************************************************************  *10 *
*  1*              *************************************************************  * 1 *
*  2*              *************************************************************  * 2 *
*  3*              *************************************************************  * 3 *
*  4*              *************************************************************  * 4 *
*  5*              *************************************************************  * 5 *
*  6*              *************************************************************  * 6 *
*  7*              *************************************************************  * 7 *
*  8*              *************************************************************  * 8 *
*  9*              *************************************************************  * 9 *
* 20*              *************************************************************  *20 *
*  1*              *************************************************************  * 1 *
*  2*                                                                          * 2 *
*  3*                 6) Add Comment          23) LC           32) Cancel      * 3 *
*  4*                                                                          * 4 *
*   *                                                                          *   *
** ***************************************************************************************
****           1          2          3          4          5          6          7          8 ****
**** 1234567890123456789012345678901234567890123456789012345678901234567890123456789 0 ****
*****************************************************************************************
```

This feature is extremely important because a large claim can have more than 400 screens of Activity Log entries which would otherwise have to be "scrolled" through. Queries can be done to limit the Activity Log display to: specific comment types; a specific comment date; payment comments; images; comments designated as important; and manual comments.

In the second embodiment, the System also provides the ability to designate individual Activity Log comments as important (usually those comments which substantiate or manifest a decision affecting the claim) by placing an asterisk in front of the comment via an 'Important Comments' function key. This designation is the only thing which can be altered with respect to an Activity Log entry after the entry has been saved.

j. Autodial

The Autodial function allows a staff member to place a claim-related telephone call from within the Activity Log. When an appropriate function key is selected, an Autodial Menu screen (See Table LXXXII) is displayed. The selections from this menu are preferably as follows: insured business; insured home; claimant business; claimant home; attorney; witness; insured driver; service provider; investigative authority; agency; responsible party; contact business; contact home; update insured phone; update claimant phone; and free-form-directory. If the user selects insured business, insured home, claimant business, claimant home, attorney, insured driver, service provider, investigative authority, agency, responsible party, contact business or contact home, an Autodial Info screen (not shown) is immediately displayed, with the number to be dialed. This screen is shown for confirmation purposes, to avoid accidental calls which would otherwise generate unnecessary comments to the Activity Log. If "witness" is selected, a List-Witness screen (not shown) is displayed. All witnesses currently associated with the claim, as input through the LPTX input screens and maintained on the Loss Claim database table, are displayed. The user simply selects one of the witnesses to dial, and invokes a 'Place Call' function key to bring up the Autodial Info screen and confirm his desire to make the call.

When a call is undertaken by the System, an application called STEP, by Wang®, is invoked to actually place the call. First, the number of the user logged on to the system is called. This number is taken from the Staff Tables (actually, from the Staff Member database table). When the user picks up his telephone and speaks into it, the application physically places the call to the designated party.

If the call is answered, the Activity Log Add screen (See Table LXXXI, above) is displayed with an automatically generated comment which includes: the time the call is placed; the party called; the phone number dialed; and the words "phone answered."

At this point, the operator may type in any information about the phone call on the Activity Log Add screen. When the call is finished, a function key ('PF16') is invoked to permanently add the comment to the Activity Log, and the operator is returned to the Autodial Menu screen.

TABLE LXXXII

```
WORKSTATION 132 - USER BJS - Barbara J. Synodinos
 3:03:39 pm   Friday   September 20, 1991
**********************************************************************************************
****          1           2 .         3           4           5           6           7          8 ****
**** 12345678901234567890123456789012345678901234567890123456789012345678901234567890 ****
**********************************************************************************************
*   *                                                                                    *   *
*  1*                                                                                    * 1 *
*  2*                          CLAIM RELATED AUTODIAL MENU                               * 2 *
*  3*                                                                                    * 3 *
*  4*          Insured:   SYNODINOS1, BARBARA                                            * 4 *
*  5*          Claiment:  SYNODINOS1, JO                                                 * 5 *
*  6*                                                                                    * 6 *
*  7*       Claim:  007 C  00081   Loss Date:  08/01/91   Policy:  02 WCX 993933         * 7 *
*  8*                                                                                    * 8 *
*  9*                     Press a PFkey to select a party to be called                   * 9 *
* 10*                                                                                    *10 *
*  1*                                                                                    * 1 *
*  2*             1) Insured Business              10) Agency                            * 2 *
*  3*             2) Insured Home                  11) Responsible Party                 * 3 *
*  4*             3) Claimant Business             12) Contact Business                  * 4 *
*  5*             4) Claimant Home                 13) Contact Home                      * 5 *
*  6*             5) Attorney                      14) Update Insured Phone              * 6 *
*  7*             6) Witness                       15) Update Claimant Phone             * 7 *
*  8*             7) Insured Driver                16) Return                            * 8 *
*  9*             8) Service Provider              18) Freeform - Directories            * 9 *
* 20*             9) Investigative Authority                                             *20 *
*  1*                                                                                    * 1 *
*  2*                                                                                    * 2 *
*  3*                                                                                    * 3 *
*  4*                                                                                    * 4 *
*   *                                                                                    *   *
** ********************************************************************************************
****          1           2           3           4           5           6           7          8 ****
**** 12345678901234567890123456789012345678901234567890123456789012345678901234567890 ****
**********************************************************************************************
```

If the party's telephone is busy, an Activity Log comment is automatically generated including, the time the call was placed, the party called, the phone number dialed and the words "phone was busy." The operator is automatically returned to the Autodial Menu screen and the message, "Phone was busy," is displayed.

If the party's telephone is not answered after a preset number of rings, an Activity Log comment is automatically generated including, the time the call was placed, the party called, the phone number dialed and the words, "phone unanswered." The user is automatically returned to the Autodial Menu screen and a "Phone Unanswered" message is displayed.

When an operator wishes to place a claim related call to a number which has not been designated as claim related (i.e. not input into the system through the LPTX input screens for that claim) a 'Freeform' function key is invoked. This displays an Autodial Freeform screen (shown in Table LXXXIII below). When this screen is displayed, the operator can either directly input a number to be called or can access a Directory List to choose a number (the Directory List draws its information from the same database table, (the Directories Table) as the Directory Tables but cannot be modified). The selection of a Directory List number prefills that number to the Freeform screen from which the call can be made. For calls, made through the Freeform screen, the party called is not automatically written to the Activity Log. However, all other standard information is generated in a comment (including the number called, the date and the time).

Any telephone call which is undertaken through the Autodial function is automatically time monitored. In other words, the

TABLE LXXXIII

```
WORKSTATION 130 - USER BJS - Barbara J. Synodinos
 3:10:18 pm   Friday   September 20, 1991
****************************************************************************************
****         1         2         3         4         5         6         7         8 ****
**** 12345678901234567890123456789012345678901234567890123456789012345678901234567890 ****
****************************************************************************************
*  *                                                                                *  *
*  1*                                                                              * 1 *
*  2*                                                                              * 2 *
*  3*                               AUTODIAL FREEFORM                              * 3 *
*  4*                                                                              * 4 *
*  5*                                                                              * 5 *
*  6*                                                                              * 6 *
*  7*      Insured:   SYNODINOS1, BARBARA                                          * 7 *
*  8*      Claimant:  SYNODINOS1, JO                                               * 8 *
*  9*                                                                              * 9 *
* 10*      Claim:  007 C  00081   Loss Date:  08/01/91   Policy:  02 WCX 993933   *10 *
*  1*                                                                              * 1 *
*  2*                                                                              * 2 *
*  3*                                                                              * 3 *
*  4*                         Enter the phone number to be called                  * 4 *
*  5*                                                                              * 5 *
*  6*                              ********************                            * 6 *
*  7*                                                                              * 7 *
*  8*                                                                              * 8 *
*  9*                                                                              * 9 *
* 20*                                                                             *20 *
*  1*                                                                              * 1 *
*  2*  Enter) Place Call                10) Directories                16) Return  * 2 *
*  3*                                                                              * 3 *
*  4*                                                                              * 4 *
*  *                                                                                *  *
** *************************************************************************************
****         1         2         3         4         5         6         7         8 ****
**** 12345678901234567890123456789012345678901234567890123456789012345678901234567890 ****
****************************************************************************************
```

duration of the telephone call is recorded and used as part of a work measurement analysis. For calls which relate to a claim, but originate outside the office, the user can access the Main Menu, Info Search, or the Activity Log functions and press a 'Start Call' function key to begin recording the duration of the call. While the time of the call is being recorded, the user can access the Info Search function to search for a claim with which to associate the call. If a claim is found, the Activity Log Add screen can be accessed and the substance of the incoming call manually recorded. A 'Stop Call' function key is invoked to end the time measurement or allowed to automatically terminate when the user moves to another claim function.

k. Inbound/Outbound Fax

Fax receipt and transmission is facilitated through a "Fax Gateway." The Fax Gateway comprises one or more personal computers, connected to the Main CPU and one or more telephone lines. Associated with the personal computer is a specialized fax board and Wang® Fax Gateway software which is integrated with the System via an application programming interface ("API").

1. Inbound Fax

Figure 23:
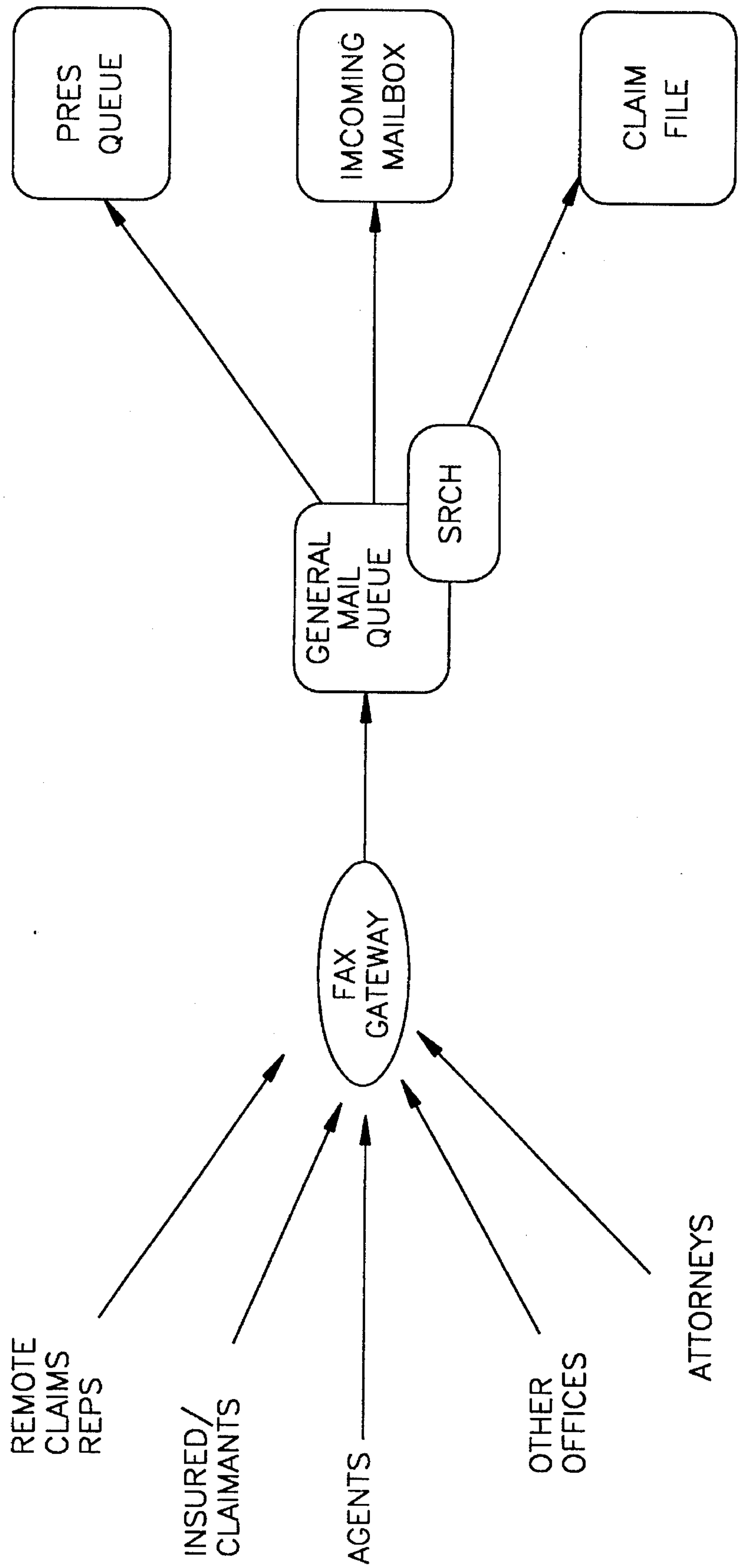
FIG. 23 is a block diagram depicting the flow associated with the receipt of a fax by the System in accordance with the second embodiment of the present invention.

As shown in FIG. 23, inbound faxes come in through the Fax Gateway from Remote (outside) Claim Reps, insureds, claimants, agents, other offices and attorneys. The System converts the received fax to an image and automatically routes it to the General Mail Queue, giving it on 'FX' Mail Qualifier. From the General Mail Queue, the fax is reviewed to determine its mail type (e.g. a Loss Notice) and with which, if any, claim it is associated. It is thereafter routed to the appropriate queue or linked directly to the claim file.

2. Outbound Fax

Figure 24:
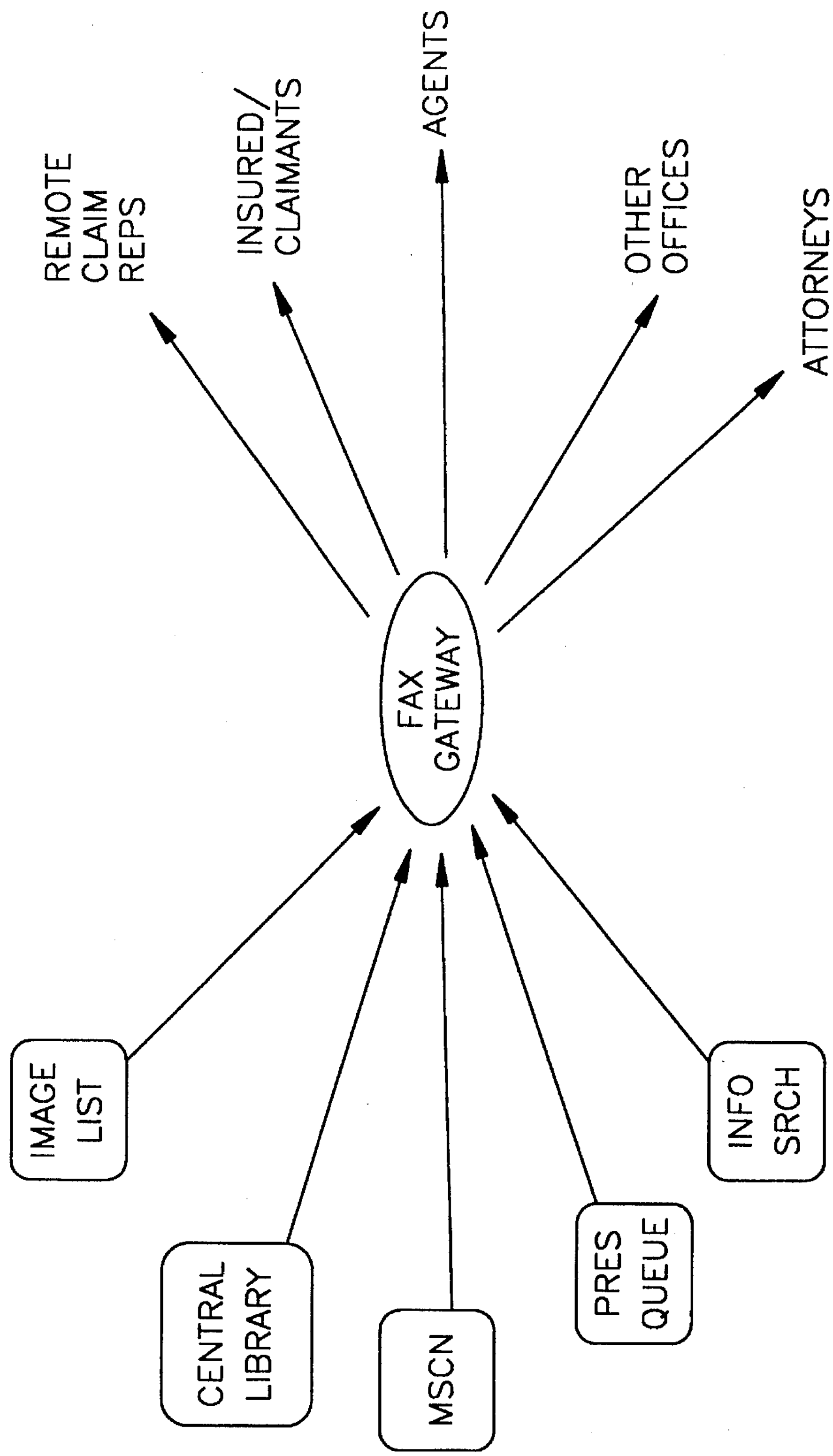
FIG. 24 is a block diagram depicting the flow associated with the sending of a fax through the System in accordance with the second embodiment of the present invention.

Referring to FIG. 24, the Outbound Fax function is available via a function key from: the Prescreener's Queue (to fax misdirected Loss Notices to another office); the Central Library (to fax out reference materials); the Image List (to fax out any image associated with a claim); the Unmatched Mail Queue/Info Search (to fax out mail to another office); and MSCN (to automatically fax out mail to Outside Claim Reps).

In order to send a fax, one or more images from the Prescreener's Queue, the Central Library, the Image List or the Unmatched Mail Queue (via Info Search) are selected. (MSCN is discussed separately, below). Thereafter, invoking a Fax function key brings up an Outbound Fax screen (not shown) where a text document (e.g. a fax cover page or other explanatory letter) can be identified to accompany the image(s) to be faxed. Exiting from the Outbound Fax screen preferably brings up the Directory Tables Inquiry screen which is used as a vehicle for locating fax telephone numbers and addresses. If the correct party and address are located, the entry is selected and a 'Fax Image' function key is invoked. An Outbound Fax Address screen (See Table LXXXIV) displays to permit modifications to any of the selected address or telephone number information. When all the information is correct a 'Send Fax' function key is invoked and the fax is sent to the Fax Gateway for transmission. A general comment to the effect that the fax was initiated is generated to the Activity Log.

TABLE LXXXIV

```
WORKSTATION 132 - USER BJS - Barbara J. Synodinos
 2:40:04 pm   Friday   September 20, 1991
**********************************************************************************************
****          1          2          3          4          5          6          7          8 ****
**** 1234567890123456789012345678901234567890123456789012345678901234567890123456789012345678901234567890 ****
**********************************************************************************************
*    *                                                                                *    *
*  1*                                                                                 * 1 *
*  2*                                                                                 * 2 *
*  3*                                                                                 * 3 *
*  4*                     OUTBOUND FAX ADDRESS SCREEN                                 * 4 *
*  5*                                                                                 * 5 *
*  6*                                                                                 * 6 *
*  7*             Last Name:      **************************************************  * 7 *
*  8*             First Name:     ***************                                     * 8 *
*  9*             Address:        ****************************                        * 9 *
* 10*             City:           ***************                                     *10 *
*  1*             State:          **                                                  * 1 *
*  2*             Fax Number:     ********************                                * 2 *
*  3*                                                                                 * 3 *
*  4*                                                                                 * 4 *
*  5*                                                                                 * 5 *
*  6*                                                                                 * 6 *
*  7*                                                                                 * 7 *
*  8*                                                                                 * 8 *
*  9*                                                                                 * 9 *
* 20*                                                                                 *20 *
*  1*                                                                                 * 1 *
*  2*   ENTER) Send Fax                                                   16) Return  * 2 *
*  3*                                                                     32) Cancel  * 3 *
*  4*                                                                                 * 4 *
*    *                                                                                *    *
** ********************************************************************************************
****          1          2          3          4          5          6          7          8 ****
**** 1234567890123456789012345678901234567890123456789012345678901234567890123456789012345678901234567890 ****
**********************************************************************************************
```

If the fax number of the intended recipient of the fax is not on the Directory Tables, a freeform address can be input through the Outbound Fax Address screen.

Faxes which are sent out through the MSCN function are sent without any operator intervention. If, in the MSCN function, a piece of mail is matched to a claim that has been assigned to a handler who is an Outside Claim Rep, a copy of that piece of mail is automatically faxed to the Rep. In the process of routing the piece of mail from the MSCN function, the System checks the Staff Tables to verify the assigned staff member. When the job description code of "OCR" (Outside Claim Rep) is encountered the fax process is automatically initiated, relying on the fax number which has been input for the Rep in the Staff Tables. This operation is completely transparent to the user.

1. Unmatched Mail Queue

After a search has been performed, an image/document for which no particular claim can be found is routed to the Unmatched Mail Queue ("UMAL"). This queue (the display screen of which is shown in Table LXXXV, below) is intended as a bulletin board for the entire office so that each staff member can review the mail and determine whether he or she was waiting for it or can recognize it. Only mail with a 'GM' Mail Qualifier can be sent to the Unmatched Mail Queue.

The natural flow through the UMAL function is to select 'Display and Info Search' by pressing 'Enter'. This displays the image and an Info Search screen. A search is then preferably done to confirm that there are indeed no matching claims.

TABLE LXXXV

```
WORKSTATION 196 - USER BJS - Barbara J. Synodinos
11:53:10 am   Tuesday   September 17, 1991
*******************************************************************************************
****         1         2         3         4         5         6         7         8 ****
**** 12345678901234567890123456789012345678901234567890123456789012345678901234567890 ****
*******************************************************************************************
*   *                                                                              *   *
*  1*                                                                              * 1 *
*  2*                        UNMATCHED MAIL QUEUE                                  * 2 *
*  3*                                                                              * 3 *
*  4*   Mail Tp        Claimant/       Image Type        Rtr   Arrival     Prt     * 4 *
*  5*    #Pgs          Insured*        Description       Init  Date/Time   Ind     * 5 *
*  6*                                                                              * 6 *
*  7*  * GM    ???                     BILL(MEDICAL)     PXA   07/26/91            * 7 *
*  8*    002   RODGERS                                         11:40:08.88         * 8 *
*  9*  MEDICAL BILL DR. SMITH $450.00 DOS 09/01/91                                 * 9 *
* 10*                                                                              *10 *
*  1*  * GM    TANNERS, ROB            ATTORNEY LTR      BJS   09/03/91            * 1 *
*  2*    003   EVANS MILL PRODUCTS                             11:33:47.88         * 2 *
*  3*  ATTY ZIEGLER, IS THIS IN OUR TERRITORY????                                  * 3 *
*  4*                                                                              * 4 *
*  5*                                                                              * 5 *
*  6*                                                                              * 6 *
*  7*                                                                              * 7 *
*  8*                                                                              * 8 *
*  9*                                                                              * 9 *
* 20*                                                                              *20 *
*  1*     Enter) Display and Info Search    7) Query    9) Modify Info    16) Return   * 1 *
*  2*         1) Display Image              8) Delete  22) Rescan Image   17) NT       * 2 *
*  3*                                                                              * 3 *
*  4*                                                                              * 4 *
*   *                                                                              *   *
** ****************************************************************************************
****         1         2         3         4         5         6         7         8 ****
**** 12345678901234567890123456789012345678901234567890123456789012345678901234567890 ****
*******************************************************************************************
```

A new Info Search is preferably performed every day for at least five days to determine if the Unmatched Mail item can be matched to anything. If a match cannot be found after this period of time the image is printed and sent to the originator for additional information. Thereafter, it is preferably deleted. If the image is not printed, it cannot be deleted from the queue. This is to prevent unidentified mail from simply being ignored.

m. Info Search

The Info Search function is modified with respect to the first embodiment and can be used in two ways. First, it can be used to perform database searches to locate associated claims as with the first embodiment. Second, it can be used as a routing facility to route images through the System.

In accordance with the Info Search facility's status as a routing tool, a plurality of routing oriented function keys can be invoked from the Info Search Facility screen (shown in Table LXXXVI, below). These function keys include: 'Rte to Hdlr'; 'Rte to Other'; 'Rte to Queue'; 'Med Pay'; and 'Unmatched'.

The 'Rte to Handler' function key routes a claim related piece of General Mail or Returned Text to the Incoming Mailbox of the handler assigned to the claim, as determined from the handler's initials in the Loss Claim database table. (The initials of the handler assigned to the claim must correspond to the initials of an existing staff member on the Staff Tables. The System will compare the handler's initials against the Staff Tables to determine whether the assigned staff member still works in the office. If the staff member is no longer present, the System will automatically default to the supervisor's initials and route the image accordingly.)

TABLE LXXXVI

```
WORKSTATION 196 - USER BJS - Barbara J. Synodinos
12:00:49 pm   Tuesday   September 17, 1991
********************************************************************************************
****          1           2           3           4           5           6           7           8 ****
**** 12345678901234567890123456789012345678901234567890123456789012345678901234567890 ****
********************************************************************************************
*   *                                                                                   *   *
*  1*                              INFO SEARCH FACILITY                                  * 1 *
*  2*                                                                                   * 2 *
*  3*    Mail Qualifier: GM    Image Code: 0000 CENTRAL LIB DOC  Queue Priority:          * 3 *
*  4*                                                                                   * 4 *
*  5*    Claiment:     ******************************             OCR Start Page: 001     * 5 *
*  6*                                                                                   * 6 *
*  7*    Clm Number:  007   **   00006      Policy Number:   **    **    ******             * 7 *
*  8*                                                                                   * 8 *
*  9*    Enter "X" If Offline Search:  *                                                  * 9 *
* 10*                                                                                   *10 *
*  1*    Insured:     **************************************************                 * 1 *
*  2*                                                                                   * 2 *
*  3*    If Known, Enter The Following Information:                                     * 3 *
*  4*                                                                                   * 4 *
*  5*             Loss Date:   ********          Seek Term:   ********  Thru   ********   * 5 *
*  6*                                                                                   * 6 *
*  7*    Insured   Address:  St:  **   Zip:   *****                                      * 7 *
*  8*    Claiment Address:  St:  **   Zip:   *****                                       * 8 *
*  9*                                                                                   * 9 *
* 20* Enter) Search   10) Exact Match    14) Unmatched   26) Print Image   16) Return   *20 *
*  1* 1) Refresh      11) Rte to Hdlr    19) Split Doc   27) Fax Image     17) NT       * 1 *
*  2* 2) Chng Types   12) Rte to Other   23) LC                            18) Help     * 2 *
*  3* 9) Med Pay      13) Rte to Queue                                                  * 3 *
*  4*                                                                                   * 4 *
*   *                                                                                   *   *
** ******************************************************************************************
****          1           2           3           4           5           6           7           8 ****
**** 12345678901234567890123456789012345678901234567890123456789012345678901234567890 ****
********************************************************************************************
```

The 'Rte to Other' function key will display a screen (not shown) that is prefilled with the handler's initials. These initials can be changed to any valid initials to route a piece of claim related General Mail to some specified staff member other than the handler. This function key will also route non-claim related General Mail to any specified staff member. Lastly, it will route any piece of Priority Mail to the appropriate recipient in the office (the intended recipients initials of this type of mail cannot be modified).

The 'Rte to Queue' function key is used to route mail designated with a Mail Qualifier to its corresponding queue (e.g. 'LN' to the Prescreener's Queue, 'GM' to the General Mail Queue, 'RT' to an OCR Queue and 'CL' to the Reference Queue.

The 'Med Pay' function key will route General Mail with a "Bill (Medical)" Image Type or a "Vendor Report" Image Type to the Med Pay Queue, the file or the Image Print Queue, as appropriate.

The 'Unmatched' function key routes General Mail to the Unmatched Mail Queue. As discussed above, mail which cannot be matched with a claim on the System database is routed to the Unmatched Mail Queue.

n. Investigative Instructions

Investigative Instructions, as with the first embodiment, are used to send claim related instructions, regarding obtaining documentation, to a staff member. However, in the second embodiment, this function has been enhanced.

The text of the Investigative Instructions is written to the Activity Log and additional comments can be added via the Activity Log Add screen. The staff member to whom the instructions have been routed is informed of the presence of the instructions and all associated images by an entry in his Referral Mailbox.

In practice, an operator who wishes to associate one or more images with Investigative Instructions either moves first to the Investigative Instructions input screen (shown in Table LXXXIV, below), via a 'Next Trans' code of 'INST' and then into the Image List or the Central Library. Once in the Image List or Central Library, the operator selects one or more documents and "Image Carry" to bring the selected documents to the Investigative Instructions function. Alternatively, the operator can, while in any System function providing access to a linked documents, specify "Image Carry," and then use 'Next Trans' to move into Investigative Instructions. When the Investigative Instructions input screen is displayed, and any appropriate images have been selected and carried forward, the actual instructions can be created by choosing the appropriate documentation to be obtained (See Table LXXXVII). The chosen instructions will automatically generate a corresponding comment to the Activity Log. However, by selecting an 'Add Activity Log Comments' function key, additional manual comments can be added. Ultimately, the instructions are routed to the handler's Referral Mailbox (See Table LXXXVIII, below). An entry then appears in the Referral Mailbox which indicates the existence of the instructions and any associated images. However, the instructions and the images themselves can only be viewed from within the Activity Log.

TABLE LXXXVII

```
WORKSTATION 83 - USER BJS - Barbara J. Synodinos
10:27:31 am   Monday   October 21, 1991
*****************************************************************************************
****        1         2         3         4         5         6         7         8 ****
**** 12345678901234567890123456789012345678901234567890123456789012345678901234567890 ****
*****************************************************************************************
*   *                                                                           *   *
*  1*                       INVESTIGATIVE INSTRUCTIONS                          * 1 *
*  2*                                                                           * 2 *
*  3*      Claim Number:     007  DP  00068    Loss Date: 10/10/91              * 3 *
*  4*      Insured Name:     SMITH, JEFFREY                                     * 4 *
*  5*           Claiment:    SMITH,JEFFREY                                      * 5 *
*  6*                                                                           * 6 *
*  7*      SEL  OBTAIN                         SEL  OBTAIN                      * 7 *
*  8*                                                                           * 8 *
*  9*        Stmt:  * Ins.  * Clmt.  * Wit.     Photos:  * Scene * IV * OV      * 9 *
* 10*                                                                           *10 *
*  1*      * Police Report                     * Wage & Medical Authorization   * 1 *
*  2*                                                                           * 2 *
*  3*      * Costimator                        * Appraisal/Estimate             * 3 *
*  4*                                                                           * 4 *
*  5*      * Diagram                           * Fire Report                    * 5 *
*  6*                                                                           * 6 *
*  7*      * Lease Agreement                   * Purchase Receipts/Invoices     * 7 *
*  8*                                                                           * 8 *
*  9*                                                                           * 9 *
* 20*        Route to: BJS   Next Trans: REFR   Date Carry: *   Image Carry *   *20 *
*  1*                                                                           * 1 *
*  2*   ENTER) Route         6) Add Activity Log Comments     18) Help   24) CLIB  * 2 *
*  3*   1) Display Image(s)  13) Image List                   23) LC     32) Cancel * 3 *
*  4*                                                                           * 4 *
*   *                                                                           *   *
** **************************************************************************************
****        1         2         3         4         5         6         7         8 ****
**** 12345678901234567890123456789012345678901234567890123456789012345678901234567890 ****
*****************************************************************************************
```

TABLE LXXXVIII

```
WORKSTATION 83 - USER BJS - Barbara J. Synodinos
10:27:59 am   Monday   October 21, 1991
*****************************************************************************************
****        1         2         3         4         5         6         7         8 ****
**** 12345678901234567890123456789012345678901234567890123456789012345678901234567890 ****
*****************************************************************************************
*   *                                                                           *   *
*  1*                            REFERRAL MAILBOX                               * 1 *
*  2*                                 For BJS                                   * 2 *
*  3*   Type/       Insured Name                                        Routed  * 3 *
*  4*   Revw/Pgs    Date     Time        Claim Number    Claimant Name    By    * 4 *
*  5* * L LPTX      MATTHEWS INTERNATIONAL                               BJS     * 5 *
*  6*   N     1     10/16/91 11:26:16.33             00000                       * 6 *
*  7*                                                                           * 7 *
*  8* * I INST      SMITH, JEFFREY                                       BJS     * 8 *
*  9*   N     M     10/21/91 10:27:40.93   007  DP   00068  SMITH, JEFFREY       * 9 *
* 10*                                                                           *10 *
*  1* * I INST      SMITH, JEFFREY                                       BJS     * 1 *
*  2*   N     M     10/21/91 10:26:22.85   007  DP   00068  SMITH, JEFFREY       * 2 *
*  3*                                                                           * 3 *
*  4* * I INST      ERRETT, JAMES E                                      BJS     * 4 *
*  5*   Y     M     04/14/91 13:02:05.41   007 K AC  00006  YOUNG, WILLIAM       * 5 *
*  6*                                                                           * 6 *
*  7*                                                                           * 7 *
*  8*                                                                           * 8 *
*  9*                                                                           * 9 *
* 20*       Position cursor in front of item to be reviewed and press ENTER     *20 *
*  1*                         9) Select Type         17) NT                     * 1 *
*  2*                         11) Change Initials    23) LC                     * 2 *
*  3*   8) Delete                                                  16) Return   * 3 *
*  4*                                                                           * 4 *
*   *                                                                           *   *
** **************************************************************************************
****        1         2         3         4         5         6         7         8 ****
**** 12345678901234567890123456789012345678901234567890123456789012345678901234567890 ****
*****************************************************************************************
```

o. Payments

The Payments function has been enhanced to provide additional functionality over that in the first embodiment. This enhancement is directed to the support of images. Single or multiple linked images for a claim can be carried into the Payment function to provide substantiating documentation.

When a payment is completed and "processed" from a Payment Route/Process screen (shown in Table LXXXIX, below) the images selected in support of the payment are automatically linked with an automatically generated Activity Log comment.

TABLE LXXXIX

```
WORKSTATION 131 - USER PXA - Pam Abbruzzeee
4:54:53 pm   Friday   September 20, 1991
*******************************************************************************************
****          1          2          3          4          5          6          7          8 ****
**** 1234567890123456789012345678901234567890123456789012345678901234567890123456789012345678901234567890 ****
*******************************************************************************************
*  *                                                                                   *  *
* 1*                                                                                  * 1 *
* 2*                                                                                  * 2 *
* 3*                                                                                  * 3 *
* 4*                           PAYMENT - ROUTE / PROCESS                              * 4 *
* 5*                                                                                  * 5 *
* 6*    Clm Num: 007   C   00065                  Issue Office Code: 515              * 6 *
* 7*                                                                                  * 7 *
* 8*                                                                                  * 8 *
* 9*                      ROUTE TO INITIALS :   ***                                   * 9 *
*10*                                                                                  *10 *
* 1*                         DIARY INITIALS :   ***                                   * 1 *
* 2*                                                                                  * 2 *
* 3*                                                                                  * 3 *
* 4*                                     PT:   *                                      * 4 *
* 5*                                                                                  * 5 *
* 6*                                    PTA:   MPAY                                   * 6 *
* 7*                                                                                  * 7 *
* 8*                                                                                  * 8 *
* 9*          Invalid NEXT TRANS - please respecify and press ENTER.                  * 9 *
*20*                  Next Trans: X     Data Carry:      Image Carry:                 *20 *
* 1*                                                                                  * 1 *
* 2*                                                                                  * 2 *
* 3*                                                                                  * 3 *
* 4*                                                                                  * 4 *
*  *                                                                                  *  *
** *****************************************************************************************
****          1          2          3          4          5          6          7          8 ****
**** 1234567890123456789012345678901234567890123456789012345678901234567890123456789012345678901234567890 ****
*******************************************************************************************
```

p. Directory Tables

The only real change in the Directory Tables application over that in the first embodiment is the addition of the ability to Autodial or send Faxes through the Directory Tables and the corresponding additional data fields to achieve these functions.

These additions enhance the overall application by providing access to the information necessary to send faxes or make telephone calls from virtually anywhere in the System.

q. Rescan Queue

The Rescan Queue is a facility used to correct problems associated with the quality of a scanned document. Such problems typically, include skewing, light or dark images.

The rescanning of documents can be requested from the LPTX function, the Prescreener's Queue, any Incoming Mailbox, the General Mail Routing Facility, the Unmatched Mail Queue and the Reference Queue. The request for a rescan eliminates the entry from the queue from which the request was made and writes an entry to the Rescan Queue (See Table XC, below). When the document is scanned in again, it will replace the old, unreadable document/image. The old document/image will no longer be on the System.

r. Document Manager

The Document Manager function gives the user the ability to: split; rearrange; delete; copy or insert documents. Splitting turns a multi-page document into a specified number of documents.

TABLE XC

```
WORKSTATION 196 - USER BJS - Barbara J. Synodinos
11:53:51 am   Tuesday   September 17, 1991
*****************************************************************************************
****        1         2         3         4         5         6         7         8 ****
**** 12345678901234567890123456789012345678901234567890123456789012345678901234567890 ****
*****************************************************************************************
*  *                                                                               *  *
*  1*                                                                              * 1 *
*  2*                              RESCAN QUEUE                                    * 2 *
*  3*                                                                              * 3 *
*  4*                                              Number                   Rescan * 4 *
*  5*  Scan Date/   Scan Time/    Scanner  Mail    of                    Requestor * 5 *
*  6*  Q Arrv Date  Q Arrv Time   Initials Type    Pages   Image Type     Initials * 6 *
*  7*                                                                              * 7 *
*  8* *04/08/91     13:09:10.23   LAE      LN      001                       LAE   * 8 *
*  9*  04/08/91     14:37:19.17                                                    * 9 *
* 10*                                                                              *10 *
*  1* *06/10/91     13:40:41.31   GRH      GM      001     ATTORNEY LETT     GRH   * 1 *
*  2*  06/17/91     14:38:21.74                                                    * 2 *
*  3*                                                                              * 3 *
*  4* *06/10/91     13:44:25.96   GRH      GM      001     DIAGRAM           GRH   * 4 *
*  5*  06/17/91     14:38:32.02                                                    * 5 *
*  6*                                                                              * 6 *
*  7* *06/10/91     13:46:48.43   GRH      GM      001     BILL (MEDICAL)    GRH   * 7 *
*  8*  06/17/91     14:38:39.24                                                    * 8 *
*  9*                                                                              * 9 *
* 20*                                                                              *20 *
*  1* Enter)  Display Image                                                        * 1 *
*  2*                                                                   16) Return * 2 *
*  3* 5) Next / Last                                                    17) NT     * 3 *
*  4*                                                                              * 4 *
*  *                                                                               *  *
*****************************************************************************************
****        1         2         3         4         5         6         7         8 ****
**** 12345678901234567890123456789012345678901234567890123456789012345678901234567890 ****
*****************************************************************************************
```

Rearranging changes the order of pages within a document. Deleting eliminates pages and/or a complete document. Copying causes the duplication of a processed document. Inserting permits the insertion of pages into one existing document from another existing document. Some or all of these feature are available from the General Mail Routing Facility, the Unmatched Mail Queue, the Prescreener's Queue, the Image List and the Reference Queue. (An example of a Document Manager input screen from the Image List is shown in Table XCI, below).

TABLE XCI

```
WORKSTATION 132 - USER BJS - Barbara J. Synodinos
2:47:16 pm   Friday   September 20, 1991
*******************************************************************************************
****          1         2         3         4         5         6         7         8 ****
**** 1234567890123456789012345678901234567890123456789012345678901234567890123456789 0 ****
*******************************************************************************************
*   *                                                                                *   *
*  1*                                                                                * 1 *
*  2*                          IMAGE LIST DOCUMENT MANAGER                           * 2 *
*  3*                                                                                * 3 *
*  4*   Img                          Link      Claim                         Link    * 4 *
*  5*   Stat    Image Type           Date      Number       Description      By      * 5 *
*  6*                                                                                * 6 *
*  7*    I     CARRIER LETTER                   007 C 00081                          * 7 *
*  8*                                                                                * 8 *
*  9*                                                                                * 9 *
* 10*                                                                                *10 *
*  1*                                                                                * 1 *
*  2*                               Enter) Display                                   * 2 *
*  3*                                  1) Split Document                             * 3 *
*  4*                                  2) Insert Document                            * 4 *
*  5*                                  3) Rearrange Document                         * 5 *
*  6*                                  4) Delete Document                            * 6 *
*  7*                                  5) Copy Document                              * 7 *
*  8*                                                                                * 8 *
*  9*                                 16) Return                                     * 9 *
* 20*                                                                                *20 *
*  1*                                                                                * 1 *
*  2*                                                                                * 2 *
*  3*                                                                                * 3 *
*  4*                                                                                * 4 *
*   *                                                                                *   *
** ****************************************************************************************
****          1         2         3         4         5         6         7         8 ****
**** 12345678901234567890123456789012345678901234567890123456789012345678901234567890 ****
*******************************************************************************************
```

The ability to manipulate image documents relies, in part, on the integration of Wang® WIIS software into the present System. This is accomplished through API's which interface the WIIS software with the rest of the System.

s. Staff Tables

The Staff Tables are not really a System function. Rather, the Staff Tables are a series of input screens which permit an authorized user to set the System parameters that will govern each user's access to the various System functions. The Staff Tables input screens act as a vehicle to capture information about each staff member and his authority level for updating a Staff Member database table. In this respect, the Staff Tables are the same as in the first embodiment. In the second embodiment, however, additional input fields are provided to capture additional criteria information.

The Modify Staff Member input screens reproduced in Tables XCII and XCIII below, show all the input fields preferably associated with each Staff Member's record in the Staff Member database table. With respect to the second embodiment of the present invention, the following fields have been added to the Staff Tables: Telephone Number; Extension; Prompt ID; Fax Number; Prescreener's Queue Access; Reference Queue Authority; LPT Input Authority; and LPT Work Access and LOB (Line of Business) Ind.

The Telephone Number and Extension and Prompt ID fields are for information which is used by the Autodial and Agency Inquiry functions associated with the System. As discussed above, the

TABLE XCII

```
WORKSTATION 196 - USER BJS - Barbara J. Synodinos
11:25:50 am   Tuesday   September 17, 1991
*******************************************************************************************
****          1         2         3         4         5         6         7         8 ****
**** 12345678901234567890123456789012345678901234567890123456789012345678901234567890 ****
*******************************************************************************************
```

TABLE XCII-continued

```
*   *                                                                  *   *
*  1*                        MODIFY STAFF MEMBER                       * 1 *
*  2*                                                                  * 2 *
*  3*             Staff Table For: BJS                                 * 3 *
*  4*     Last Name: SYNODINOS***********     First Name: BARBARA***   * 4 *
*  5*         FOCS Supv/OR Code : BS 9999 C                            * 5 *
*  6*           Telephone Number  : 275-1327************     Ext: 1327 * 6 *
*  7*                   Prompt ID : 0401       Fax Number : 275-1344************   * 7 *
*  8*                   Job Title : OUTSIDE CLAIM REP*************     * 8 *
*  9*                        Unit: FHU*******     Unit Number  : 02    * 9 *
* 10*                     AMC: 3                Default Menu : 03      *10 *
*  1*        Job Description Code : OCR    State License: ********************  * 1 *
*  2*                  Supervisor : MJR        Alert Meg Rec.  : MJR   * 2 *
*  3*               Out of Office : ********  to  ********  Type : *  (V-S-T)  * 3 *
*  4*  Caseload/New Assignments  : 010     Caseload Outstanding : 0000010      * 4 *
*  5*        Diary Limit per Day : 10                                  * 5 *
*  6*         Daily Rollover Limit  -   Per Day: 010     Per Claim : 010       * 6 *
*  7*                       Generhfe SuperAllsOthDiary30Compensation   * 7 *
*  8*   Generate Handlers Diary - Compensation: 10    All Others  : 10 * 8 *
*  9*   Termination/Transfer Date : ********                           * 9 *
* 20*        Primary Office Code : 515                                 *20 *
*  1*                                       Next Trans : ****          * 1 *
*  2*   ENTER) Modify    5) Authorities   14) Valid JDC-AMC Combinations   18) Help   * 2 *
*  3*             13) Valid Administration Units          23) LC    32) Cancel     * 3 *
*  4*                                                                  * 4 *
*   *                                                                  *   *
** *********************************************************************************
****        1         2         3         4         5         6         7         8 ****
**** 12345678901234567890123456789012345678901234567890123456789012345678901234567890 ****
************************************************************************************
```

Autodial function provides staff members with the ability to place telephone calls through the System. First, the Autodial function is selected, a menu screen is displayed, and a category of telephone number is chosen. Then, the user selects the appropriate number and activates the calling sequence. The STEP application is then invoked and the user's extension, as

TABLE XCIII

```
WORKSTATION 196 - USER BJS - Barbara J. Synodinos
11:25:53 am   Tuesday   September 17, 1991
************************************************************************************
****        1         2         3         4         5         6         7         8 ****
**** 12345678901234567890123456789012345678901234567890123456789012345678901234567890 ****
************************************************************************************
*   *                                                                  *   *
*  1*                     MODIFY STAFF MEMBER                  Page 2  * 1 *
*  2*                                                                  * 2 *
*  3*              Staff Table For: BJS                                * 3 *
*  4*     Last Name: SYNODINOS            First Name: BARBARA          * 4 *
*  5*                                                                  * 5 *
*  6*                                                                  * 6 *
*  7*                                                                  * 7 *
*  8*                                                                  * 8 *
*  9*              Payment Authority : 10000                           * 9 *
* 10*                   Trans Review : N          (Y-N)                *10 *
*  1*              Reserve Authority : 10000                           * 1 *
*  2*            Staff Table Authority : A        (A-B-C-D-E)          * 2 *
*  3*            Other Table Authority : Y        (Y-N)                * 3 *
*  4*         Prescreener Queue Access : B                             * 4 *
*  5*        Reference Queue Authority : Y                             * 5 *
*  6*              LPT Input Authority : CA                            * 6 *
*  7*    LPT Work Access and LCB Ind  : B                              * 7 *
*  8*                                                                  * 8 *
*  9*            Authorizer: MJR      Updater: BJS                     * 9 *
* 20*                                          Next Trans: ****        *20 *
*  1*                                                                  * 1 *
*  2*       ENTER) Modify      4) Previous Screen     18) Help         * 2 *
*  3*                                                 23) LC    32) Cancel  * 3 *
*  4*                                                                  * 4 *
*   *                                                                  *   *
** *********************************************************************************
****        1         2         3         4         5         6         7         8 ****
**** 12345678901234567890123456789012345678901234567890123456789012345678901234567890 ****
************************************************************************************
```

identified in the Staff Tables, is called. The user speaks into the telephone and the application then physically places the call.

The Fax Number field is for use with staff members who are designated as Outside Claim Reps. When something is scanned into the System through MSCN, and is then attached to a file that is assigned to someone with a Job Description Code of 'OCR' the System will automatically look for a fax number, in the Staff Tables, to which the scanned document will automatically be faxed.

The other fields all control a staff member's access to various queues and functions in the System. In some cases, access is either simply allowed or denied. In other cases, varying levels of authority and/or access can be set.

t. Image Carry/Data Carry

Data Carry and Image Carry are designations within the System for the carrying of image and/or text data between various System functions.

Data Carry, which is part of the first embodiment as well, allows an operator to keep working on the same claim as he moves between functions. In some cases, Data Carry is automatic (e.g. within input screens of the same function) and in others it must be explicitly requested by the user. When it is employed, Data Carry brings the appropriate information concerning a particular claim from one System function to the next. In other words, the database records associated with the particular chosen claim remain "accessed" such that data fields in the display screens of the new function are prefilled with all corresponding information from the claim's database record. Data Carry is not available between all functions.

Image Carry is similar to Data Carry, except that the emphasis with Image Carry is on one or more particular images rather than a particular claim. While Image Carry and Data Carry are mutually exclusive in terms of operation, they are frequently used together. As with Data Carry, Image Carry is automatic in some cases (e.g. when moving from the Mailbox function to the Activity Log the System brings the image along) and user invoked in others. With Image Carry the image(s)/document(s) which have been selected in one function are automatically carried into the next function for manipulation, display or further linking (only previously linked documents can be carried forward with Image Carry). Image Carry, like Data Carry, is not available between all functions.

u. Logical Scan/Free-Form Input

The second embodiment of the present invention also provides a means by which electronic images can be annotated. This is accomplished, in part, through a software program called Wang®Freestyle. This program is integrated into the System via APIs. Freestyle allows free-form screen input via a stylus and a tablet which are electrically connected to each other and the operator's PC (a mouse or a keyboard can be used instead the stylus and tablet combination). A tablet card or the like is connected to the PC's CPU to permit the CPU to recognize the free-form screen input.

The stylus and tablet function as a pencil and paper combination. The writing appears on the PC's display screen and can be done on a displayed image document or on a blank screen.

Figure 25:
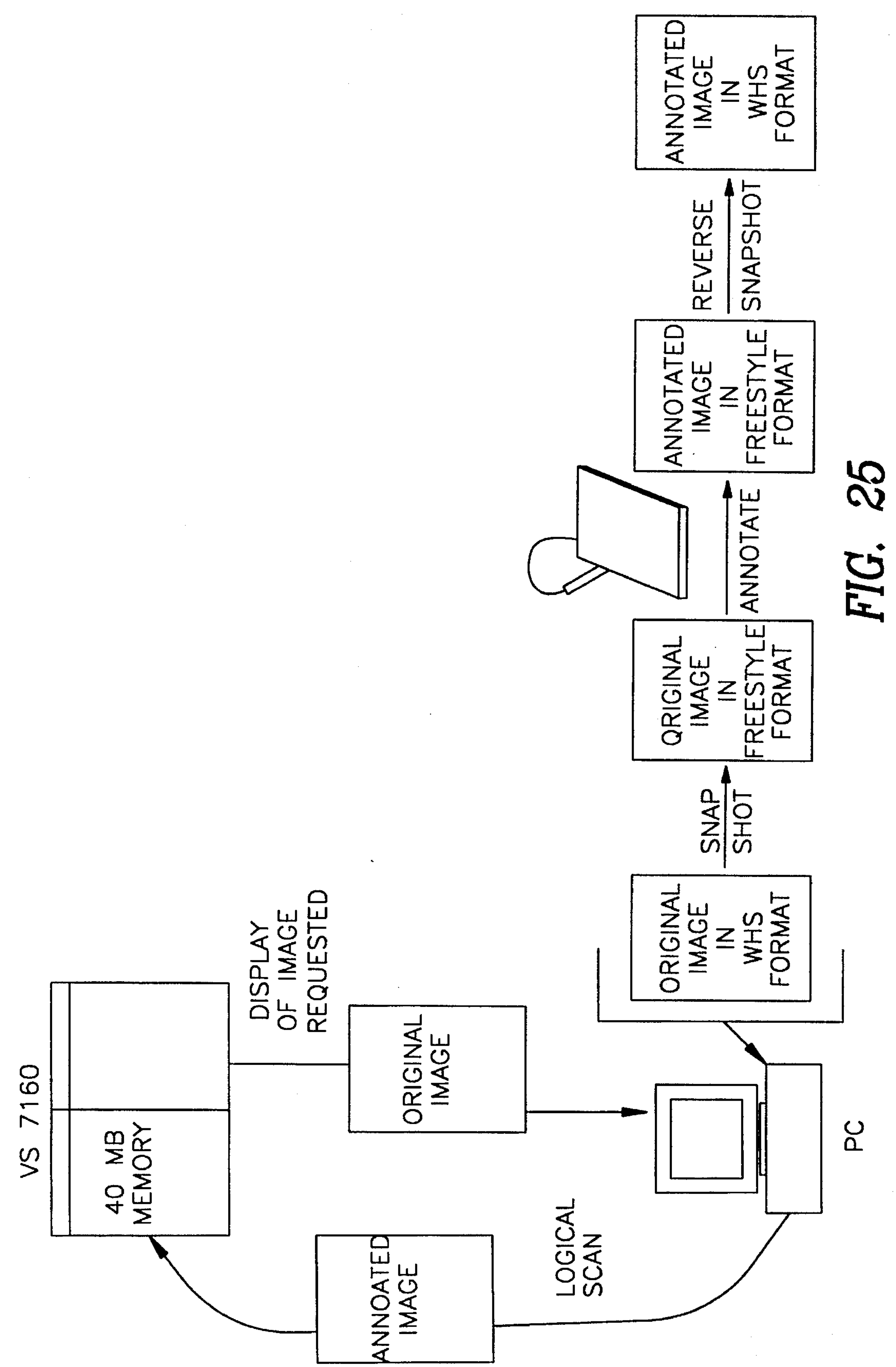
FIG. 25 is a block diagram depicting the annotation of an image in accordance with the second embodiment of the present invention.

Referring to FIG. 25, in order to annotate (mark up or write on) an image, the displayed image must be converted from Wang®WIIS format to Freestyle format using a Snap Shot function associated with the Wang® Freestyle software (which is resident on the PC). Once in this format, an operator can write or type all over the image using the stylus and tablet (or mouse) and/or keyboard. When the operator completes the annotation a Freestyle Reverse Snap Shot function is used to capture the annotations and convert them to WIIS format.

In order to save an annotated image, the user must invoke a 'Logical Scan' function key. The Logical Scan function "scans" the PC's memory (rather than a physical scan of a piece of paper), to bring the annotations to the Main CPU.

Since the integrity of the original image should preferably be preserved, the annotations are saved apart from the actual image. Then, when the user wishes to view or fax the annotated image, the image and the annotations are merged.

When a new document is created to through the Freestyle software, the resulting document can be attached as another page to an already existing image or as a stand-alone page through a Freestyle File Cabinet facility. The resulting document is then "sent up" to the main CPU where it is stored in a separate "File Cabinet" database which is integrated into the System. Annotated documents can be routed to a specific queue or a person mailbox and can either be associated with a claim number or not, depending upon the information input before the annotated document is sent to the File Cabinet.

All these free-form documents can be linked to the Activity Log or faxed out through the Fax Gateway like any other image.

v. Voice Mail/Agency Inquiry

The second embodiment of the present invention also incorporates the ability to work with voice data. Both incoming voice messages and incoming voice information requests can be handled by the System using voice data, without operator intervention.

1. Voice Mail

Figure 26:
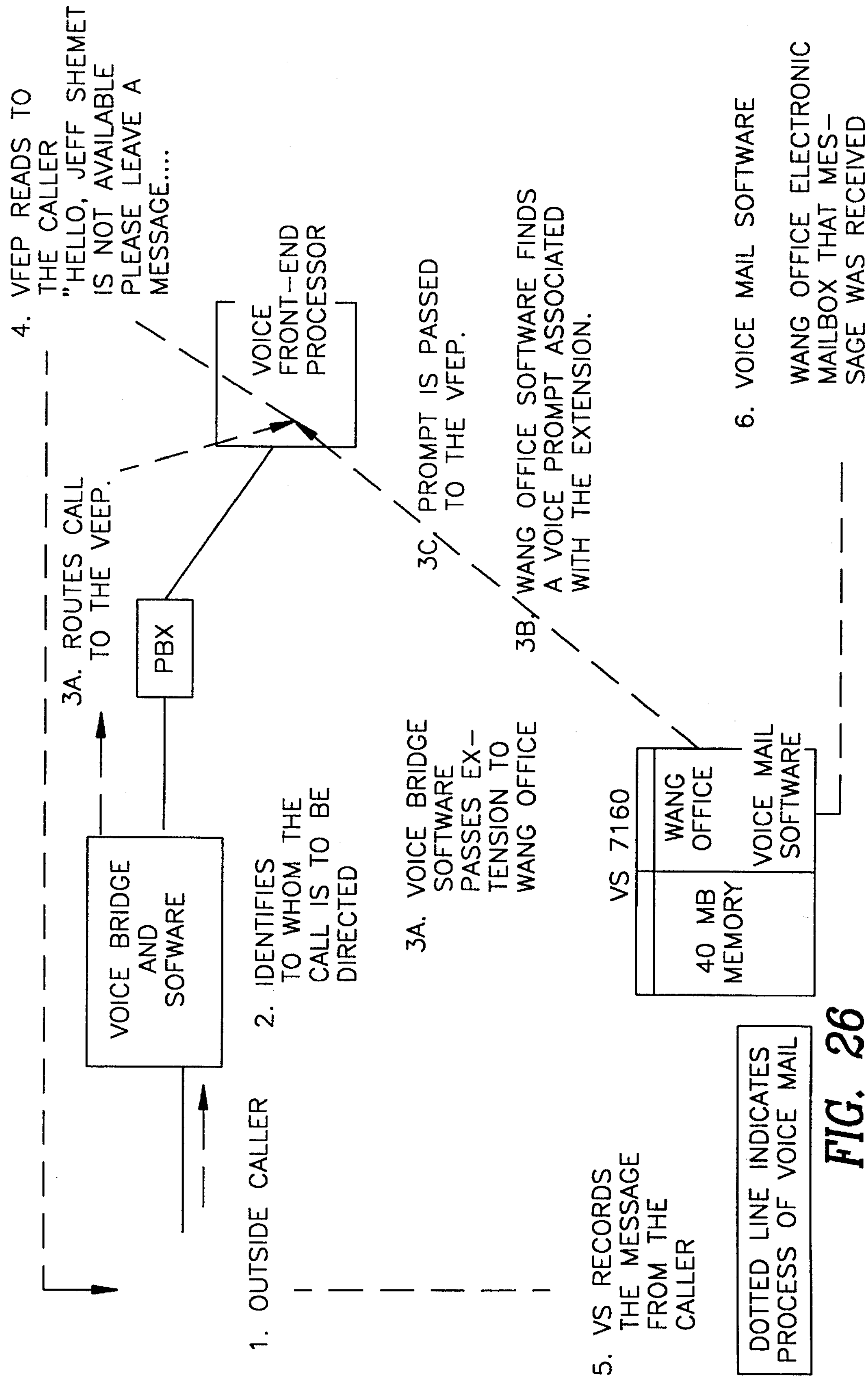
FIG. 26 is a block diagram depicting the operation of the Voice Mail portion of the System in accordance with the second embodiment of the present invention.

Referring to FIG. 26, when an outside call comes in for a staff member, it passes through a Voice Bridge (e.g. Model ATT 7405 SET) where Voice Bridge Software which is integrated into the System, identifies the extension number dialed. The extension number is then passed to the Main CPU, where Wang® Office software (integrated into the System) identifies the staff member being called and finds a voice prompt associated with that staff member. Simultaneously, the call is routed to the Voice Front End Processor. The voice prompt is passed to the VFEP and the voice prompt message is played to the caller. When the voice prompt message is finished, the Main CPU records the caller verbal message in storage for subsequent playback. The Voice Bridge software then sends a message via Wang® Office E-Mail to the person being called that a message has been received in the "Voice Message Center." The user can then access the Voice Message Center from any touch tone phone and retrieve the message.

2. Agency Inquiry

Figure 27:
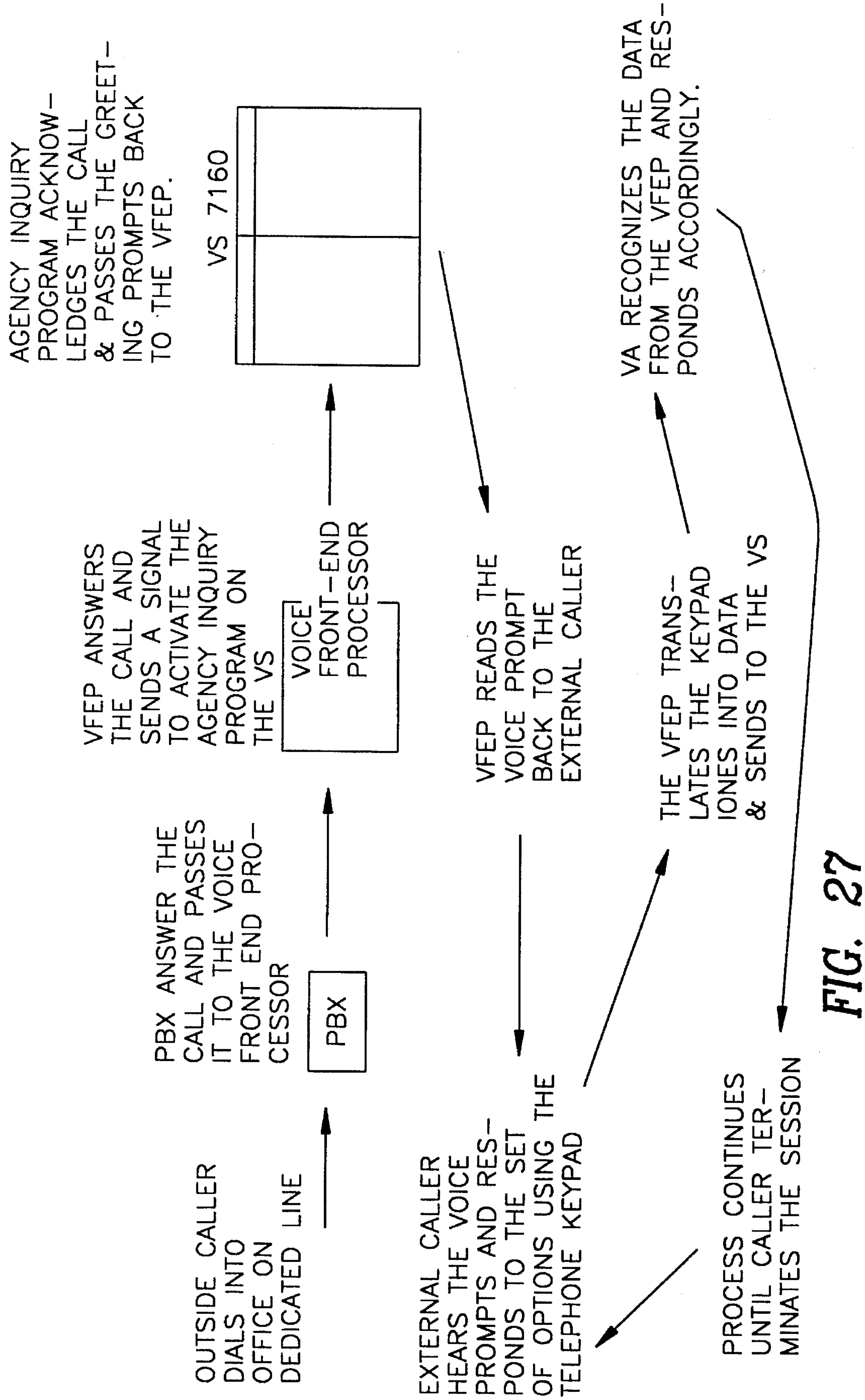
FIG. 27 is a block diagram depicting the operation of the Agency Inquiry portion of the system in accordance with the second embodiment of the present invention.

Referring to FIG. 27, Agency Inquiry provides a way for outside agents to remotely access the System and receive voice information regarding the status of a claim and various steps undertaken in its processing. Some of the information available to the agents includes: the name of the claim handler; whether the claim is open or closed; the date and amount of the last payment; reserve information; and the name of any involved attorney.

Two levels of security exist with respect to remote Agent Inquiries. The first level (User ID and Password) verifies the agent participation in business with the claim office and then permits access to the System. The second level limits the agents' access to information concerning only those claims originating from their own insureds. In response to a voice prompt, the agent enters the claim number of the claim for which he desires information through the telephone's keypad. The agent User ID is then compared to the validated agency code on the Loss Event Table record associated with the particular claim. If the ID matches the code, the System directs the VFEP to read the next prompt to the agent.

The agent response to voice options read by the VFEP via his telephone keypad. The tones generated over the telephone line by the keypad are translated into data by the VFEP and passed to the Main CPU. The Main CPU provides the appropriate response to the data and instructs the VFEP to read the response to the caller, in voice. This process continues until the caller terminates the session.

If desired the caller can, via the keypad, request the faxing of any Loss Notice (or other identified image) to the caller number on the Directory Tables. The caller also has the option of having his call transferred to the handler responsible for the claim (the handler is identified in the Loss Claim Table).

w. Outside Claim Representatives

As discussed above, Outside Claim Representatives ("reps") carry on claim handler activities out in the field. As such, they do not have direct (local) access the System in the claims office. Therefore, each rep preferably has a remote terminal system comprising a PC 256 with Freestyle software and an associated free-form input device 254 and a fax card 258. Peripherals include a desktop scanner 250 and a laser printer 252.

The reps establish communication with the Main CPU via a modem 248 and log on to the System in the same manner as in-office staff members (passing through the User ID and Password security). Once in the System, the reps can perform all non-image activities in the same manner as other in-office staff members. However, with respect to viewing images, in at least one version of the second embodiment the rep is limited to printing out images which have been faxed to him.

Figure 28:
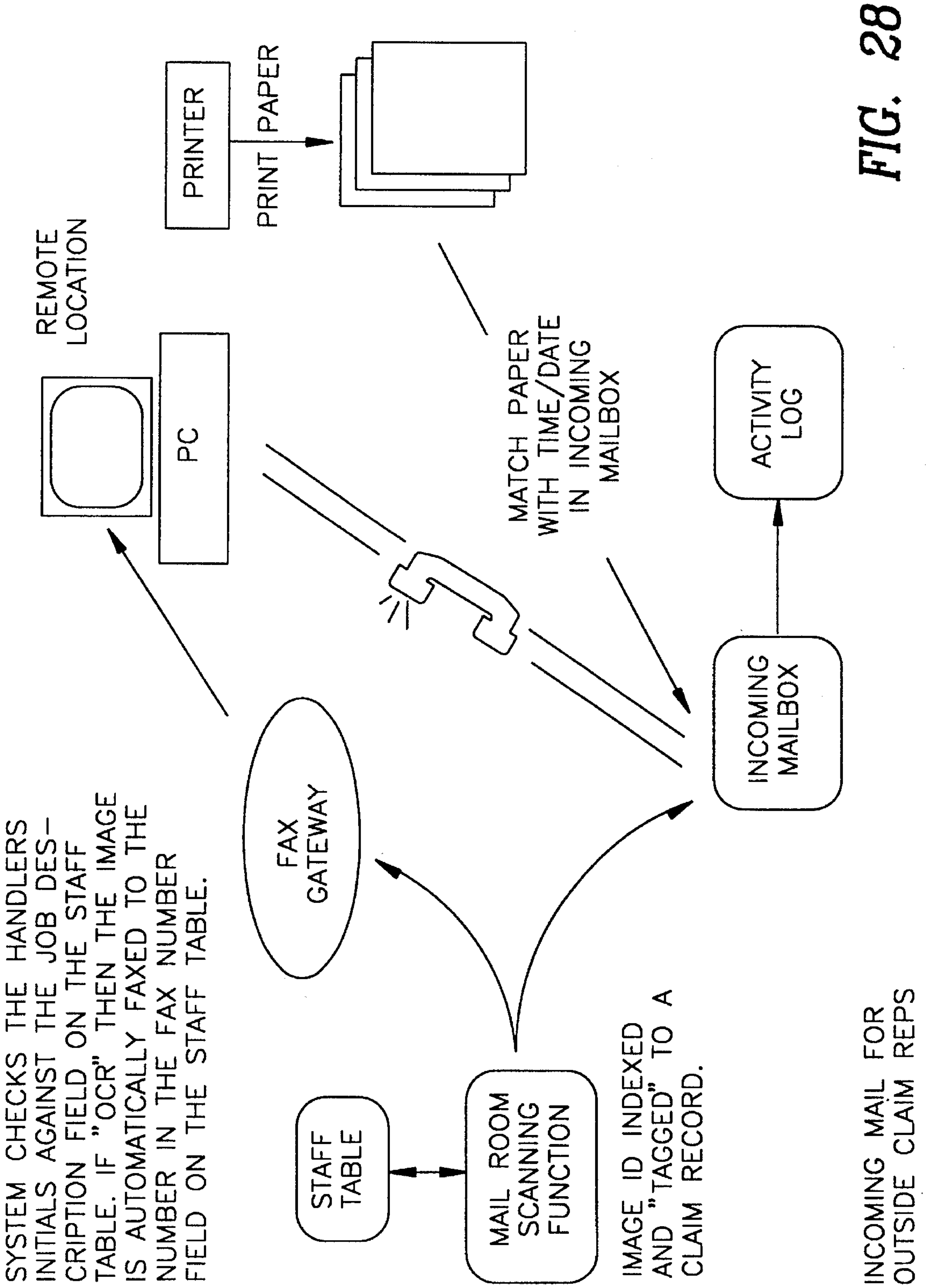
FIG. 28 is a block diagram depicting a first approach to image review by an Outside Claim Representative in accordance with the second embodiment of the present invention.

As shown in FIG. 28, when a piece of mail that belongs to a rep is received in the office, it is scanned in as with any other mail. When an image is tagged to a claim file, and the claim handler initials are verified with the Staff Tables for routing, the handler's job description filed is also checked. If, this field has the code 'OCR' then the System knows that an Outside Claim Rep is the handler and automatically faxes a copy of the scanned image, through the Fax Gateway, to the rep using the fax number in the rep's Staff Table record. The image is also routed to the rep's Incoming Mailbox, as with any other image. Additionally, when the System faxes an image out to the rep, it automatically sends a cover sheet with the time and date which corresponds to the queue arrival time in the Incoming Mailbox.

Before the rep remotely accesses the System, he typically prints copies of all the faxes sent to his fax card. This is preferably done via Wang® Freestyle which is resident on the rep's PC. Freestyle permits the rep to view or print the faxed image but does not permit the local viewing of a document simultaneously with rep's remote connection with the System. Thus, after logging on to the System and accessing his Incoming Mailbox, the rep generally compares the printed faxes' time and date information with the entries in the Incoming Mailbox. In this way, the rep can identify the images and can route link or otherwise manipulate the images without the necessity of simultaneously viewing them on his own display screen.

The rep also has the ability to take documents he generates in the course of his claim investigations and send them to the System as faxed images. This is accomplished by using Wang® Freestyle as the vehicle for accepting an image scanned by a scanner and sending the image out as a fax through the fax card. When the System receives the image through the Fax Gateway it is treated as Claim Rep Documentation where it is given a Mail Qualifier of 'CR' and automatically linked to the Activity Log with a generated comment.

The Outside Claim Rep procedures associated with the second embodiment eliminate the delay in claim reps handling their mail, which would otherwise accumulate in the claims office. This speeds the settling of claims and the paying of bills and provides the reps with access to the most up-to-date information available at any given time.

x. Remote Image Viewing

In another version of the second embodiment it is possible for Remote Claim Reps, other remote users, and/or in-office users to view images while logged on to the System with a minimum of time delay. This is accomplished through one or more of three approaches. In each case, the overriding concern is to minimize image retrieval and display time. This is because each image is an average of 60,000 bytes in size and because requested images may be stored on multiple optical disks which would then require physical disk interchange. Software, called Voyager®, is interfaced with the System via APIs. A special caching program is interfaced with the Voyager software to facilitate these operations.

1. Logical Optical Disk Caching

If an in-office user intends to locally view one or more images which reside on one or more optical disks, all the pages of all the documents may be retrieved, preferably at night, and placed on magnetic disk (which is used as a cache). This shortens retrieval time from as much as 30 seconds (or longer) to approximately 3–6 seconds. The image residence on magnetic disk is temporary and can be terminated as soon as the auditor has finished his review.

2. Anticipatory Remote Caching

When images are desired at a remote location, and can be identified in advance, the image documents can be sent to the remote site ahead of time (anticipatory cache) to vastly reduce interactive display response times. A specialized database query can be used to help identify which documents require anticipatory caching.

Figure 29:
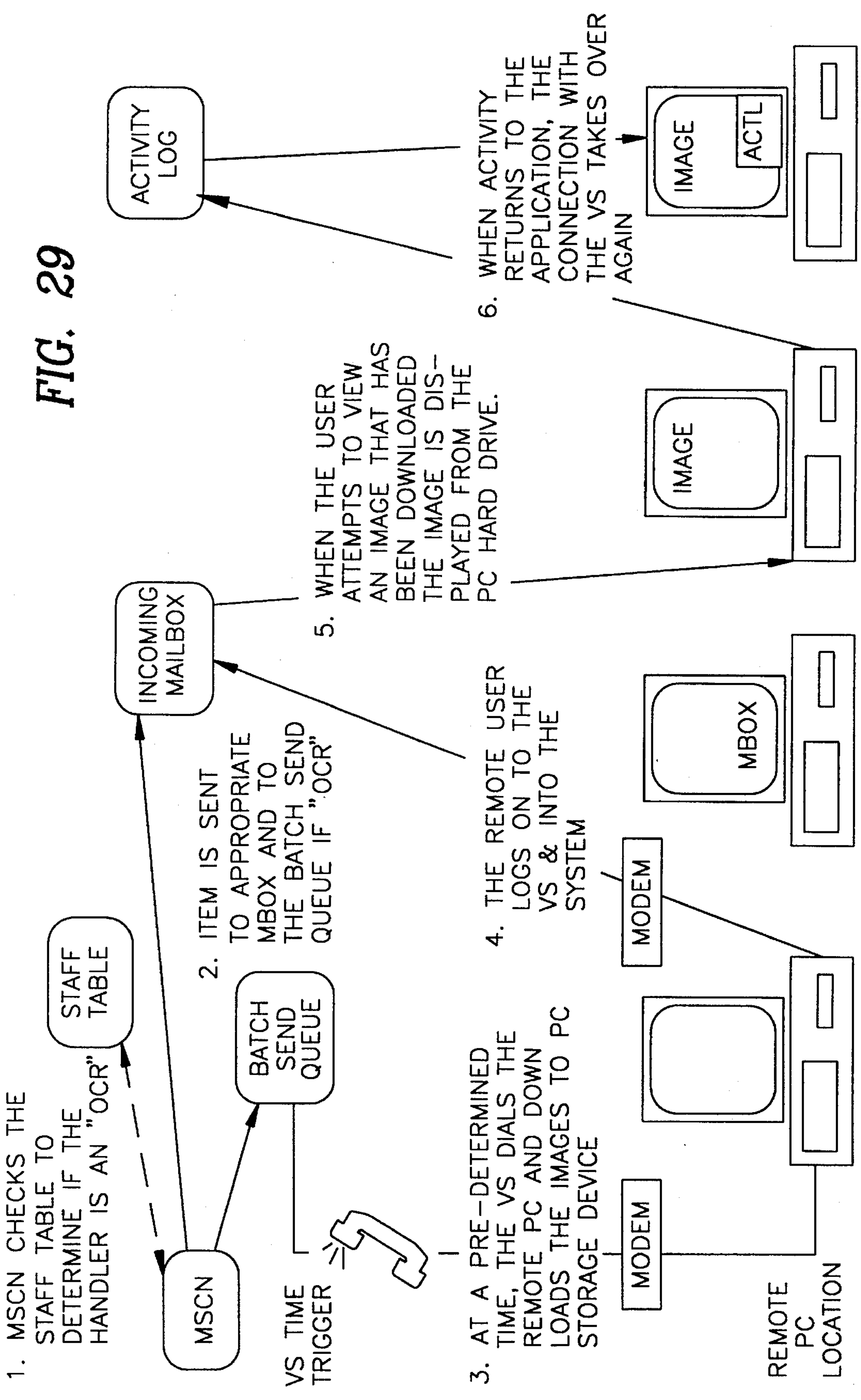
FIG. 29 is a block diagram depicting the Anticipatory Remote Caching approach to image review in accordance with the second embodiment of the present invention.

Referring to FIG. 29, with respect to Incoming Mail for an Outside Claim Rep, the System checks the Staff Tables to determine if the handler is an 'OCR'. If he is, the document gets routed to both a Batch Send Queue and the handler Incoming Mailbox. The System, which interfaces with the Voyager® software, takes the documents to be transferred to the rep's PC (as identified in the Batch Send Queue) and passes them to the Voyager® software which handles the actual transfer of the documents. This transfer is usually done during non-peak hours to minimize costs and computer time. The transferred image documents are stored on a storage device associated with the rep's PC. Thereafter, when the rep logs on to the System, any image which is identified in his Incoming Mailbox is immediately retrieved and displayed from the PC's storage device. Any linking or other routing of the image can still be done without any adverse impact since the original image still resides in the office on the magnetic or optical disk.

This same procedure can be done between offices, with the images being passed between Main CPUs. In this operation, the requesting office identifies the claims it wishes to see by claim number and all the associated images are designated for transfer. Thereafter, the Voyager® software physically transfers the images to the second office's Main CPU for storage on magnetic disk or the like. In this way, the second office can remotely log on to the first office's System and review the associated images simultaneously with a rapid response time.

3. . Interactive Caching

When either a rep, other remote user or other office requests a view of document which has not been anticipated, the first requested page is sent over the communication line. In addition to being displayed on the remote PC or via the Main CPU, it is stored on the rep's PC's storage device or Main CPU's storage device (magnetic disk). Any subsequent requested display of that page results in much quicker response because of the remote caching. The Interactive Caching occurs only at page level not at the document level.

In practice, the System passes the page to the interfaced Voyager® software which controls the actual page transfer to the remote PC or Main CPU.

y. Image Archiving

When images are initially scanned into the System, they are stored on magnetic disk for fast retrieval. Ten days after images associated with Workers' Compensation, Liability and NoFault Auto claims are linked, they are archived to optical disk. All other lines of business are archived to optical disk 90 days after the images have been linked.

The archival time for the images is based on the likelihood of image redisplay. The images associated with the claim types for which archival is done in 10 days, typically comprise medical bills and the like which are dealt with immediately and then are no longer necessary. Thus, these images need only be readily available for a very short time. For other claims involving property damage and the like (i.e. those which are kept on magnetic disk for 90 days), the review of the images is an ongoing and repetitive operation. However, since most of these claims are closed within 90 days, the images can be archived at that time. All these archival times are adjustable to allow a given office to determine its own processing times.

When a claim is closed (i.e. disposed of) it is archived to optical disk immediately. This overrides any other criterion. Similarly, through the Image List, a particular class of documents (e.g. all Loss Notices) or particular individual documents can be indefinitely designated for retention on magnetic disk, to avoid archiving.

All archiving is done automatically, preferably during offpeak hours.

z. Image Printing

Any image which has been scanned into the System can be printed. The same is true for any fax which has been received through the Fax Gateway.

Some images/documents are routed to an Image Print Queue (not shown). The Image Print Queue displays information including: claim number, requester and number of pages to identify the image to anyone monitoring printing operations. Once an image has been routed to the Image Print Queue, its printing can be cancelled, delayed or accelerated. Laser printers are preferably used to print images since they provide the best quality.

aa. Preferred Work Flows

As described above, the System includes many preferred work flows and accordingly, moves the user automatically to the next logical processing step. In most cases, the System will return error messages for attempts to circumvent the logical flows through the use of function keys. However, most preferred flows can be overridden by inputting a viable code in any 'Next Trans' field. (See the System Overview shown in FIGS. 38*a*–38*e*).

Generally, the most logical flows are invoked by simply hitting 'Enter'. The first level of a preferred work flow is screens with a particular function (e.g. the next in the series of LPTX input screens. The next level incorporates a decision acknowledging an image and automatically moving to the next logical function (e.g. from the General Mail Queue screen to the Info Search input screen). Other logical flows are preferably shown as options on the bottom of the particular input screen for invocation by various function keys. For example, from the Incoming Mailbox, if 'Enter' is hit, the image is automatically displayed. If the image is associated with a claim record, thereafter, the Activity Log is automatically displayed (simultaneously with the image) to allow the appropriate documentation to be made. If the image is not associated with a claim, the Info Search facility is automatically displayed to allow the user to further route the image or search the database(s).

bb. Work Measurement

As a user undertakes work through the System, the time he spends logged on is continuously monitored. If his work involves a particular claim and/or claim family, the time is attributed to that claim or claim family. The time spent in each application, with or without affiliation with a claim, is also monitored as a series of start-stop records. Accordingly, the goal of this feature is to be able to account for 100% of a staff member time during the course of a day as well as assessing the most efficient work patterns in terms of time and productivity.

Based on the collected time information, reports can be generated which indicate how much time is spent on each claim, how much time is spent on particular matters (e.g. scanning, reviewing mail, paying bills, inputting Loss Notices, etc.) and how much total time is spent on the System. These reports can be used to set individual as well as office-wide standards and goals for claim processing. The reports can also be used to pin-point superior and inferior time based performance by the staff members and used to assess the cost associated with the handling of a particular account and/or line of business in a specific geographical location.

An additional work measurement feature is the Mail Monitoring function. This function tracks the number of mail items scanned, the number of items processed or "worked" and the number of items outstanding on a daily basis. This information can be obtained for individual staff members as well. This permits management to ascertain the daily impact of incoming mail on the office and to provide feedback to staff members on their mail handling performance.

cc. Database Structure

The System of the second embodiment of the present invention preferably relies on four different databases. These databases include a Main database, a Purge database, a Document Locator database and a File Cabinet database. These databases reside on magnetic disk and can be readily accessed, as needed.

Figure 30:
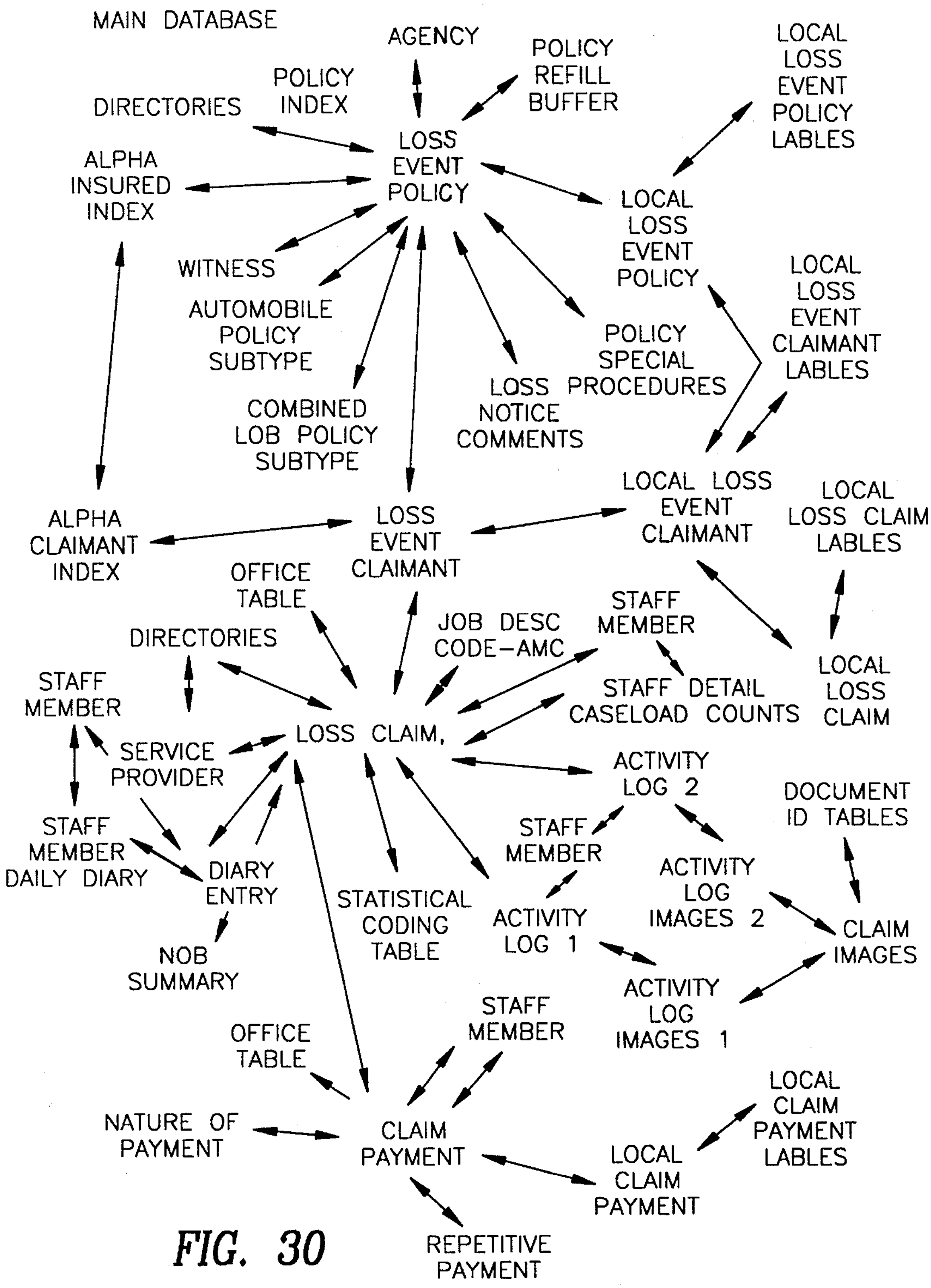
FIG. 30 is a block diagram depicting a flow diagram depicting the flow of information between database tables in accordance with the present invention.
Figure 31:
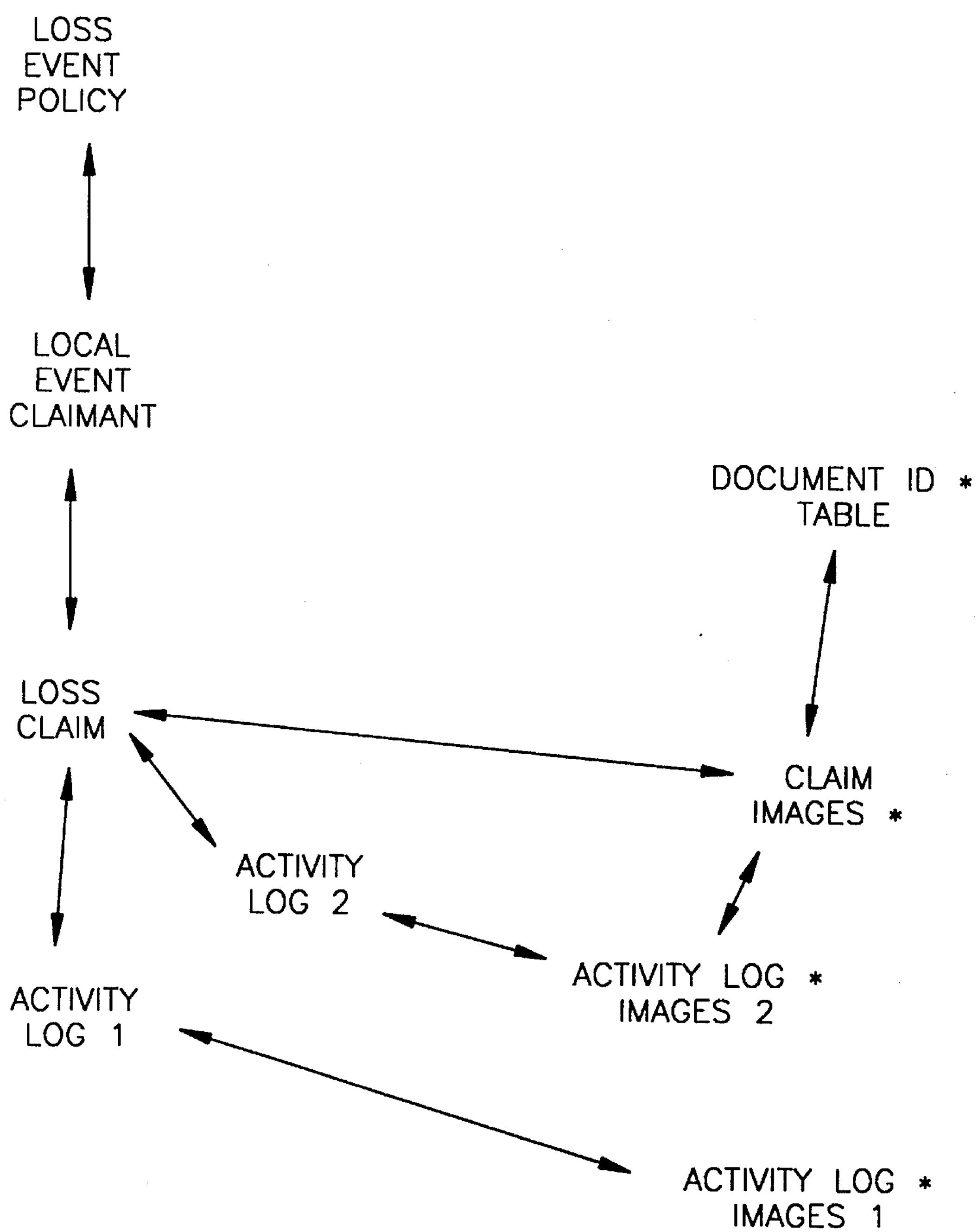
FIG. 31 is a flow diagram highlighting the database tables associated only with the second embodiment depicting the flow of information between the tables unique to the second embodiment and other database tables associated with the first and second embodiments.
Figure 32:
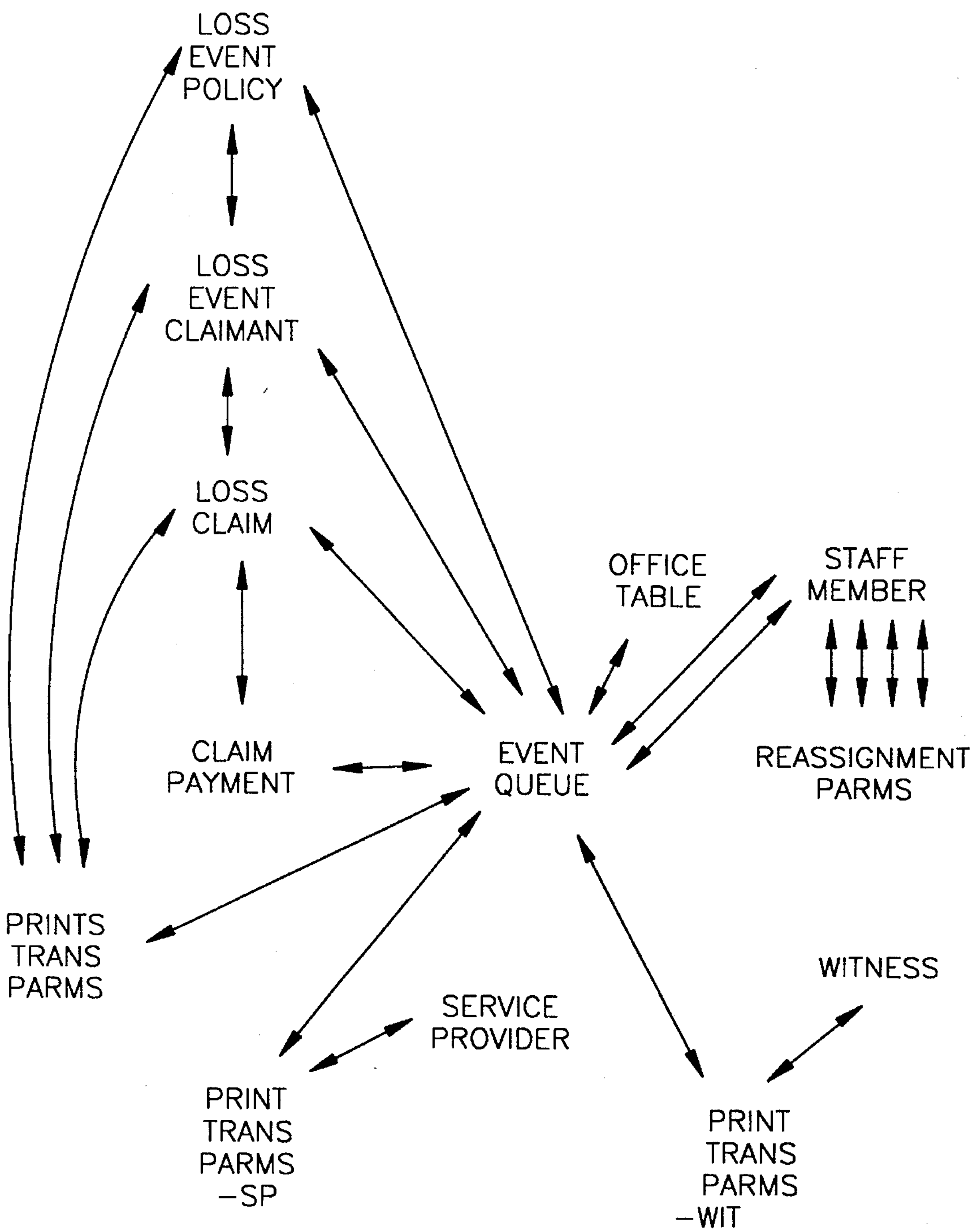
FIG. 32 is a flow diagram depicting the flow of information between the Event Queue Table and other database tables in accordance with the present invention.
Figure 33:
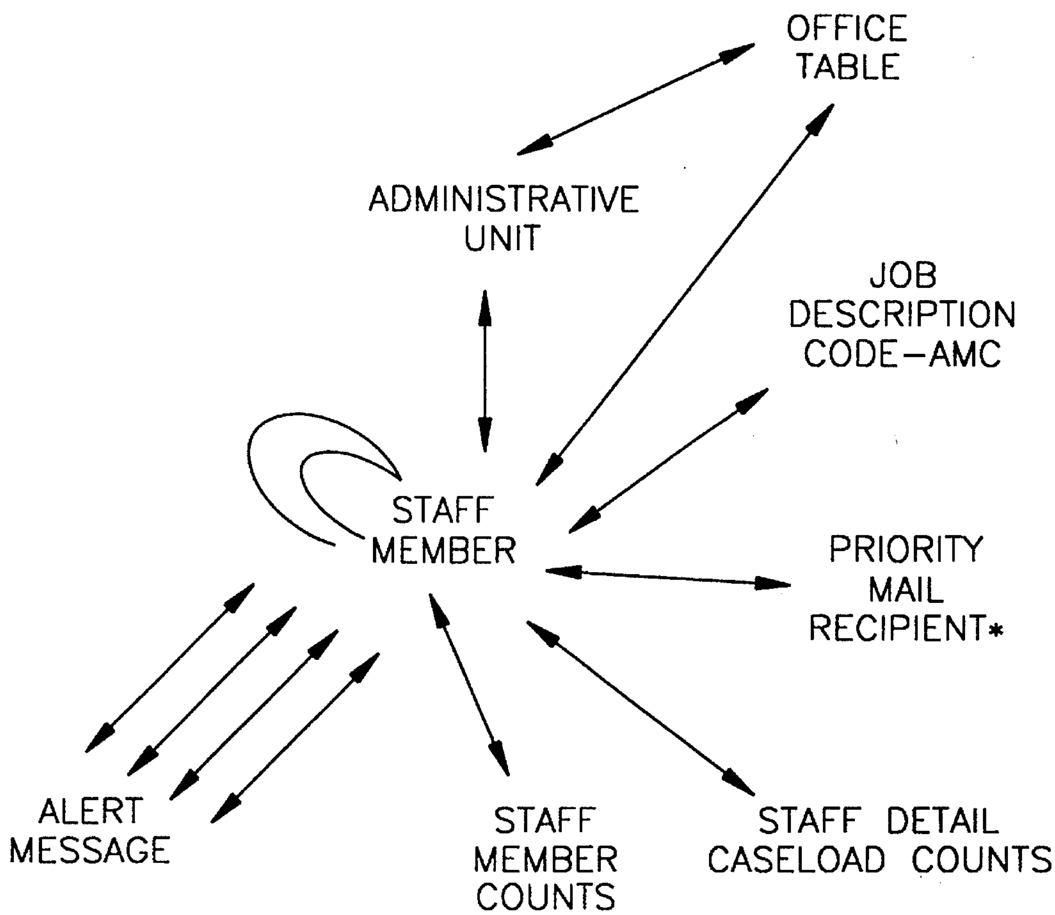
FIG. 33 is a flow diagram depicting the flow of information between the Staff Member Table and other database tables in accordance with the present invention.
Figure 34:
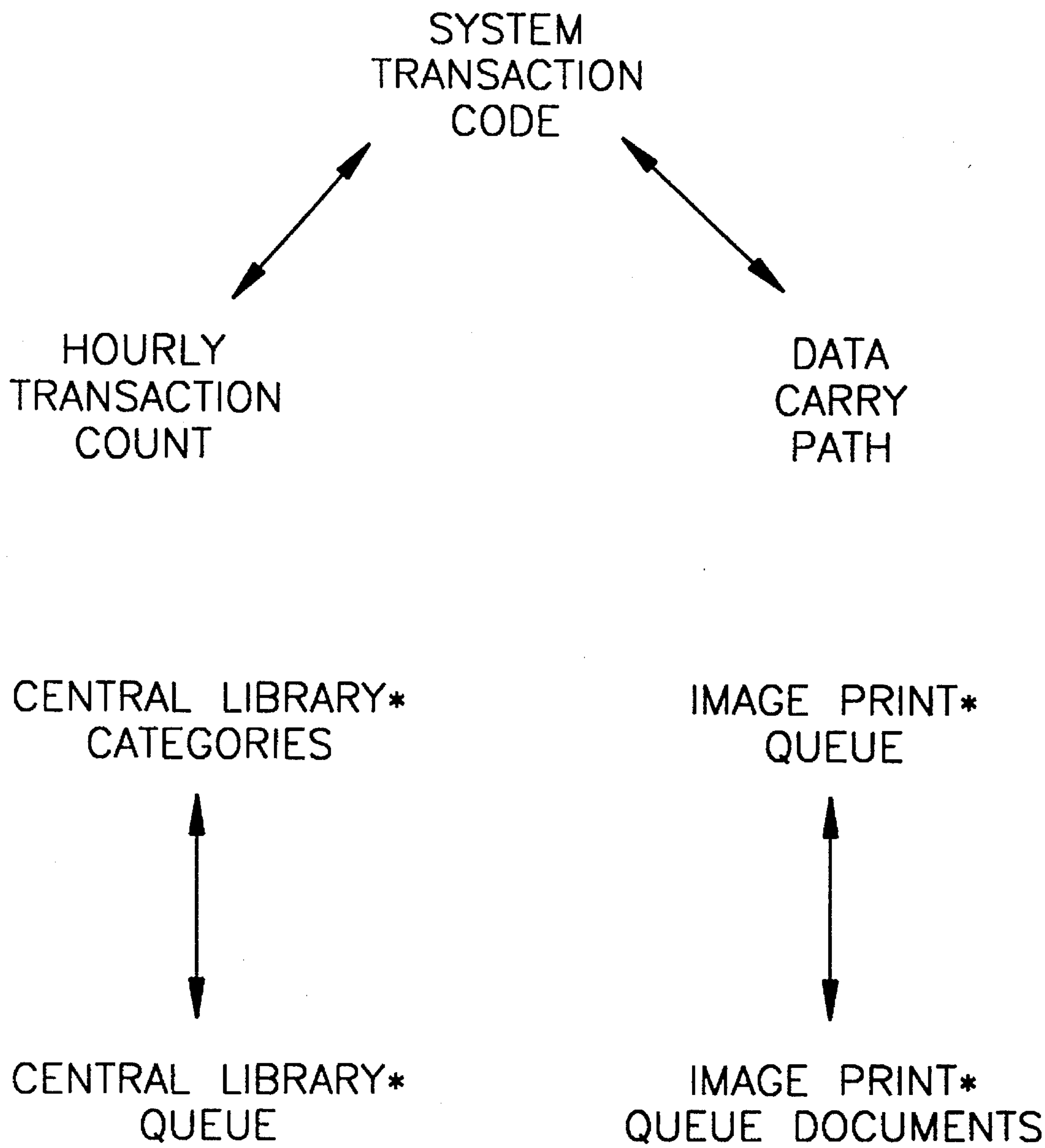
FIG. 34 is a flow diagram depicting the flow of information between various database tables in accordance with the present invention.
Figure 35:
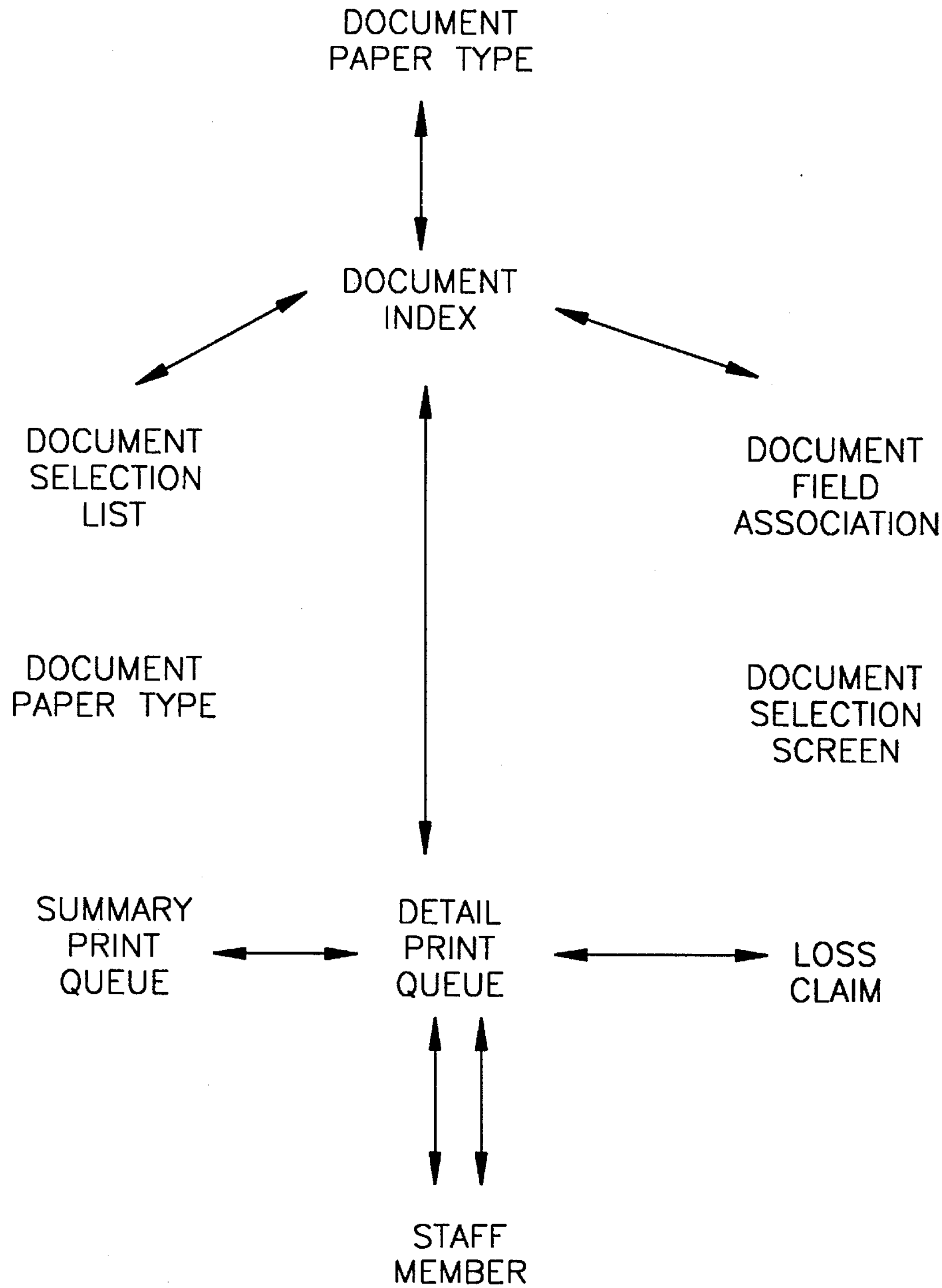
FIG. 35 is a flow diagram depicting the flow of information between the Text Processing database tables.
Figure 36:
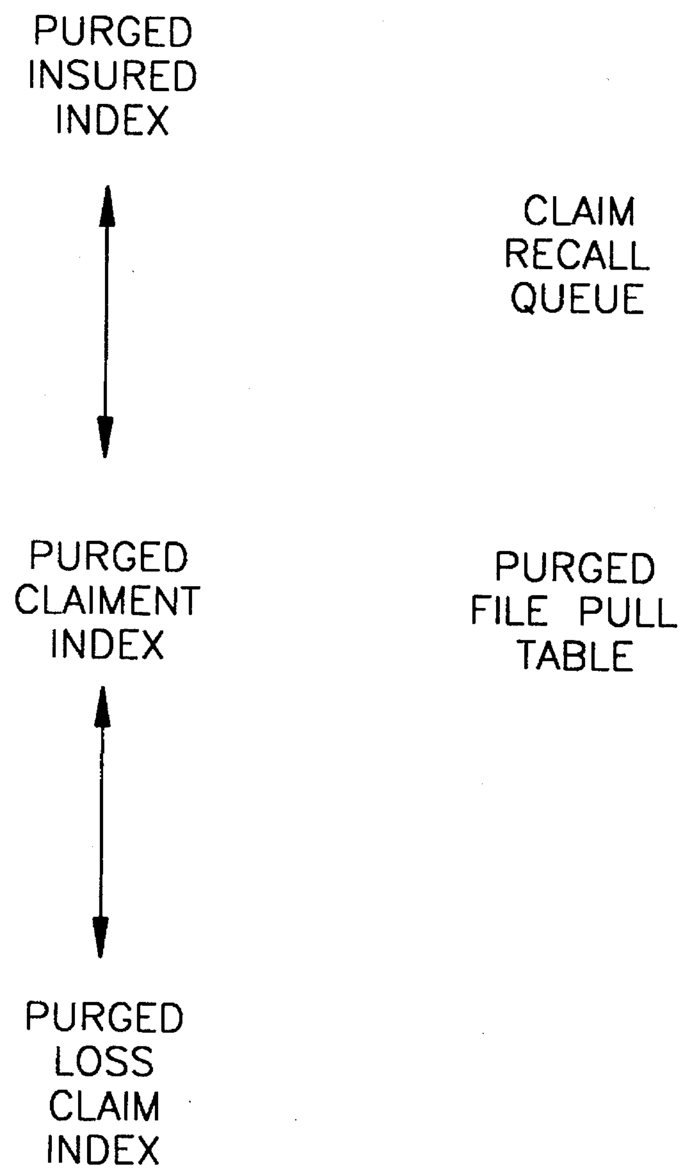
FIG. 36 is a flow diagram depicting the flow of information between database tables associated with the purge and recall functions of the System of the present invention.
Figure 37:
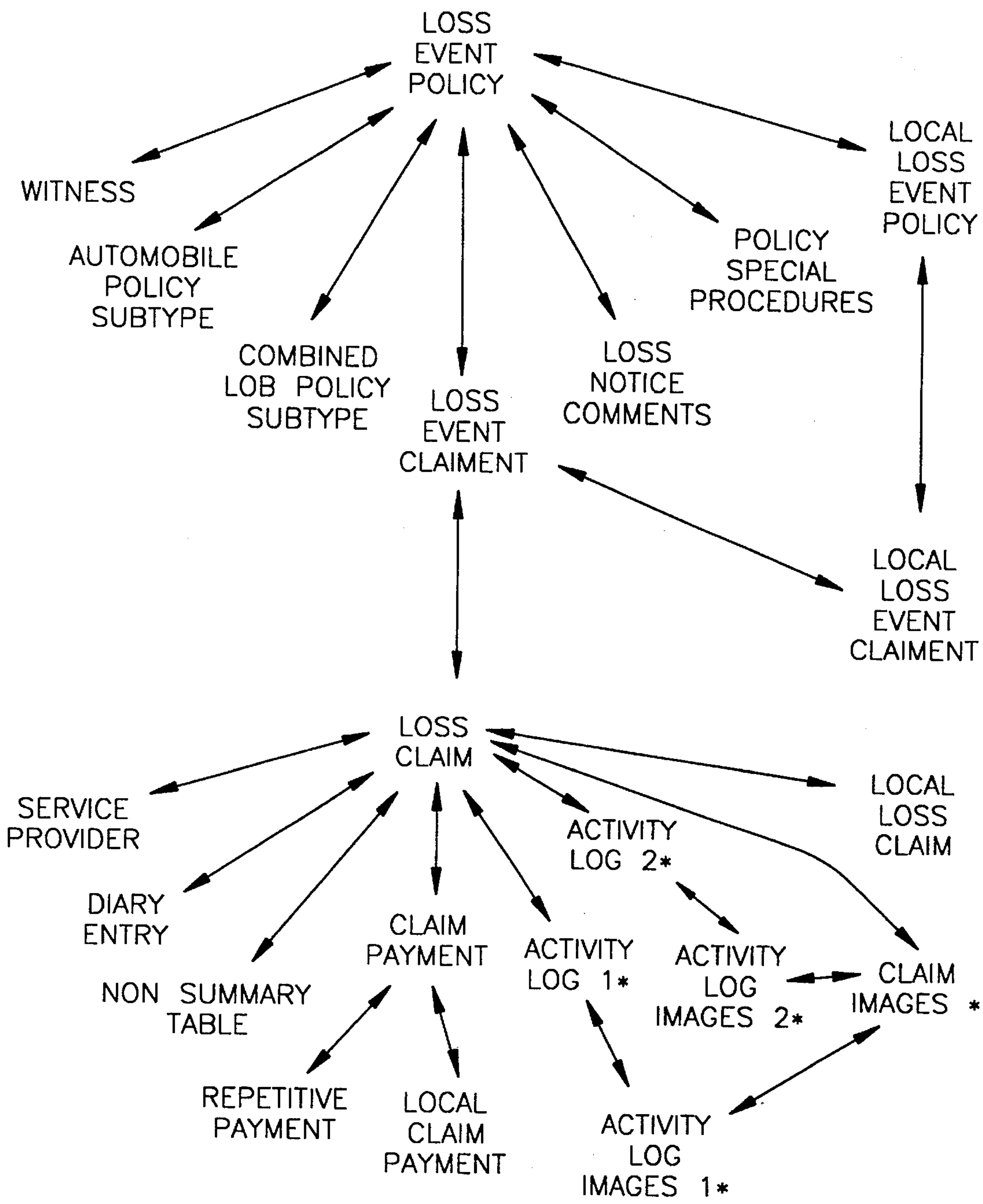
FIG. 37 is a flow diagram depicting the flow of information between the database tables of the Purge database of the present invention; and FIG. *38a–38e* together comprise a block diagram depicting an overview of the System in accordance with the second embodiment of the present invention.
Figure 38A:
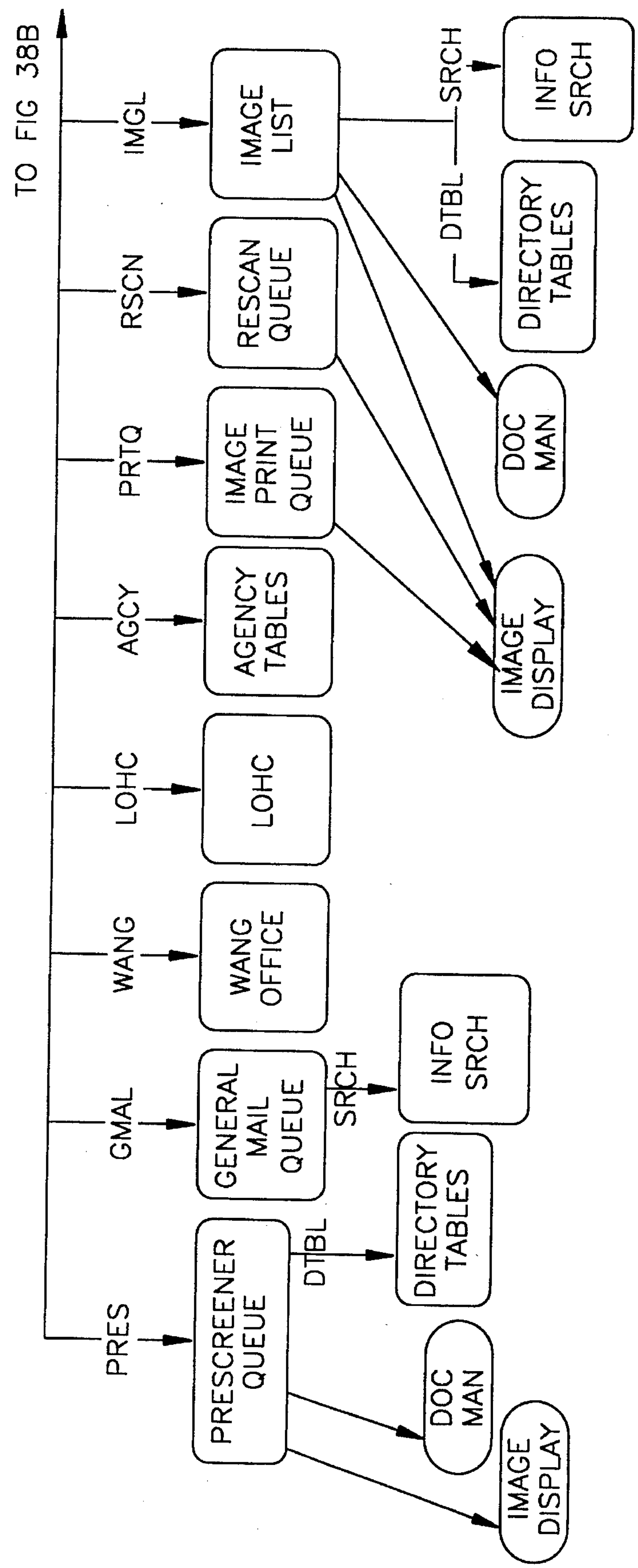
Figure 38B:
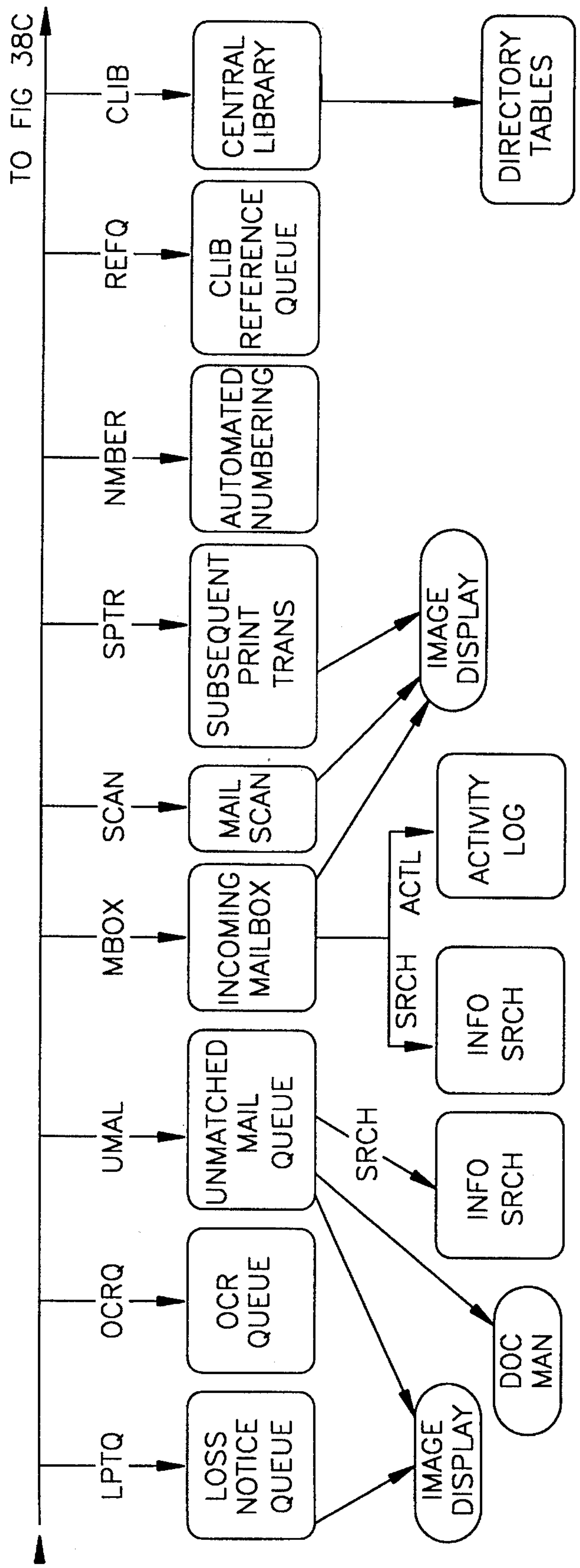
Figure 38C:
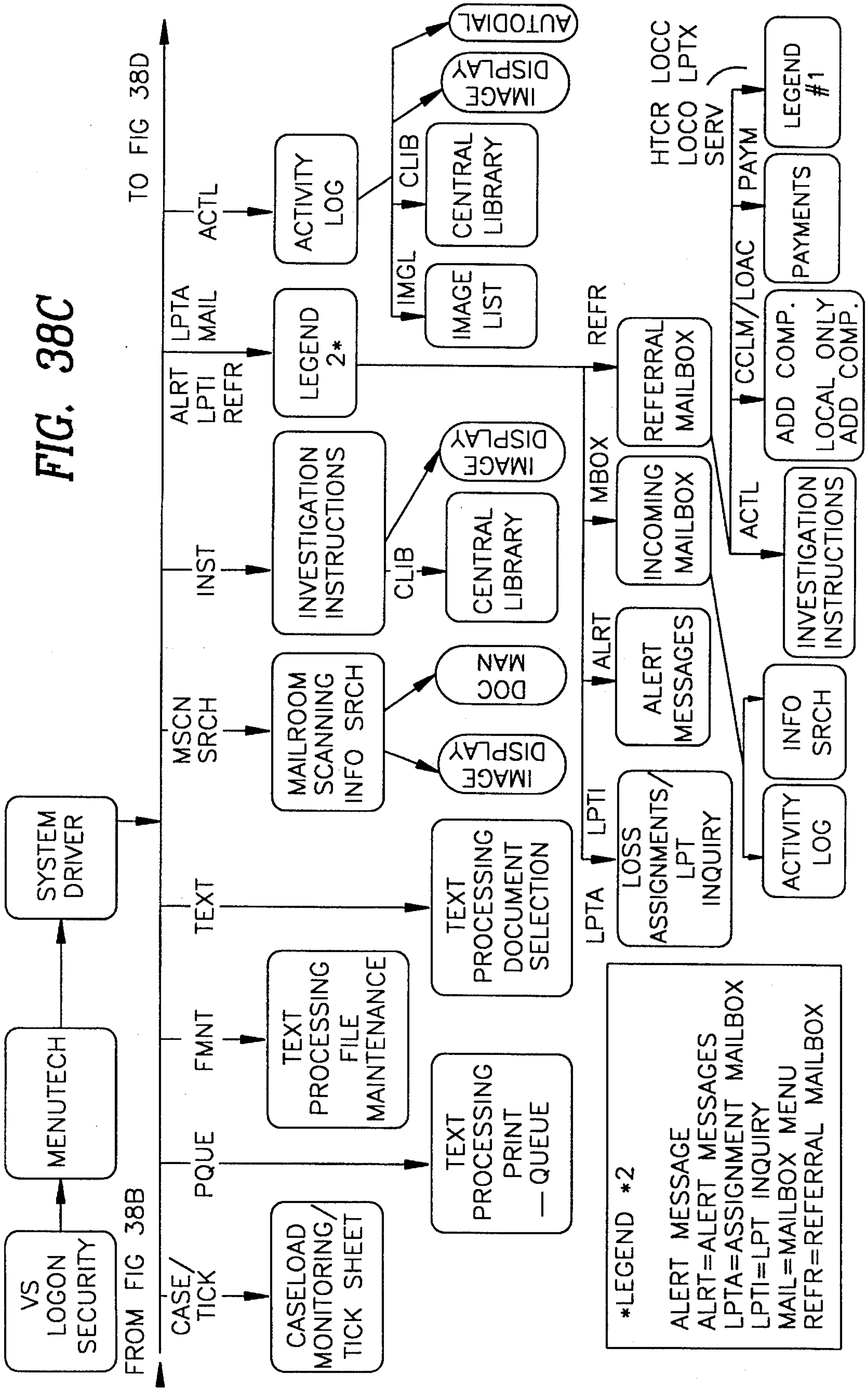
Figure 38D:
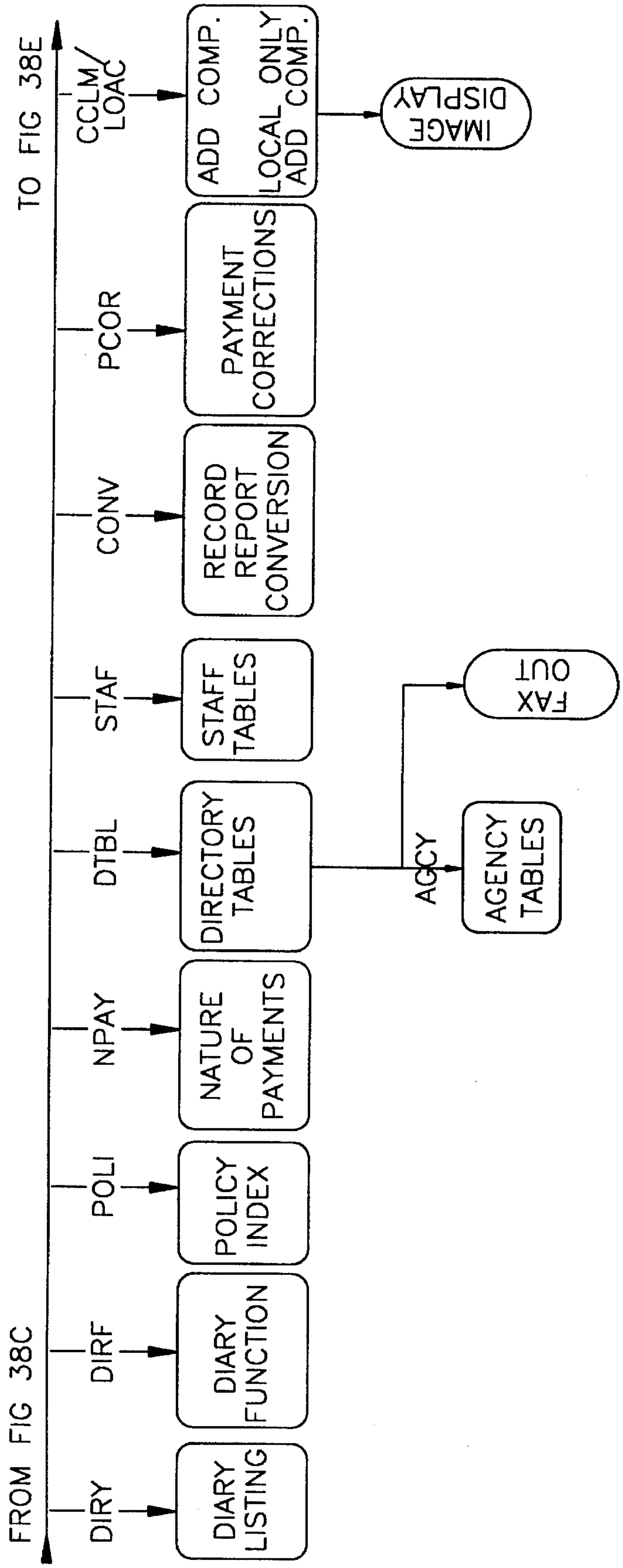
Figure 38E:
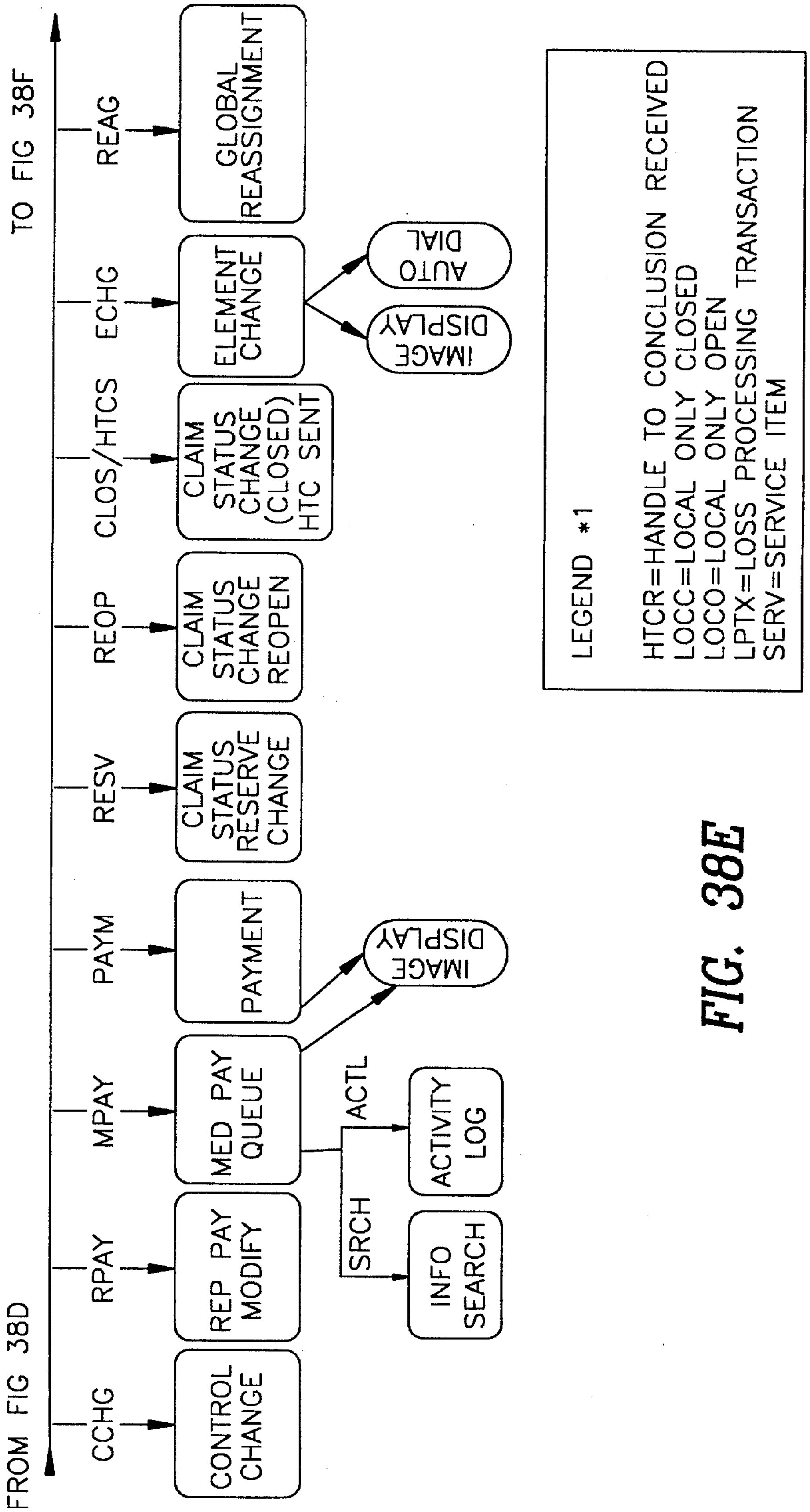
Figure 38F:
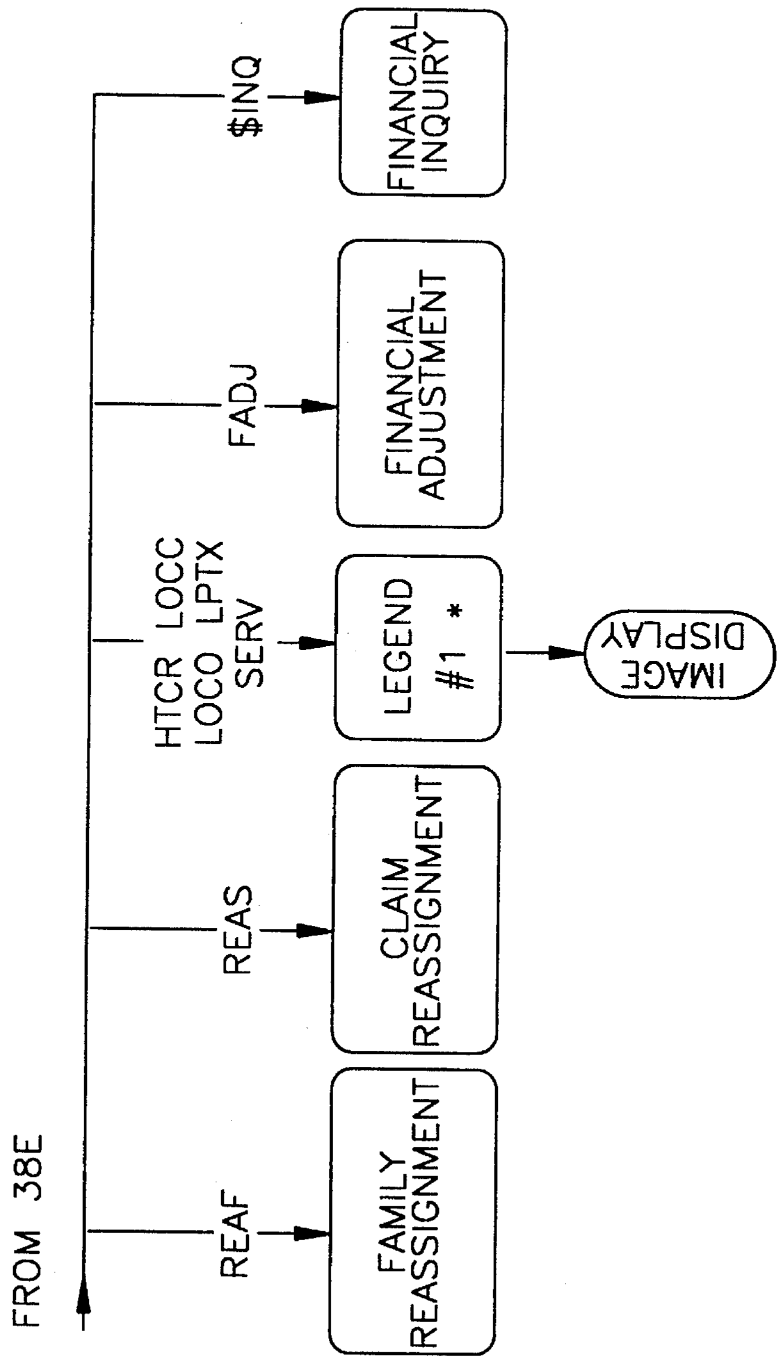

Each of the databases comprises a plurality of database tables. These tables are relational in nature and some directly share information. However, some of the table are "stand-alone." FIGS. 30–37 show the relationships of the Main database's tables as well as those of the Purge database. Referring to FIGS. 30, 32 and 33, the main sources for information used by the Main database tables are the Loss Event Policy Table (See FIG. 30), the Loss Claim Table (See FIG. 30), the Event Queue Table (See FIG. 32) and the Staff Member Table (See FIGS. 30 and 33). FIG. 31, shows the database tables which are associated with the second embodiment, in their various relationships. These database tables are essentially used to accommodate the use of images. Those Main database tables which are stand-alone tables are listed below:

MAIN DATABASE STAND-ALONE TABLES

| ARCHIVE/PRE-FETCH | OCR |
|---|---|
| Archive Volume Type Table | OCR Form ID Table |
| Claim Symbol Table | OCR Job Statistics |
| Document Work File | OCR Prefill |
| Document Work File | OCR Prefill2 |
| Image Pre-Fetch History | OCR Property Prefill |
| Volume Information Table | OCR Property Prefill2 |
| | OCR Queue |
| | OCR Workers Comp Prefill |
| | OCR Zones |
| **WORK MEASUREMENT** | **MISCELLANEOUS** |
| Policy Group Market | Age Table |
| Work Measurement Claim Summary | Image Types |
| Work Measurement Rollup | Loss Notice Mail |
| Work Measurement Summary | Queue |
| Work Measurement Table | Mail Queue |
| Messages | Rescan Queue |
| Error Log | Scan Volumes |
| Generated Identifier Catalog | Type of Injury |
| Communication Parameters | Host Transmission |
| Query Parameter Table | Shadow |
| Reserve Parameter Table | Insured Claimant |
| Claims Reserve Counts | Name Change |
| Host Transmission Buffer | Host Return Buffer |

All the Main database tables and their respective purposes are enumerated below in Table XCIV.

TABLE XCIV

| TABLE NAME | DESCRIPTION |
|---|---|
| Activity Log Images1 Table | Images related to the Activity Log Comments (AOL) |
| Activity Log Images2 Table | Images related to the Activity Log Comments (WC) |
| Activity Log1 Table | Activity Log Table (AOL) |
| Activity Log2 Table | Activity Log Table (WC) |
| Administrative Unit Table | Valid Unit IDS and Descriptions |
| Age Table | Stores exception diary criteria by claim symbol |
| Agency Table | Agency Table |
| Alert Message Table | Contains alert messages to staff members |
| Alpha Claimant Index Table | Index of loss event claimant by claimant name |
| Alpha Insured Index Table | Index to loss event policy records by insured name |
| Archive Volume Type Table | Stores the type of archive volumes and which type takes priority |
| Automotive Policy Subtype Table | Policy data related to automobile line of business |
| Caseload Parameter Table | Temporary table used for caseload queries |
| Central Library Categories Table | Stores different catergories for CLIB |
| Central Library Queue Table | Central library documents |
| Claim Images Table | Images related to the claim and claim family |
| Claim Payment Table | Payment and payee data relating to a claim |
| Claim Recall Queue Table | Claims to be recalled from the purge volume |
| Claim Symbol Table | Criteria to archive images based on claim symbol |
| Claims Reserve Counts Table | Temporary table containing the counts for reserve ranges set up for the reserve reports data in table built at processing time |
| Combined Line of Business Policy Subtype | Policy Information for property G-L policies |
| Communication Parameters Table | Date specific information so information would not be hard coded. Also used to pass information to and from AB program to driver |
| Data Carry Path Table | Valid data carry paths |
| Detail Print Queue Table | Detail level print queue for text processing |
| Diary Entry Table | Stores diary entries for the diary function |
| Diary Entry for Rollover Table | This table description is used solely by the diary rollover job for performance. It eliminates use of count fields |
| Directories Table | Directory table |
| Document-Field Association Table | Document field association for text processing |
| Document ID Table | Table to identify information about document IDs |
| Document Index Table | Document index for text processing |
| Document Manager Table | Used by Document Manager function to display results of various Document Manager functions before actually applying the changes |
| Document Paper Type Table | Paper types and names for text processing |
| Document Selection List Table | Document selection list for text processing |
| Document Selection Screen Table | Virtual table used for document selection |
| Document Work File Table | Temporary filed used to sort records to be archived by plate order |
| Error Log Table | Log errors occurring behind the scenes |
| Event Queue Table | Queue of various transactions' control information |

TABLE XCIV-continued

| TABLE NAME | DESCRIPTION |
|---|---|
| Generated Identifier Catalog Table | This file supports automated numbering for generation of surrogate identified |
| Host Returned Buffer Table | Holds the records returning from the host interface with errors, when the transaction hardcopy for them can't be produced due to LOHC problems |
| Host Transmission Buffer Table | Contains data needed to transmit FOCS transactions to the host. Any change made to this table must be made to host transmission shadow. |
| Host Transmission Shadow Table | This is a duplicate of the host transmission buffer table to be used for recovery. When a change is made to Host Transmission Buffer Table make same changes here |
| Hourly Transaction Count Table | Count of transactions/hour |
| Image Prefetch History Table | Track number times document pre-fetched |
| Image Print Queue Table | Image print requests |
| Image Print Queue Documents Table | Documents to be printed related to image print queue |
| Image Types Table | Valid types of images and their description |
| Insured-Claimant Name Change Table | This table will be used to store the insured and claimant name changes made during any one day |
| Job Description Code - AMC Table | Valid adjustment method codes and job descriptions |
| Local Claim Payment Table | Local payment data |
| Local Claim Payment Labels Table | Labels for the local payment data fields |
| Local Loss Claim Table | Local claim information |
| Local Loss Claim Labels Table | Labels for local loss claim data fields |
| Local Loss Event Claimant Table | Local claimant information |
| Local Loss Event Claimant Label Table | Labels for local claimant data fields |
| Local Loss Event Policy Table | Local loss event information |
| Local Loss Event Policy Labels Table | Labels for local loss event policy data fields |
| Loss-Claim Table | Specific loss and claim data |
| Loss Event Claimant Table | Potential claimant data |
| Loss Event Policy Table | Loss event, policy, insured data |
| Loss Notice Comments Table | Loss contact and comments |
| Loss Notice Mail Queue Table | Stores information about scanned loss notices until such time as they're linked to claim, deleted or re-classified |
| Mail Queue Table | Information on newly scanned or re-scanned mail |
| Messages Table | Error or informational message text identified by code |
| Nature of Payment Table | Valid nature of payment codes and corresponding text |
| Nature of Benefit Summary Table | Summary of paid amounts by claim by nature of benefit |
| OCR Form ID Table | Description of forms defined for OCR process |
| OCR Job Statistical Table | Statistical information for each OCR job processed |
| OCR Prefill | Data extracted from OCR process for automobile line of business |
| OCR Prefill 2 Table | Extension of data extracted from OCR process for auto line of business |
| OCR Property Prefill Table | Data extracted from OCR process for property line of business |
| OCR Property Prefill 2 Table | Extension of data extracted from OCR process for property line of business |
| OCR Queue Table | Contains information about images to be processed by OCR |
| OCR Workers Comp Prefill Table | Data extracted from the OCR process for workers comp line of business |

TABLE XCIV-continued

| TABLE NAME | DESCRIPTION |
|---|---|
| OCR Zones Table | Describes each zone within an OCR form |
| Office Table | Identifies attributes that are unique to a given office |
| Policy Group Market Table | Valid group and market segment codes by policy symbol. Used by work measurement routing |
| Policy Index Table | Table for storing policy information (primarily but not limited to commercial lines) for those policies which are not automated (not on PMF) |
| Policy Information Table | Table for storing policy information (primarily but not limited to commercial lines) for those policies which are not automated (not on PMF) |
| Policy Prefill Buffer Table | Driver/vehicle prefill from host |
| Policy Special Procedures Table | Procedural/handling instructions for policy |
| Print Trans Parameters Table | Print transaction paramenters |
| Print Trans Parameters - Witness Table | Print transaction parameters for witness changes |
| Print Transactions Parameters - Service Provider Table | Print transaction parameters for service provider changes |
| Priority Mail Recipients Table | Identifies staff members who are recipients of "Priority" mail |
| Purged Claimant Index Table | Index of purged claimant data |
| Purged File Pull Table | Used to create a report of all the paper files to be pulled |
| Purged Insured Index Table | Index of purged insured data |
| Purged Loss Claim Index Table | Index of purged loss claim data |
| Query Parameter Table | Query parameters for caseload reporting |
| Reassignment Parameters Table | Print transactions - parameters for reassignments child of event queue |
| Repetitive Payment Table | Repetitive pay - schedule payment dates with descriptive text |
| Rescan Queue Table | Contains information about images that need to be re-scanned |
| Reserve Parameter Table | Table used to enter requests for the different types of reserve reports |
| Response Timings Table | Function to function response times |
| Scan Volumes Table | Identifies the volumes where images will be scanned |
| Service Provider Table | Service providers related to a claim |
| Staff Detail Case Load Counts Table | Pace counts and formulas to track case load |
| Staff Member Table | Staff member data |
| Staff Member Counts Table | Contains various counts by staff member |
| Staff Member Daily Diary Table | Contains records needed to identify the existence of personal diaries |
| Statistical Coding Table | An extension of the loss claim table containing statistical coding information |
| Summary Print Queue Table | Summary level print queue for text processing |
| System Transaction Code Table | Valid system transaction codes |
| Type of Injury Table | Table used by agency inquiry. Holds the prompt IDs to play back the various types of injuries based on code entered on claim |
| Volume Information Table | Contains information about the magnetic and optical disk volumes. Used by scan, image archive and backup functions |
| Witness Table | Potential witness data - information about witnesses of a loss |
| Work Measurement Claim Summary Table | Claim summary information for claims logged by work measurement |
| Work Measurement Rollup Table | Daily summary (rollup) of the work measurement detail records |

TABLE XCIV-continued

| TABLE NAME | DESCRIPTION |
|---|---|
| Work Measurement Summary Table | Historical summary information on the work measurement activities performed on specific claims |
| Work Measurement Table | Daily work measurement detail data capture records |

3. Other Embodiments

As indicated previously the present invention is a system and method for substantially automating work management. While reference has been made to a claim processing system, numerous other applications will occur to those of skill in the art.

In another preferred embodiment of the present invention, the work activities of attorneys in a law office are managed through the present system and method.

The Initial Input Transaction (equivalent to the LPTX) generically provides a facility for recording case specific information. In a law office, each case that is received is recorded through the Initial Input Transaction (IIT). The matter name and type as well as the expected cost, etc. are input through the IIT. By way of example, for a trademark application, the particular trademark, its goods and the date of first use are all recorded through the IIT.

The Work Source Index (equivalent to the Policy Index) generically provides an accessible database of work source information. In a law office, the Work Source Index (WSI) is maintained as a client database. Thus, when an IIT is input for an existing client, the basic client information is extracted from the WSI and prefills some of the IIT fields. This is done by inputting the client number through a WSI screen.

The Staff Table function generically provides a facility for storing information relevant to office personnel. Specifically, in a law office, the Staff Tables are used to maintain authority levels for access to certain functions (e.g. billing, docketing, etc.), to track vacation schedules, to indicate experience levels, to indicate billing rate, to indicate areas of expertise, to record Patent Office registration numbers, to set overall caseload limits and daily diary or due date limits, to indicate a supervising attorney, etc.

The Diary function generically provides a means for prioritizing work and for scheduling various tasks. In a law office, the diary is used to docket legal due dates, to schedule meetings, to set business deadlines and to maintain and report certain attorney specific date information (e.g. the meeting of business deadlines, the number of times diary entries rollover, the number of events diaried for a single day or time period, etc.).

The Activity Log function generically maintains a record of key activities involved in the processing of work items. In a law office the Activity Log is a very important tool for tracking activity on a case and activity undertaken for a particular client. In practice the Log can be employed on two separate levels. The first level permits simply the tracking of important activities which occur in handling a case (e.g. the receipt of an Office Action, a telephone conference with an Examiner, the mailing of an amendment, etc.). On the second level, the Log is used to track attorney billing. In such cases an attorney accesses the log for a particular client and the specific matter and inputs a description of the work done and the time spent. This information is then directly fed into an automatic billing function (corresponding to the payment function).

The generation of Alert Messages generically provides for the routing of such messages automatically to appropriate staff members upon the breach of some predetermined criteria. In a law office, such messages are provided when too much time is spent on a case, when deadlines are missed, when system security locks out an attempted entry, when a deadline is assigned during a scheduled vacation, etc.

The Mailbox function generically provides a facility for referring work tasks and receiving alert messages. In a law office cases are assigned with notification placed in attorneys' mailboxes. The cases, and work generated thereon (e.g. a brief, a patent application, etc.), are also routed for review and revision to other attorneys.

The Caseload Monitoring function generically provides a facility to track and report the workload of the staff. In a law office each attorney's caseload is monitored to insure even distribution. Further, with this function it is possible to monitor an attorney's progress on specific types of cases.

The Reassignment function generically provides a facility to move work from one staff member to another. In a law office one or more cases can be easily reassigned to another attorney. The need for reassignment frequently occurs when an attorney leaves or when a case evolves to a point where a higher level of expertise is needed.

Automated numbering is of particular value in a law office. Each case must be identified with a client and matter numbers for easy reference. As such, the system provides such numbers automatically without worry of duplication. Moreover, with the present system and method there is no need to re-record the numbers for billing purposes.

Text Processing generically provides for the generation of preformatted form letters. It includes system controlled extraction of applicable information from local databases to prefill blank fields, automatic Activity Log recording and paper type and copy management. In a law office Text processing is used to automatically generate forms for legal filings (e.g. declarations, powers of attorney, etc.), letters (reporting letters and the like) and billing statements. The openings and closings of letters, as well as the openings and closings of trademark/patent applications and amendments are also automatically generated. The intervening text is input as with any other word processing package.

The Directory Tables function generically provides a facility for storing names, addresses and other pertinent information of individuals/services. In a law office the Directory Tables function is used to maintain clients' names and addresses as well as the names and addresses of courts, process servers, expert witnesses court reporters, etc.

The Info Search function generically provides a facility to search for information resident on local databases. In a law office the Info Search function is used to quickly provide clients with status reports without attorney intervention, to locate case numbers, to determine time billed to a case, etc.

The Local Data function generically provides a facility for customization of data recordation and output at the local level. In a law office the local data function is used for a variety of things including statistical tracking of client locations, categories of work, etc. However, local data can be used for virtually any database management needs.

The Help function, the Print Queue Management functions, the Data Carry facility and the various Change functions (e.g. Control Change, Element Change, etc.) all perform the same tasks in generic and law office environments. These functions all augment the use of the specific work processing functions.

The ability to input, maintain and display images is an important addition in a law office environment. All incoming mail, including court documents, payments, agency communications and general correspondence, is scanned into the System. The various documents are matched with existing cases or recognized as new matters and routed to the appropriate queues. Those persons assigned to input new matters, access the Prescreener's Queue, input new information from the correspondence and route the image to the appropriate attorney for review. General correspondence gets immediately tagged to the file and routed to the assigned attorney assistant for docketing through the Diary function. After docketing, the correspondence is routed to the attorney's Incoming Mailbox for review.

Sending and receiving faxes is a simple matter when undertaken through the System. Images can be collected from anywhere in the matter file, attached to a Word Processing document and faxed out to a client, opposing counsel, etc. Similarly, incoming faxes are automatically received as an image and then routed by a mail clerk to the appropriate attorney.

Since time is automatically tracked by the System, it is easy for an attorney to access the appropriate matter and allow the System to track his time spent. This can be done even if the work is not being done through the System. This function is particularly helpful when incoming calls are taken through the 'Start Call' function and then matched to a particular matter. In sum, an attorney's entire billing for the day can be accounted for through the System.

Ultimately, the greatest utility of the imaging features of the present invention lies in the ability to capture documents produced and received during litigation. The capability of the System to locate every single document in seconds significantly reduces the document management time required by attorneys and paralegals. Still further, when this is coupled with remote image access, the environmental applications are greatly expanded. For example, when an attorney is examining a witness at a trial or during a deposition, the System provides the ability to immediately locate a forgotten document and display and/or print it for review by the attorney or witness. Moreover, when a trial is held at a location geographically remote from the attorney's office, only original documents need to be transferred. Multiple copies and back up materials requiring storage space and organizational effort are unnecessary. Each attorney working on the case can access documents in the "home office" at will.

While reference has been made to specific hardware, software and functional elements, these are meant as illustrative only and one of skill in the art may alter such elements without departing from the spirit and intent of the present invention.

What is claimed is:

1. A computer implemented method of managing work through a system comprising the steps of:

- providing a processing means for processing data related to a work matter, including data stored in a storage means electronically interconnected therewith;
- providing a plurality of intelligent terminals each having data storage and retrieval equipment, a display screen and at least one input device, wherein said intelligent terminals are electronically linked to and communicate with said processing means and are capable of accessing, displaying and storing data stored in said interconnected storage means;

- providing at least one electronic scanner operably connected with a suitable instrumentality for operating on an output of said electronic scanner which instrumentality may include one of said intelligent terminals;
- scanning a plurality of documents, with said electronic scanner, to create a plurality of electronic images, each said electronic image corresponding to a page of said plurality of documents;
- inputting information through said intelligent terminal connected to said scanner to categorize said documents;
- transmitting said electronic images to said processing means for storage on said data storage means;
- creating, for each said document, a document summary file, including at least a portion of said characterization information and time, date and location information for said document and
- writing said summary file information as at least one record to a database table located in said data storage means;
- displaying a list, comprising at least a portion of said extracted information, corresponding to at least a portion of said records, at one of said intelligent terminals, as an indication of the presence of scanned documents;
- selecting an image for display from said displayed list;
- retrieving said image from its location on said main computer's data storage equipment;
- displaying said retrieved image at one of said intelligent terminals;
- linking said displayed image with a previously designated work matter;
- automatically generating a comment describing said displayed image to an activity log stored in said storage means and linked to said work matter;
- permanently associating said displayed image with said comment;
- saving said comment, said image association and said work matter association on said main computer's data storage equipment;
- providing a database table indicating a person associated with the processing of a work matter;
- providing a staff member database table including a plurality of records each having information describing the attributes of a person associated with the processing of work matters;
- comparing the person associated with the processing of a work matter with said plurality of records of said staff member database table; and
- locating a record of said staff member database table corresponding to said person associated with said work matter.

2. A computer implemented method of managing work through a system, said system including a processing means for processing data related to a work matter, a storage means, and a plurality of intelligent terminals, wherein said storage means and said intelligent terminals are electronically linked with such processing means, comprising the steps of:

- collecting and storing data in said storage means, which data may include information generated externally to said system, information resident in said system at an initial time, information developed in the course of work management activity, and staffing information related to said work matter;

scanning a plurality of documents with an electronic scanner having an output suitably linked with a processing instrumentality for processing and storage of an output signal from said scanner whereby a plurality of electronic images, corresponding to scanned portions of said plurality of documents, are created and stored, and wherein said scanned documents may include a portion of said information generated externally to said system, and further wherein characterization information in respect to said scanned documents may be linked to said electronic images through operation of said processing instrumentality;

causing said electronic images created by said scanner, including such characterization information as may have been linked to said images, to be stored in said data storage means, through operation of said processing instrumentality;

creating a document summary file for each document so stored in electronic image form, including at least a portion of said characterization information, time, date, and location information for that document, and writing that summary file information to a record in a database table in said data storage means;

routing a preselected portion of said summary file information to one of said intelligent terminals for display at said terminal and, at an operator's option, causing at least one of said electronic images associated with one of said documents included in said preselected portion of said summary file information to be displayed by said terminal for processing by said operator; and recording all processing activities by said operator in an activity log associated with said work matter, whereby said activity log is electronically stored in said storage means and linked with said work matter at all times during which said work matter is being processed in said system.

3. The method according to claim 2 comprising the additional steps of:

causing at least one of said documents included in said preselected portion of said summary file information to be operated on by an optical character recognition device, whereby selected portions of said electronic images associated with that document are converted from image data to text data;

linking said converted text data with a designated work matter;

creating a matter summary file identifying at least said designated matter and said converted text data linked thereto, and storing said converted text data along with said summary file identification data for said designated work matter in said data storage means; and causing at least one of said matter summary files to be displayed at one of said intelligent terminals for processing by an operator situated thereat, in accordance with a predetermined processing regime, and, at said operator's option, further causing detailed information stored in said storage means, and associated with said matter summary file, to be displayed at said intelligent terminal.

4. The method according to claim 3 comprising the additional steps of:

automatically sending data corresponding to said stored images to said optical character recognition device; reading data from preselected areas of said image and converting said data to text data; and writing said text data to a database table.

5. The method according to claim 2 comprising the additional steps of:

electronically connecting an input/output terminal at a remote location with said processing means, wherein said terminal includes a display screen;

remotely accessing said processing means from said terminal and selecting at least one image for display on said remote terminal;

causing said selected image to be transmitted to said remote terminal; and displaying said image on said remote terminal display screen while maintaining access to said processing means.

6. The method according to claim 2 comprising the additional steps of:

providing a database table wherein a person associated with the processing of a work matter may be identified;

providing a staff member database table including a plurality of records each having information describing attributes of a person associated with the processing of work matters;

comparing identity information for said person associated with the processing of a work matter with records in said staff member database table;

locating a record in said staff member database table corresponding to said person associated with said work matter.

7. The method according to claim 6 comprising the additional step of automatically transmitting a selected electronic image to an electronic address listed in said staff member database table for said person associated with said work matter.

8. The method according to claim 2 comprising the additional steps of:

initially storing said scanned electronic images on magnetic storage media associated with said storage means;

transferring a first portion of said stored images from said magnetic media to optical disk storage means operatively linked to said processing means after a first preselected period of time based on required image access; and transferring a second portion of said stored images from said magnetic media to said optical disk storage means after a second preselected period of time, said second period of time being of greater duration than said first period of time and being based on required image access.

9. The method according to claim 8 comprising the additional step of determining whether said transferred portion of said stored images is removed from said magnetic media in said first or second preselected period of time based on the type of work matter with which the image is associated.

10. The method accordingly to claim 2 comprising the additional steps of:

annotating a selected scanned electronic image via an input to said processing instrumentality;

saving said annotations on said storage means;

merging said annotation and said selected image; and displaying said merged annotated image at one of said intelligent terminals.

11. The method according to claim 2 comprising the additional step of:

providing a plurality of queues for displaying at least a portion of said summary file information for different preselected types of documents as identified, at least in part, by said document characterization information.

12. The method according to claim 2 comprising the additional steps of:

providing an image list to store and display an indication of every scanned electronic image associated with a particular work matter; and providing an electronic reference library for storage and display of reference images used in making decisions with respect to work matters, wherein said reference images can be associated with particular activity log comments to substantiate a decision.

13. The method according to claim 2 comprising the additional steps of:

providing a means to handle payments through the system;

automatically generating a payment comment to said activity log when a payment is handled through the system; and causing documentation associated with said payment to be scanned into the system and the resulting electronic images to be thereafter linked with said activity log payment comment.

14. The method according to claim 2 comprising the additional steps of:

providing a means for accepting incoming telephone calls;

automatically answering said telephone calls with a prerecorded message;

automatically prompting for information from a caller, wherein said information is to be input by the caller through a telephone keypad;

receiving information input by the caller through said telephone keypad; and providing information, based on said input keypad information, from said processing means to said caller in the form of voice communication.

15. The method according to claim 2 comprising the additional steps of:

selecting a party to whom a telephone call is to be made;

automatically dialing the selected party's number based on previously input information;

automatically generating an activity log comment regarding the call; and automatically recording the duration of the call, if the call is completed.

16. The method according to claim 2 comprising the additional steps of providing means to split, insert, re-order or copy said scanned electronic images.

17. A computer-implemented method for managing work through a system, said system including a processing means for processing data related to a work matter, a storage means interconnected with said processing means and a plurality of intelligent terminals electronically linked with said processing means, said method comprising the steps of:

scanning a plurality of documents with an electronic scanner having an output suitably linked with a processing instrumentality for processing and storage of an output signal from said scanner whereby a plurality of electronic images, corresponding to scanned portions of said plurality of documents, are created and stored, and wherein said scanned documents may include a portion of said data related to said work matter, and further wherein characterization information in respect to said scanned documents may be linked to said electronic images through operation of said processing instrumentality, summarizing said data related to said work matter into a summary file, electronically linking said data and said summary file, storing said data and said summary file in said storage means subject to retrieval by an operator at one of said intelligent terminals for processing by said operator, and recording the processing by said operator in an activity log associated with said work matter, whereby said activity long is electronically stored in said storage means and linked with said work matter at all times during which said work matter is being processed in said system.

18. The method according to claim 7 comprising the additional step of:

causing said electronic images created by said scanner, including such characterization information as may have been linked to said images, to be stored in said data storage means, through operation of said processing instrumentality.

19. The method according to claim 17 comprising the additional step of:

creating a document summary file for each document so stored in electronic image form, and writing that summary file information to a record in a database table in said data storage means.

20. The method according to claim 19, comprising the additional step of:

routing a preselected portion of said summary file information to one of said intelligent terminals for display at said terminal and, at an operator's option, causing at least one of said electronic images associated with one of said documents included in said preselected portion of said summary file information to be displayed by said terminal.

21. The method according to claim 20 comprising the additional step of:

causing at least one of said documents included in said preselected portion of said summary file information to be operated on by an optical character recognition device, whereby selected portions of said electronic images associated with that document are converted from image data to text data.

22. The method according to claim 21 comprising the additional step of:

linking said converted text data with a designated work matter.

23. A computer-implemented method of managing work through a system, said system including a processing means for processing data related to a work matter, a storage means interconnected with said processing means and a plurality of intelligent terminals electronically linked with said processing means, comprising the steps of:

scanning a plurality of documents with an electronic scanner having an output suitably linked with a processing instrumentality for processing and storage of an output signal from said scanner whereby a plurality of electronic images, corresponding to scanned portions of said plurality of documents, are created and stored, and wherein said scanned documents may include a portion of said data related to said work matter, and further wherein characterization information in respect to said scanned documents may be linked to said electronic images through operation of said processing instrumentality;

providing an electronic reference library for storage and display of reference images used in making decisions with respect to work matters, wherein said reference images are associated with particular activity log comments to substantiate a decision;

causing said elctronic images created by said scanner, including such characterization information as may have been linked to said images, to be stored in said dtat storage means, through operation of said processing instrumentality;

providing a plurality of system functions for processing work, wherein said work is derived from said electronic images; and automatically moving a user between said plurality of functions based on document type and function.

24. A computer-automated system for managing work comprising:

a processing means for processing data relates to a work matter and a storage means electronically linked thereto, wherein data is collected and stored in storage means, which data may include information generated externally to said system, information resident in said system at an initial time, information developed in the course of work management activity, and staffing information related to said work matter;

a plurality of intelligent terminals interconnected with said processing means and said data storage means such that said terminals are able to access, display and store data stored n said data storage means;

an electronic scanner for scanning a plurality of documents, said scanner having an output suitably linked with a processing instrumentality for processing and storage of an output signal from said scanner, whereby a plurality of electronic images, corresponding to scanned portions of said plurality of documents, are created and stored, and wherein said scanned documents may include a portion of said information generated externally to said system, and further wherein characterization information in respect to said scanned documents may be linked to said electronic images through operation of said processing instrumentality;

document summary means for creating a document summary file respecting each document so stored in electronic image form, including at least a portion of said characterization information, time, date, and location information for that document, and for writing that summary file information to a record in a database table in said data storage means;

means for routing a preselected portion of said summary file information to one of said intelligent terminals for display at said terminal and, at an operator's option, for causing at least one of said electronic images associated with one of said documents included in said preselected portion of said summary file information to be displayed by said terminal for processing by said operator; and means for recording processing activities by said operator in an activity log associated with said work matter, whereby said activity log is electronically stored in said storage means and linked with said work matter at all times during which said work matter is being processed in said system.

25. The system of claim 24 further comprising:

optical character recognition means disposed for operating on at least one of said documents included in said preselected portion of said summary file information, whereby, upon such operation, selected portions of said electronic images associated with that document are converted from image data to text data;

means for linking said converted text data with a designated work matter;

matter summary means for creating a matter summary file identifying at least said designated matter and said converted text data linked thereto, and storing said converted text data linked thereto, and storing said converted text data along with said summary file identification data for said designated work matter in said data storage means; and means for causing at least one of said matter summary files to be displayed at one of said intelligent terminals for processing by an operator situated thereat, in accordance with a predetermined processing regime, and, at said operator's option, for causing detailed information stored in said storage means, and associated with said matter summary file, to be displayed at said intelligent terminal.

26. A work management system comprising:

processing means, including a data bank into which data is written and from which data is read, said data bank storing information regarding an initial transaction, work source information, office staff information, policy information, information regarding dates of importance, information regarding work processing activities, staff case lead information, and predetermined text data for preparing documents, the data bank including staff table means for storing, retrieving, displaying and modifying information about staff members who access the system, wherein said stored information includes one or more data items selected from the group consisting of: name, user ID, job title, supervisor, experience level, cost rate, diary rollover limit, scheduled vacation, payment authority, and staff functional and processing authority levels;

at least one terminal means for communicating with said processing means and operable by at least one operator to produce requests and to enter information and/or retrieve information for writing and/or reading from said data bank;

display means for displaying information that is entered and retrieved;

first merging means operatively interacting with said processing means for reading out from said data bank selected information regarding work processing activities and selected office staff information and merging said read out work processing activities information and said read out office staff information to compile an activity log listing key work activities and a staff member associated with those activities;

case summary means for automatically summarizing said initial transaction information;

routing means for routing transaction information to a staff member for processing in response to input through one of said terminal means; and staff member electronic queue means for receiving said initial transaction summary and other electronic messages;

assignment means for assigning a case to a particular staff member for processing in response to input through one of said terminal means;

reassignment means for reassigning cases from a particular staff member to another staff member for processing;

diary means for automatically and manually setting, storing and displaying dates for various activities associated with the processing of a case including means for manually overriding automatically set diary dates;

activity log means for automatically recording information about transactions undertaken through the system in the processing of a case and for manually recording information and comments about other activities in the processing of a case including means for selectively displaying said recorded information and comments on said display means;

inquiry means for selectively retrieving and displaying transaction information in response to input of at least one case number through one of said terminal means;

system controller means for controlling an operator's movements within the system, wherein said system controller means verifies the availability of each requested function during a system session and verifies said operator's authority to access a system function prior to permitting such access; and security means comprising security level means for selectively limiting access to certain predetermined functions of the system in accordance with a preset security level associated with each authorization code.

27. The system of claim 26, wherein said data bank is locatable in at least one remote location.

* * * * *